United States Patent
Kemmet et al.

(10) Patent No.: US 12,403,809 B2
(45) Date of Patent: Sep. 2, 2025

(54) TRANSFER RAMP SYSTEMS FOR LOADING, UNLOADING, OR TRANSFERRING CARGO BETWEEN ONE OR MORE COMMERCIAL VEHICLES AND ASSOCIATED SYSTEMS, DEVICES, AND METHODS

(71) Applicant: Node Systems Inc., Los Angeles, CA (US)

(72) Inventors: Ryan Kemmet, Phoenix, AZ (US); Michael Tung, Los Angeles, CA (US); Ilia Smolov, Santa Monica, CA (US); Sang Lim, Los Angeles, CA (US); Nikita Rushmanov, Van Nuys, CA (US)

(73) Assignee: Node Systems Inc., Los Angeles, CA (US)

( * ) Notice: Subject to any disclaimer, the term of this patent is extended or adjusted under 35 U.S.C. 154(b) by 0 days.

(21) Appl. No.: 18/654,932

(22) Filed: May 3, 2024

(65) Prior Publication Data

US 2024/0367572 A1 Nov. 7, 2024

Related U.S. Application Data

(60) Provisional application No. 63/566,210, filed on Mar. 15, 2024, provisional application No. 63/585,202, (Continued)

(51) Int. Cl.
B60P 1/43 (2006.01)
(52) U.S. Cl.
CPC .................. B60P 1/431 (2013.01)

(58) Field of Classification Search
CPC ........................................ B60P 1/431
(Continued)

(56) References Cited

U.S. PATENT DOCUMENTS

| | | | | |
|---|---|---|---|---|
| 3,305,110 A | * | 2/1967 | Tantlinger | B60P 1/6436 414/373 |
| 3,763,827 A | * | 10/1973 | Burkart | B60P 3/04 296/61 |

(Continued)

FOREIGN PATENT DOCUMENTS

FR 1859996 A1 * 11/2007 ............... B60R 3/02

OTHER PUBLICATIONS

ISA/US International Search Report and Written Opinion mailed Sep. 9, 2024 for PCT/US2024/027819 filed May 3, 2024, Applicant: Node Systems Inc., 16 pages.

*Primary Examiner* — Raymond W Addie
(74) *Attorney, Agent, or Firm* — Perkins Coie LLP

(57) ABSTRACT

Transfer ramp systems, including transfer ramp systems for loading, unloading, or transferring cargo between one or more commercial vehicles, are disclosed herein. In one embodiment, a transfer ramp system comprises a transfer ramp and at least one extendable arm attached to the transfer ramp. The at least one extendable arm is usable to extend or retract the transfer ramp. The transfer ramp system is mountable beneath a top platform of a vehicle or trailer. When the transfer ramp system is mounted beneath the top platform, the transfer ramp is moveable between (a) a stowed position in which the transfer ramp is positioned beneath the top platform and (b) a deployed position in which the transfer ramp is usable to bridge a gap between the top platform and another structure for moving cargo between (i) the other structure and (ii) the vehicle or trailer.

36 Claims, 72 Drawing Sheets

Related U.S. Application Data filed on Sep. 25, 2023, provisional application No. 63/583,151, filed on Sep. 15, 2023, provisional application No. 63/499,977, filed on May 3, 2023.

(58) Field of Classification Search
USPC .................................................. 14/69.5–71.1
See application file for complete search history.

(56) References Cited

U.S. PATENT DOCUMENTS

| | | | | |
|---|---|---|---|---|
| 3,870,170 | A * | 3/1975 | Noble .................... | B60P 1/431 |
| | | | | 414/537 |
| 4,114,944 | A * | 9/1978 | Joynt .................... | B60P 1/431 |
| | | | | 296/50 |
| 4,579,503 | A | 4/1986 | Disque | |
| 5,160,236 | A * | 11/1992 | Redding ................ | A61G 3/067 |
| | | | | 14/71.1 |
| 5,253,410 | A * | 10/1993 | Mortenson ............ | B60P 1/431 |
| | | | | 14/71.1 |
| 5,393,192 | A * | 2/1995 | Hall ....................... | B60P 1/431 |
| | | | | 296/61 |
| 6,192,541 | B1 * | 2/2001 | Castelli ................. | E01D 15/24 |
| | | | | 405/218 |
| 11,034,278 | B2 * | 6/2021 | Kloepfer ............... | B62D 33/044 |
| 2002/0110444 | A1 * | 8/2002 | Navarro ................. | B60P 1/431 |
| | | | | 414/537 |
| 2003/0215316 | A1 * | 11/2003 | Burney .................. | B60P 1/431 |
| | | | | 414/537 |
| 2004/0022613 | A1 * | 2/2004 | Kellogg ................. | B60P 1/431 |
| | | | | 414/537 |
| 2004/0098818 | A1 * | 5/2004 | Kennedy ............... | B63B 27/143 |
| | | | | 14/69.5 |
| 2004/0146385 | A1 * | 7/2004 | Edwards ................ | B60P 1/431 |
| | | | | 414/537 |
| 2006/0245883 | A1 * | 11/2006 | Fontaine ............... | A61G 3/067 |
| | | | | 414/537 |
| 2010/0115714 | A1 * | 5/2010 | Cassway ............... | B65D 88/542 |
| | | | | 14/71.3 |
| 2011/0008140 | A1 * | 1/2011 | Hansen .................. | A61G 3/067 |
| | | | | 414/812 |
| 2012/0030886 | A1 * | 2/2012 | Persson ................. | B60R 3/02 |
| | | | | 14/71.1 |
| 2012/0233787 | A1 * | 9/2012 | Couto .................... | B60P 1/431 |
| | | | | 14/71.1 |
| 2015/0040329 | A1 | 2/2015 | Palmersheim | |
| 2015/0343937 | A1 | 12/2015 | Nespor | |
| 2018/0105091 | A1 * | 4/2018 | Stevens ................. | B60P 3/04 |
| 2019/0106042 | A1 * | 4/2019 | Hill ....................... | B60P 1/431 |
| 2020/0062281 | A1 * | 2/2020 | Brown ................... | A62C 13/66 |
| 2021/0000666 | A1 * | 1/2021 | Smith .................... | B60P 1/431 |
| 2021/0237636 | A1 | 8/2021 | Saucier | |

* cited by examiner

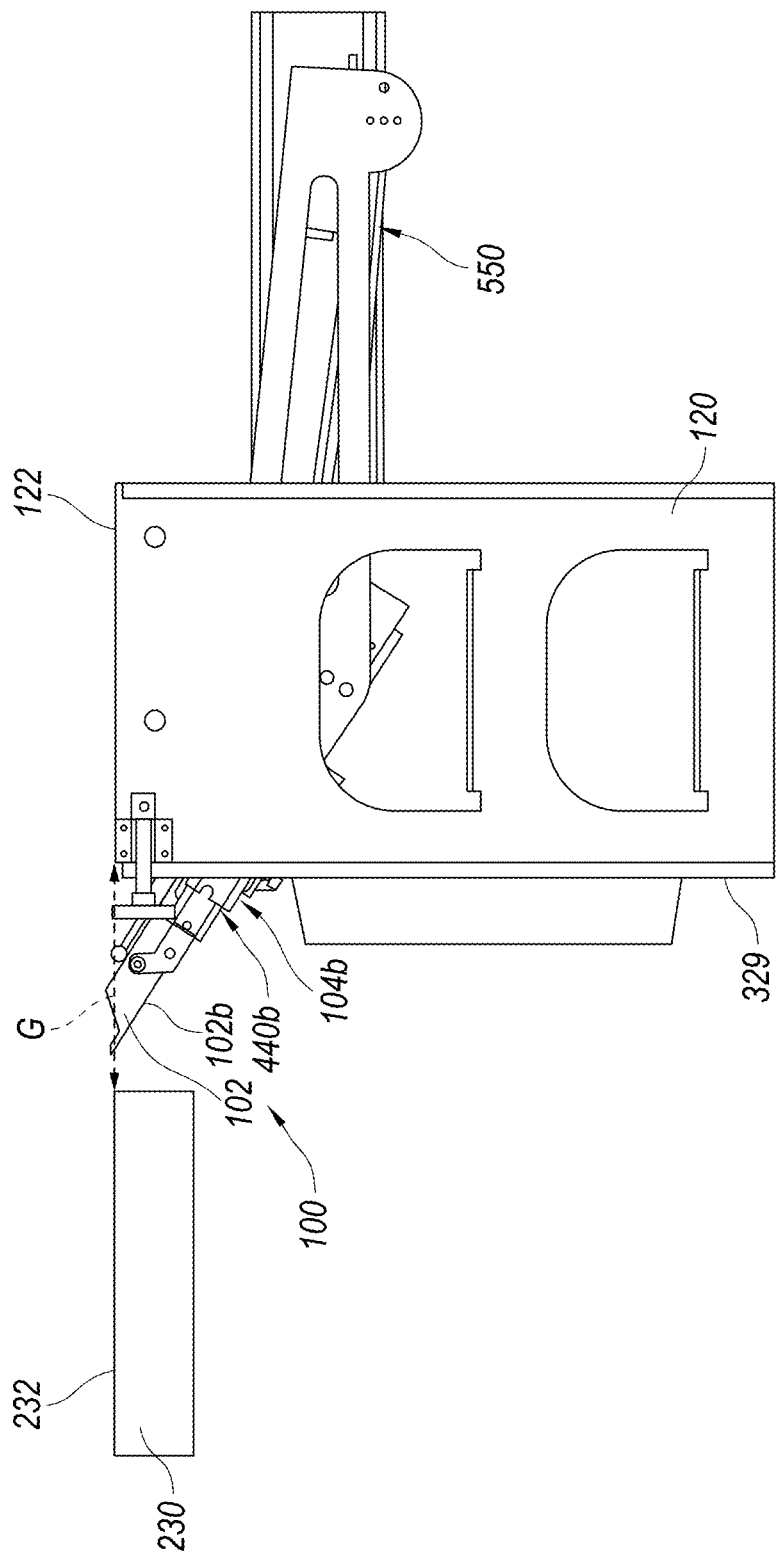

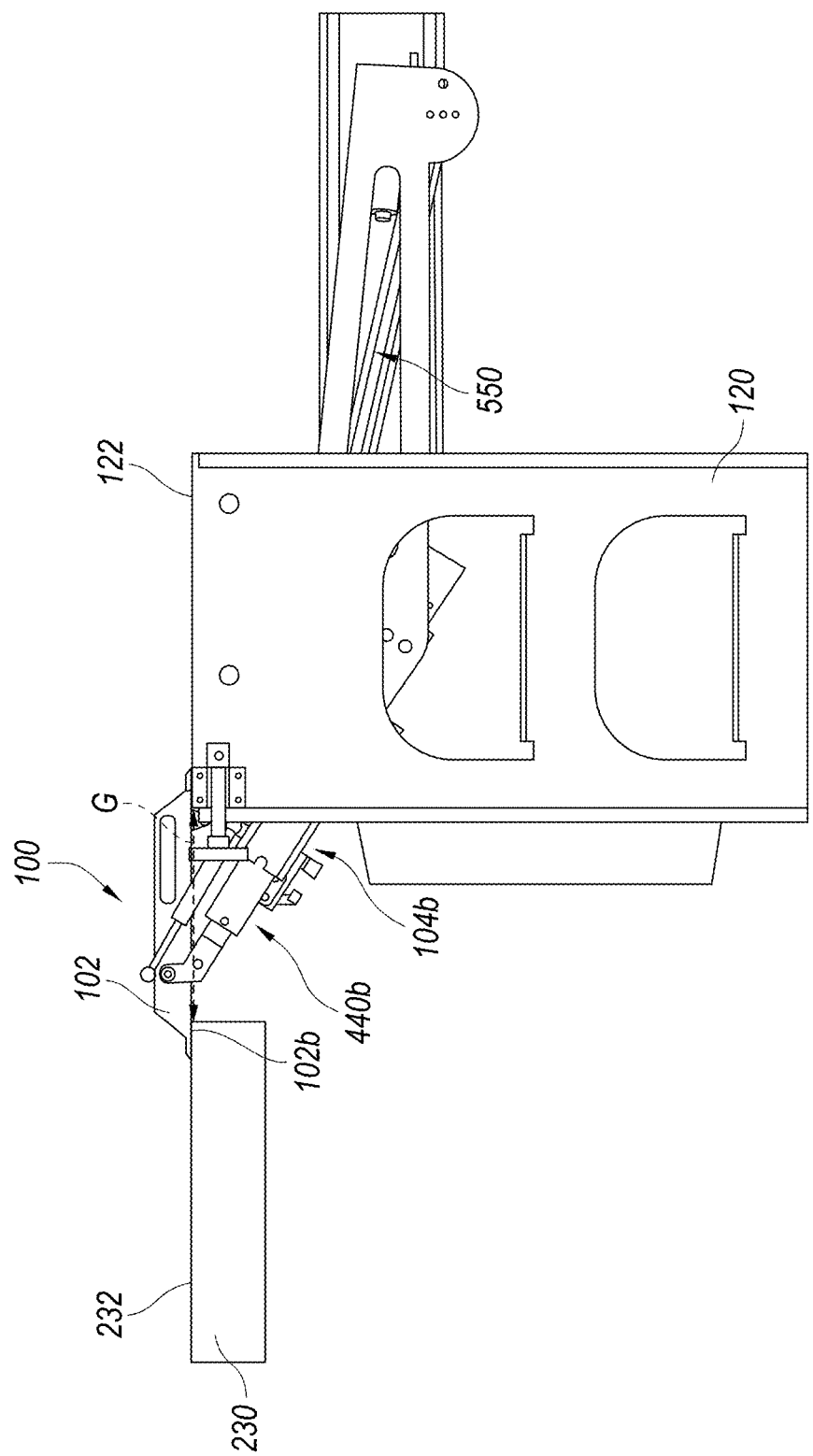

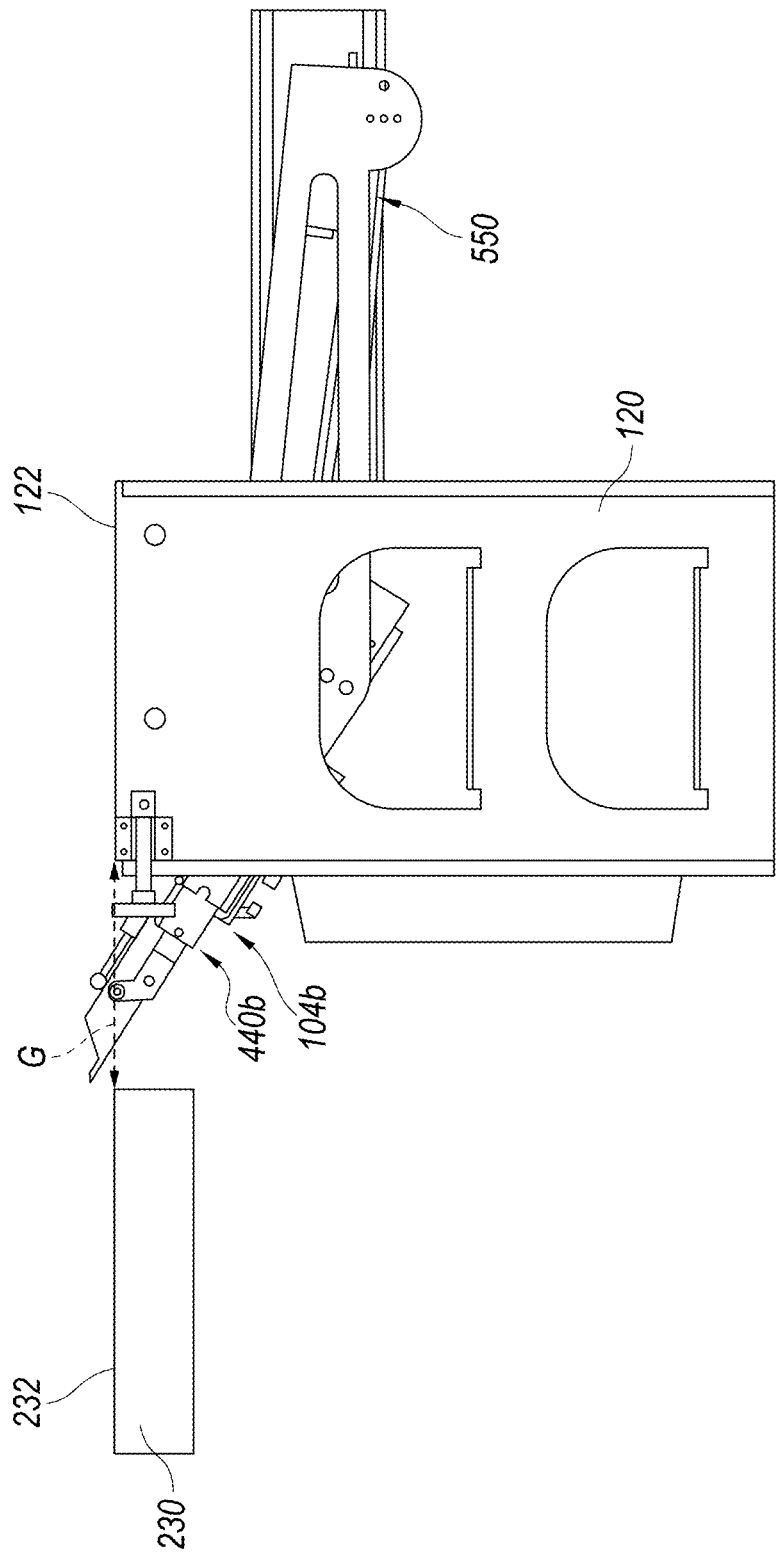

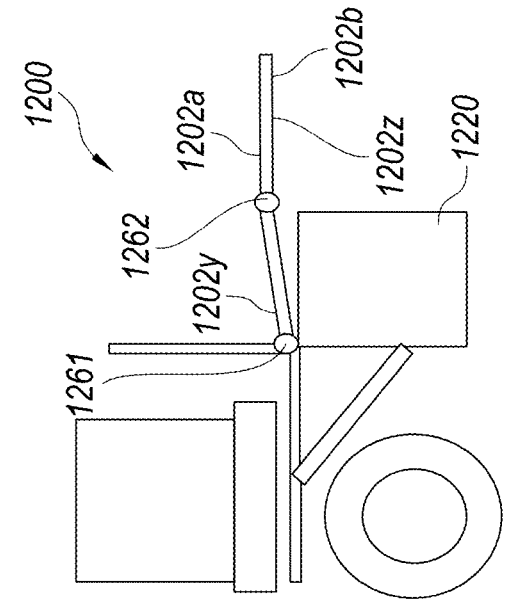
FIG. 12D
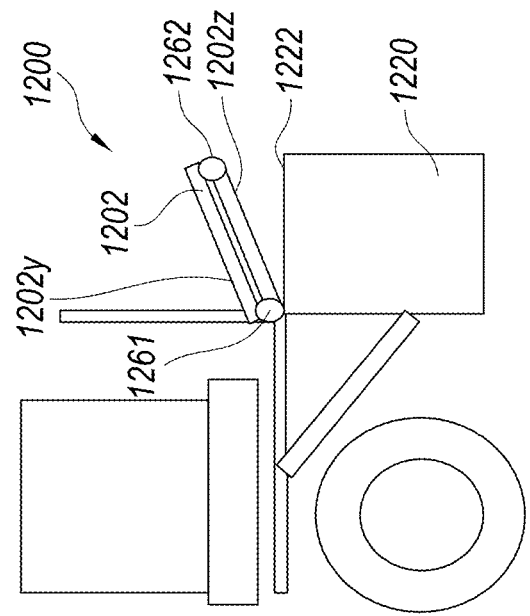
FIG. 12B
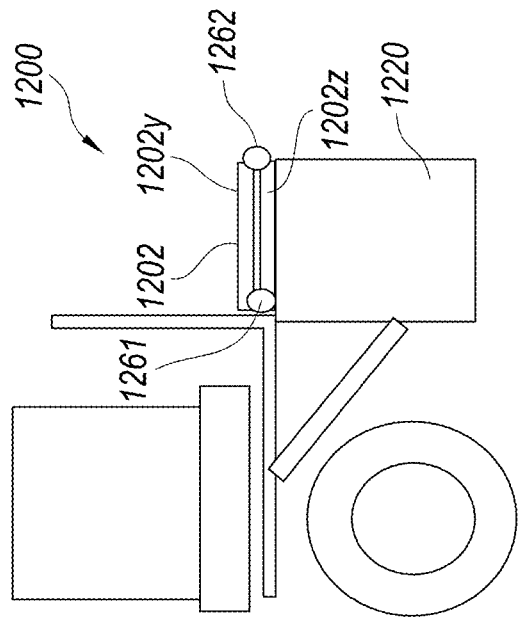
FIG. 12C
FIG. 12A

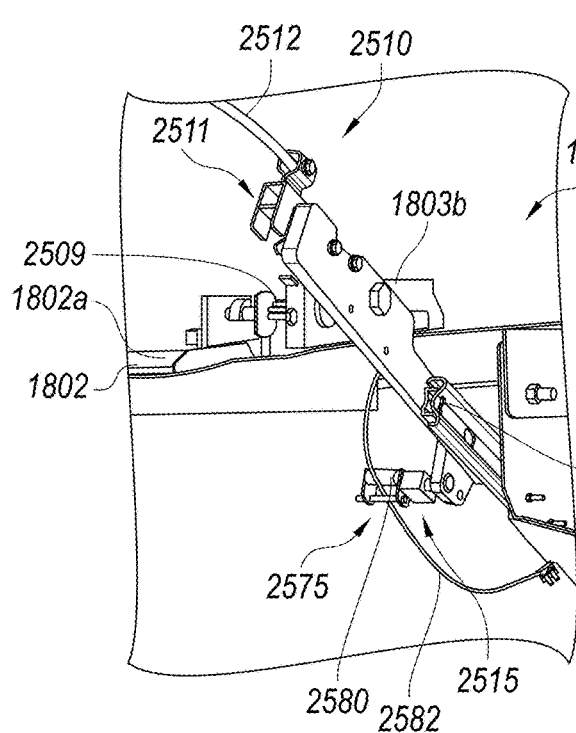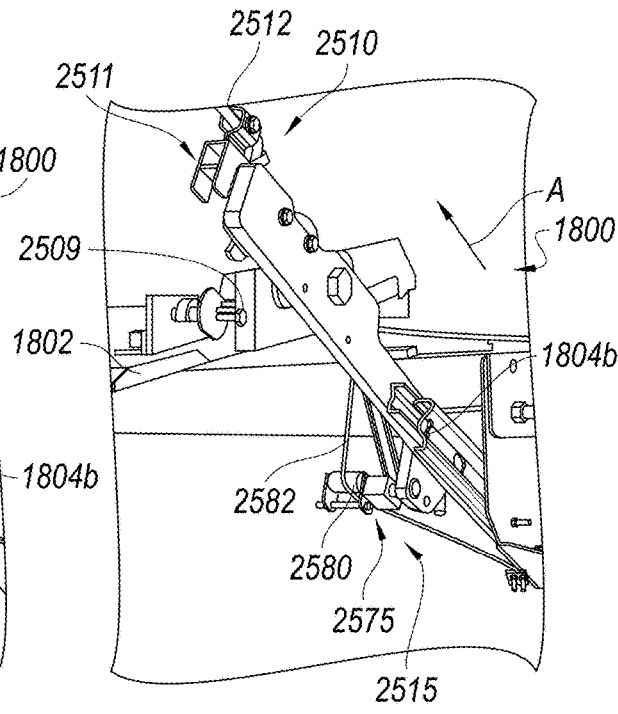
*FIG. 25A*      *FIG. 25B*
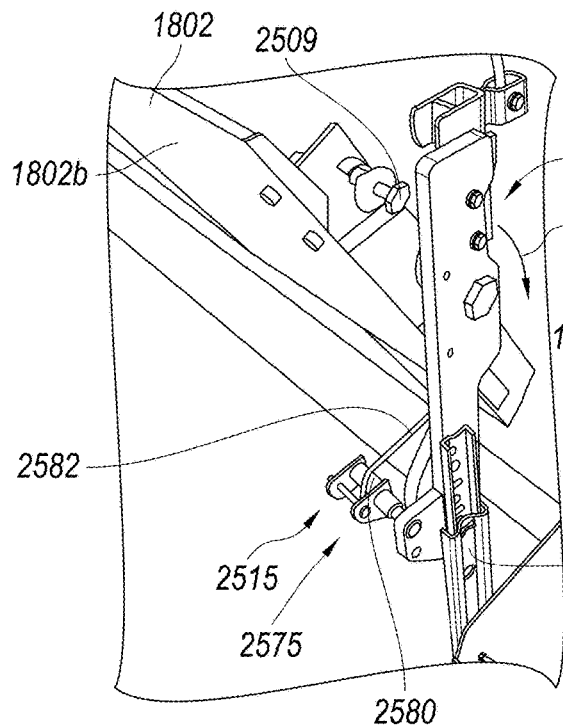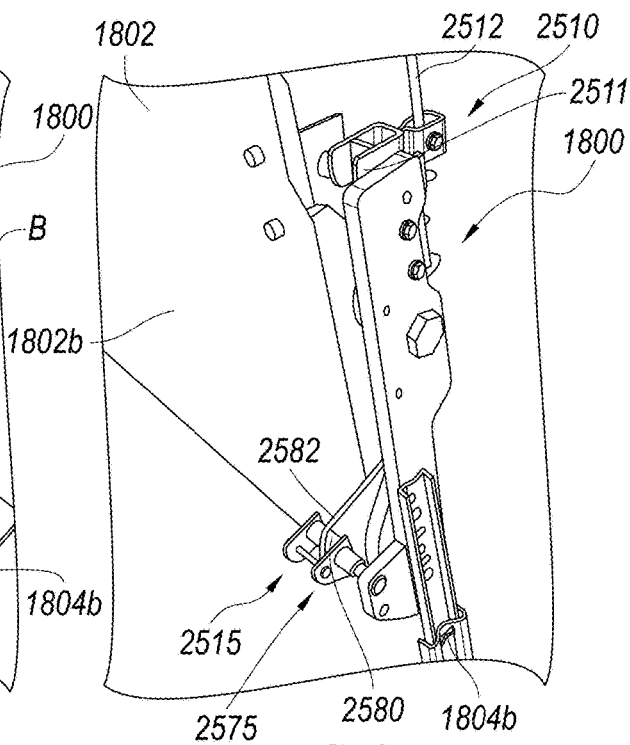
*FIG. 25C*      *FIG. 25D*

TRANSFER RAMP SYSTEMS FOR LOADING, UNLOADING, OR TRANSFERRING CARGO BETWEEN ONE OR MORE COMMERCIAL VEHICLES AND ASSOCIATED SYSTEMS, DEVICES, AND METHODS

CROSS-REFERENCE TO RELATED APPLICATION(S)

This application claims the benefit of the following applications:
(a) U.S. Provisional Patent Application No. 63/499,977, filed May 3, 2023;
(b) U.S. Provisional Patent Application No. 63/583,151, filed Sep. 15, 2023;
(c) U.S. Provisional Patent Application No. 63/585,202, filed Sep. 25, 2023; and
(d) U.S. Provisional Patent Application No. 63/566,210 filed Mar. 15, 2024.

All of the foregoing applications are incorporated herein by reference in their entireties. Further, components and features of embodiments disclosed in the applications incorporated by reference may be combined with various components and features disclosed and claimed in the present application.

TECHNICAL FIELD

The present disclosure relates generally to transfer ramp systems. For example, several embodiments of the present technology relate to transfer ramp systems for loading and unloading one or more commercial vehicles, including for transferring cargo between two or more commercial vehicles.

BACKGROUND

The trucking industry serves an essential function of an economy's supply chain by transporting goods and other materials over land, typically from a port or warehouse to either retail distribution centers or consumers' residential addresses. Commonly, specialty equipment, such as forklifts and docks, are used to load and unload commercial shipping vehicles. In addition, transferring cargo between commercial vehicles remains challenging even with known specialty equipment and human supervision and/or intervention.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted, but are for explanation and understanding only.

FIGS. 8A-8L are partially schematic side views of the transfer ramp system of FIG. 1 illustrating a method of operating the transfer ramp system in accordance with various embodiments of the present technology.

FIGS. 12A-12D are partially schematic side views of still another transfer ramp system configured in accordance with various embodiments of the present technology.

FIGS. 25A-25D are perspective views of a transfer ramp stowage system configured in accordance with various embodiments of the present technology.

DETAILED DESCRIPTION

A. Overview

Figure 1:
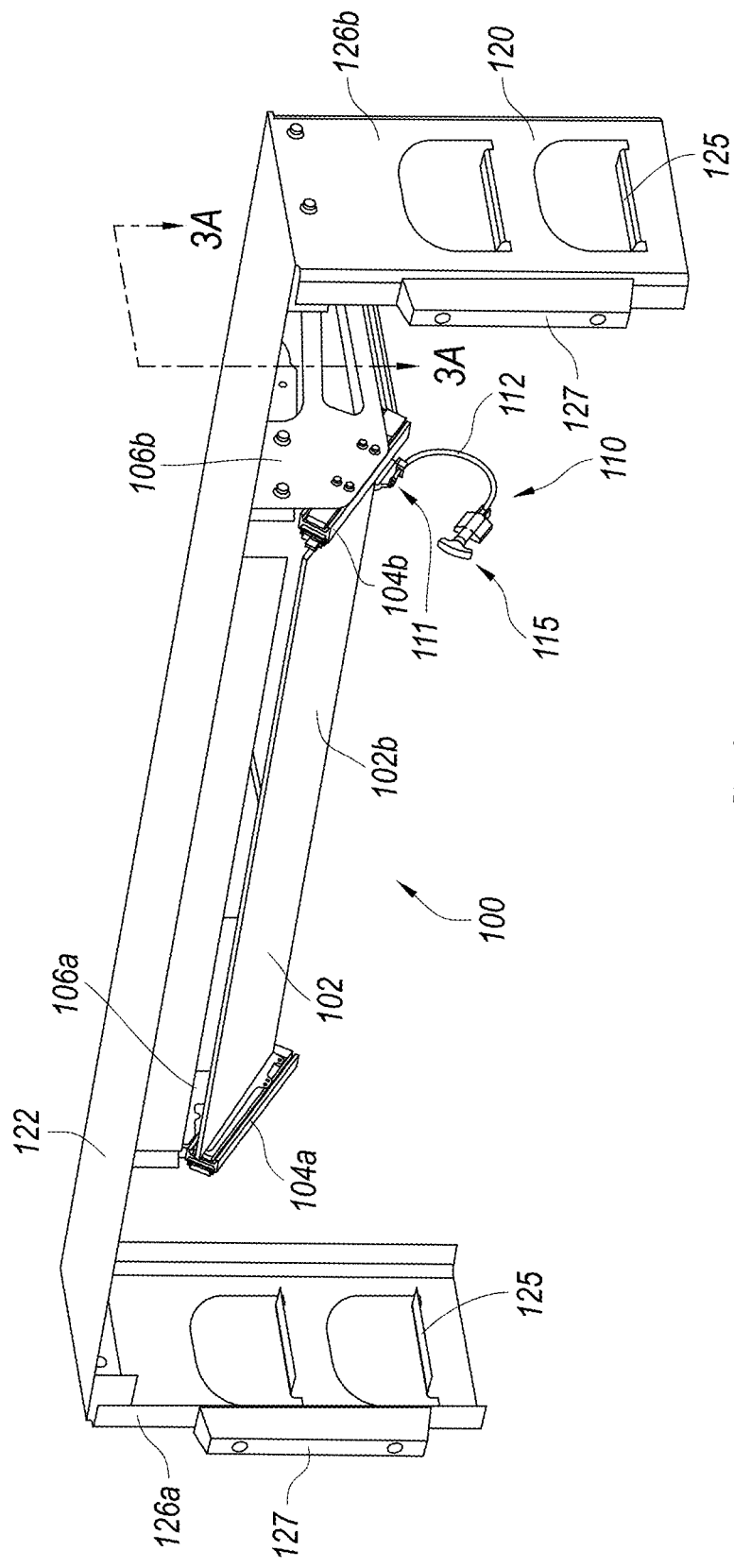
FIG. 1 is a partially schematic perspective view of a transfer ramp system configured in accordance with various embodiments of the present technology.

Shipping companies (e.g., less-than-truckload (LTL) expeditors) frequently transfer cargo (e.g., pallets or other objects) between commercial vehicles. For example, when a truck transports cargo to an airport for shipping the cargo elsewhere, that truck must commonly wait in line at the airport for one to three hours to drop off the cargo before being freed up to perform additional work. Thus, when a company simultaneously employs (i) a first truck to pick up a first pallet from a first location and (ii) a second truck to pick up a second pallet from a second location, the second pallet in the second truck is commonly transferred to the first truck before the first truck heads to the airport to drop off both the first and second pallets. This truck-to-truck transfer frees up the second truck to perform additional work, while only the first truck must wait at the airport for one to three hours. In other words, in such a scenario, the truck-to-truck transfer facilitates realizing one to three hours of additional utilization of the second truck.

Today, such truck-to-truck transfers are typically performed by positioning trucks back-to-back and jumping a gap that exists between the trucks. More specifically, rubber bumpers on a liftgate of a first truck can be backed against rubber bumpers on a liftgate of a second truck. In this position, there commonly exists a gap between the dock plate of the liftgate of the first truck and the dock plate of the liftgate of the second truck. This gap is typically about 26 cm (e.g., 25.4 cm, or 10 inches) wide. Thus, to transfer a pallet from the second truck into the first truck, the drivers employ a pallet jack to jump the gap and move the pallet into the first truck. A similar transfer operation is commonly performed at a loading dock, such as (i) when the loading dock lacks a dock plate that spans a gap between a top surface of the loading dock and a liftgate of a truck and/or (ii) when a mechanism used to deploy the dock plate of the loading dock is inoperable.

There are several drawbacks to performing transfers of cargo in this manner. For example, using a pallet jack to jump the gap is a physically intensive procedure for drivers of the commercial vehicles. In addition, such transfers are typically limited to cargo weighing approximately 136-182 kg (approximately 300-400 lbs.) or less, which excludes a large percentage of cargo typically transferred by such commercial vehicles. Furthermore, such a transfer procedure poses a risk (i) of damaging one or both of the commercial vehicles, the pallet jack, the cargo being transferred across the gap, and/or other cargo in one or both of the commercial vehicles; (ii) of injuring the drivers; (iii) of the wheels of the pallet jack or other objects falling into or getting stuck within the gap; and/or (iv) of the cargo falling (e.g., falling over, falling off the pallet jack, falling off the liftgates, and/or falling into the gap) while jumping the gap.

To address these concerns, several embodiments of the present technology are directed to transfer ramp systems (also referred to herein as "cargo transferring systems") for loading, unloading, and/or transferring cargo between (a) a commercial vehicle and/or (b) another commercial vehicle, loading dock, trailer, or other structure. In one embodiment, for example, a transfer ramp system includes a ramp coupled to a pair of extendable arms. The arms are actuatable by one or more actuators to move the ramp from a stowed position beneath a top platform (e.g., of or above a liftgate) at a rear of a commercial vehicle to an extended position above a top platform. The transfer ramp system can further include a release latch that, when actuated, allows the ramp to pivot into alignment with the top platform (e.g., freely, via use of one or more struts, via use of one or more springs, via use of an electric motor or other actuator, and/or by manually rotating the ramp).

After the ramp is pivoted into alignment with the top platform, the one or more actuators are used to retract the extendable arms such that the ramp is brought into contact with (a) the top platform and (b) a top platform of another commercial vehicle, a top surface of a loading dock, or a top surface of another structure. In this manner, the transfer ramp system can be used to bridge the gap that exists between (i) the end of the top platform of a commercial vehicle on which the transfer ramp system is installed and (ii) the end of a top platform/surface of another commercial vehicle, a loading dock, or another structure. As such, cargo (e.g., of any weight) can be more easily and safely transferred into, out of, and/or between one or more commercial vehicles, without needing to jump the gap and/or with less risk (i) of damaging one or both of the commercial vehicles, a pallet jack, the cargo being transferred, and/or other cargo in one or both of the commercial vehicles; (ii) of injuring the driver(s); and/or (iii) of the cargo falling over and/or off the liftgate(s) of the commercial vehicle(s).

Specific details of several embodiments of transfer ramp systems (and associated systems, devices, and methods) are described below. For example, several embodiments of the present technology described below are directed to transfer ramp systems for transferring cargo between (a) a commercial vehicle and (b) another commercial vehicle, loading dock, or other structure. Although the present technology is primarily described below in relation to commercial vehicles (e.g., commercial trucks, semi-trucks, trailers, etc.), a person of ordinary skill in the art will readily appreciate that other vehicles (e.g., personal, recreational, civilian, etc.) can be used with the systems, devices, methods, and computer-readable mediums of the present technology described herein.

It will be appreciated that variations of the embodiments illustrated in the drawings exist and are within the scope of the present technology. Furthermore, it should be noted that embodiments of the present technology can have different configurations, components, and/or procedures than those shown or described herein. Moreover, a person of ordinary skill in the art will understand that embodiments of the present technology can have configurations, components, and/or procedures in addition to those shown or described herein, and that these and other embodiments can lack several of the configurations, components, and/or procedures shown or described herein without deviating from the present technology.

B. Selected Embodiments of Transfer Ramp Systems and Associated Systems, Devices, and Methods FIG. 1 is a partially schematic perspective view of a transfer ramp system 100 ("the system 100") configured in accordance with various embodiments of the present technology. As shown, the system 100 includes a transfer ramp 102 (e.g., a transfer platform, a transfer bridge, a transfer deck, a bridge deck), a plurality of extendable arms 104 (identified individually in FIG. 1 as first extendable arm 104a and second extendable arm 104b), mounting brackets 106 (identified individually in FIG. 1 as first mounting bracket 106a and second mounting bracket 106b), and a ramp latching system 110. Although not shown in FIG. 1, the system 100 can additionally include (a) one or more actuators for extending and/or retracting the first and second extendable arms 104a and 104b, and/or (b) one or more struts and/or springs that facilitate rotating or pivoting the transfer ramp 102. Such actuators, struts, and/or springs are discussed in greater detail below with reference to FIGS. 2, 5, and 7A-8L.

In FIG. 1, the system 100 is illustrated in a stowed (e.g., undeployed, retracted, fully retracted) position or state beneath a liftgate 120 of a vehicle or trailer (e.g., a commercial vehicle, a commercial trailer, a box truck). More specifically, the liftgate 120 has a top platform 122 (e.g., a top plate, a dock plate) and sides 126. The sides 126 are identified individually in FIG. 1 as first side 126a and second side 126b, and each includes steps 125 and a rubber bumper 127 (e.g., used as a stop while backing the liftgate 120 against a loading dock or another vehicle or trailer). In the stowed position, the system 100 occupies a space beneath the top platform 122 and between the first and second sides 126a and 126b of the liftgate 120. The first and second mounting brackets 106a and 106b of the system 100 of FIG. 1 are fixedly attached (i) to a portion of the liftgate 120 beneath the top platform 122 and/or (ii) to the vehicle/trailer such that the system 100 is mounted to or under/beneath frame rails of the vehicle/trailer. The frame rails can include frame rails of the frame of the vehicle/trailer itself and/or frame rails of a frame of a box positioned on or carried by the vehicle/trailer. As a specific example, the first and second mounting brackets 106a and 106b of the system 100 can be fixedly attached to the portion of the liftgate 120 beneath the top platform 122 and/or to the vehicle/trailer such that the system 100 is mounted to, on, within, and/or beneath a chassis of the vehicle/trailer. As shown in FIGS. 1, the first and second mounting brackets 106a and 106b are also attached to the first and second extendable arms 104a and 104b, respectively. In turn, the first and second extendable arms 104a and 104b are each attached to a corresponding side of the transfer ramp 102.

The ramp latching system 110 of the system 100 includes a cable release latch 111 that releasably holds the transfer ramp 102 in the orientation shown in FIG. 1. Such an orientation of the transfer ramp 102 is also referred to herein as a 'stowed orientation.' The ramp latching system 110 further includes an actuation mechanism 115 and a cable 112 operably connecting the actuation mechanism 115 to the cable release latch 111. The actuation mechanism 115 can include a handle, button, lever, or other user interface that, when pushed, pulled, twisted, or otherwise manipulated by a user of the system 100, releases the cable release latch 111 via the cable 112 to permit the transfer ramp 102 to pivot forward from the stowed orientation toward an orientation in which the transfer ramp 102 is parallel to or aligned with the top platform 122 of the liftgate 120 (e.g., an orientation in which the transfer ramp 102 is generally flat or horizontal). As best shown in FIGS. 2, 3E, and 8A-8L, the cable release actuation mechanism 115 can be mounted to or stowed at/on a portion of the liftgate 120 in some embodiments, such as to the second side 126b of the liftgate 120. Additionally, or alternatively, the cable release actuation mechanism 115 can be mounted and/or stowed at a location that is proximate controls for the liftgate 120. Furthermore, although shown with the cable release latch 111 in the illustrated embodiment, the ramp latching system 110 can include a different style of latch (i) that releasably holds the transfer ramp 102 in the stowed orientation and (ii) that may or may not be actuated using the actuation mechanism 115 and/or the cable 112 shown in FIG. 1. Various different styles of latches and latching systems are discussed in greater detail below.

Figure 2:
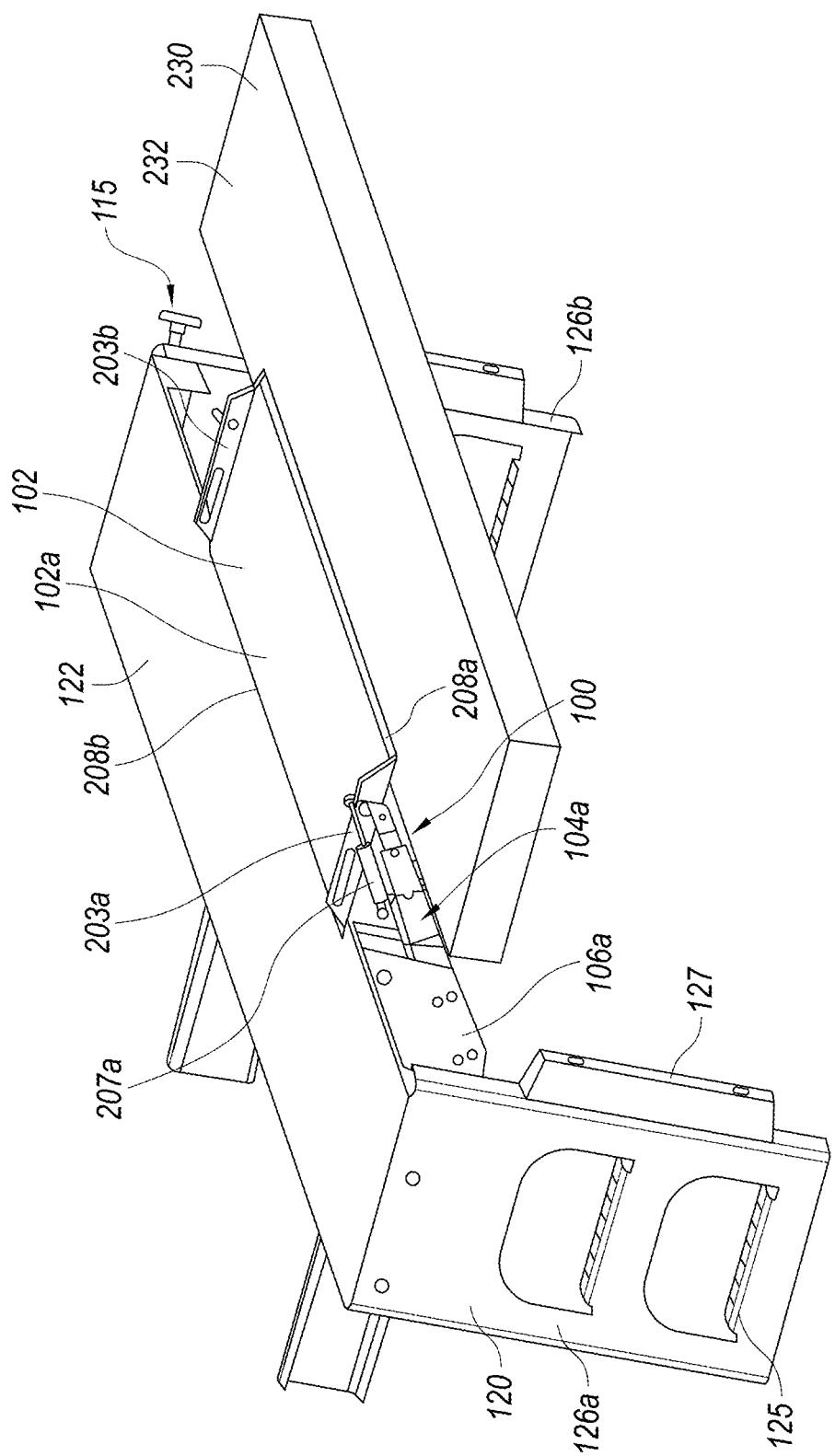
FIG. 2 is another partially schematic perspective view of the transfer ramp system of FIG. 1.

FIG. 2 is a partially schematic perspective view of the transfer ramp system 100 of FIG. 1 illustrated in a deployed state (e.g., a fully deployed state). As shown, the transfer ramp 102 of the system 100 has been (i) extended out from beneath the top platform 122 of the liftgate 120 via the extendable arms 104a and 104b, (ii) pivoted forward from the stowed orientation to a generally horizontal or flat orientation, and (iii) lowered via the extendable arms 104a and 104b until the bottom surface 102b (FIG. 1) of the transfer ramp 102 abuts against the top platform 122 of the liftgate 120 and a top surface 232 of another structure 230. In some embodiments, the other structure 230 can be a liftgate of another commercial vehicle, and the top surface 232 can be a top platform (e.g., a dock plate) of the liftgate of the other commercial vehicle. In these and other embodiments, the other structure 230 can be a trailer (e.g., a semi-truck trailer) or a bed of a truck, and the top surface 232 can be a floor or other surface of the trailer or the bed of the truck. Additionally, or alternatively, the other structure 230 can be a loading dock, and the top surface 232 can be a top surface of the loading dock. In these and still other embodiments, the other structure 230 can be another transfer ramp system (e.g., similar to the system 100), and the top surface 232 can be a top surface of a transfer ramp of the other transfer ramp system.

In the deployed state illustrated in FIG. 2, the transfer ramp 102 spans or bridges a gap that exists between the top platform 122 of the liftgate 120 and the top surface 232 of the other structure 230. More specifically, a first portion of the transfer ramp 102 rests on the top surface 232 of the other structure 230, and a second portion of the transfer ramp 102 rests on the top platform 122 of the liftgate 120. As such, the transfer ramp 102 facilitates transferring cargo between the top platform 122 of the liftgate 120 and the top surface 232 of the other structure 230 via a top surface 102a of the transfer ramp 102. In other words, the transfer ramp 102 facilitates loading cargo into and/or unloading cargo from the vehicle/trailer, such as without needing to back the top platform 122 of the liftgate 120 fully against the top surface 232 of the other structure 230.

Because the transfer ramp 102, in the deployed state illustrated in FIG. 2, rests on the top platform 122 of the liftgate 120 and on the top surface 232 of the other structure 230, weight of cargo positioned on the top surface 102a of the transfer ramp 102 can be transferred from the transfer ramp 102 to the liftgate 120 and the other structure 230. Thus, at least while the system 100 is in the deployed state shown in FIG. 2, the weight of cargo positioned on the top surface 102a of the transfer ramp 102 can be supported by the transfer ramp 102, the liftgate 120, the vehicle/trailer employing the liftgate 120, and the other structure 230. In other words, in such a state of the system 100, the weight of the cargo on the top surface 102a of the transfer ramp 102 need not be supported by the extendable arms 104a and 104b and/or the first and second mounting bracket 106a and 106b of the system 100. Instead, assuming nothing is placed on the transfer ramp 102 outside of the deployed state shown in FIG. 2, the extendable arms 104a and 104b and/or the first and second mounting brackets 106a and 106b need only support the weight of the transfer ramp 102 while deploying or retracting the transfer ramp 102 between the stowed position (FIG. 1) and the deployed position (FIG. 2).

As shown in FIG. 2, the transfer ramp 102 can include a back lip 208a and a front lip 208b. The back lip 208a can correspond to a backmost edge of the transfer ramp 102 relative to a front of the vehicle/trailer, and/or the front lip 208b can correspond to a frontmost edge of the transfer ramp 102 relative to the front of the vehicle/trailer. The back lip 208a and/or the front lip 208b can be ramped to facilitate a smoother or gradual transition between (a) the top surface 232 of the other structure 230 and/or the top platform 122 of the liftgate 120 and (b) the top surface 102a of the transfer ramp 102. The smoother or gradual transition can facilitate easier loading and/or unloading of cargo onto and/or off of the top surface 102a of the transfer ramp 102.

In these and other embodiments, the transfer ramp 102 can include side rails 203 (identified individually in FIG. 2 as first side rail 203a and second side rail 203b). In some embodiments, the first and second side rails 203a and 203b are positioned to help prevent or hinder cargo from rolling or otherwise shifting off the top surface 102a of the transfer ramp 102 into the gap between the top platform 122 of the liftgate 120 and the top surface 232 of the other structure 230. In some embodiments, the first and second extendable arms 104a and 104b can be mechanically attached to the first and second side rails 203a and 203b, respectively, such that the first and second extendable arms 104a and 104b can raise and/or lower the transfer ramp 102 as the first and second extendable arms 104a and 104b are extended and/or retracted, respectively. As discussed above, the system 100 can include struts 207a and 207b (only the strut 207a is illustrated in FIG. 2; the strut 207b is shown in FIG. 3B). The struts 207a and 207b can be mechanically attached to the first and second side rails 203a and 203b, respectively, of the transfer ramp 102, and can be used to control or limit tilt or pivot of the transfer ramp 102 (e.g., at least when the transfer ramp 102 is not held in the stowed orientation by the cable release latch 111 of the ramp latching system 110). Furthermore, the struts 207a and 207b and/or the first and second extendable arms 104a and 104b can prevent the transfer ramp 102 from shifting and/or rotating along a plane generally parallel to the top platform 122 of the liftgate 120, at least while the transfer ramp 102 is in the deployed position illustrated in FIG. 2.

Figure 3A:
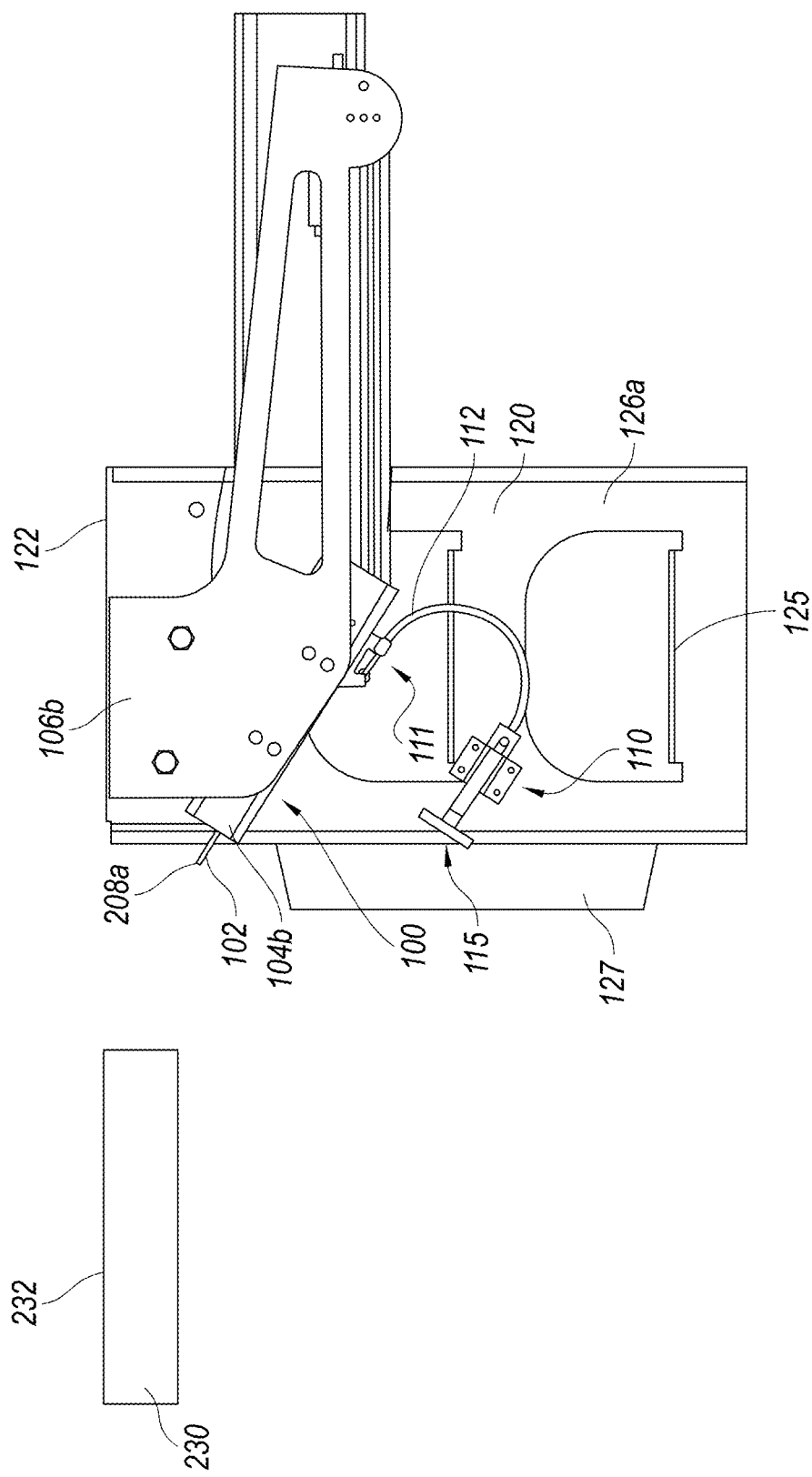
FIGS. 3A-3D are partially schematic cross-sectional side views of the transfer ramp system of FIG. 1.
Figure 3B:
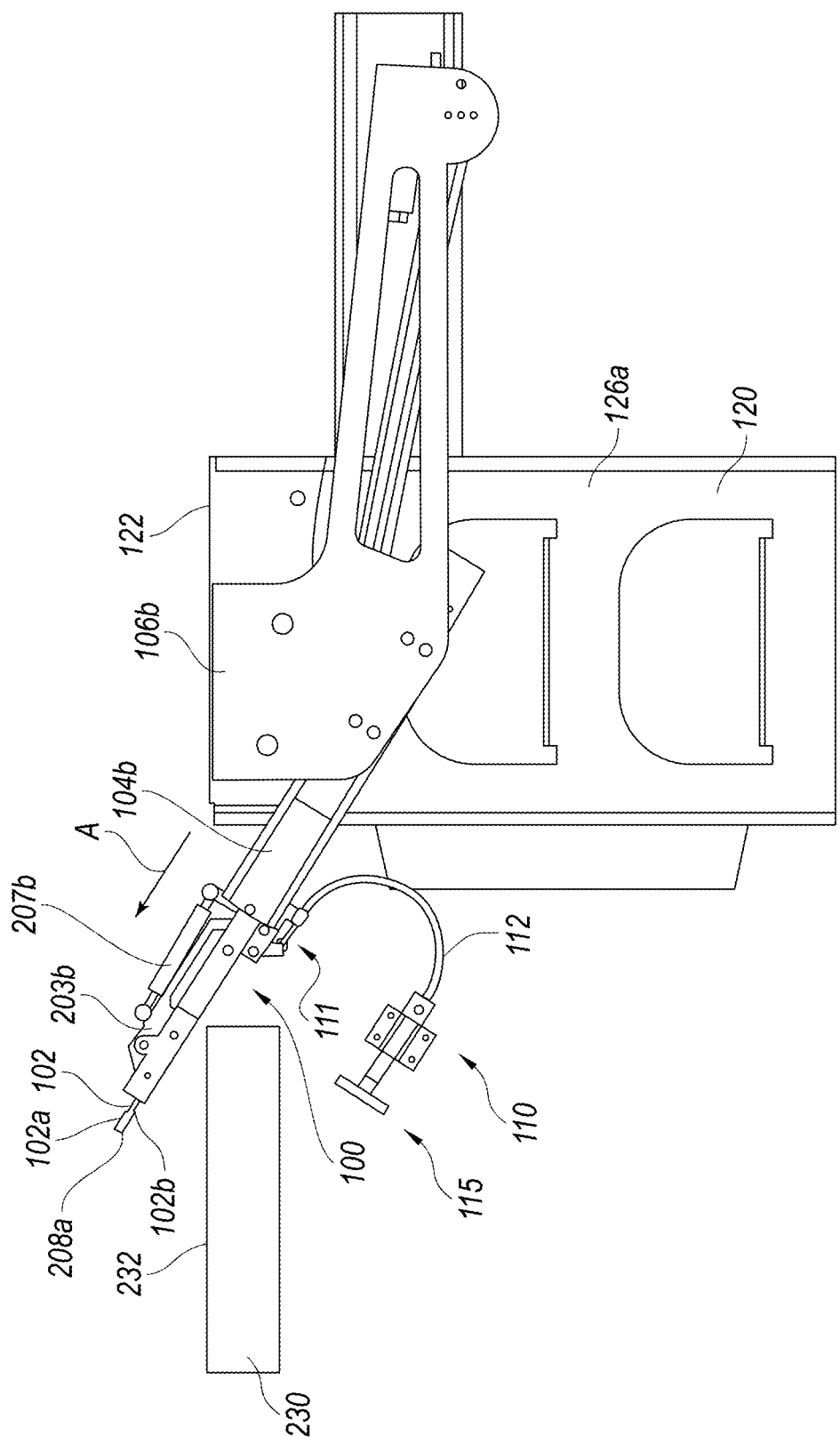
Figure 3C:
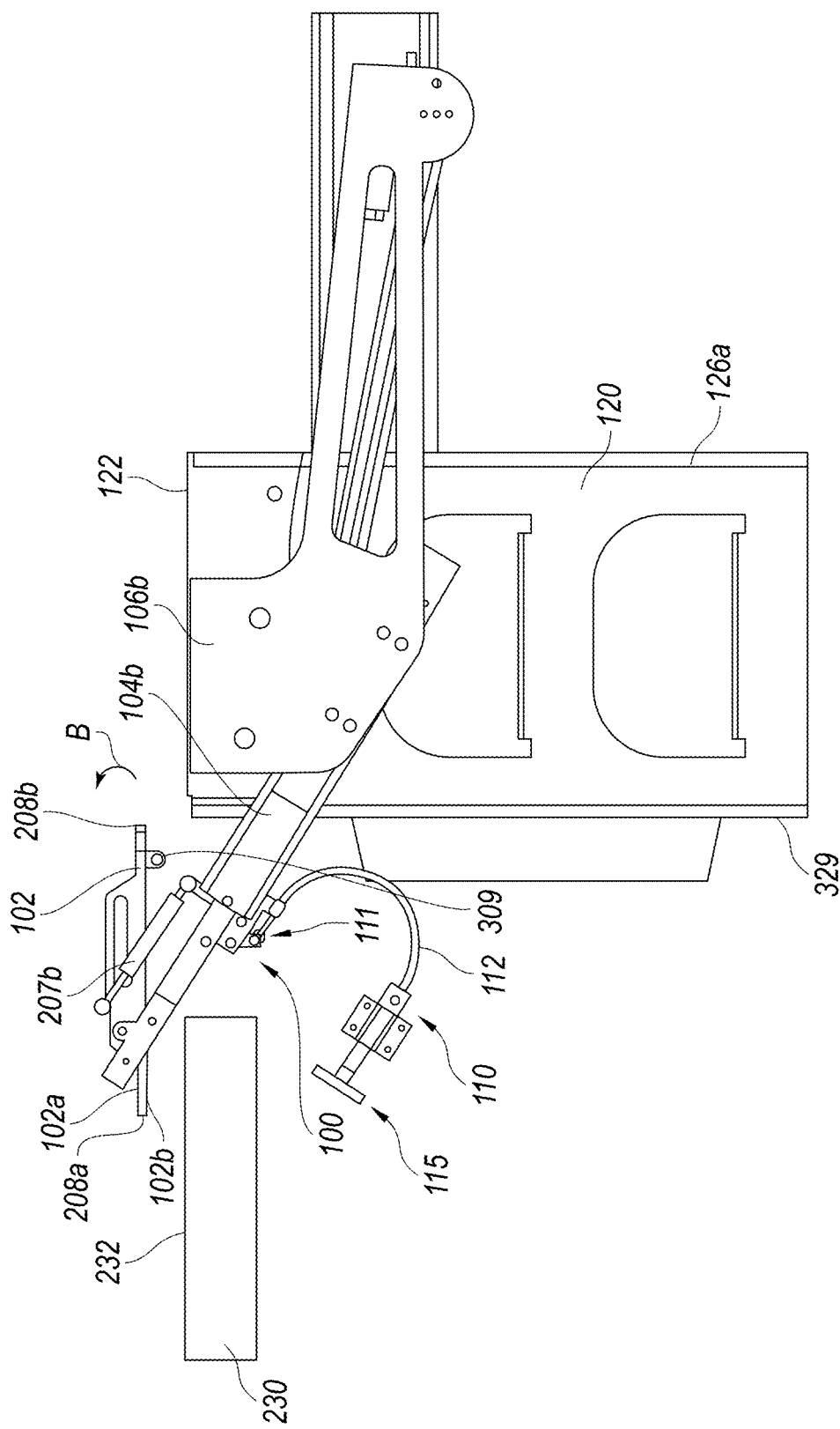
Figure 3D:
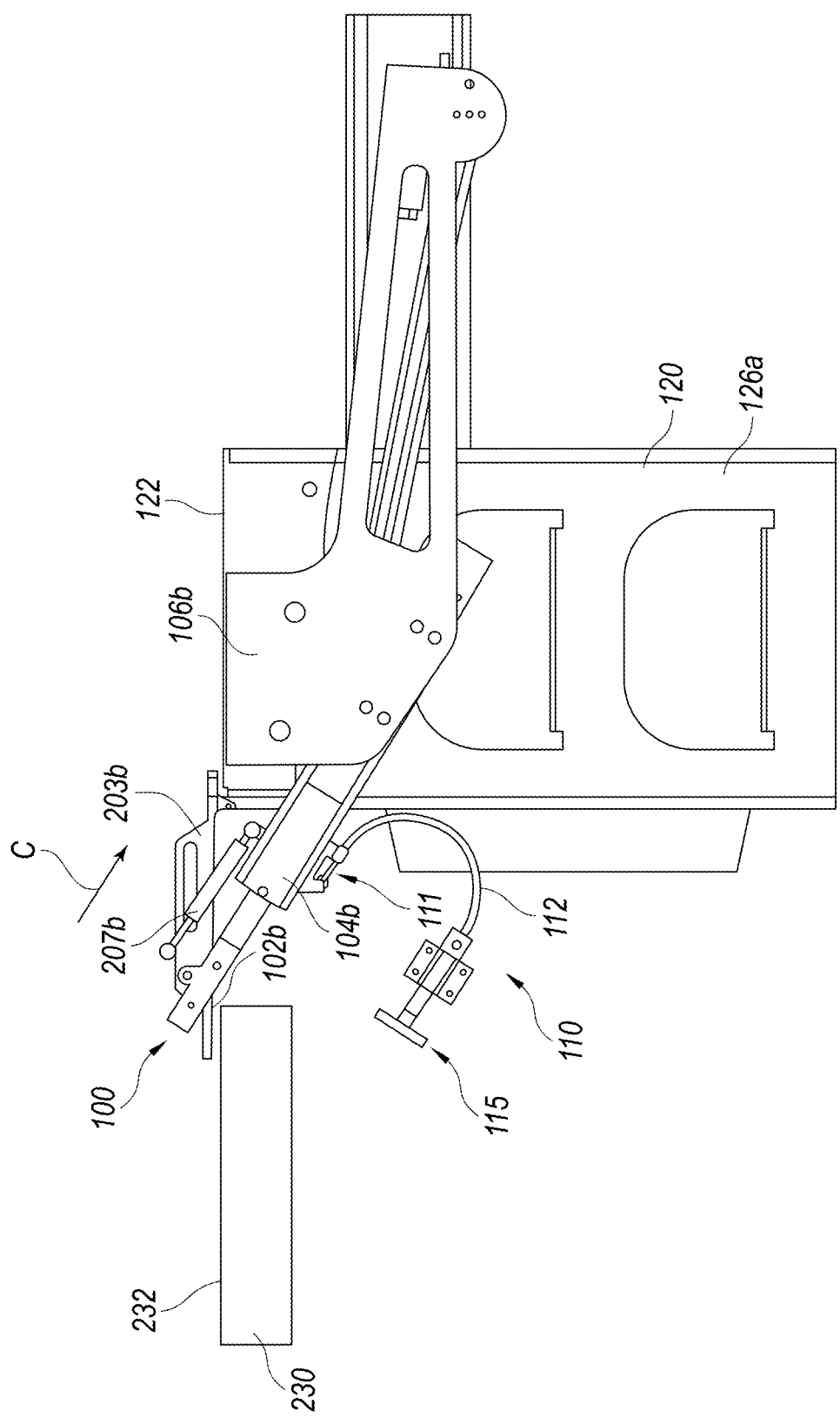
Figure 3E:
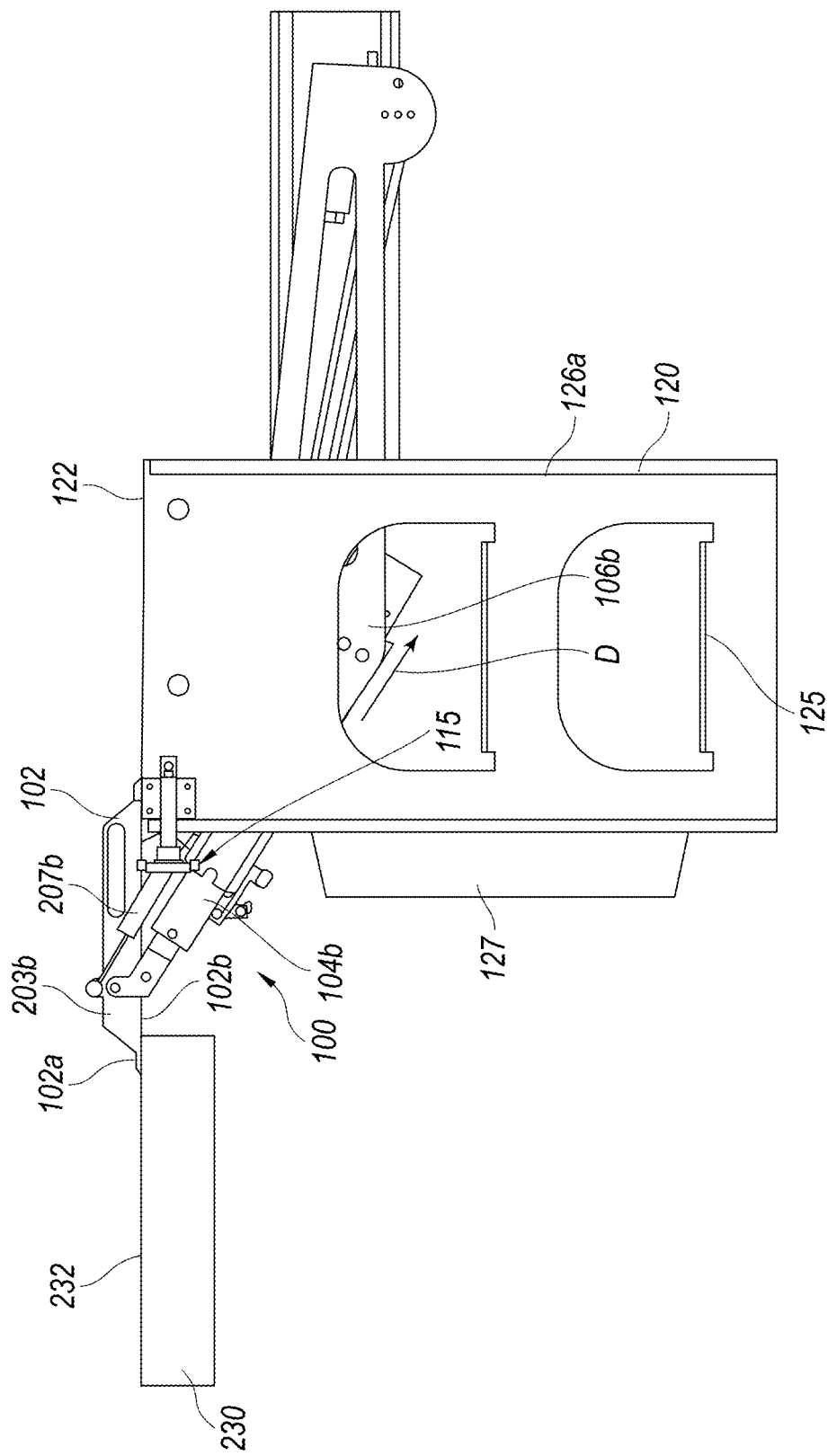
FIG. 3E is a partially schematic side view of the transfer ramp system of FIG. 1.

FIGS. 3A-3E illustrate a process of operating the system 100 to move the system 100 from the stowed position (as illustrated in FIG. 1) to the deployed position (as illustrated in FIG. 2). More specifically, FIGS. 3A-3D are partially schematic cross-sectional side views of the transfer ramp system 100 taken along the line 3A-3A in FIG. 1, and FIG. 3E is a partially schematic side view of the transfer ramp system 100 without the cross-section. In FIG. 3A, the system 100 is illustrated in the stowed position beneath the top platform 122 of the liftgate 120. In FIG. 3B, the extendable arms 104a (FIG. 1) and 104b of the system 100 are extended such that the transfer ramp 102 is moved in a direction generally parallel to arrow A and through the gap that exists between the top platform 122 of the liftgate 120 and the top surface 232 of the other structure 230.

In FIG. 3C, after the back lip 208a of the transfer ramp 102 is positioned above the top platform 122 of the liftgate 120 or above the top surface 232 of the other structure 230, and/or after the front lip 208b of the transfer ramp 102 clears a front face 329 of the liftgate 120 (e.g., a front face of the first and second sides 126a and 126b and/or of the top platform 122), the cable release latch 111 can be actuated via the actuation mechanism 115 and the cable 112 of the ramp latching system 110 to release a latchable portion 309 of the transfer ramp 102. In turn, the transfer ramp 102 can be pivoted forward in a direction generally along or parallel to arrow B, such as (i) freely or (ii) via use of one or more springs (not shown) and/or by extending the struts 207a (FIG. 2) and 207b. In some embodiments, the transfer ramp 102 can be rotated forward until the top surface 102a and/or the bottom surface 102b of the transfer ramp 102 is generally parallel to the top platform 122 of the liftgate 120. In these and other embodiments, the transfer ramp 102 can be rotated forward until the back lip 208a of the transfer ramp 102 is positioned over the top surface 232 of the other structure 230 and/or until the front lip 208b of the transfer ramp 102 is positioned over the top platform 122 of the liftgate 120.

In FIG. 3D, with the transfer ramp 102 rotated forward, the extendable arms 104a and 104b can be retracted to lower the transfer ramp 102 in a direction generally parallel to arrow C and toward the top platform 122 of the liftgate 120 and the top surface 232 of the other structure 230. As shown in FIG. 3E, the extendable arms 104a and 104b can be retracted until the bottom surface 102b of the transfer ramp 102 abuts or otherwise rests on the top platform 122 of the liftgate 120 and the top surface 232 of the other structure 230. As discussed above, in the deployed state shown, the transfer ramp 102 is in alignment with the top platform 122 of the liftgate 120, is in contact with the top platform 122 of the liftgate 120, is in contact with the top surface 232 of the other structure 230, and bridges the gap between the top platform 122 of the liftgate 120 and the top surface 232 of the other structure 230.

In the illustrated embodiment, the top platform 122 of the liftgate 120 and the top surface 232 of the other structure 230 are positioned at relatively the same height. Thus, as the transfer ramp 102 is lowered to the deployed state shown in FIG. 3E, the transfer ramp 102 bridges the gap while remaining relatively flat, horizontal, or level. In scenarios in which the top platform 122 of the liftgate 120 is positioned at a different height from the top surface 232 of the other structure 230, the transfer ramp 102 can settle into a deployed state in which the transfer ramp 102 (a) rests on the top platform 122, (b) rests on the top surface 232, (c) bridges the gap between the top platform 122 and the top surface 232, and (d) is positioned in a slanted or ramped orientation.

In some embodiments, the extendable arms 104 can be retracted beyond the point at which the transfer ramp 102 initially contacts the top platform 122 and the top surface 232. For example, continued retraction of the extendable arms 104 can press or smash the transfer ramp 102 into the top platform 122 and the top surface 232 to bring the top platform 122 and the top surface 232 into closer alignment with one another and/or to bring the transfer ramp 102 closer to a relatively flat, horizonal, or level orientation. As a specific example, consider a scenario in which the top platform 122 is positioned at a lower height than the top surface 232. In this scenario, continued retraction of the extendable arms 104 beyond the point at which the transfer ramp 102 initially contacts the top platform 122 and the top surface 232 can lower the height of the top surface 232 (e.g., via the suspension of a vehicle that includes the top surface 232) and/or can raise the height of the top platform 122 (e.g., via an upwards force that results as the transfer ramp 102 is pushed down into the top surface 232). As a result, the height of the top platform 122 can be brought into alignment with the height of the top surface 232, meaning that the transfer ramp 102 can be brought to (or closer to) a generally flat, horizontal, or level orientation thereby making transfers of cargo across the transfer ramp 102 easier.

In these and other embodiments, all or a portion of the transfer ramp 102 can be formed of a material (e.g., aluminum or another suitable material) that is conformable and/or resiliently deformable. In these embodiments, (a) when the top platform 122 of the liftgate 120 is positioned at a different height from the top surface 232 of the other structure 230 and/or (b) when the top platform 122 and/or the top surface 232 are not level or flat relative to the transfer ramp 102 such that one side of the transfer ramp 102 (at or near one of the sidewalls 103a or 103b) makes contact with the top platform 122 and/or the top surface 232 before the other side of the transfer ramp 102 (at or near the other of the sidewalls 103a and 103b), at least one of the extendable arms 104 can continue to be retracted (e.g., generally along or parallel to arrow D shown in FIG. 3E) after a portion of the transfer ramp 102 initially makes contact with the top platform 122 and/or the top surface 232. Continuing to retract one or more of the extendable arms 104 in this manner can facilitate conforming the transfer ramp 102 to the top platform 122 and/or the top surface 232 to provide a suitably flat surface for transferring cargo between the top platform 122 and the top surface 232 across the transfer ramp 102.

As a specific example, consider a scenario in which a first side of the top surface 232 is positioned higher (closer) to the transfer ramp 102 in the generally flat or horizontal orientation than a second side of the top surface 232 opposite the first side of the top surface 232. In this example, as the extendable arms 104 are retracted to lower the transfer ramp 102 toward the top surface 232, a first side of the transfer ramp 102 (e.g., a side of the transfer ramp 102 that is connected to the first extendable arm 104a) can make initial contact with the first side of the top surface 232 before a second side of the transfer ramp 102 (e.g., a side of the transfer ramp 102 that is connected to the second extendable arm 104b) makes contact with the second side of the top surface 232. When the first side of the transfer ramp 102 makes initial contact with the first side of the top surface 232, the second side of the transfer ramp 102 may not be in contact with the second side of the top surface 232, and may instead be positioned a distance above the second side of the top surface 232. As such, at this point in time, the second side of the transfer ramp 102 can pose a roadblock or obstacle to transferring cargo across at least the second side of the transfer ramp 102. Thus, after the first side of the transfer ramp 102 initially makes contact with the first side of the top surface 232, one or more of the extendable arms 104 can continue to be retracted to lower the second side of the transfer ramp 102. In embodiments employing a respective actuator for each of the first and second extendable arms 104a and 104b, continued retraction of the extendable arms 104 can overcurrent the actuator controlling the first extendable arm 104a (e.g., due to the first side of the transfer ramp 102 already being in contact with the first side of the top surface 232) such that the actuator controlling the first extendable arm 104a ceases to retract the first extendable arm 104a. At the same time, the actuator controlling the second extendable arm 104 can continue to retract the second extendable arm 104 to pull the second side of the transfer ramp 102 toward the second side of the top surface 232. In turn, the transfer ramp 102 can bend (e.g., deform, warp) such that the second side of the transfer ramp 102 is brought into contact with the second side of the top surface 232 while the first side of the transfer ramp 102 remains in contact with the first side of the top surface 232. In other words, the continued retraction of at least the second extendable arm 104b can pull the second side of the transfer ramp 102 against the second side of the top surface 232 such that the transfer ramp 102 is conformed to the top surface 232 and/or the top platform 122, despite the initial misalignment. Conforming the transfer ramp 102 to the top platform 122 and/or the top surface 232 in this manner can reduce or eliminate the roadblock/obstacle posed by the second side of the transfer ramp 102, and/or can provide a more suitable or flat surface for transferring cargo across the transfer ramp 102 between the top platform 122 and the top surface 232. In embodiments in which the transfer ramp 102 is resiliently deformable, the transfer ramp 102 can return to its initial, unbent, and/or non-conforming shape as the extendable arms 104 are subsequently extended to raise the transfer ramp 102 off of the top surface 232 and/or the top platform 122.

Additionally, or alternatively, when the first side of the transfer ramp 102 makes initial contact with the first side of the top surface 232 in the above example and the second side of the transfer ramp 102 is not in contact with the second side of the top surface 232, both of the extendable arms 104 can continue to be retracted. In some embodiments, this can force the first side of the transfer ramp 102 down into the first side of the top surface 232 to lower the height of the first side of the top surface 232 relative to the second side of the top surface 232 (e.g., using the suspension of a vehicle including the top surface 232). Lowering the height of the first side of the top surface 232 relative to the second side of the top surface 232 can bring the second side of the transfer ramp 102 into contact with the second side of the top surface 232, thereby (a) leveling the transfer ramp 102 and/or the top surface 232 and/or (b) eliminating, reducing, or minimizing the roadblock or obstacle posed by the second side of the transfer ramp 102 to transferring cargo across at least the second side of the transfer ramp 102.

Figure 4A:
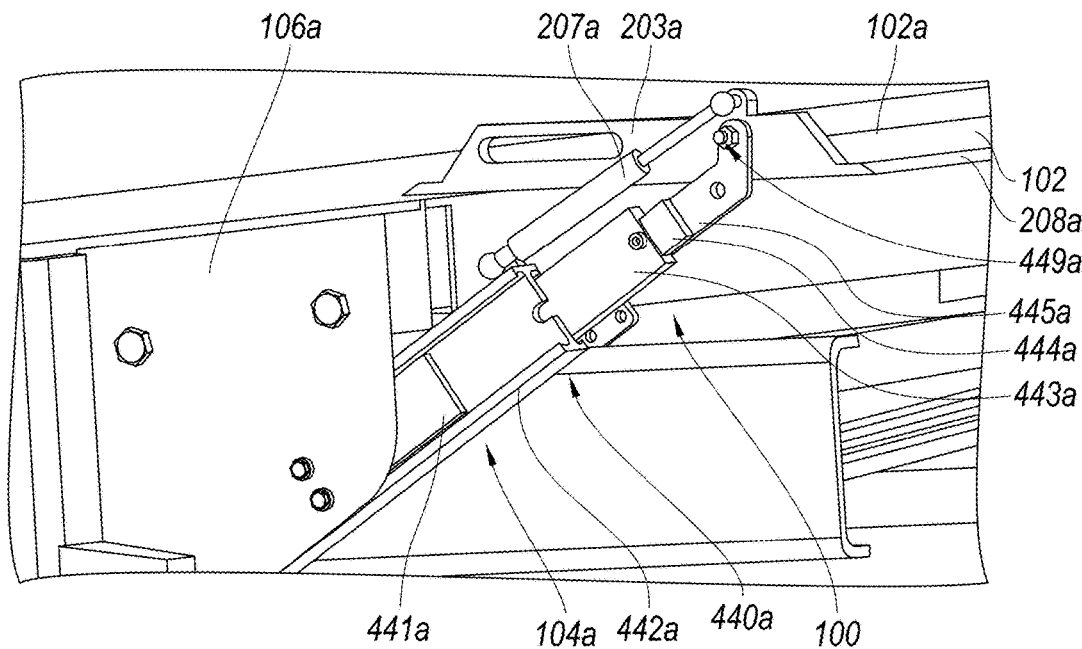
FIGS. 4A and 4B are partially schematic perspective views of sliding rails of extendable arms of the transfer ramp system of FIG. 1 configured in accordance with various embodiments of the present technology.
Figure 4B:
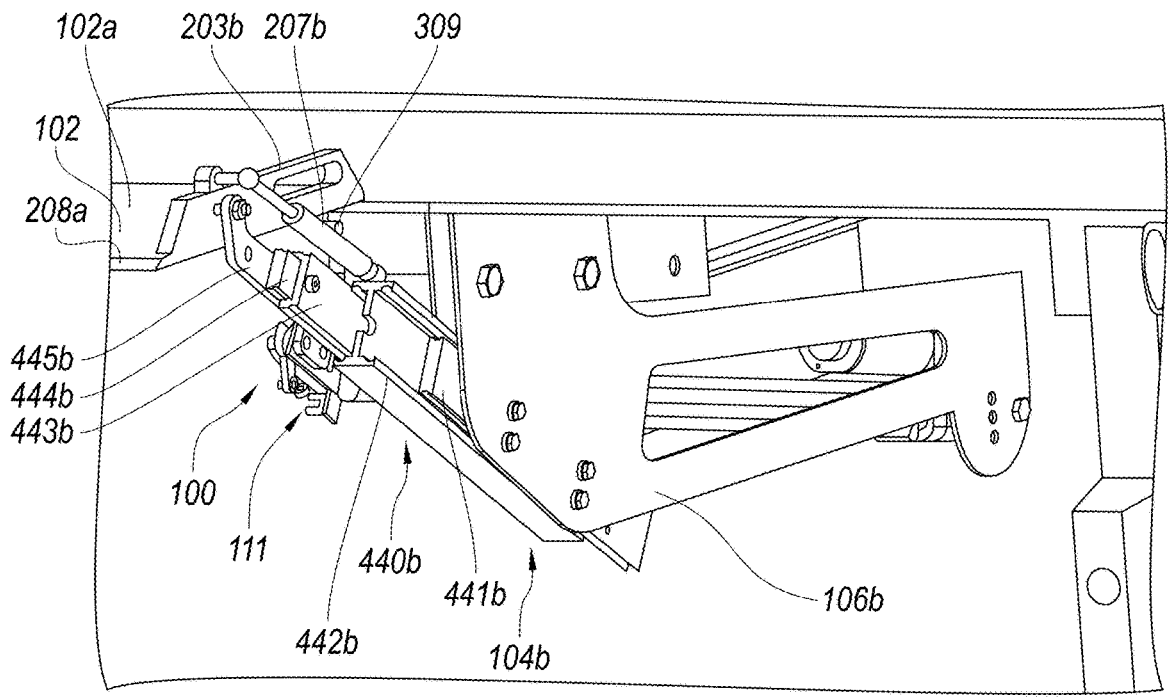

FIGS. 4A and 4B are partially schematic perspective views of the first and second extendable arms 104a and 104b, respectively, of the system 100 of FIG. 1. As shown, the first and second extendable arms 104a and 104b can each include a rail or sliding system 440a and 440b, respectively. Referring to the rail system 440a of the first extendable arm 104a of FIG. 4A as an example, the rail system 440a includes first through fifth rail portions 441a-445a. The first rail portion 441a is fixedly attached to the first mounting bracket 106a. The second rail portion 442a is illustrated as an 'I' beam having a channel on each of its longitudinal sides. The first rail portion 441a is seated in a channel on a first longitudinal side of the second rail portion 442a, and the third rail portion 443a is seated in a channel on a second longitudinal side of the second rail portion 442a. The third rail portion 443a is illustrated as having a 'C' channel. The fourth rail portion 444a is positioned within the 'C' channel of the third rail portion 443a, and is fixedly attached to the fifth rail portion 445a. The fifth rail portion 445a is attached to the first side rail 203a of the transfer ramp 102. In particular, the fifth rail portion 445a is attached to the first side rail 203a at a point 449a (e.g., a hinge pin) and in a manner that permits the transfer ramp 102 to pivot about the point 449a (e.g., as the strut 207a is extended and/or retracted). As shown in FIG. 4B, the rail system 440b of the second extendable arm 104b is structured in a manner generally similar to the rail system 440a (FIG. 4A) of the first extendable arm 104a (FIG. 4A), but is fixedly attached to the second mounting bracket 106b and is pivotally attached to the second side rail 203b of the transfer ramp 102 at a point 449b (e.g., a hinge pin) and in a manner that permits the transfer ramp 102 to pivot about the point 449b (e.g., as the strut 207b is extended and/or retracted).

In the illustrated embodiment, each of the rail systems 440a and 440b are generally telescoping. The telescoping feature of the rail systems 440a and 440b facilitates deploying (e.g., raising) and retracting (e.g., lowering) the transfer ramp 102. As discussed in greater detail below, the rail systems 440a and 440b can, via one or more actuators, be operated in unison (e.g., such that the rail systems 440a and 440b can be extended or retracted together and/or at the same time) or independently of one another.

Figure 5:
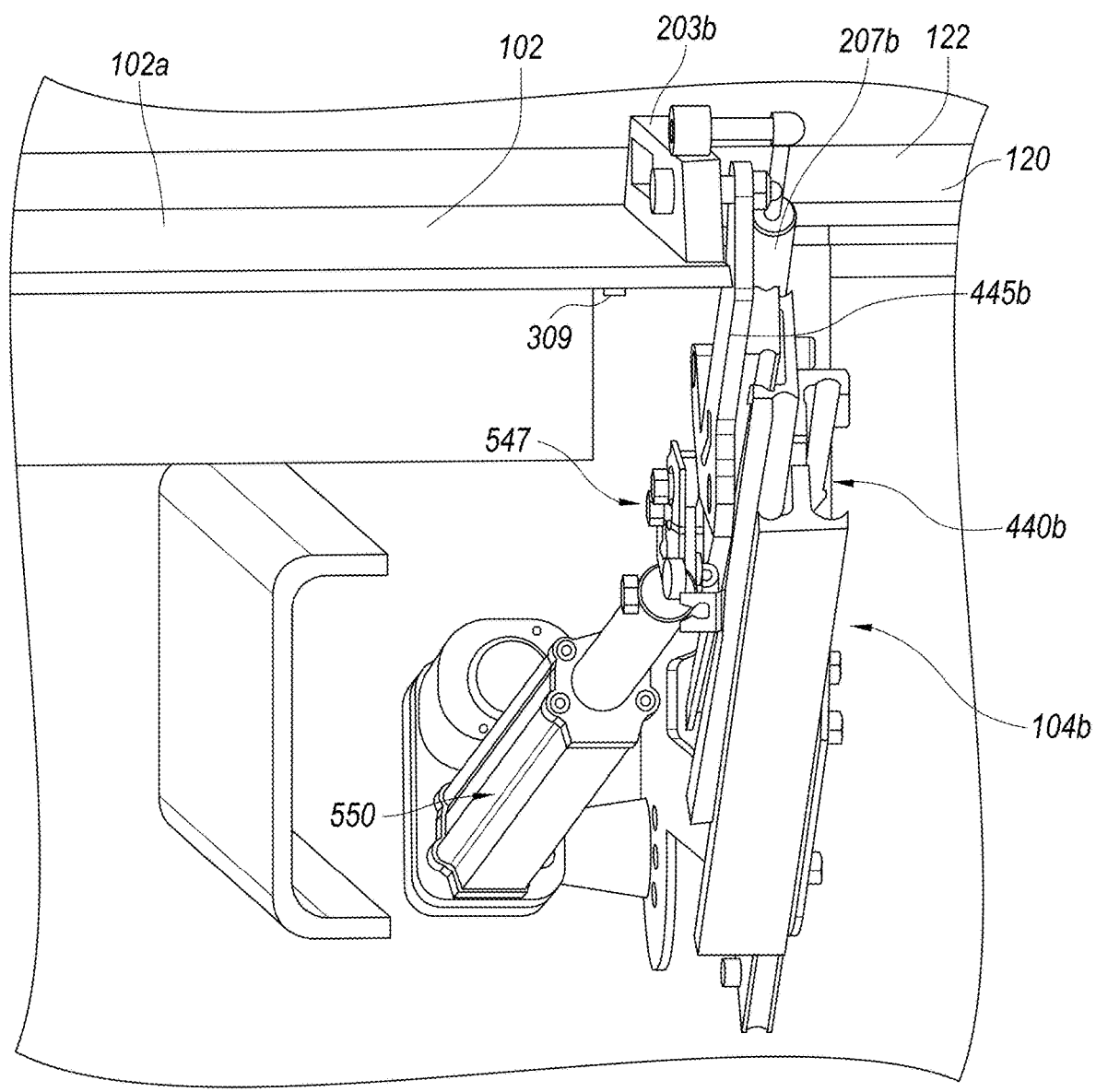
FIG. 5 is a partially schematic perspective view of an actuator of the transfer ramp system of FIG. 1 configured in accordance with various embodiments of the present technology.

FIG. 5 is a partially schematic perspective view of an actuator 550 of the system 100 of FIG. 1. As shown, the actuator 550 is positioned beneath the top platform 122 of the liftgate 120 and is attached to the second mounting bracket 106b. The actuator 550 is further attached to the fifth rail portion 445b of the rail system 440b of the second extendable arm 104b at location 547. In other embodiments, the actuator 550 can be attached to the fifth rail portion 445b of the rail system 440b at another location different from the location 547, and/or can be attached to another component of the second extendable arm 104b besides the fifth rail portion 445b.

In the illustrated embodiment, the actuator 550 is a linear actuator that is configured to extend and retract. As the actuator 550 extends, the actuator 550 pushes on the fifth rail portion 445b of the rail system 440b, thereby causing the telescoping rail system 440b of the second extendable arm 104b to extend outward and raise the transfer ramp 102. As the actuator 550 retracts, the actuator 550 pulls the fifth rail portion 445b of the rail system 440b inward, thereby causing the telescoping rail system 440b to retract inward and lower the transfer ramp 102. In embodiments employing a single (e.g., only one) actuator 550 or only one or more actuators 550 coupled to the second extendable arm 104b (as opposed to the first extendable arm 104a), the first extendable arm 104a can be extended and retracted via extension and retraction, respectively, of the second extendable arm 104b when the actuator 550 is extended and retracted, respectively.

The actuator 550 can be a pneumatic, hydraulic, electric (e.g., electro-hydraulic, electromechanical), and/or piezoelectric linear actuator. In embodiments employing a pneumatic linear actuator, the linear actuator can be tied into an air system of the vehicle/trailer. For example, the pneumatic linear actuator can be tapped into an air suspension system of the vehicle/trailer (e.g., as an accessory). Additionally, or alternatively, using a pneumatic linear actuator can facilitate controlled stowage of the transfer ramp 102 and/or of the system 100 by venting air pressure (e.g., through a valve). In other embodiments, the actuator 550 can be another suitable type of actuator system, such as a chain and pulley system. Operation of the actuator 550 can be controlled via one or more user controls (e.g., push buttons, levers, toggle switches, etc.), such as user controls mounted or stowed on the liftgate 120, a side of the vehicle/trailer, or within a cabin or box of the vehicle. In some embodiments, the user controls for the actuator 550 can be positioned proximate the controls for the liftgate 120.

Although shown as being coupled to the second extendable arm 104b in FIG. 5, the actuator 550 can be coupled to the first extendable arm 104a in other embodiments of the present technology. In some embodiments, the system 100 includes an actuator 550 attached to the first extendable arm 104a in addition to the actuator 550 attached to the second extendable arm 104b. In these embodiments, the actuator 550 attached to the first extendable arm 104a and the actuator 550 attached to the second extendable arm 104b can extend and/or retract in unison such that the first and second extendable arms 104a and 104b are extended and/or retracted, respectively, in unison. In these and other embodiments, the actuator 550 attached to the first extendable arm 104a can be extended and/or retracted independently from the actuator 550 attached to the second extendable arm 104b (and/or vice versa).

Figure 6A:
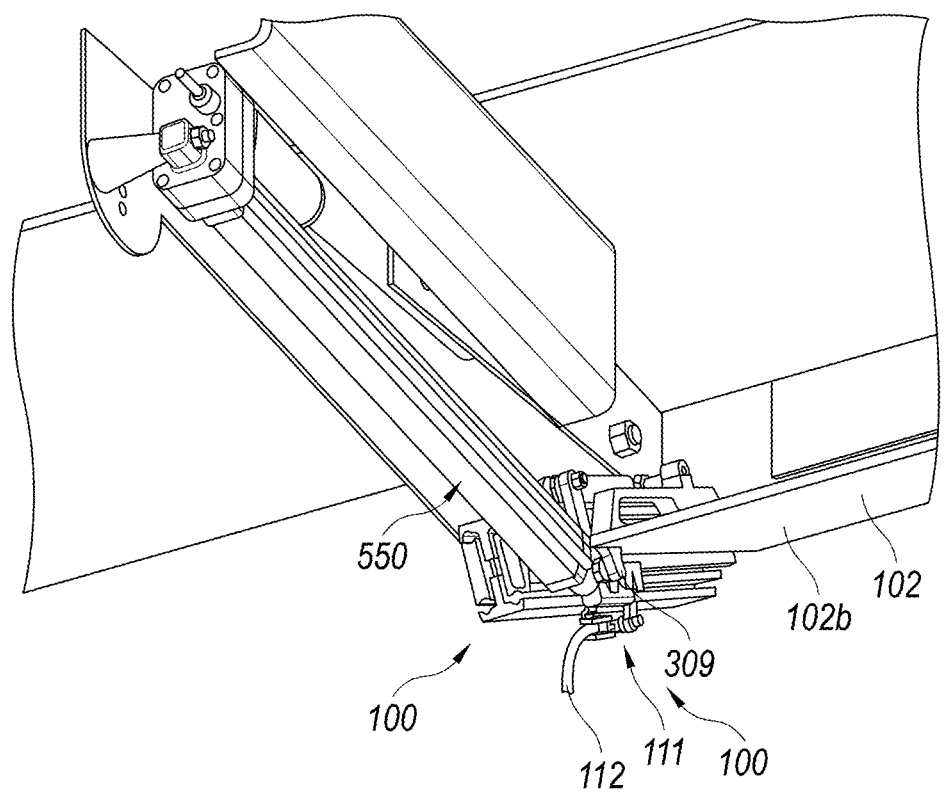
FIGS. 6A-6C are partially schematic perspective views of a cable latch system of the transfer ramp system of FIG. 1 configured in accordance with various embodiments of the present technology.
Figure 6B:
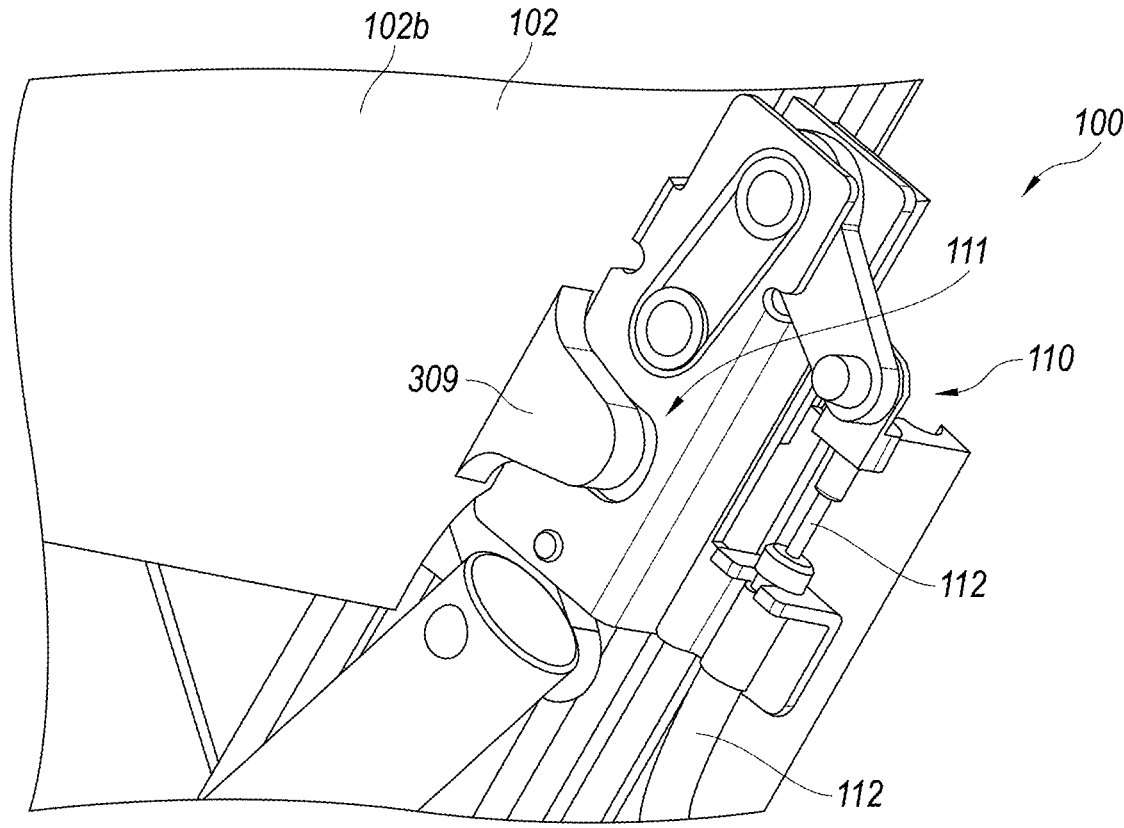
Figure 6C:
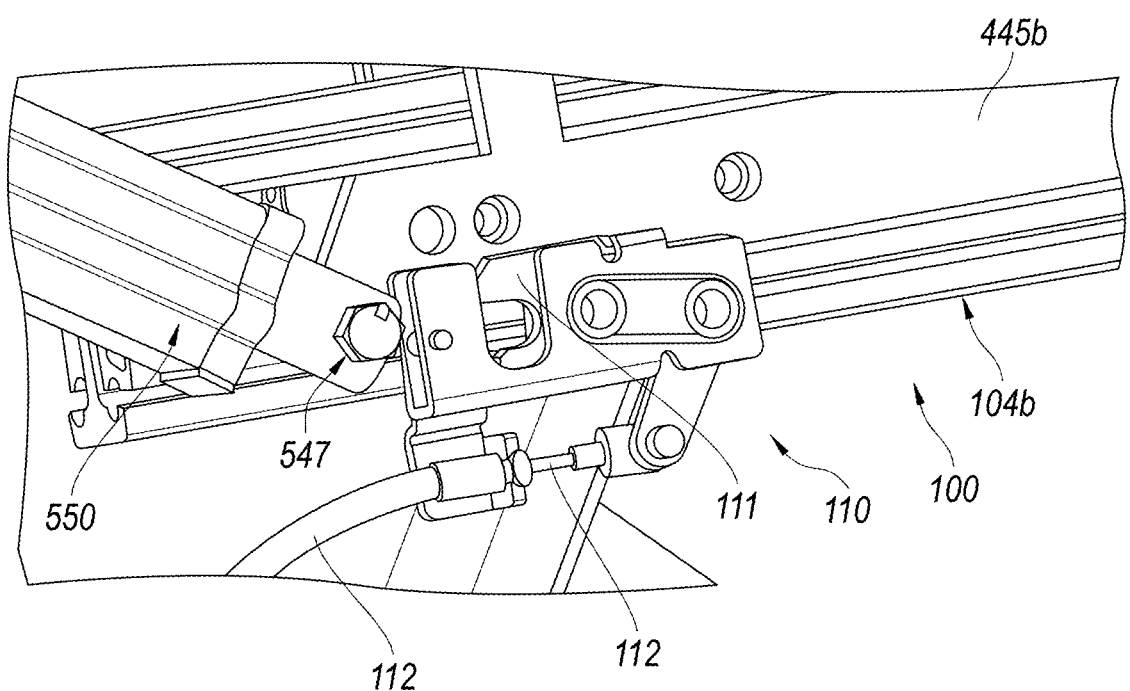

FIGS. 6A-6C are partially schematic perspective views of the ramp latching system 110 of the system 100 of FIG. 1. Referring to FIGS. 6A and 6B, the latchable portion 309 of the transfer ramp 102 is shown latched in the cable release latch 111 of the ramp latching system 110. When the latchable portion 309 of the transfer ramp 102 is latched in the cable release latch 111, the transfer ramp 102 can be held in the stowed orientation (shown in FIG. 1) and prevented or hindered from being rotated or pivoted forward toward the generally flat or horizontal orientation (shown in FIG. 2). Referring now to FIG. 6C, when a user of the system actuates the cable release latch 111 via the actuation mechanism 115 and the cable 112, the latchable portion 309 of the transfer ramp 102 is released from the cable release latch 111 such that the transfer ramp 102 can be rotated or pivoted from the stowed orientation toward the generally flat or horizontal orientation. In some embodiments, the ramp latching system 110 can operate in a manner generally similar to a hood release latch in an automobile. In these and other embodiments, another suitable type of latching system can be employed in lieu of the ramp latching system 110 and/or the latchable portion 309 of the transfer ramp 102. Examples of other suitable types of latching systems include cotter pins, ball lock pins, push button locks, and thumb latches. Several of these other suitable types of latching systems are discussed in greater detail below.

In some embodiments, the transfer ramp 102 can be configured to freely rotate (e.g., without biasing) when the latchable portion 309 of the transfer ramp 102 is released from the cable release latch 111. In other embodiments, the system 100 can include one or more springs (not shown) that are useable (in addition to or in lieu of the struts 207a and/or 207b) to bias, transition, or pivot the transfer ramp 102 at least part of the way between the stowed orientation (shown in FIG. 1) and the generally flat or horizontal orientation (shown in FIG. 2). For example, the system 100 can include one or more springs (e.g., one or more torsion springs and/or one or more other suitable types of springs) that are installed on, at, or proximate the point 449a (FIG. 4A) and/or the point 449b (FIG. 4B). Continuing with this example, when the latchable portion 309 of the transfer ramp 102 is released from the cable release latch 111, the one or more springs can bias or force the transfer ramp 102 toward the generally flat or horizontal orientation. As a specific example, when the transfer ramp 102 is transitioned to the stowed orientation (shown in FIG. 1), the one or more springs can be twisted (e.g., wound) such that the one or more springs are transitioned from storing a first amount of energy to storing a second, higher amount of energy. Thus, when the transfer ramp 102 is released from the cable release latch 111, the one or more springs are permitted to untwist (e.g., unwind) and release the stored. As this occurs, the one or more springs can exert a torque or twisting force against the transfer ramp 102 to transition, pivot, or rotate the transfer ramp 102 at least part of the way between the stowed orientation and the generally flat or horizontal orientation.

Figure 7A:
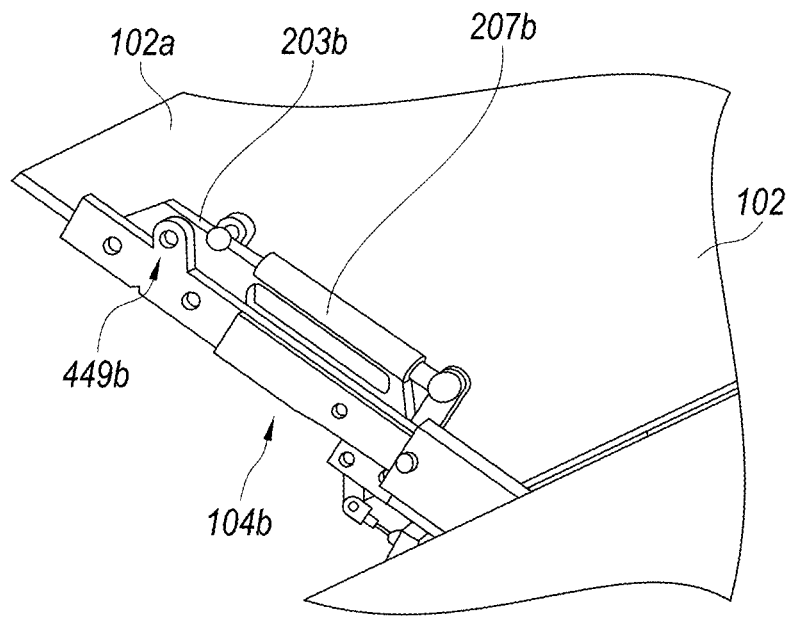
FIGS. 7A and 7B are partially schematic perspective views of a strut of the transfer ramp system of FIG. 1 configured in accordance with various embodiments of the present technology.
Figure 7B:
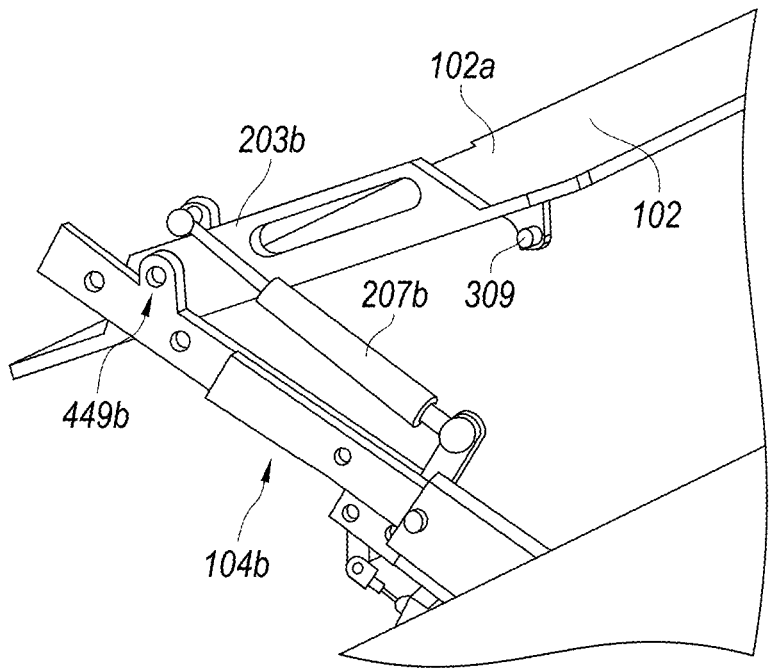

FIGS. 7A and 7B are partially schematic perspective views of the strut 207b of the system 100 of FIG. 1. The strut 207b can be fixedly attached to the second side rail 203b of the transfer ramp 102 and/or to the second extendable arm 104b. The strut 207a (FIG. 2) can be structurally generally similar to the strut 207b, but can be fixedly attached to the first side rail 203a of the transfer ramp 102 and/or to the first extendable arm 104a.

In some embodiments, the struts 207a and 207b can be gas struts. In other embodiments, the struts 207a and 207b can be air cylinders. In still other embodiments, the struts 207a and 207b can be other suitable actuator systems, such as a pneumatic, hydraulic, electric (e.g., electro-hydraulic, electromechanical), and/or piezoelectric linear actuators or pistons. In still other embodiments, the struts 207a and 207b can be controlled via stepper motors or other actuators. In embodiments in which the struts 207a and 207b are gas struts or air cylinders, the struts 207a and 207b can be tapped into an air suspension system of the vehicle/trailer (e.g., as accessories).

As discussed above, the struts 207a and 207b can be used to rotate or pivot the transfer ramp 102. For example, after the transfer ramp 102 is released from the cable release latch 111 of the ramp latching system 110 and/or after the spring(s) (not shown) pivot the transfer ramp 102 at least part of the way toward the generally flat or horizontal orientation (shown in FIG. 2), the struts 207a and 207b can be extended, such as from the position of the strut 207b shown in FIG. 7A to the position of the strut 207b shown in FIG. 7B. In embodiments in which the struts 207a and 207b are gas struts or air cylinders, the struts 207a and 207b can be extended by filling the strut 207a and/or the strut 207b with gas or air. Extension of the struts 207a and 207b can rotate or pivot the transfer ramp 102 away from the stowed orientation (shown in FIG. 1) and/or toward the flat or horizontal orientation (shown in FIG. 2), or further.

Additionally, or alternatively, the struts 207a and 207b can be retracted, such as from the position of the strut 207b shown in FIG. 7B to the position of the strut 207b shown in FIG. 7A. For example, in embodiments in which the struts 207a and 207b are gas struts or air cylinders, gas or air in the strut 207a and/or the strut 207b can be vented via a valve (not shown) such that the struts 207a and 207b are permitted to retract. Additionally, or alternatively, a user of the system 100 can (a) pull on a rope or cable (not shown) attached to (e.g., a back portion) of the transfer ramp 102 and/or (b) push on (e.g., a back portion of the top surface 102a of) the transfer ramp 102, to retract the struts 207a and 207b and/or rotate or pivot the transfer ramp 102 toward the stowed orientation. In some embodiments, retraction of the struts 207a and 207b can rotate or pivot the transfer ramp 102 from the flat or horizontal orientation toward the stowed orientation. In these and other embodiments, the system 100 can include a transfer ramp stowage system (e.g., similar to the transfer ramp stowage system discussed in detail below with reference to FIGS. 25A-25D and/or similar to the transfer ramp stowage system discussed in detail below with reference to FIGS. 26A-26E). For example, the system 100 can include a cable (not shown) connected to a portion of the transfer ramp 102. The cable can be routed from the portion of the transfer ramp 102, across a pulley or other object (e.g., through a loop), and/or to a position (e.g., a fixed position) on the system 100 such that, when the extendable arms 104 are extended while the latchable portion 309 of the transfer ramp 102 is released from the cable release latch 111, the cable can be pulled taught and used to pivot or rotate the transfer ramp 102 toward the stowed orientation (shown in FIG. 1). More specifically, as the extendable arms 104 are extended, the cable connected to the transfer ramp 102 can be brought taught (e.g., against the pulley or other object) to apply a force against the transfer ramp 102 and rotate the transfer ramp 102 toward the stowed position. Such a force can additionally be used to retract the struts 207a and/or 207b in some embodiments. In these and other embodiments, as the transfer ramp 102 returns to the stowed orientation, the latchable portion 309 of the transfer ramp 102 can engage with the cable release latch 111 of the ramp latching system 110 such that the cable release latch 111 latches the latchable portion 309 of the transfer ramp 102 and prevents or hinders the transfer ramp 102 from rotating or pivoting away from the stowed orientation.

In some embodiments, only one of the struts 207a and 207b are actively actuated (e.g., actively filled with gas or air and/or vented). In these embodiments, the other of the struts 207a and 207b can extend or retract via active extension or retraction of the one of the struts 207a and 207b. In embodiments in which both of the struts 207a and 207b are actively actuated, the struts 207a and 207b can be actively actuated such that the struts 207a and 207b extend and/or retract in unison. In other embodiments, the struts 207a and 207b can be actively actuated such that the struts 207a and 207b can extend and/or retract independent of one another.

In some embodiments, the struts 207a and 207b can limit over rotation or pivoting of the transfer ramp 102. For example, the struts 207a and 207b can be extended out to a certain distance or extent beyond which further extension can be prevented or hindered. In this manner, the struts 207a and 207b can limit rotation or pivoting of the transfer ramp 102 to positions corresponding to extension of the struts 207a and 207b beyond the certain distance or extent. As another example, the struts 207a and 207b, the cable release latch 111, and/or the latchable portion 309 of the transfer ramp 102 can limit over rotation or pivoting of the transfer ramp 102 beyond the stowed orientation of the transfer ramp 102 (as shown in FIG. 1).

Figure 8A:
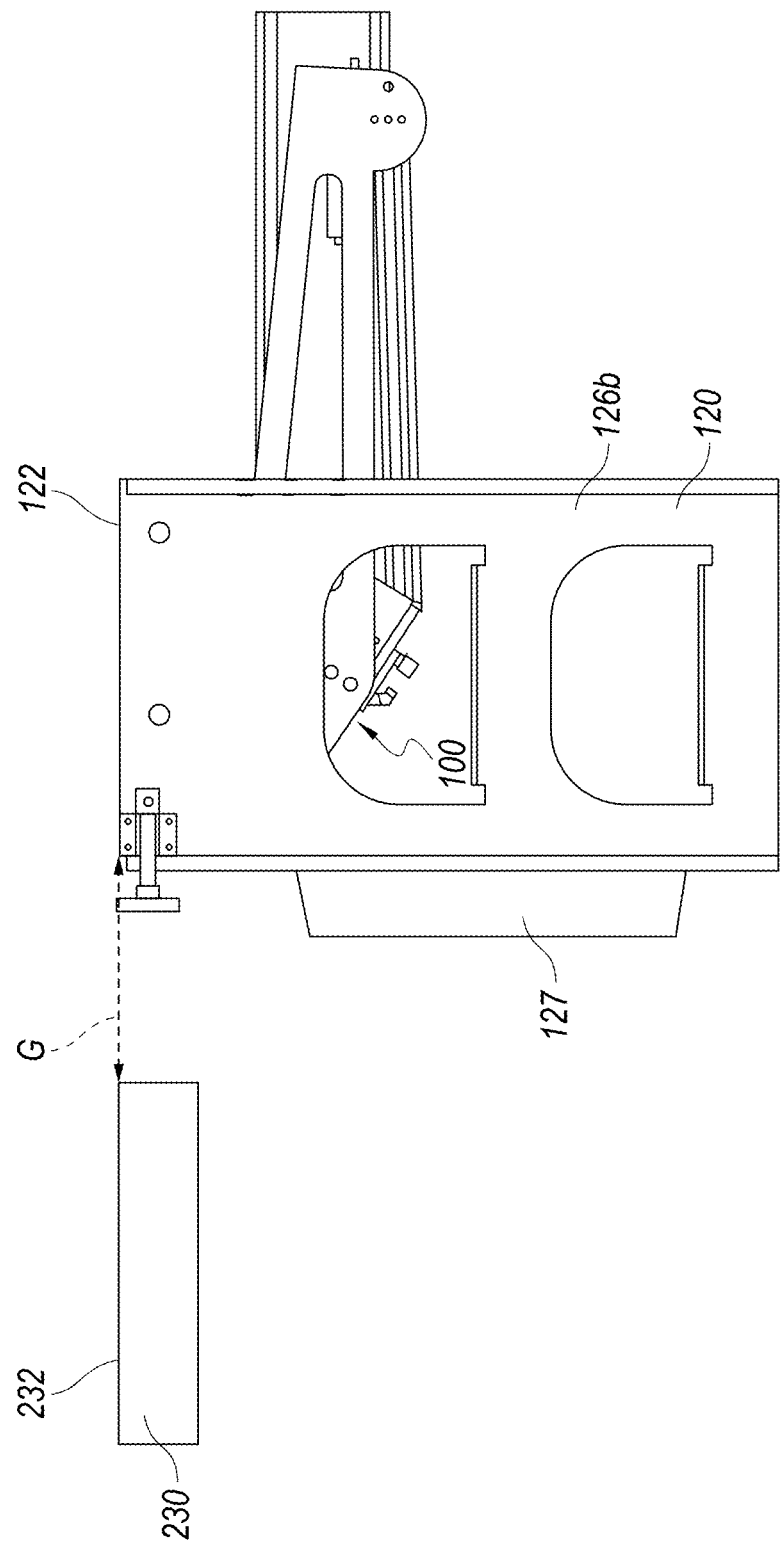

FIGS. 8A-8L are partially schematic side views of the transfer ramp system 100 of FIG. 1 illustrating a method of operating the system 100 in accordance with various embodiments of the present technology. All or a subset of the steps of the method illustrated in FIGS. 8A-8L can be performed in accordance with the above discussion of the system 100. As shown in FIG. 8A, the method begins with the system 100 in the stowed position beneath the top platform 122 of the liftgate 120. More specifically, the vehicle/trailer can initially be backed toward the other structure 230 until (a) the vehicle/trailer is positioned such that the rubber bumper 127 of the liftgate 120 faces and/or contacts the other structure 230, and/or (b) the top platform 122 of the liftgate 120 is spaced a distance from the top surface 232 of the other structure 230 that is less than a length of the transfer ramp 102 measured from the back lip 208a (FIG. 2) of the transfer ramp 102 (FIG. 1) to the front lip 208b (FIG. 2) of the transfer ramp 102. As discussed above, the other structure 230 can be a commercial vehicle, a loading dock, a trailer, a bed of a truck, or another structure. When the vehicle/trailer including the liftgate 120 is positioned as shown in FIG. 8A, a gap G exists between the top platform 122 of the liftgate 120 and the top surface 232 of the other structure 230.

Figure 8B:
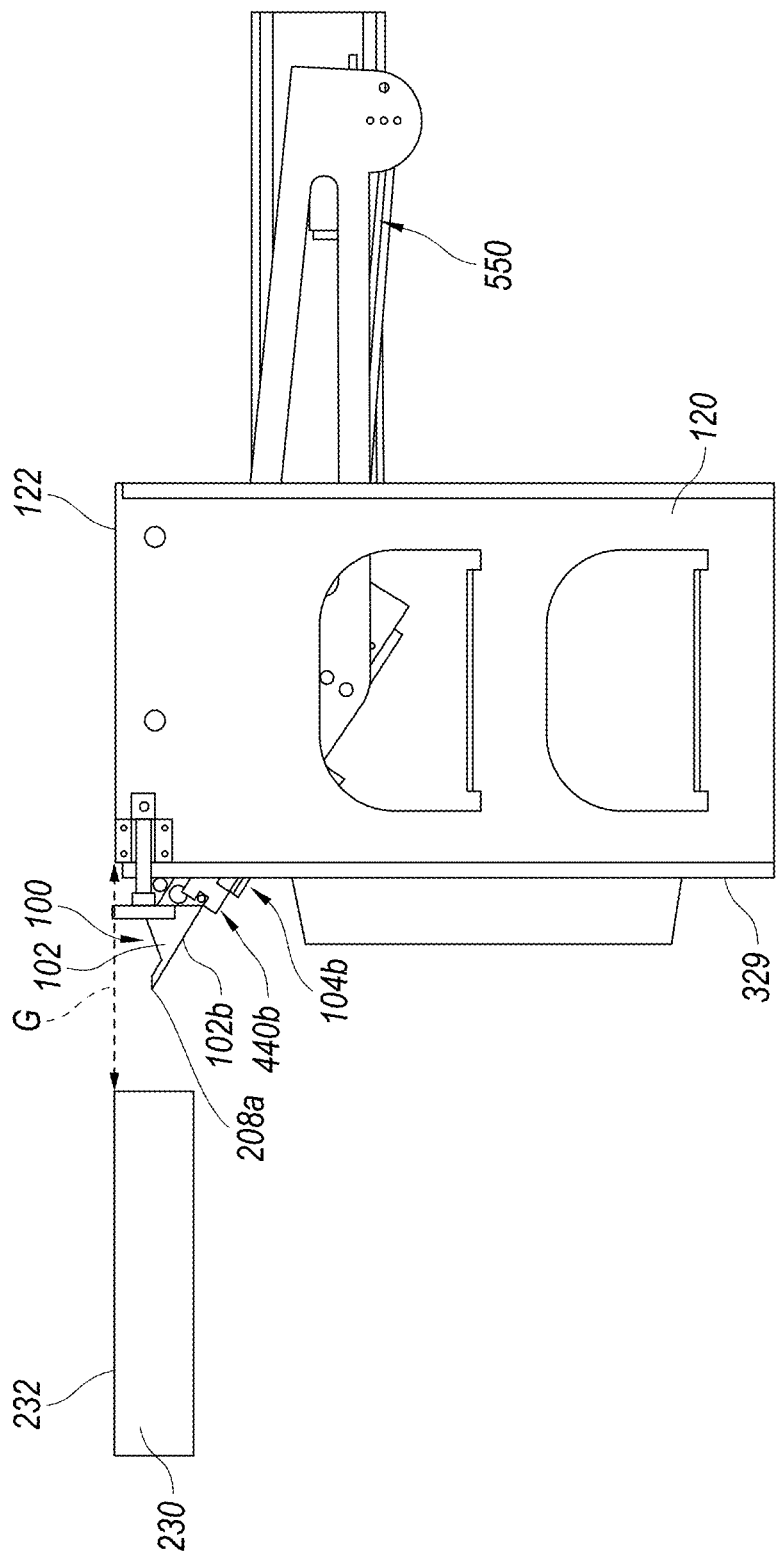
Figure 8D:
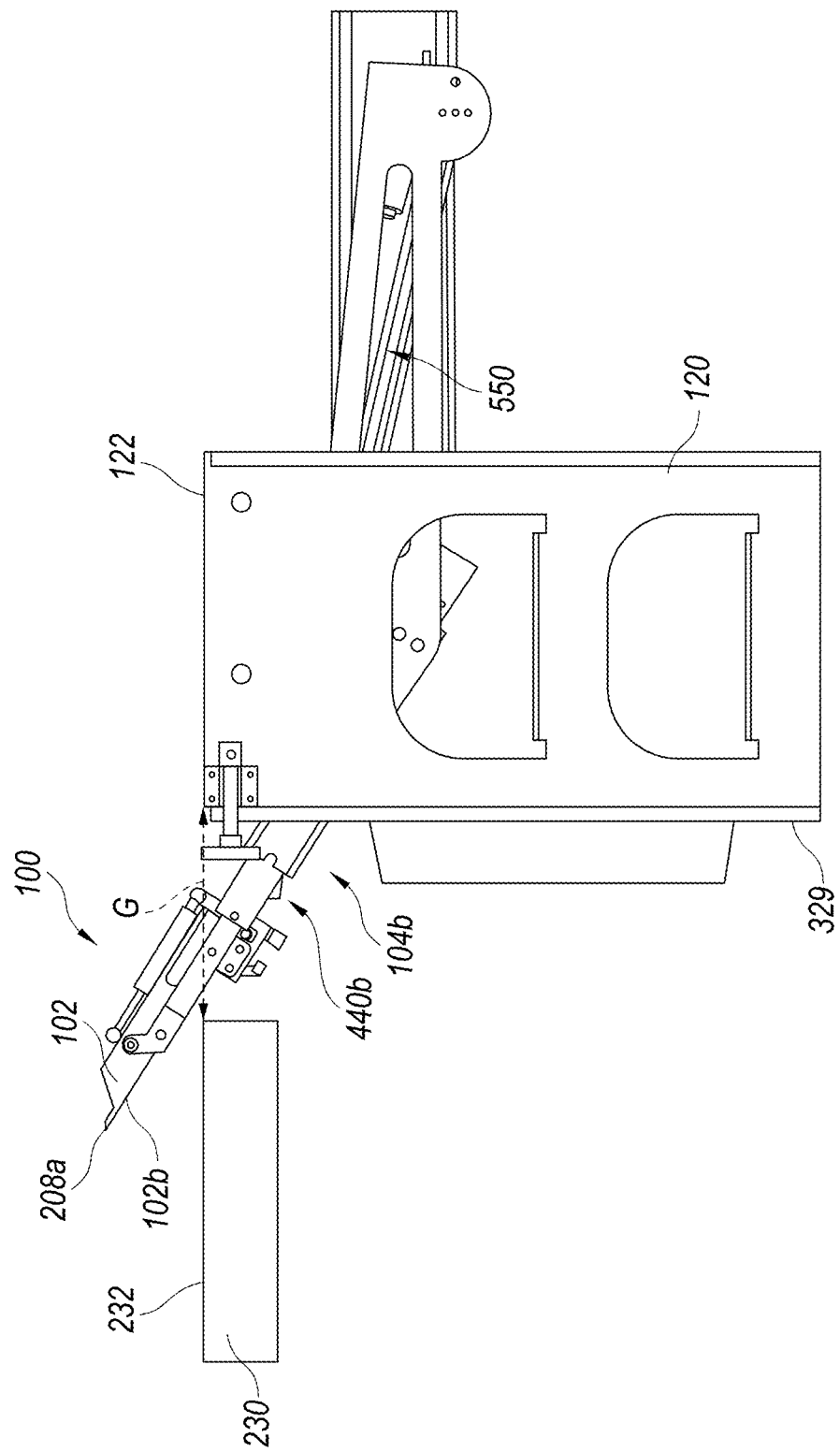

Referring now to FIGS. 8B-8D, the method continues by raising the transfer ramp 102 from the stowed position (FIG. 8A) to a deployed position (FIG. 8D) above the top platform 122 of the liftgate 120 and/or above the top surface 232 of the other structure 230. Raising the transfer ramp 102 can include extending the first and second extendable arms 104a (FIG. 1) and 104b using the actuator 550 and/or the rail systems 440a and 440b. Raising the transfer ramp 102 using the actuator 550 can include filling the actuator 550 with gas or air, or otherwise actuating the actuator 550. In some embodiments, raising the transfer ramp 102 includes raising the transfer ramp 102 such that the transfer ramp 102 passes through the gap G that exists between the top surface 232 of the other structure 230 and the top platform 122 of the liftgate 120. In these and other embodiments, raising the transfer ramp 102 includes raising the transfer ramp 102 such that at least a portion of the transfer ramp 102 overshoots the top surface 232 of the other structure 230 (as shown in FIG. 8D). In these and still other embodiments, raising the transfer ramp 102 includes raising the transfer ramp 102 until (i) the back lip 208a and/or a portion of the bottom surface 102b of the transfer ramp 102 is positioned above the top surface 232 of the other structure 230, and/or (b) the front lip 208b (FIG. 2) of the transfer ramp 102 clears (e.g., is positioned in front of) the front face 329 of the liftgate 120.

Figure 8E:
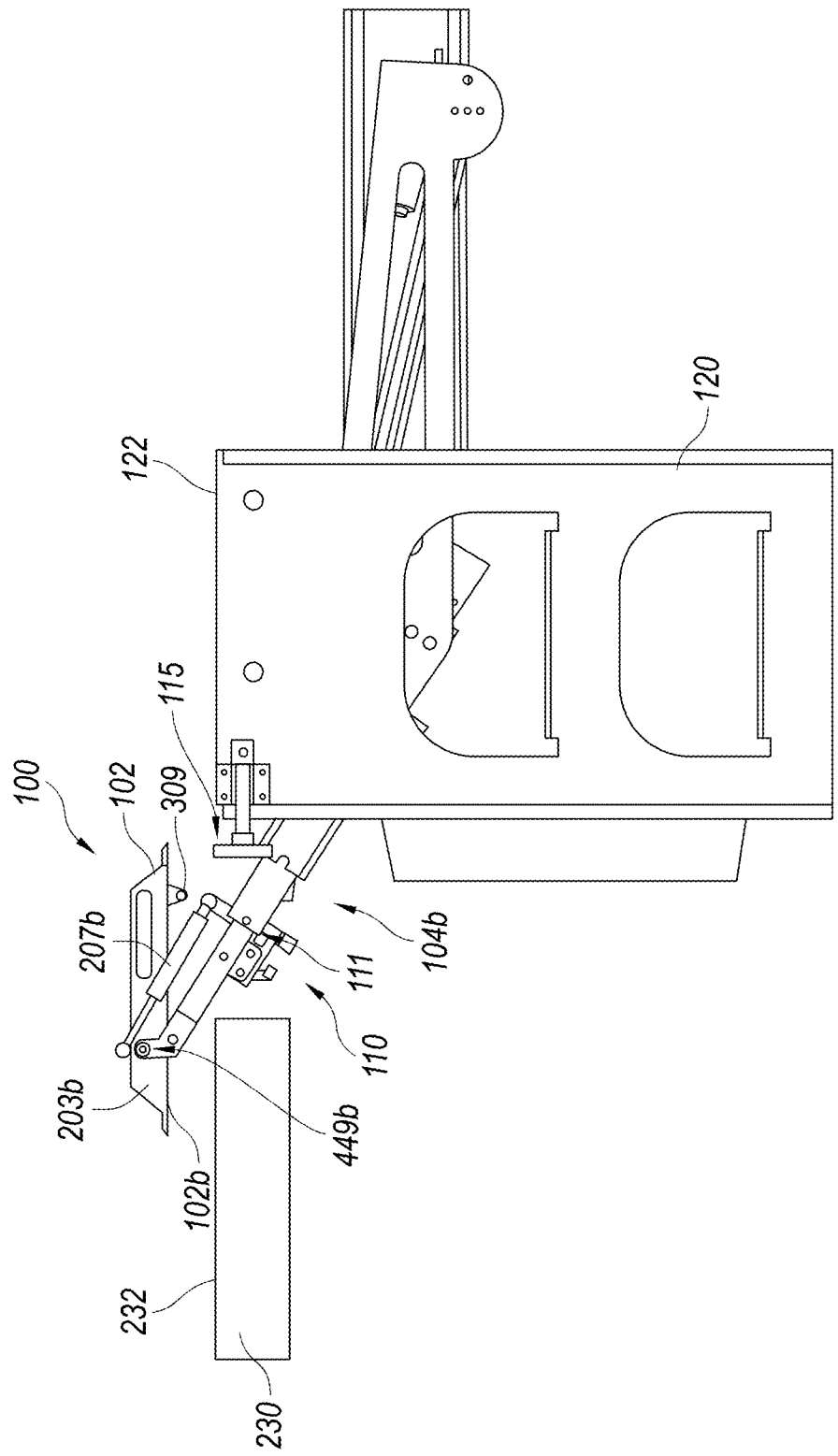

Referring to FIG. 8E, the method continues by rotating or pivoting the transfer ramp 102 from the stowed orientation (FIG. 8D) to a deployed orientation (e.g., in which the transfer ramp 102 is relatively flat or horizontal, and/or in which to top surface 102a and/or the bottom surface 102b of the transfer ramp 102 is/are brought more into alignment with the top platform 122 of the liftgate 120 and/or the top surface 232 of the other structure 230). In some embodiments, rotating or pivoting the transfer ramp 102 can include releasing the latchable portion 309 of the transfer ramp 102 from the cable release latch 111 of the ramp latching system 110, such as by actuating the cable release latch 111 via the actuation mechanism 115 and the cable 112 (FIG. 1). In these and other embodiments, rotating or pivoting the transfer ramp 102 can include rotating or pivoting the transfer ramp 102 using one or more springs and/or by extending the struts 207a (FIG. 2) and 207b (e.g., such that the transfer ramp 102 pivots about the points 449a (FIG. 4A) and 449b at which the first and second extendable arms 104a (FIG. 1) and 104b, respectively, are attached to the first and second side rails 203a (FIG. 2) and 203b, respectively, of the transfer ramp 102). Extending the struts 207a and 207b can include filling the struts 207a and/or 207b with gas or air, or otherwise actuating the struts 207a and/or 207b. In these and other embodiments, extending the struts 207a and 207b can include pushing on the transfer ramp 102 or otherwise manually rotating or pivoting the transfer ramp 102.

Figure 8F:
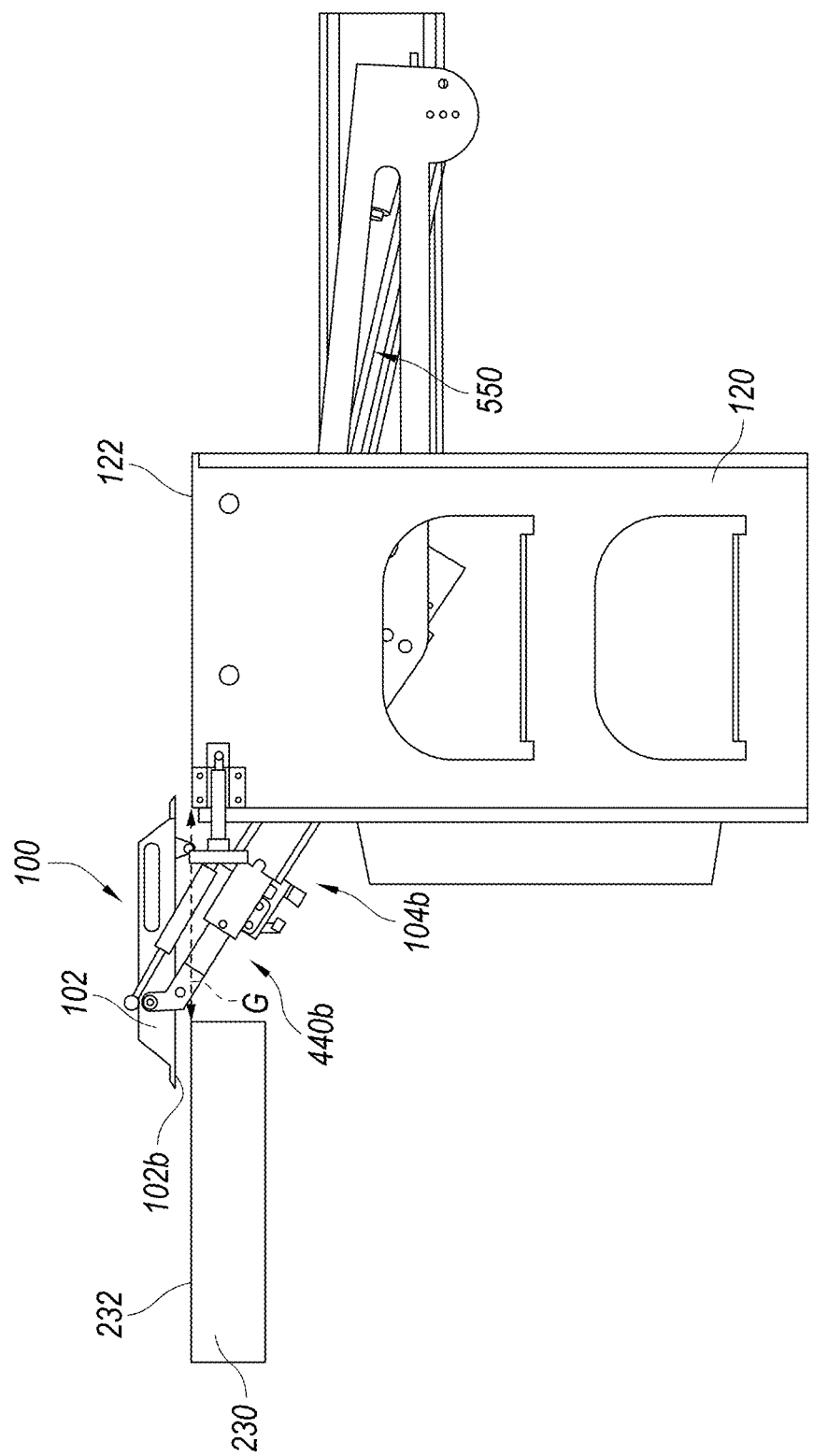

Referring to FIGS. 8F and 8G, the method continues by lowering the transfer ramp 102 until the transfer ramp 102 is in the deployed position illustrated in FIG. 8G. Lowering the transfer ramp 102 can include lowering the transfer ramp 102 while the transfer ramp 102 is in the generally flat or horizontal orientation (or in another orientation that is more in alignment with the top platform 122 of the liftgate 120 than the stowed orientation of the transfer ramp 102). Lowering the transfer ramp 102 can additionally, or alternatively, include retracting the first and second extendable arms 104a (FIG. 1) and 104b using the actuator 550 and/or the rail systems 440a and 440b. Lowering the transfer ramp 102 using the actuator 550 can include venting gas or air from the actuator 550 (e.g., through a valve), or otherwise actuating the actuator 550. In some embodiments, lowering the transfer ramp 102 includes lowering the transfer ramp 102 such that at least a portion of the bottom surface 102b of the transfer ramp 102 is positioned above the top surface 232 of the other structure 230 and at least another portion of the bottom surface 102b is positioned above the top platform 122 of the liftgate 120. In these and other embodiments, lowering the transfer ramp 102 can include lowering the transfer ramp 102 until a portion of the bottom surface 102b of the transfer ramp 102 rests on the top surface 232 of the other structure 230, another portion of the bottom surface 102b rests on the top platform 122 of the liftgate 120, and the transfer ramp 102 spans the gap G. In these and still other embodiments, lowering the transfer ramp 102 can include continuing to retract at least one of the extendable arms 104 after the transfer ramp 102 makes initial contact with the top platform 122 and/or the top surface 232 (e.g., such that the transfer ramp 102 bends and/or conforms to the arrangement of the top platform 122 and/or the top surface 232, as discussed in greater detail above).

With the transfer ramp 102 positioned as shown in FIG. 8G, the method continues by transferring cargo across the top surface 102a (FIG. 2) of the transfer ramp 102. For example, cargo (e.g., a pallet or other object) can be loaded into the vehicle/trailer by transferring the cargo from the top surface 232 of the other structure 230, across the top surface 102a of the transfer ramp 102, and onto the top platform 122 of the liftgate 120. Additionally, or alternatively, cargo can be unloaded from the vehicle/trailer by transferring the cargo from the top platform 122 of the liftgate 120, across the top surface 102a of the transfer ramp 102, and onto the top surface 232 of the other structure 230.

Figure 8H:
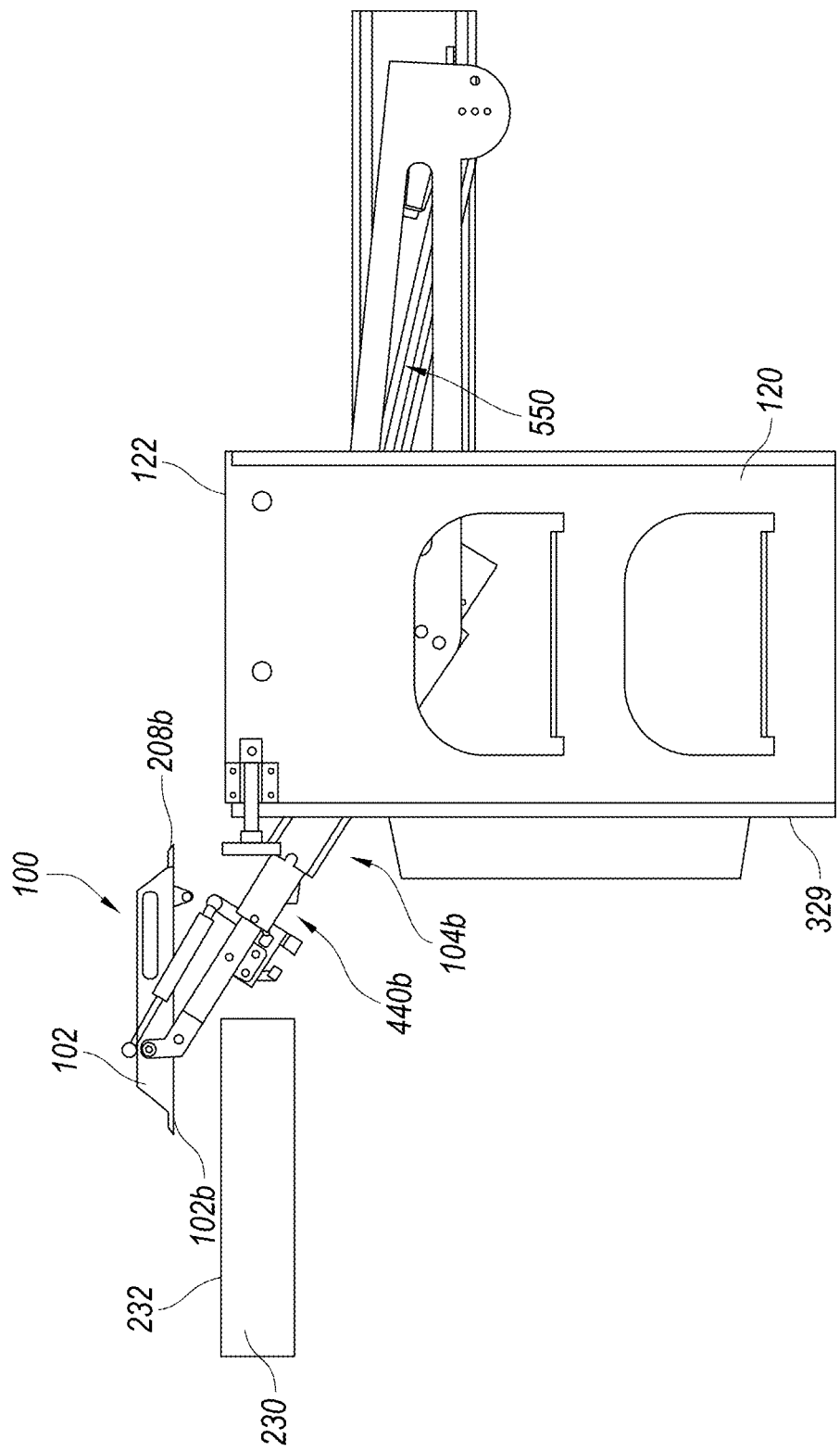

Referring to FIG. 8H, the method continues by raising the transfer ramp 102 from the deployed position (shown in FIG. 8G) to a deployed position (shown in FIG. 8H) above the top platform 122 of the liftgate 120 and/or above the top surface 232 of the other structure 230. The deployed position shown in FIG. 8H can be identical or at least generally similar to the deployed position shown in FIG. 8E. Raising the transfer ramp 102 can include raising the transfer ramp 102 while the transfer ramp 102 is in the generally flat or horizontal orientation (or in another orientation that is more in alignment with the top platform 122 of the liftgate 120 than the stowed orientation of the transfer ramp 102). Raising the transfer ramp 102 can additionally, or alternatively, include extending the first and second extendable arms 104a (FIG. 1) and 104b using the actuator 550 and/or the rail systems 440a and 440b. Raising the transfer ramp 102 using the actuator 550 can include filling the actuator 550 with gas or air, or otherwise actuating the actuator 550. In some embodiments, raising the transfer ramp 102 can include raising the transfer ramp 102 to a position at which the bottom surface 102b of the transfer ramp 102 is not in contact with the top surface 232 of the other structure 230 and/or with the top platform 122 of the liftgate 120. In these and other embodiments, raising the transfer ramp 102 can include raising the transfer ramp 102 until the front lip 208b of the transfer ramp 102 clears or is positioned in front of the front face 329 of the liftgate 120.

Figure 8I:
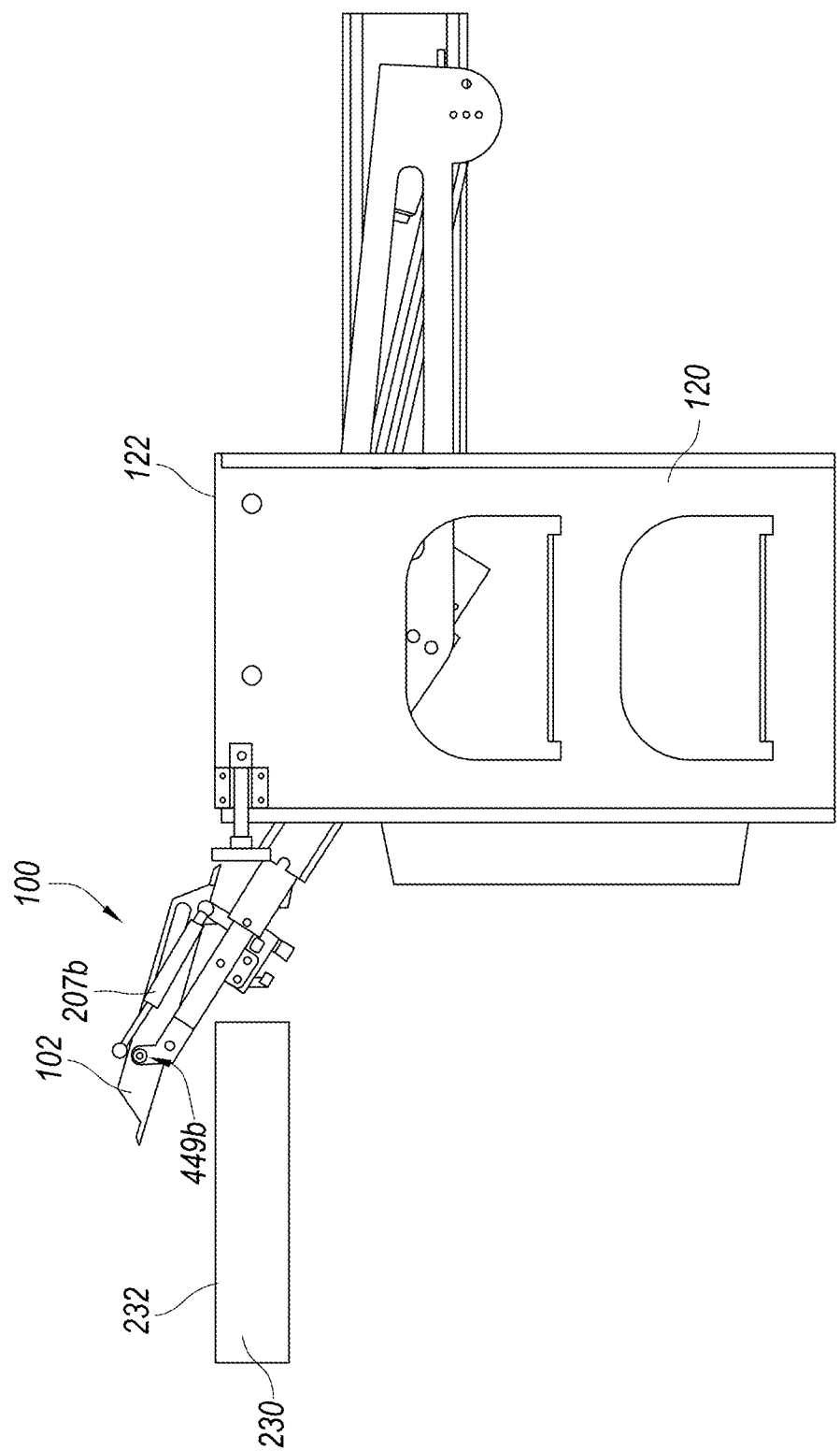
Figure 8J:
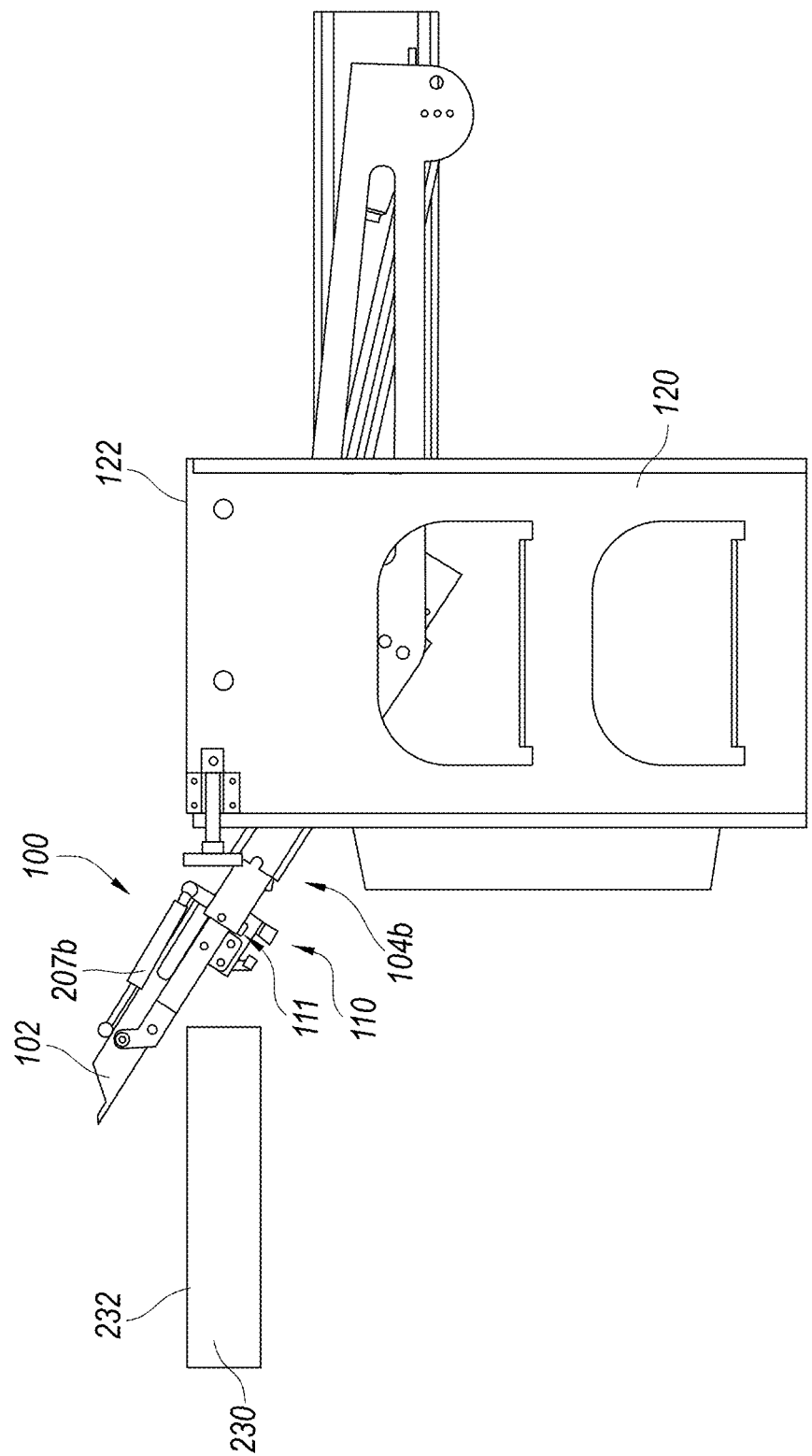

Referring now to FIGS. 8I and 8J, the method continues by rotating or pivoting the transfer ramp 102 to the stowed orientation. In some embodiments, rotating or pivoting the transfer ramp 102 to the stowed orientation can include retracting the struts 207a (FIG. 2) and 207b (e.g., such that the transfer ramp 102 pivots about the points 449a (FIG. 4A) and 449b at which the first and second extendable arms 104a (FIG. 1) and 104b, respectively, are attached to the first and second side rails 203a (FIG. 2) and 203b, respectively, of the transfer ramp 102). Retracting the struts 207a and 207b can include venting gas or air from the struts 207a and/or 207b (e.g., through a valve), or otherwise actuating the struts 207a and/or 207b. In these and other embodiments, retracting the struts 207a and 207b can include pushing on (e.g., the top surface 102a (FIG. 2) of) the transfer ramp 102, pulling a cable or strap attached to the transfer ramp 102, or otherwise manually rotating or pivoting the transfer ramp 102. In these and still other embodiments, rotating or pivoting the transfer ramp 102 to the stowed orientation can include rotating or pivoting the transfer ramp 102 using a transfer ramp stowage system (as discussed above and in greater detail below with reference to FIGS. 25A-25D and/or FIGS. 26A-26E), such as by extending the extendable arms 104 to pull a cable (not shown) connected to the transfer ramp 102 taught and thereby rotate the transfer ramp 102 toward the stowed orientation. In these and other embodiments, rotating or pivoting the transfer ramp 102 to the stowed orientation can include rotating or pivoting the transfer ramp 102 until the latchable portion 309 (FIG. 8E) engages with and becomes latched by the cable release latch 111 of the ramp latching system 110 (e.g., such that rotation or pivoting away from the stowed orientation is prevented or hindered by the cable release latch 111).

Figure 8L:
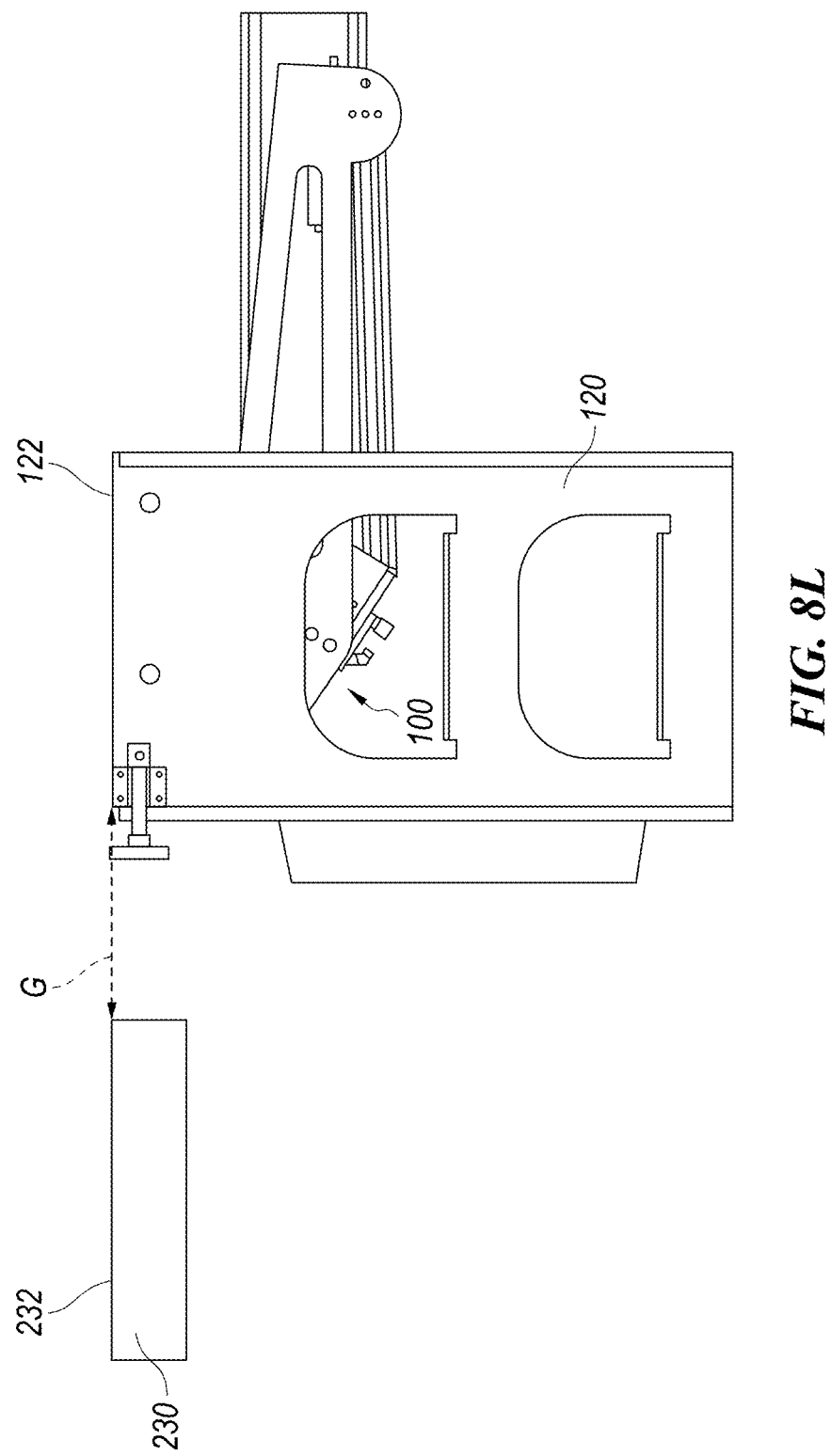

Referring to FIGS. 8K and 8L, the method continues by lowering the transfer ramp 102 and returning the system 100 to the stowed position. Lowering the transfer ramp 102 can include lowering the transfer ramp 102 while the transfer ramp 102 is in the stowed orientation. Lowering the transfer ramp 102 can additionally, or alternatively, include retracting the first and second extendable arms 104a (FIG. 1) and 104b using the actuator 550 and/or the rail systems 440a and 440b. Lowering the transfer ramp 102 using the actuator 550 can include venting gas or air from the actuator 550 (e.g., through a valve), or otherwise actuating the actuator 550. In some embodiments, lowering the transfer ramp 102 includes lowering the transfer ramp 102 such that the transfer ramp 102 passes through the gap G that exists between the top surface 232 of the other structure 230 and the top platform 122 of the liftgate 120. In these and other embodiments, lowering the transfer ramp 102 includes lowering the transfer ramp 102 until the system 100 is in the stowed position beneath the top platform 122 of the liftgate 120.

Although the steps of the methods described herein are discussed and/or illustrated in a particular order, the methods described herein are not so limited. In other embodiments, the methods described herein can be performed in different orders. In these and other embodiments, any of the steps of the methods described herein can be performed before, during, and/or after any of the other steps of the methods described herein. Furthermore, a person skilled in the art will readily recognize that the methods described herein can be altered and still remain within these and other embodiments of the present technology. For example, one or more steps of the methods described herein can be omitted and/or repeated in some embodiments.

Variations of the embodiments illustrated in FIGS. 1-8L and described in detail above exist and are within the scope of the present technology. Indeed, variations of the embodiments illustrated in FIGS. 1-8L are discussed in detail below with reference to FIGS. 18A-27. In these and other variations, transfer ramps 102 configured in accordance with other embodiments of the present technology can lack side rails 203a and/or 203b, and/or can include side rails that extend downward toward the bottom surfaces 102b of the transfer ramps 102 (as opposed to extending upward toward the top surfaces 102a of the transfer ramps 102). As another example, the first and/or second extendable arms 104a and/or 104b can be attached to transfer ramps 102 at locations along the transfer ramps 102 that differ from the points 449a and/or 449b shown in FIGS. 4A and/or 4B, respectively. Additionally, or alternatively, the struts 207a and/or 207b (a) can be attached to transfer ramps 102 at locations along the transfer ramps 102 that differ from the locations shown in FIGS. 4A and/or 7A, respectively, and/or (b) can be attached to the first and/or second extendable arms 104a and/or 104b, respectively, at other locations along the first and/or second extendable arms 104a and/or 104b that differ from the locations shown in FIGS. 4A and/or 4B, respectively. As still another example, the first and/or second extendable arms 104a and/or 104b can include other extendable and/or retracting structures than shown in FIGS. 4A and/or 4B, respectively. In still other embodiments, the system 100 can include a different number of (e.g., one or more than two) extendable arms 104.

In these and other embodiments, the system 100 can be operated such that the transfer ramp 102 does not rest on the top platform 122 of the liftgate 120 and/or on the top surface 232 of the other structure 230 in the deployed position. For example, the transfer ramp 102 can be deployed such that the transfer ramp 102, in the deployed position, rests on the top platform 122 of the liftgate 120 or the top surface 232 of the other structure 230, but not both. As another example, the transfer ramp 102 can be deployed such that the transfer ramp 102 bridges the gap G that exists between the top platform 122 of the liftgate 120 and the top surface 232 of the other structure 230 by fitting within the gap G without resting on the top platform 122 of the liftgate 120 and/or without resting on the top surface 232 of the other structure 230.

In some embodiments, the system 100 can additionally include a spring that biases the transfer ramp 102 toward the stowed orientation. The spring can be used in addition to or in lieu of the struts 207a and/or 207b. The transfer ramp 102 in some of these embodiments can be manually pivoted or rotated from the stowed orientation toward the generally flat or horizontal orientation, such as stepping on, pushing on, pulling on, or otherwise manually tilting the transfer ramp 102 toward the generally flat or horizontal orientation. Alternatively, the transfer ramp 102 can be rotated or tilted toward the flat or horizontal orientation, for example, by extending the struts 207a and/or 207b and/or using another actuator. Thereafter, the spring can be used to return the transfer ramp 102 back to the stowed orientation.

Furthermore, although many of the steps of the methods described above are discussed as involving users of the system 100, one or more of these steps can be automated in some embodiments of the present technology. For example, the system 100 can be installed on a fully autonomous vehicle or trailer towed by a fully autonomous vehicle. In these and other embodiments, the process of backing up the liftgate 120 toward the other structure 230 (e.g., before deploying the transfer ramp 102) can be autonomous. In these and still other embodiments, extending and/or retracting the first and/or second extendable arms 104a and/or 104b to raise and/or lower, respectively, the transfer ramp 102 can be autonomous. Additionally, or alternatively, releasing the transfer ramp 102 from the ramp latching system 110 (e.g., by actuating the cable release latch 111) can be autonomous; rotating and/or pivoting the transfer ramp 102 (e.g., by extending and/or retracting the struts 207a and/or 207b) can be autonomous; and/or transferring cargo across the top surface 102a of the transfer ramp 102 can be autonomous.

Figure 9A:
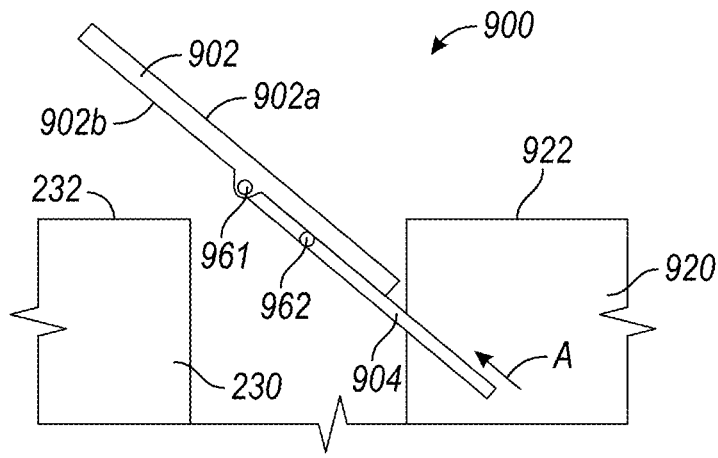
FIGS. 9A-9C are partially schematic side views of another transfer ramp system configured in accordance with various embodiments of the present technology.
Figure 9B:
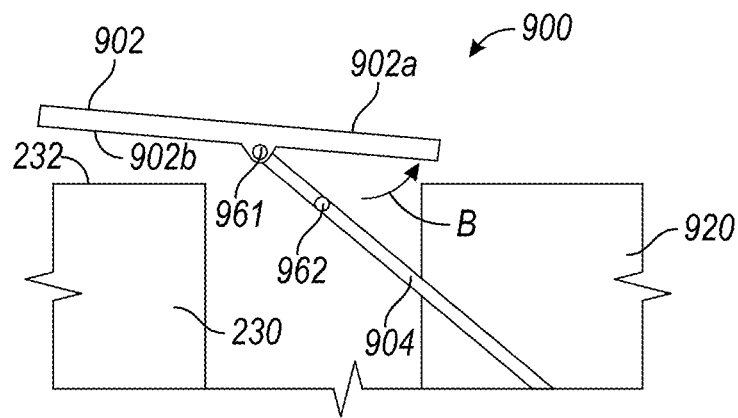
Figure 9C:
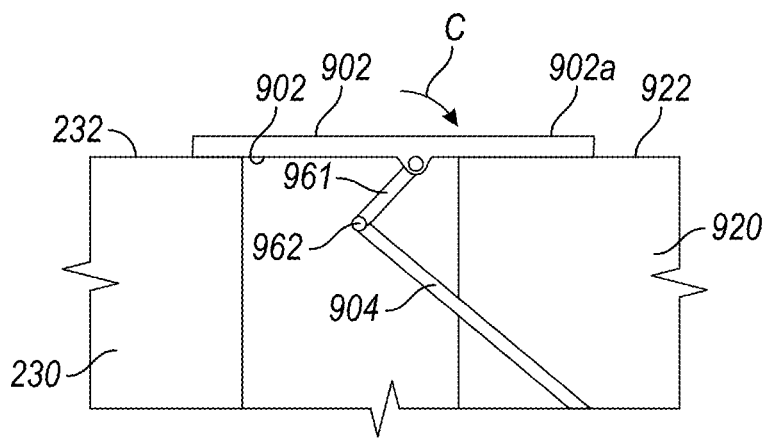

FIGS. 9A-9C are partially schematic side views of another transfer ramp system 900 ("the system 900") configured in accordance with various embodiments of the present technology. As shown, the system 900 includes a transfer ramp 902 and at least one extendable arm 904. The transfer ramp 902 and/or the extendable arm(s) 904 can be generally similar to the transfer ramp 102 (FIG. 1) and the extendable arms 104 (FIG. 1), respectively, of the system 100 (FIG. 1) described above. For example, the extendable arm(s) 904 can be extended and/or retracted using an actuator (not shown), such as a linear actuator. In contrast with the system 100, the system 900 is configured to pivot about multiple different axes. For example, the system 900 includes a first hinge or pivot point 961 and a second hinge or pivot point 962.

Referring to FIG. 9A, the transfer ramp 902 can be advanced (raised) generally along or parallel to arrow A through a gap that exists between a top platform 922 (e.g., a dock plate) of a liftgate 920 and the top surface 232 of the other structure 230. As shown in FIG. 9B, after the transfer ramp 902 is raised through the gap, the transfer ramp 902 can be rotated or pivoted (e.g., using one or more struts) about the first pivot point 961 (generally along or parallel to arrow B) to move the transfer ramp 902 from a stowed orientation (FIG. 9A) to a generally flat or horizontal orientation (FIG. 9B). Thereafter, as shown in FIG. 9C, the extendable arm(s) 904 can pivot about the second pivot point 962 and generally along or parallel to arrow C. Pivoting about the second pivot point 962 allows a bottom surface 902b of the transfer ramp 902 to fall against the top platform 922 of the liftgate 920 and the top surface 232 of the other structure 230. In this manner, the transfer ramp 902 can be lowered (e.g., without needing to retract the extendable arm(s) 904). Cargo can then be transferred across a top surface 902a of the transfer ramp 902.

To retract the system 900, the extendable arm(s) 904 can pivot about the second pivot point 962 in a direction generally opposite to the arrow C shown in FIG. 9C. Thereafter, the transfer ramp 902 can pivot or rotate about the first pivot point 961 in a direction generally opposite to the arrow B shown in FIG. 9B to return the transfer ramp 902 to the stowed orientation. Then, the transfer ramp 902 can be lowered using the extendable arm(s) 904 to return the system 900 to the retracted position or state beneath the liftgate 920.

Figure 10A:
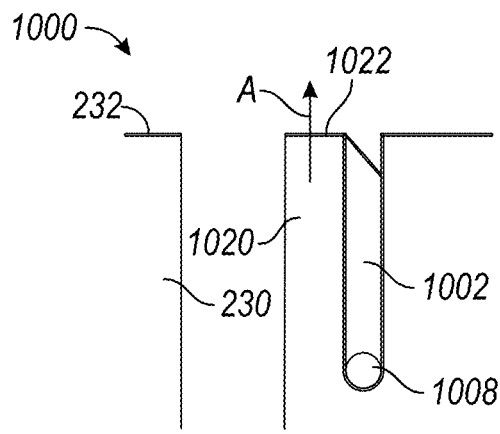
FIGS. 10A-10C are partially schematic cross-sectional side views of still another transfer ramp system configured in accordance with various embodiments of the present technology.
Figure 10B:
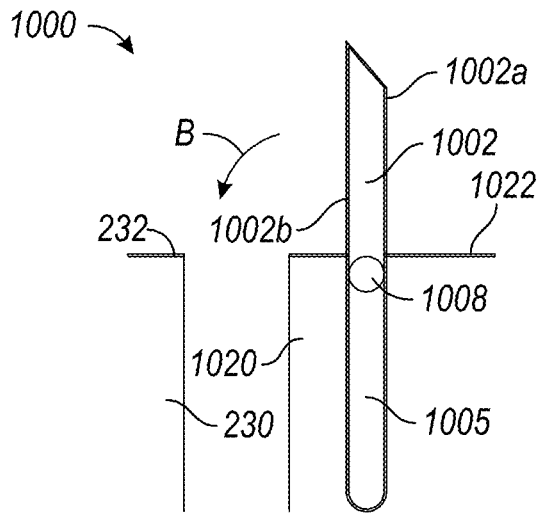
Figure 10C:
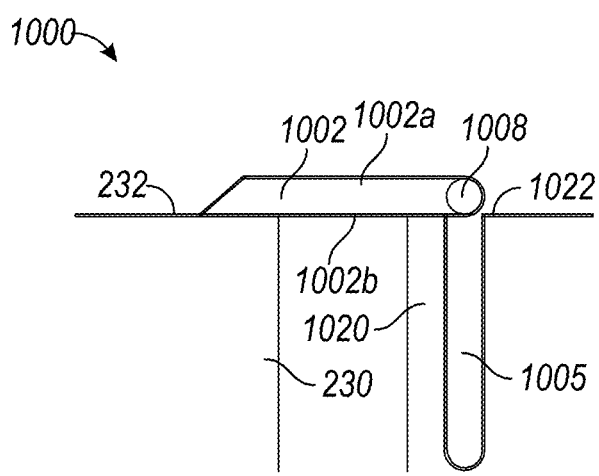

FIGS. 10A-10C are partially schematic cross-sectional side views of another transfer ramp system 1000 ("the system 1000") configured in accordance with various embodiments of the present technology. The system 1000 includes a transfer ramp 1002 and a hinge or pivot point 1008. In a stowed or undeployed state of the system 1000, the transfer ramp 1002 can be positioned within a corresponding recess 1005 (FIGS. 10B and 10C) in a liftgate 1020. To deploy the transfer ramp 1002, the transfer ramp 1002 can be (a) lifted or raised out of the recess 1005 generally along or parallel to the arrow A (FIG. 10A) and (b) rotated or pivoted about the pivot point 1008 generally along or parallel to the arrow B (FIG. 10B) until (i) a bottom surface 1002b (FIGS. 10B and 10C) rests on the top surface 232 of the other structure 230 and (ii) the transfer ramp 1002 spans a gap between the top surface 232 and a top platform 1022 (e.g., a dock plate) of the liftgate 1020. Thereafter, cargo can be transferred across a top surface 1002a (FIGS. 10B and 10C) of the transfer ramp 1002. To retract or undeploy the system 1000, the transfer ramp 1002 is (a) lifted or rotated about the pivot point 1008 in a direction generally opposite to the arrow B (FIG. 10B) and (b) lowered back into the corresponding recess 1005 in the liftgate 1020.

Figure 11A:
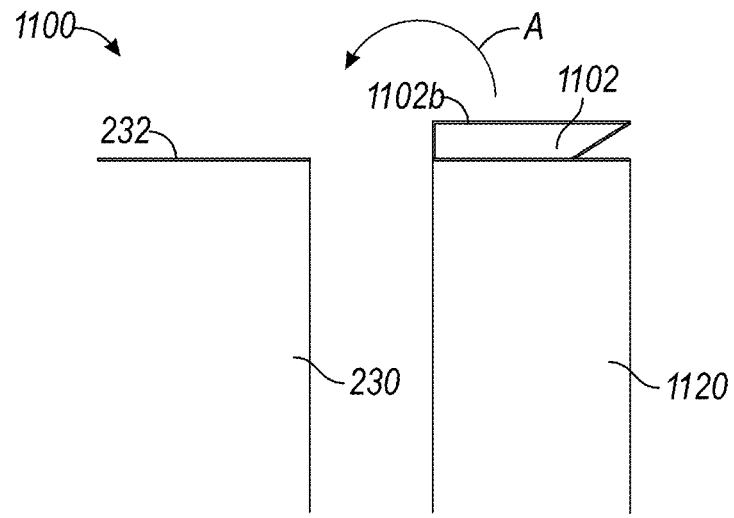
FIGS. 11A and 11B are partially schematic side views of yet another transfer ramp system configured in accordance with various embodiments of the present technology.
Figure 11B:
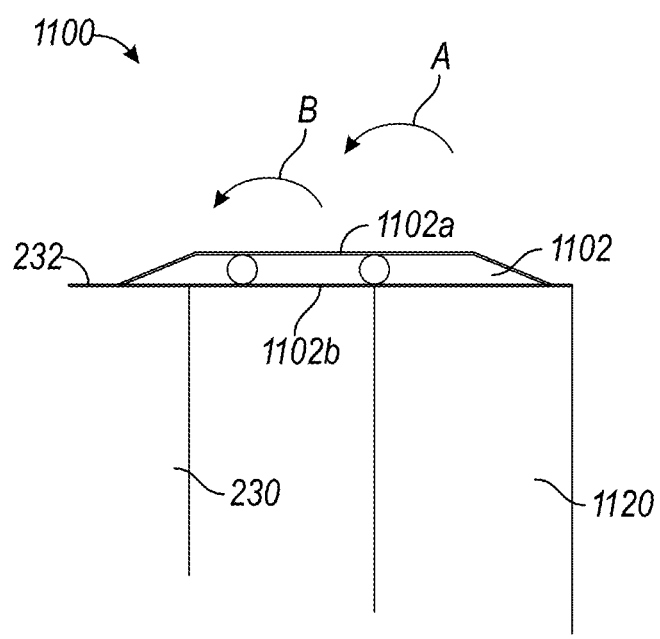

FIGS. 11A and 11B are partially schematic side views of another transfer ramp system 1100 ("the system 1100") configured in accordance with various embodiments of the present technology. As shown in FIG. 11A, the system 1100 includes a transfer ramp 1102 that, in a stowed or undeployed state, serves as a top plate (e.g., a dock plate) of a liftgate 1120. To deploy the transfer ramp 1102, the transfer ramp 1102 is unfolded generally along or parallel to arrow A. Although shown with a single panel or section in FIG. 11A, the transfer ramp 1102 can include multiple panels or sections in some embodiments. For example, referring to FIG. 11B, the transfer ramp 1102 can include two panels or sections. The first and second sections of the transfer ramp 1102 can be unfolded from off a platform 1122 of the liftgate 1120 generally along or parallel to arrow A, and the second section of the transfer ramp 1102 can then be unfolded off of the first section of the transfer ramp 1102 generally along arrow B. When the transfer ramp 1102 of FIG. 11A or 11B is deployed, a bottom surface 1102b of the transfer ramp 1102 can rest on a top surface 232 of another structure 230 such that the transfer ramp 1102 bridges a gap that exists between the top surface 232 of the other structure 230 and the platform 1122 of the liftgate 1120. Cargo can then be transferred across a top surface 1102a of the transfer ramp 1102. To retract or undeploy the transfer ramp 1102, the transfer ramp 1102 can be rotated or folded in a direction generally opposite to the arrow B (FIG. 11B) and/or in a direction generally opposite to the arrow A (FIGS. 11A and 11B) such that sections of the transfer ramp 1102 are folded together and/or such that the transfer ramp 1102 is returned to the stowed position on top of the liftgate 1120 (as shown in FIG. 11A).

FIGS. 12A-12D are partially schematic side views of another transfer ramp system 1200 ("the system 1200") configured in accordance with various embodiments of the present technology. As shown, the system 1200 is generally similar to the system 1100 of FIGS. 11A and 11B in that the system 1200 includes a transfer ramp 1202 that rests on top of a liftgate 1220 and/or serves as a top plate (e.g., a dock plate) of the liftgate 1220 when the system 1200 is in a stowed or retracted position or state. The transfer ramp 1202 of the system 1200, however, differs from the transfer ramp 1102 of the system 1100. In particular, the transfer ramp 1202 includes multiple sections (identified individually in FIGS. 12A-12D as first section 1202y and second section 1202z) that fold under one another. Although shown with two sections 1202y and 1202z in the illustrated embodiment, the transfer ramp 1202 can include a different number of sections (e.g., one or more than two sections) in other embodiments of the present technology.

To deploy the system 1200, the transfer ramp 1202 is initially lifted or raised such that the transfer ramp 1202 rotates about a hinge or pivot point 1261, as shown in FIG. 12B. Thereafter, as shown in FIG. 12C, the second section 1202z of the transfer ramp 1202 is unfolded from under the first section 1202y of the transfer ramp 1202 by rotating or pivoting the second section 1202z about a hinge or pivot point 1262 generally along or parallel to arrow A. With the second section 1202z of the transfer ramp 1202 unfolded, the transfer ramp 1202 is then lowered (as shown in FIG. 12D) until a bottom surface 1202b of the second section 1202z comes to rest on a top surface of another structure (not shown) such that the transfer ramp 1202 spans a gap that exists between the liftgate 1220 and the other structure. Cargo can then be transferred across a top surface 1202a (FIG. 12D) of the transfer ramp 1202. To retract or undeploy the system 1200, the transfer ramp 1202 can be raised, the second section 1202z can be rotated or pivoted about the pivot point 1262 in a direction generally opposite to the arrow A (FIG. 12C) such that the second section 1202z is folded under the first section 1202y (as shown in FIG. 12B), and the transfer ramp 1202 can be lowered until it rests on top of the liftgate 1220 (as shown in FIG. 12A).

FIGS. 13A-13E are partially schematic perspective views of another transfer ramp system 1300 ("the system 1300") configured in accordance with various embodiments of the present technology. The system 1300 includes a transfer ramp 1302 and tracks 1306 (identified individually in FIGS. 13A-13E as first track 1306a and second track 1306b). The first and second tracks 1306a and 1306b are mounted to a liftgate 1320 beneath a top platform 1322 (e.g., a dock plate) of the liftgate 1320. In the illustrated embodiment, the first and second tracks 1306a and 1306b are arced and define a non-linear pathway along which the transfer ramp 1302 can be slid or translated. The first and second tracks 1306a and 1306b can have another shape and/or define a different pathway for the transfer ramp 1302 in other embodiments of the present technology.

Figure 13A:
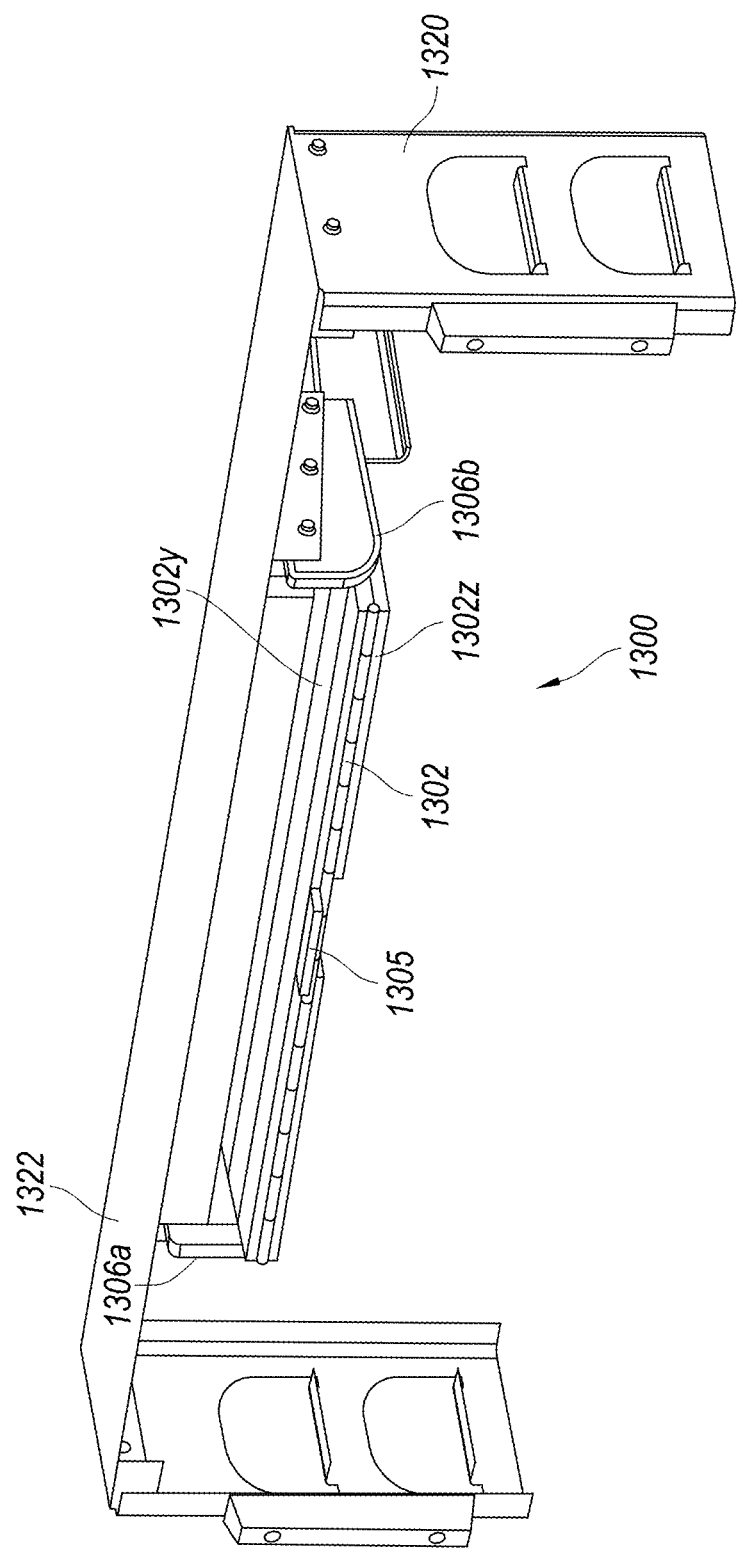
FIGS. 13A-13E are partially schematic side views of still another transfer ramp system configured in accordance with various embodiments of the present technology.

In a stowed position or state of the system 1300, the transfer ramp 1302 is positioned beneath the top platform 1322 of the liftgate 1320 and between the first and second tracks 1306a and 1306b. More specifically, the transfer ramp 1302 includes a first section 1302y and a second section 1302z that fold over one another. As best shown in FIG. 13E, the first section 1302y is slidably attached to the first and second tracks 1306a and 1306b such that the transfer ramp 1302 can be moved along the first and second tracks 1306a and 1306b but is prevented from detaching from or coming out of the first and second tracks 1306a and 1306b. In some embodiments, the second section 1302z of the transfer ramp 1302 may rest within and/or be constrained by the first and second tracks 1306a and 1306b at least while the transfer ramp 1302 is stowed under the liftgate 1320. Although shown with two sections in the illustrated embodiment, the transfer ramp 1302 can include a different number of (e.g., one or more than two) sections in other embodiments of the present technology.

Figure 13B:
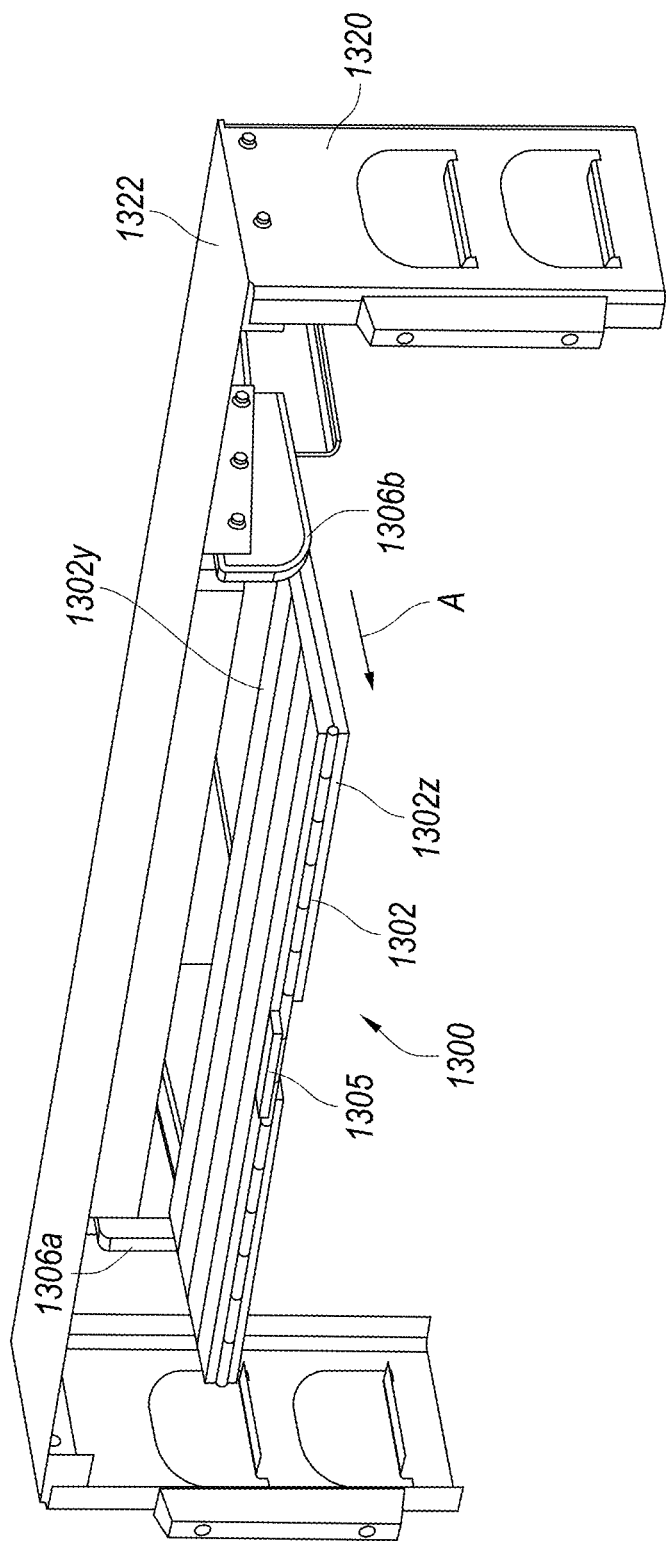

To deploy the system 1300, the transfer ramp 1302 can initially be slid along the first and second tracks 1306a and 1306b in a direction generally along or parallel to arrow A (FIG. 13B). As shown, the transfer ramp 1302 includes a handle 1305. In these embodiments, a user of the system 1300 can pull on the handle 1305 to manually slide or translate the transfer ramp 1302 along the first and second tracks 1306a and 1306b. Additionally, or alternatively, movement of the transfer ramp 1302 can be automated. For example, the system 1300 can include one or more actuators for moving the transfer ramp 1302 along the first and second tracks 1306a and 1306b. In some of these embodiments, the handle 1305 can be omitted.

Figure 13C:
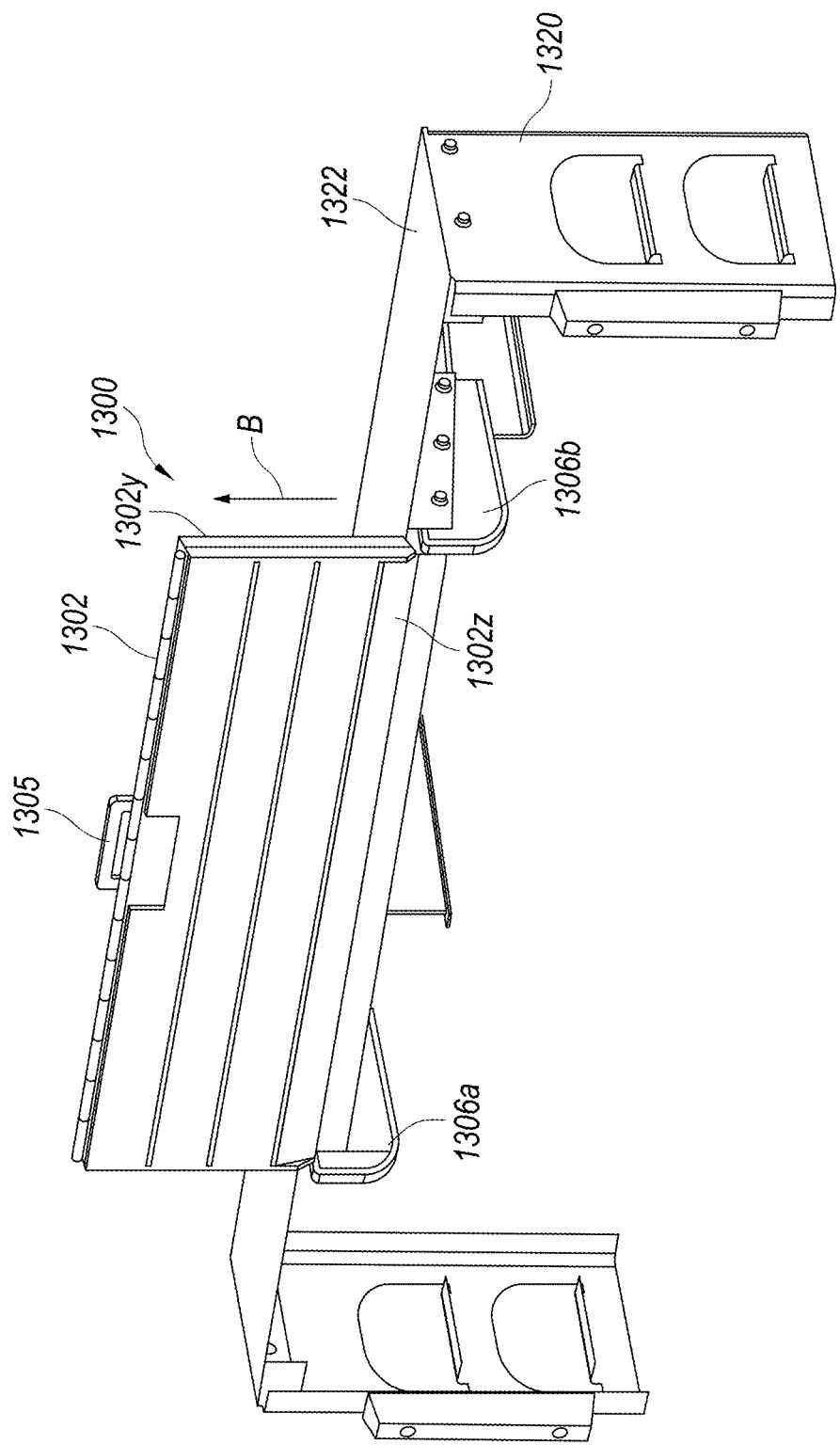
Figure 13D:
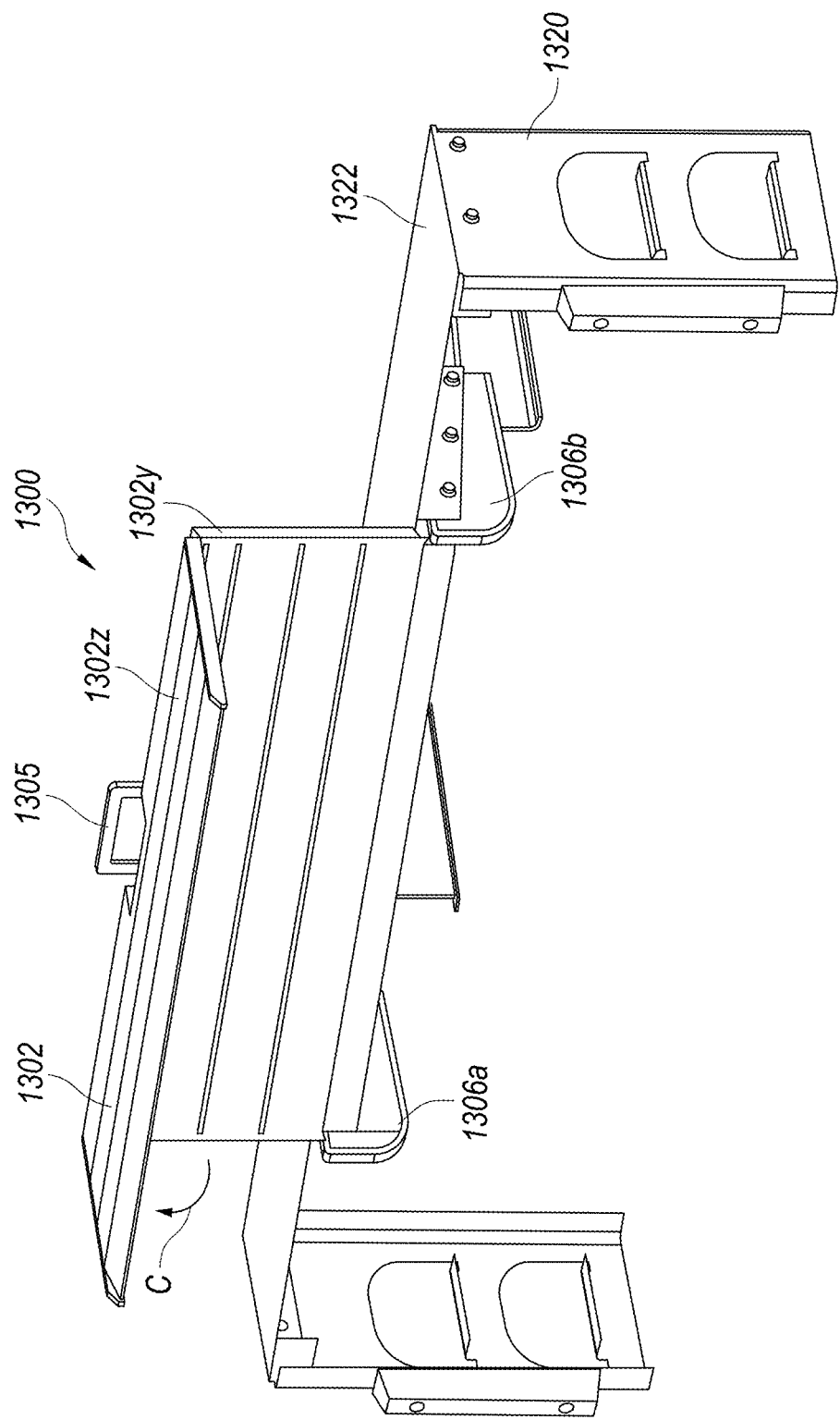
Figure 13E:
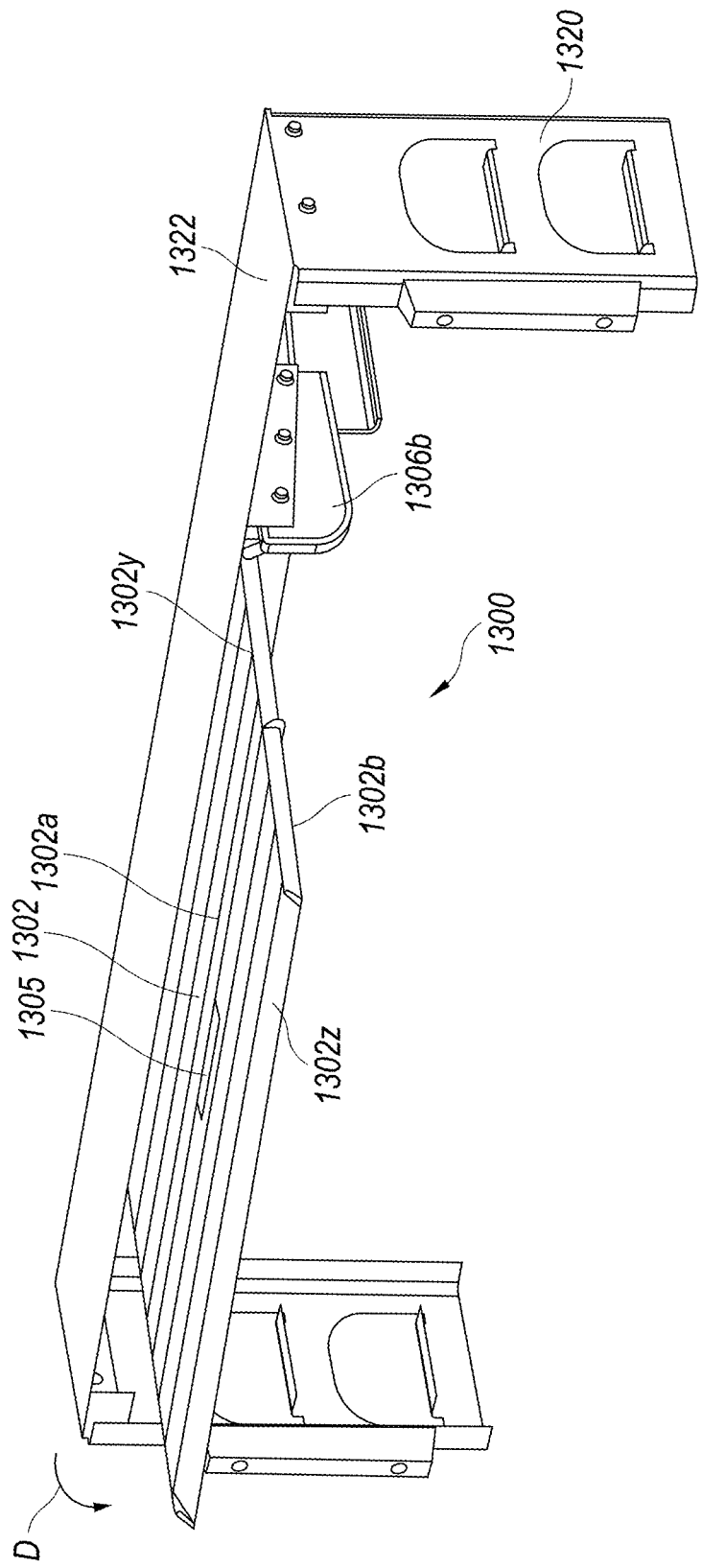

As shown in FIG. 13C, after moving the transfer ramp 1302 generally along or parallel to the arrow A (FIG. 13B), the transfer ramp 1302 can then be slid vertically along the first and second tracks 1306a and 1306b in a direction generally along or parallel to arrow B. Again, a user can manually lift the transfer ramp 1302 vertically (e.g., using the handle 1305), and/or the vertical movement of the transfer ramp 1302 can be automated via use of one or more actuators. Referring now to FIG. 13D, the second section 1302z of the transfer ramp 1302 can be unfolded away from the first section 1302y of the transfer ramp 1302 by swinging the second section 1302z generally along or parallel to the arrow C.

As shown in FIG. 13E, after unfolding the transfer ramp 1302, the transfer ramp 1302 can be moved to a generally flat or horizontal orientation by moving the transfer ramp 1302 generally along or parallel to arrow D. More specifically, the first and second sections 1302y and 1302z can be brought in line with one another, and/or the transfer ramp 1302 can be moved such that a bottom surface 1302b of the second section 1302z of the transfer ramp 1302 is brought to rest on a top surface of another structure (not shown). Thereafter, cargo can be transferred across a top surface 1302a of the transfer ramp 1302. In some embodiments, at least while transfer ramp 1302 is in the deployed state shown in FIG. 13E), the handle 1305 can be positioned within a corresponding cutout or recess such that it does not present a roadblock or barrier to transferring cargo across the 1302a of the transfer ramp 1302.

To retract or undeploy the system 1300, the first and second sections 1302y and 1302z of the transfer ramp 1302 can be raised and folded against one another such that the transfer ramp 1302 is returned to the position shown in FIG. 13C. Then, the transfer ramp 1302 can be returned to the stowed position or state beneath the top platform 1322 of the liftgate 1320 (as shown in FIG. 13A) by sliding the transfer ramp 1302 along the first and second tracks 1306a and 1306b in a direction generally opposite to the arrow B (FIG. 13C) and then in a direction generally opposite to the arrow A (FIG. 13B).

Figure 14:
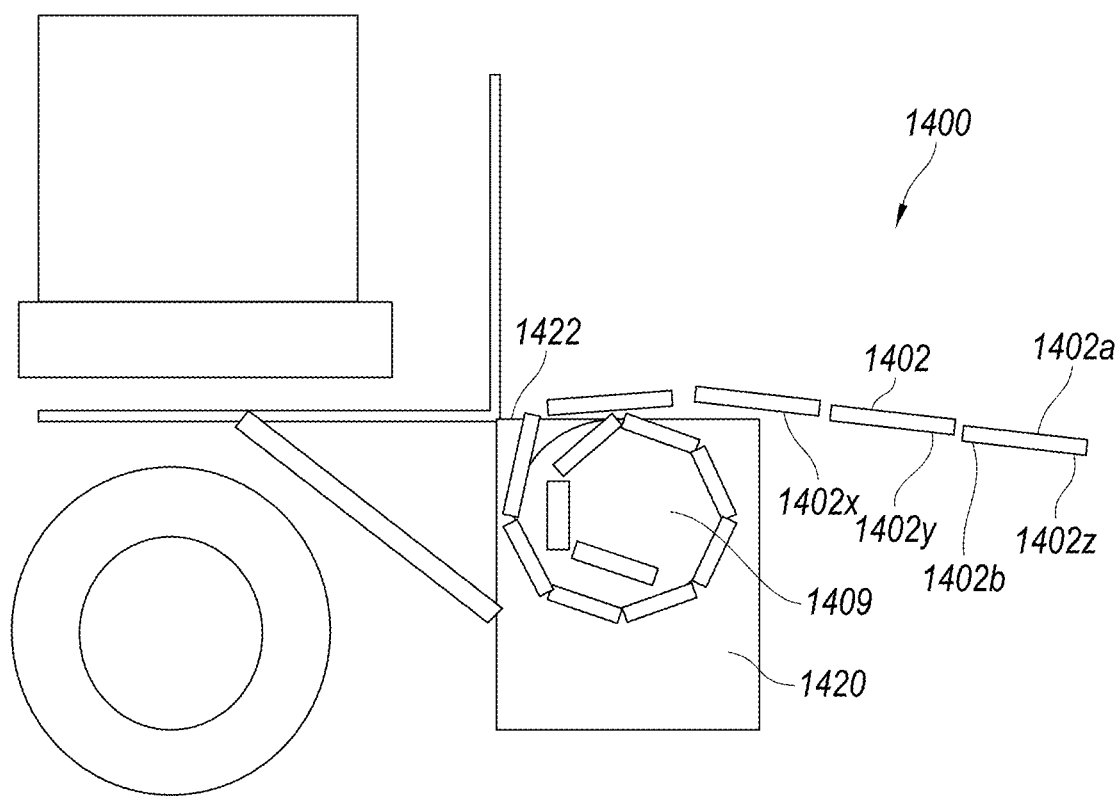
FIG. 14 is a partially schematic cross-sectional side view of yet another transfer ramp system configured in accordance with various embodiments of the present technology.

FIG. 14 is a partially schematic cross-sectional side view of another transfer ramp system 1400 ("the system 1400") configured in accordance with various embodiments of the present technology. As shown, the system 1400 includes a transfer ramp 1402 that can be rolled into a drum 1409 that is stored in a liftgate 1420 or beneath a top platform 1422 of the liftgate 1420. The transfer ramp 1402 can include a plurality of sections. Three sections 1402*x*, 1402*y*, and 1402*z* of the transfer ramp 1402 are identified individually in FIG. 14. In some embodiments, the transfer ramp 1402 can include travel limiters (e.g., between immediately adjacent sections of the transfer ramp 1402) to prevent or hinder the transfer ramp 1402 from drooping when deployed.

To deploy the system 1400, the transfer ramp 1402 can be pulled to unwind or unroll sections of the transfer ramp 1402 from the drum 1409. At least some of the sections of the transfer ramp 1402 can then be rested on another structure (not shown) such that the transfer ramp 1402 spans a gap that exists between the top platform 1422 of the liftgate 1420 and the other structure. For example, the section 1402*z* can be laid on a top surface (not shown) of the other structure such that a bottom surface 1402*b* of the section 1402*z* contacts the top surface of the other structure. Thereafter, cargo can be transferred across a top surface 1402*a* of the transfer ramp 1402. To undeploy or retract the system 1400, the transfer ramp 1402 can be rewound back into the drum 1409 such that the transfer ramp 1402 is returned to the stowed state or position within the liftgate 1420 or beneath the top platform 1422 of the liftgate 1420.

Figure 15A:
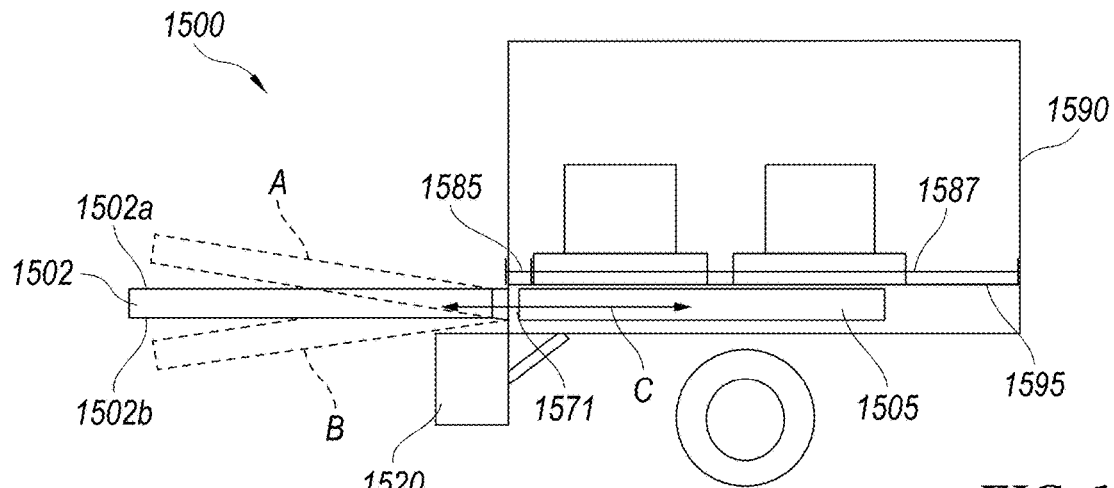
FIG. 15A is a partially schematic cross-sectional side view of another transfer ramp system configured in accordance with various embodiments of the present technology.
Figure 15B:
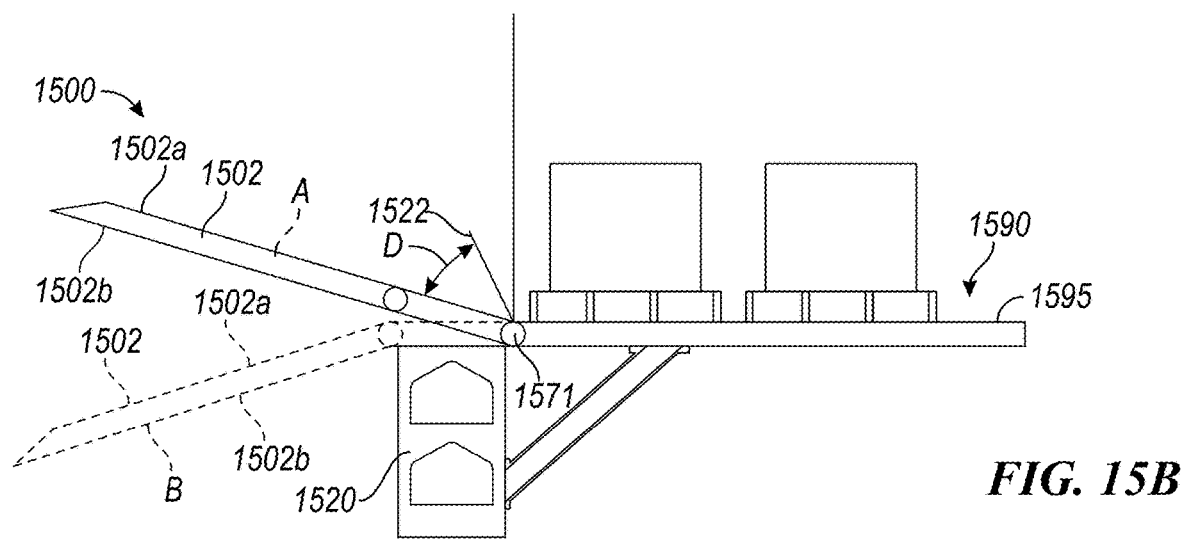
FIGS. 15B and 15C are partially schematic side views of a variation of the transfer ramp system of FIG. 15A configured in accordance with various embodiments of the present technology.
Figure 15C:
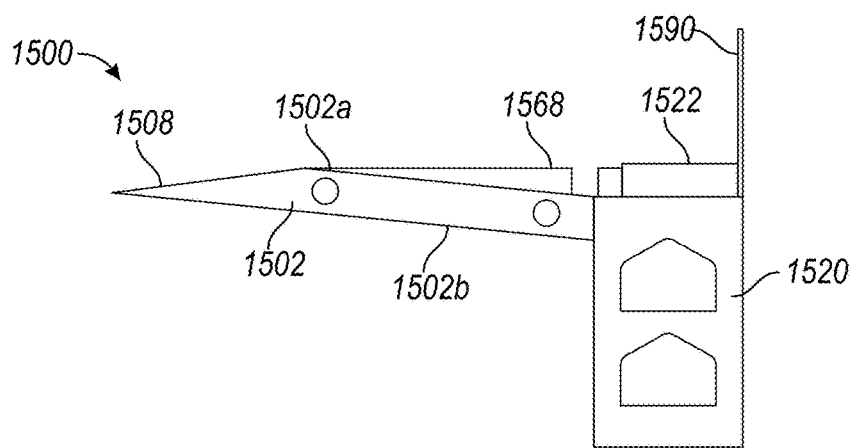

FIG. 15A is a partially schematic cross-sectional side view of another transfer ramp system 1500 ("the system 1500") configured in accordance with various embodiments of the present technology, and FIGS. 15B and 15C are partially schematic side views of slightly alternative implementations of the system 1500. As shown, the system 1500 includes a transfer ramp 1502 having a top surface 1502*a* and a bottom surface 1502*b*. In a stowed (e.g., retracted, undeployed) state of the system 1500, the transfer ramp 1502 can be stowed in a corresponding slot or recess 1505 (*i*) within or beneath a floor 1595 (FIGS. 15A and 15B) of a bed or box 1590 of a vehicle or trailer and/or (ii) within, beneath, or on a top platform 1522 (FIG. 15B) of a liftgate 1520. The transfer ramp 1502 can be manually or mechanically (e.g., via an actuator) moved into and/or out of the recess 1505 generally along or parallel to arrow C. In some embodiments, the system 1500 can include bearings (not shown) that facilitate translating the transfer ramp 1502 generally along or parallel to the arrow C. As best shown in FIGS. 15B and 15C, the system 1500 can further include a stop 1571 that prevents the transfer ramp 1502 from being fully removed from the corresponding recess 1505. When deployed, the transfer ramp 1502 can be moved (e.g., rotated or pivoted) to various positions between position A and position B (FIGS. 15A and 15B).

In FIG. 15A, when deployed, the transfer ramp 1502 can rest on top of the liftgate 1520. In the alternative implementations shown in FIGS. 15B and 15C, the transfer ramp 1502 can be deployed beneath the top platform 1522 (e.g., a dock plate) of the liftgate 1520. In some versions of these alternative implementations, the top platform 1522 can rotate or pivot generally along or parallel to arrow D (FIG. 15B) such that the top platform 1522 can rest on the top surface 1502*a* of the transfer ramp 1502 when the transfer ramp 1502 is deployed and such that the transfer ramp 1502 can pivot to the various positions between position A and position B (FIG. 15B). In some embodiments, when resting on the top surface 1502*a* of the transfer ramp 1502, the top platform 1522 can provide a ramped section 1568 (FIG. 15C) for moving cargo into or out of the vehicle/trailer. Alternatively, the ramped section 1568 shown in FIG. 15C can be part of the transfer ramp 1502 that is exposed and brought into alignment with the top platform 1522 when the transfer ramp 1502 is deployed. The transfer ramp 1502 can additionally, or alternatively, include a ramped lip portion 1508 in some embodiments to facilitate easier loading and/or unloading of cargo onto and/or off of, respectively, the top surface 1502*a* of the transfer ramp 1502 (e.g., when the bottom surface 1502*b* of the transfer ramp 1502 is contacting a top surface of another structure (not shown)).

Although shown in FIGS. 15A-15C as being fully embedded beneath the floor 1595 of the box 1590 and/or fully beneath the top platform 1522 of the liftgate 1520 when the system 1500 is in a stowed position or state, the top surface 1502*a* of at least a portion of the transfer ramp 1502 can serve as part of the floor 1595 of the box 1590 and/or as the top platform 1522 of the liftgate 1520 in other embodiments of the present technology. For example, referring to FIG. 15A, a section 1585 of the floor 1595 can be omitted in some embodiments. In these embodiments, the top surface 1502*a* of the transfer ramp 1502 can serve as at least part of the floor for the box 1590. Continuing with this example, when the transfer ramp 1502 is needed to bridge a gap between (a) the box 1590 or the liftgate 1520 and (b) a top surface of another structure (not shown), the transfer ramp 1502 can be extended outward toward the other structure by moving the transfer ramp 1502 generally along or parallel to the arrow C.

As another example, referring to FIG. 15A, the floor 1595 of the box 1590 can be divided into two portions: a first section 1585 and a second section 1587. The first section 1585 of the floor 1595 can be deployed out of the box 1590 to serve as the transfer ramp 1502. Continuing with this example, in a stowed position or state of the system 1500, the first section 1585 can sit flush with the second section 1587 of the floor 1595 such that the floor 1595 is generally continuous. When the system 1500 is deployed, the first section 1585 can be moved (e.g., slid or translated) out of the box 1590 until a first portion of the first section 1585 rests on a top surface of another structure (not shown) and/or until a second portion of the first section 1585 rests on the liftgate 1520. Thereafter, the first section 1585 can be used as a transfer ramp 1502 to move cargo into and/or out of the box 1590.

FIGS. 16A-16E are partially schematic perspective views of another transfer ramp system 1600 ("the system 1600") configured in accordance with various embodiments of the present technology. As shown, the system 1600 includes a transfer ramp 1602 that sits on top of a liftgate 1620. The transfer ramp 1602 includes a top surface 1602*a*, a first side rail 1603*a*, and a second side rail 1603*b*. The first and/or second side rails 1603*a* and 1603*b* can include cutouts 1616*a* and 1616*b* (e.g., notches or slots) through which pegs or protrusions 1621*a* and 1621*b*, respectively, can project when the transfer ramp 1602 is mounted on the liftgate 1620. The protrusions 1621*a* and 1621*b* can (i) prevent or hinder vertical motion of the transfer ramp 1602 and (ii) limit horizontal motion of the transfer ramp 1602 to the length(s) of the cutout(s) 1616*a* and/or 1616*b*. Although shown with two cutouts 1616*a* and 1616*b* and two corresponding protrusions 1621*a* and 1621*b* in the illustrated embodiment, the system 1600 can include a different number of cutouts 1616 (e.g., one or more than two) and/or a different number of protrusions 1621 (e.g., one or more than two) in other embodiments of the present technology.

Figure 16A:
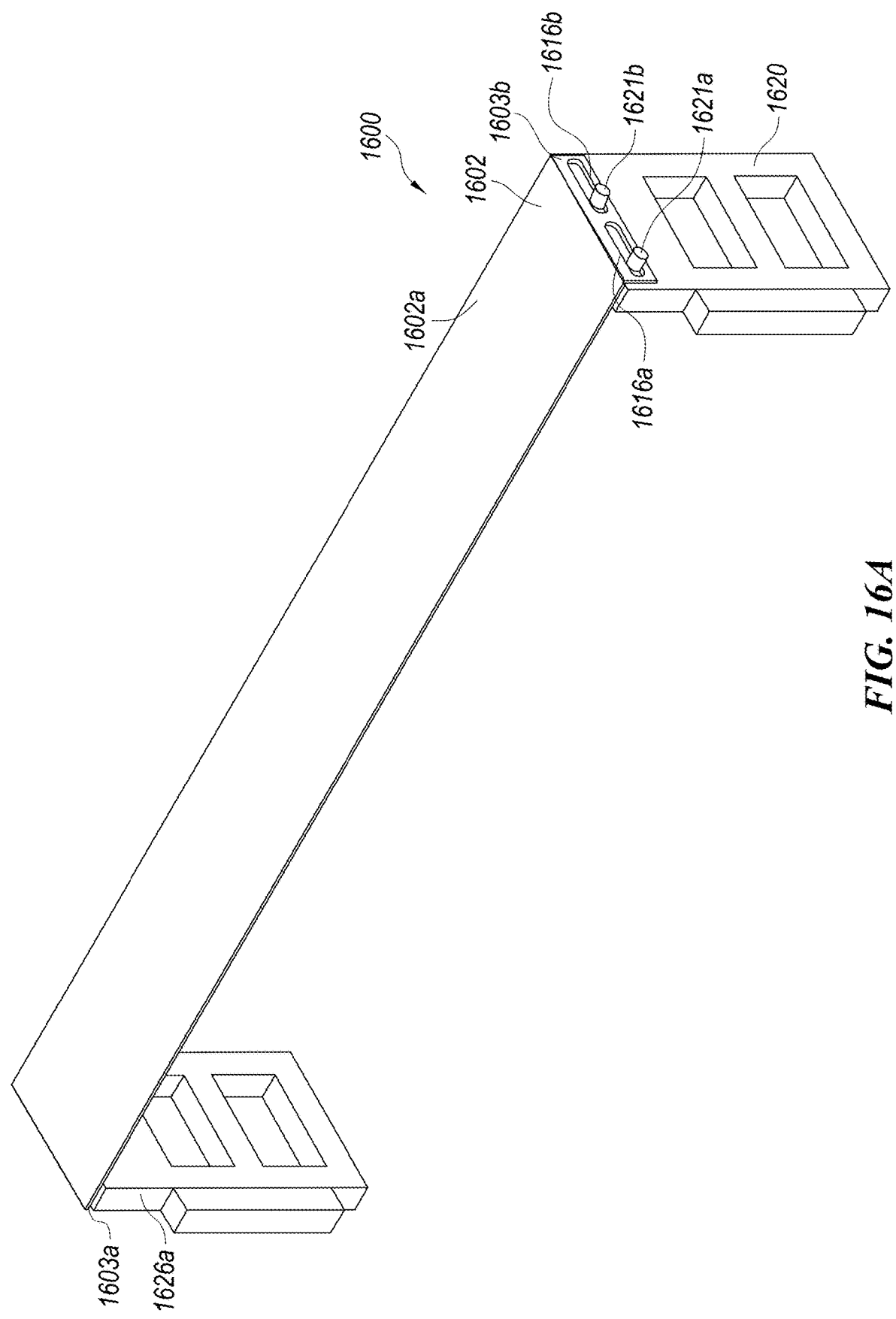
FIGS. 16A-16E are partially schematic perspective views of another transfer ramp system configured in accordance with various embodiments of the present technology.
Figure 16B:
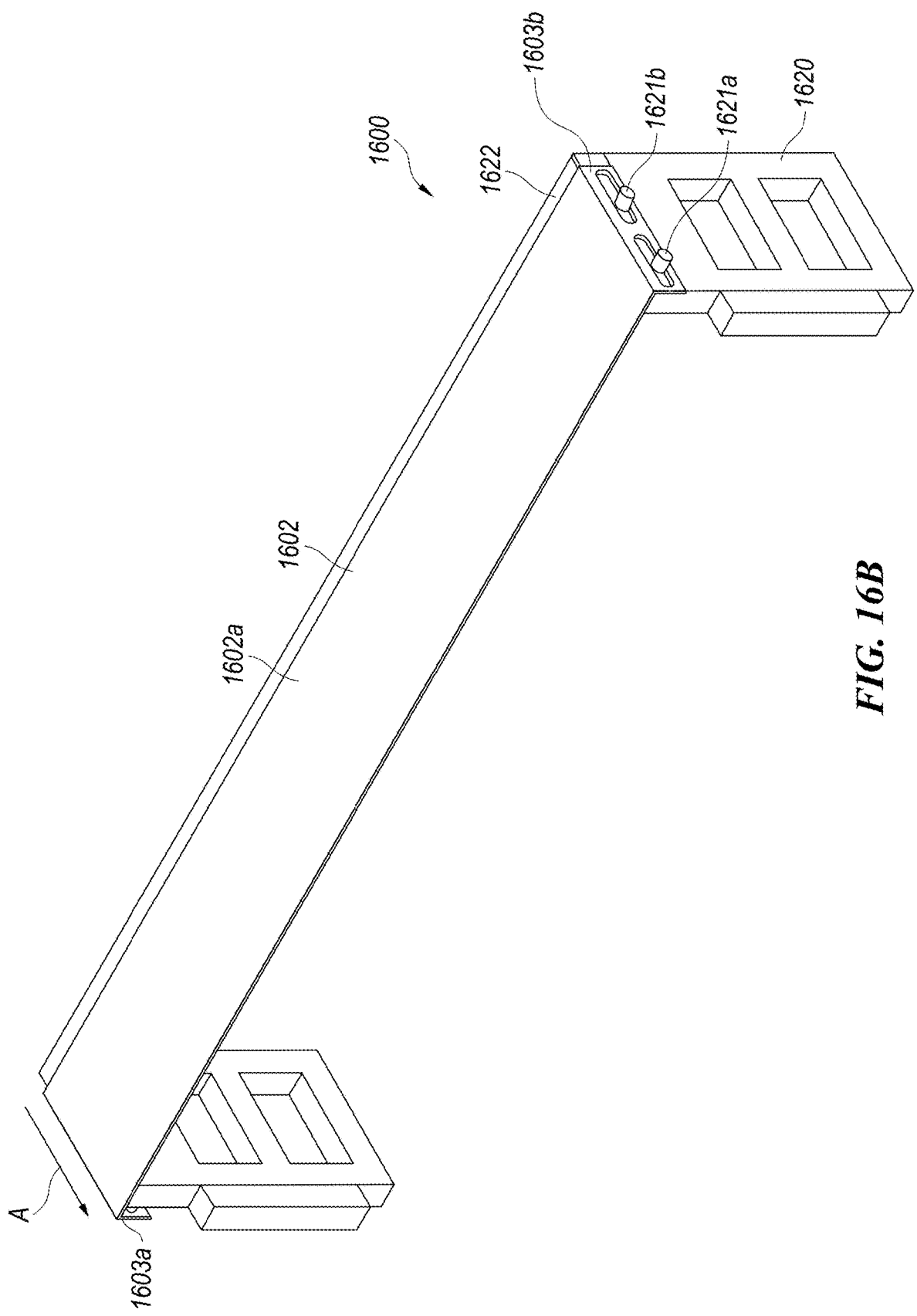
Figure 16C:
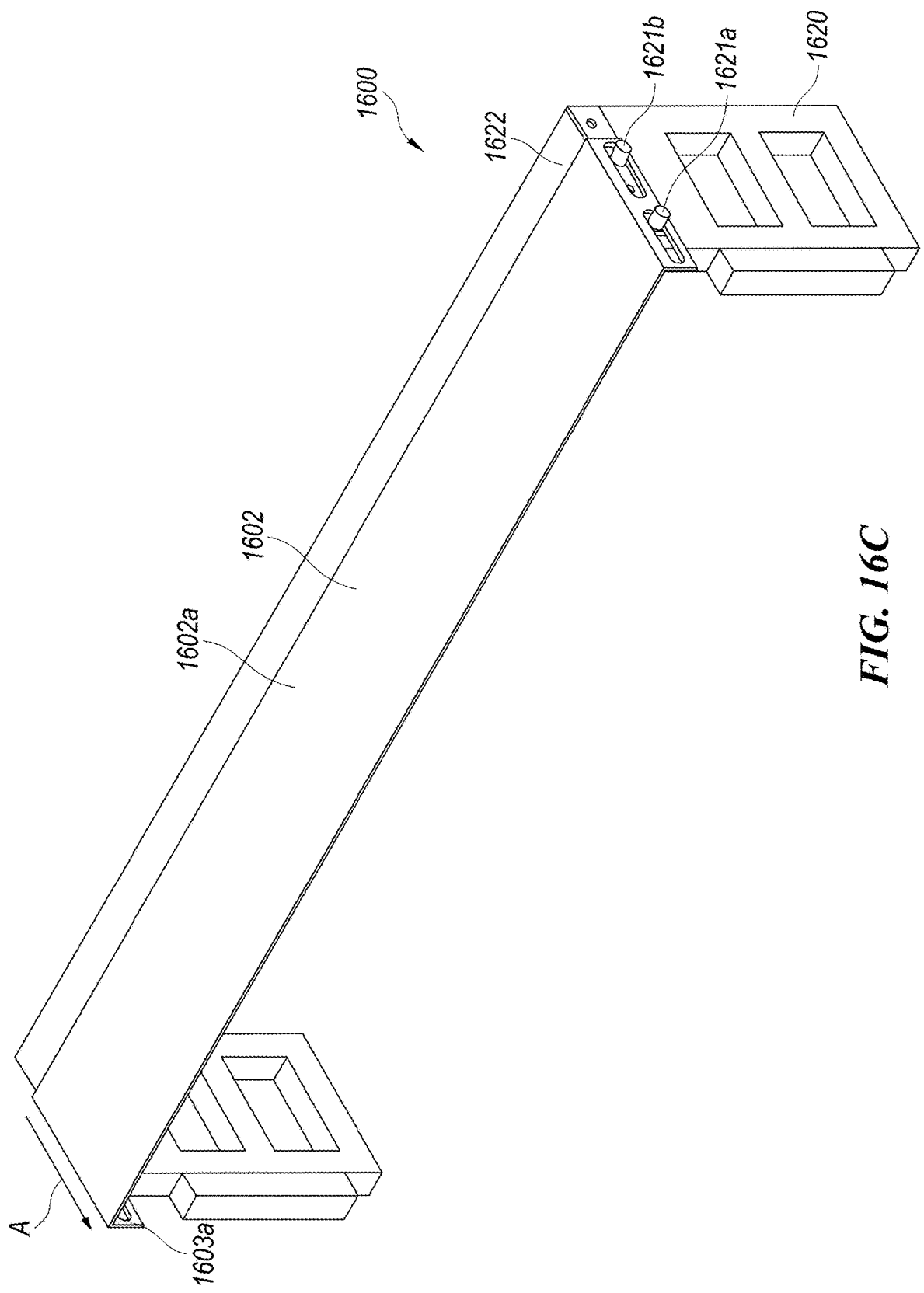

Referring now to FIGS. 16B and 16C, the system 1600 can be moved from a stowed position or state (as shown in FIG. 16A) to a deployed position or state (as shown in FIG. 16C) by moving or translating the transfer ramp 1602 generally along or parallel to arrow A. In this manner, the transfer ramp 1602 can be extended away from the liftgate 1620 and toward and/or onto a top surface of another structure (not shown). Thereafter, cargo can be transferred across the top surface 1602a of the transfer ramp 1602 and/or a top platform 1622 (e.g., a dock plate) of the liftgate 1620.

In some embodiments, the system 1600 can include a latch or lock (not shown) to hold the transfer ramp 1602 in a stowed position or state (as shown in FIG. 16A). In these embodiments, the latch can be actuated to release the transfer ramp 1602 before translating the transfer ramp 1602 generally along or parallel to the arrow A. In these and other embodiments, the transfer ramp 1602 can be locked or held in place (e.g., by one or more latches; not shown) at various positions between the stowed position shown in FIG. 16A and the extended position shown in FIG. 16C. As such, the transfer ramp 1602 can be used to span gaps of various magnitudes. Alternatively, the transfer ramp 1602 may be locked or held in place only at the stowed position shown in FIG. 16A and the extended position shown in FIG. 16C. In these and still other embodiments, the transfer ramp 1602 can be translated a different distance generally along the arrow A at one side of the transfer ramp 1602 than at the other side of the transfer ramp transfer ramp 1602. This can facilitate the system 1600 accommodating a range of horizontal misalignment between the liftgate 1620 and another structure.

Figure 16D:
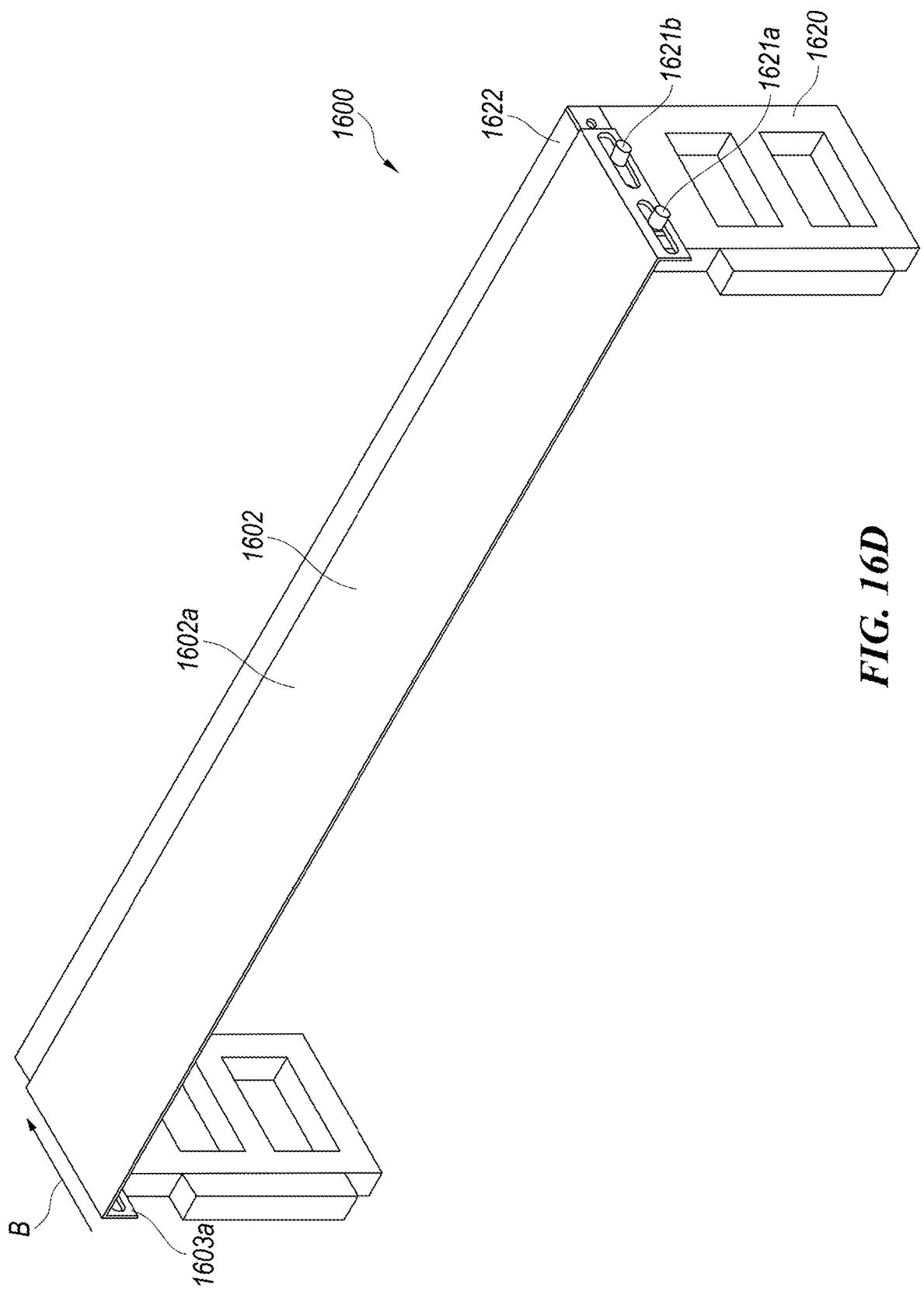
Figure 16E:
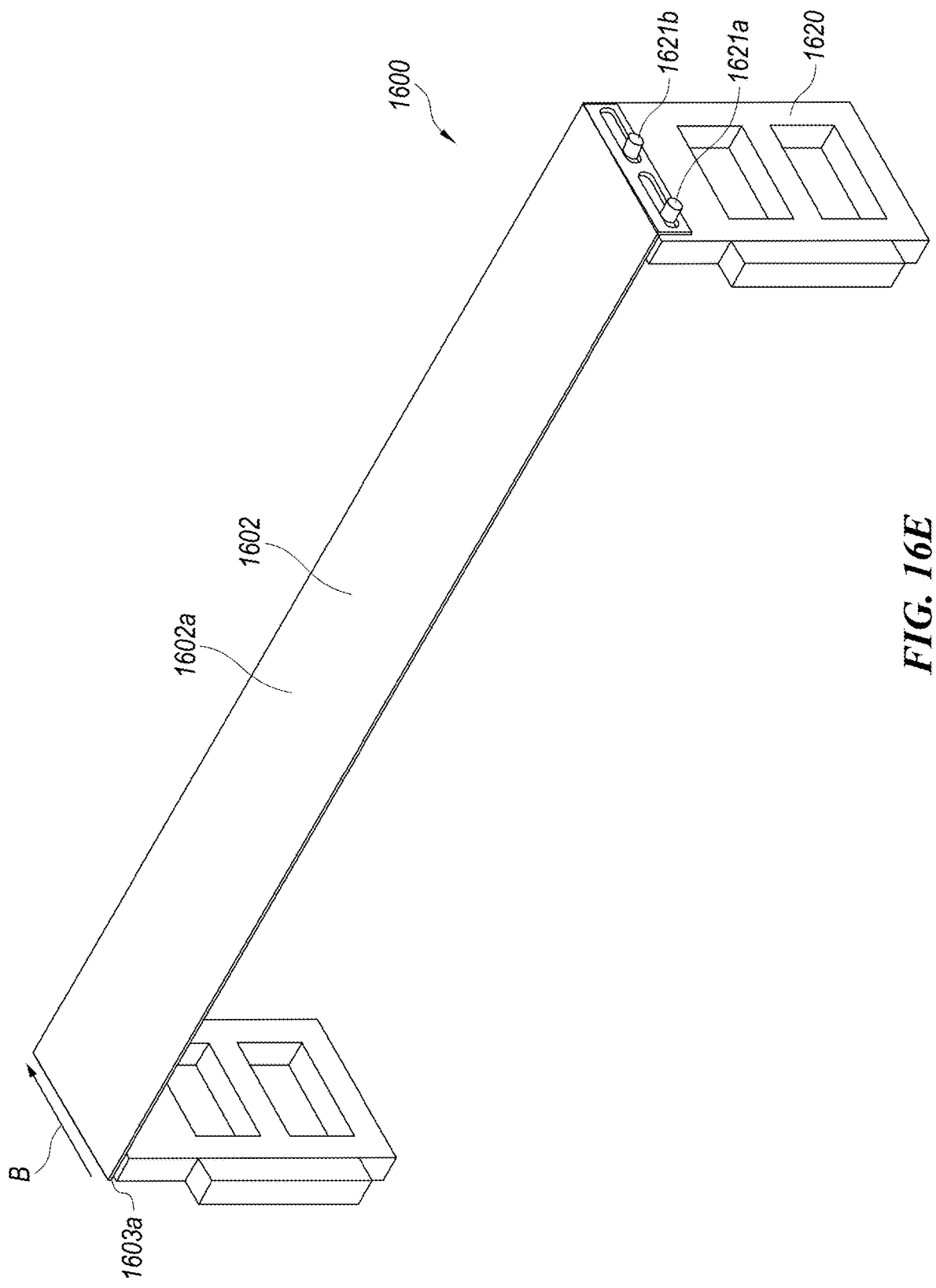

Referring now to FIGS. 16D and 16E, the system 1600 can be returned to the stowed position or state (as shown in FIGS. 16A and 16E) by moving or translating the transfer ramp 1602 generally along or parallel to arrow B. In embodiments in which the system 1600 includes one or more latches or locks to hold the transfer ramp 1602 in a deployed position, returning the system 1600 to the stowed position or state can include actuating a latch or lock to release the transfer ramp 1602 before moving the transfer ramp 1602 generally along or parallel to the arrow B. As the transfer ramp 1602 returns to the stowed position or state, the transfer ramp 1602 can engage with a latch or lock to retain the transfer ramp 1602 in the stowed position or state.

Figure 17A:
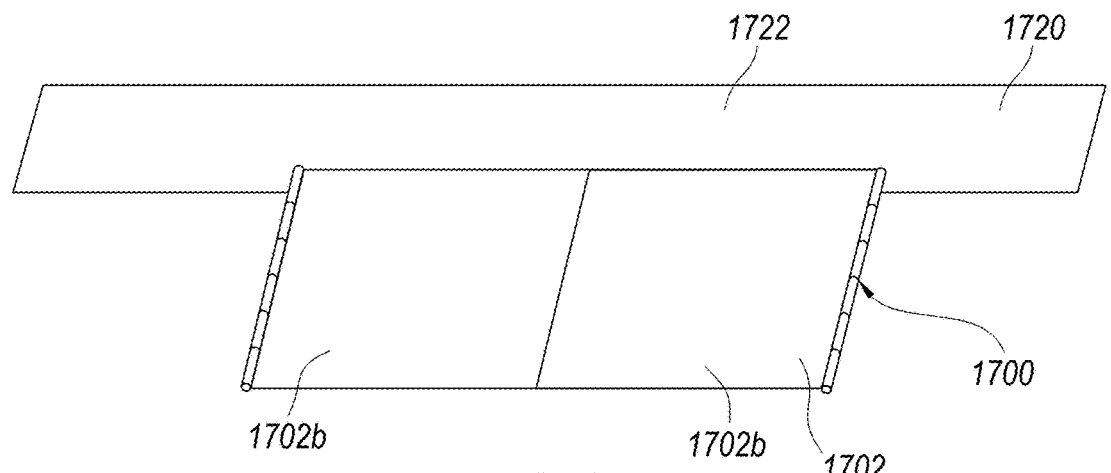
FIGS. 17A-17C are partially schematic perspective views of still another transfer ramp system configured in accordance with various embodiments of the present technology.
Figure 17B:
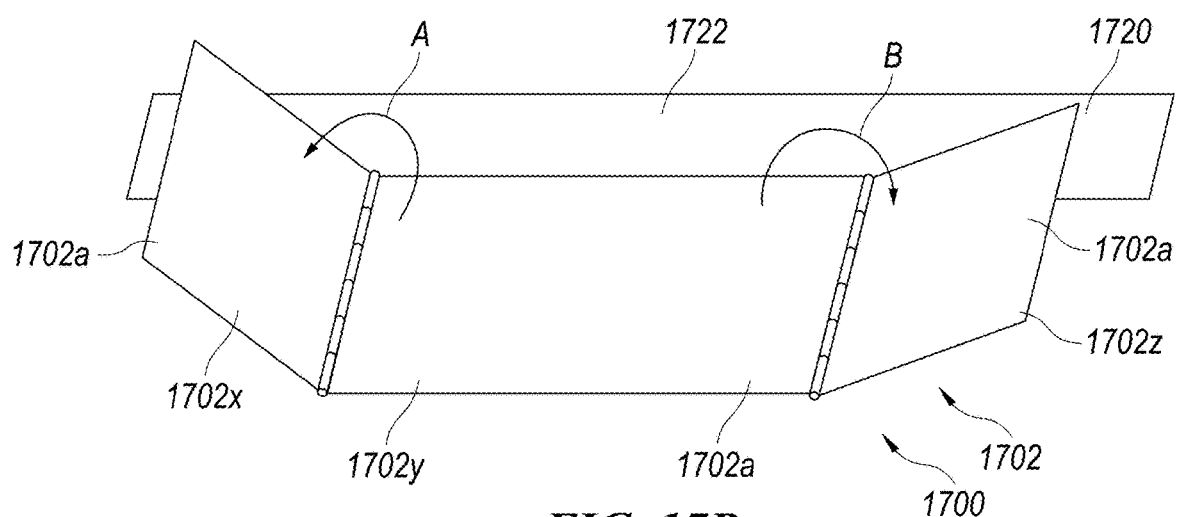
Figure 17C:
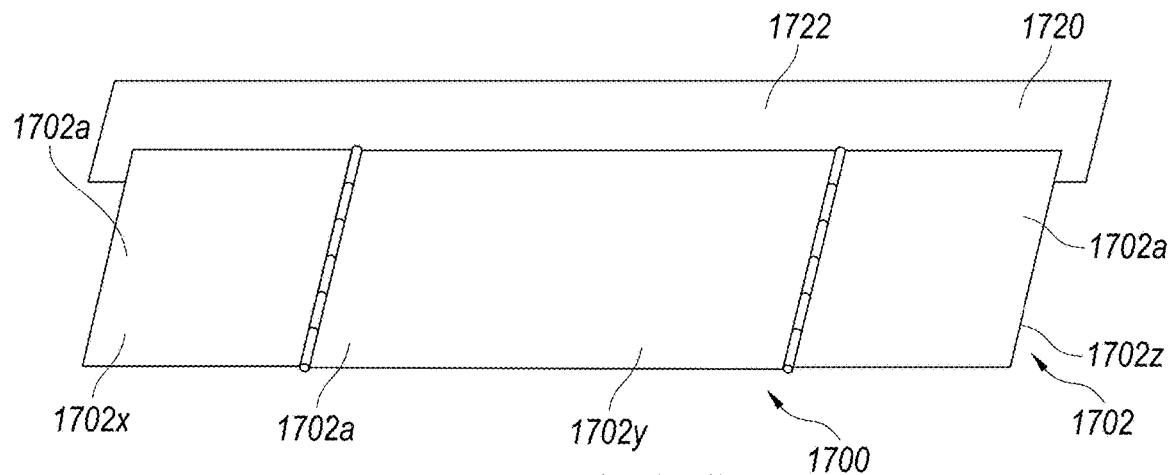

FIGS. 17A-17C are partially schematic perspective views of another transfer ramp system 1700 ("the system 1700") configured in accordance with various embodiments of the present technology. The system 1700 includes a transfer ramp 1702 positioned on top of or beneath a top platform 1722 (e.g., a dock plate) of a liftgate 1720. When positioned beneath the top platform 1722 of the liftgate 1720, the system 1700 can be mounted to frame rails (not shown) of a vehicle or trailer that includes the liftgate 1720. Thus, space beneath the liftgate 1720 can be limited and/or a width of the space available for the system 1700 beneath the liftgate 1720 can be less than a width of the top platform 1722 of the liftgate 1720 that is useable for transferring cargo. Therefore, as best shown in FIGS. 17B and 17C, the transfer ramp 1702 can include a plurality of sections (identified individually in FIGS. 17B and 17C as first section 1702x, second section 1702y, and third section 1702z). The first and third sections 1702x and 1702z (i) can be folded onto or underneath the second section 1702y to reduce the width or footprint of the transfer ramp 1702 for stowage, and (ii) can be unfolded (generally along or parallel to arrows A and B, respectively shown in FIG. 17B) to expand a width of a top surface 1702a (FIGS. 17B and 17C) of the transfer ramp 1702 that is usable for transferring cargo across a gap between the top platform 1722 of the liftgate 1720 and another structure (not shown). The first and third sections 1702x and 1702z can be manually, mechanically, and/or autonomously folded and/or unfolded. Although shown with three sections in the illustrated embodiment, the transfer ramp 1702 can include a different number of sections (e.g., one section, two sections, or more than three sections) in other embodiments of the present technology.

In some embodiments, the transfer ramp 1702 is useable to transfer cargo without deploying the first and third sections 1702x and 1702z. For example, the transfer ramp 1702 can be deployed as shown in FIG. 17A, and cargo can be transferred across a bottom surface 1702b of the first and third sections 1702x and 1702z. Widths of other transfer ramps in other embodiments of the present technology, such as widths of the other transfer ramps of the transfer ramp systems illustrated in FIGS. 1-16E and/or described herein, can be expandable in a manner generally similar to the width of the transfer ramp 1702 of FIGS. 17A-17C.

Figure 18A:
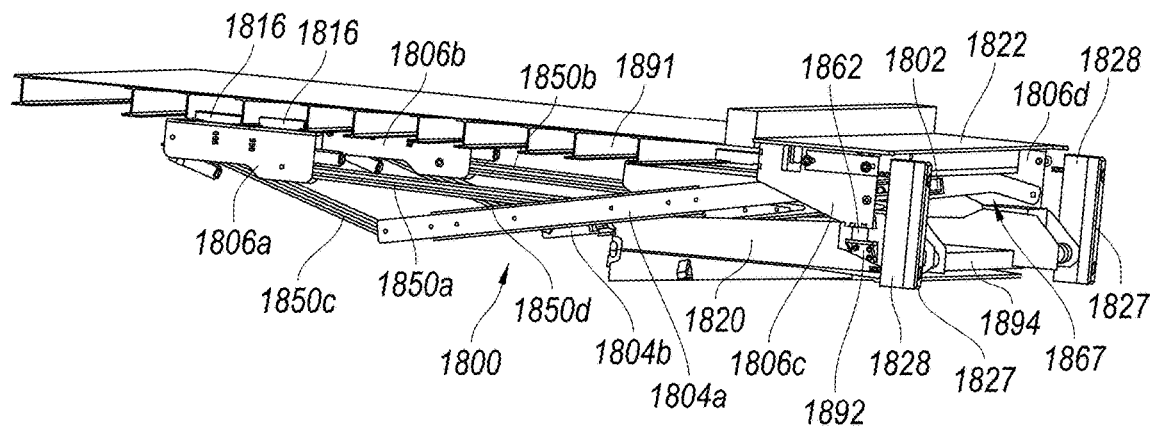
FIGS. 18A and 18B are partially schematic perspective views of another transfer ramp system configured in accordance with various embodiments of the present technology.
Figure 18B:
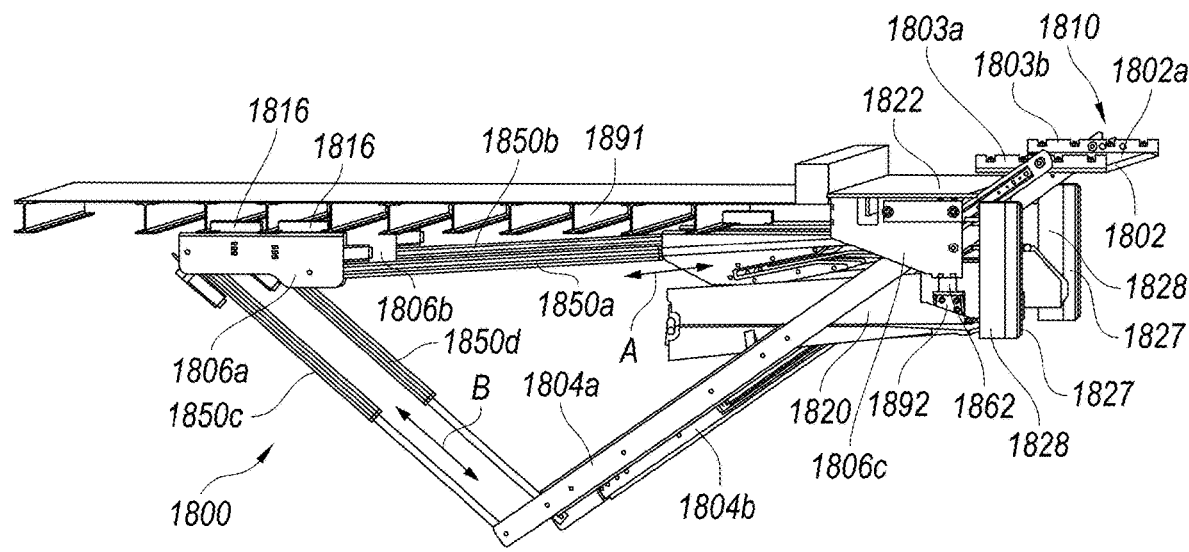

FIGS. 18A-18D are partially schematic perspective views of another transfer ramp system 1800 ("the system 1800") configured in accordance with various embodiments of the present technology. More specifically, FIG. 18A is a partially schematic perspective view of the system 1800 in a stowed position or state, and FIG. 18B is a partially schematic perspective view of the system 1800 in an at least partially deployed position or state. The system 1800 is generally similar to the system 100 described above with reference to FIGS. 1-8L. Similar reference numbers are therefore used in FIGS. 18A-24N as are used in FIGS. 1-8L to indicate like or at least generally similar components across these drawings, and a detailed discussion of many of these like/similar components of the system 1800 is therefore largely omitted below for the sake of brevity.

As shown, the system 1800 includes a transfer ramp 1802, a plurality of extendable arms 1804 (identified individually as first extendable arm 1804a and second extendable arm 1084b in FIGS. 18A and 18B), mounting brackets 1806 (identified individually as first through fourth mounting brackets 1806a-1806d, respectively), and a ramp latching system 1810 (FIG. 18B). The system 1800 further includes actuators 1850 (identified individually as first actuator 1850a, second actuator 1850b, third actuator 1850c, and fourth actuator 1850d in FIGS. 18A and 18B).

In FIG. 18A, the system 1800 is shown in the stowed position or state beneath a top platform 1822 (e.g., a top plate, a dock plate, a floor of a bed or box) and frame rails 1891 of a vehicle or trailer (e.g., frame rails of the frame of the vehicle/trailer itself, frame rails of a frame of a box positioned on or carried by the vehicle/trailer). More specifically, the transfer ramp 1802 of the system 1800 is shown in the stowed position (a) beneath the top platform 1822 and the frame rails 1891, (b) above a ramp portion 1894 of a liftgate 1820 of the vehicle/trailer that can be raised or lowered (e.g., to transfer cargo between a box or bed of the vehicle/trailer and the ground in front of the vehicle/trailer), and (c) at a location that does not impede operation of the liftgate 1820. In some embodiments, the system 1800 can include a bump stop 1892 (i) that spaces the liftgate 1820 downwards and increases the space between the top platform 1822 and the ramp portion 1894 of the liftgate 1820 within which the system 1800 can be deployed and retracted, and/or (b) that limits upwards motion of the liftgate 1820 and thereby prevents the liftgate 1820 from colliding with or crushing the system 1800. For example, as shown in FIG. 18A, the system 1800 can include a bump stop 1862 on the mounting bracket 1806c. The system 1800 may additionally, or alternatively, include a bump stop 1862 on the mounting bracket 1806d. The bump stop(s) 1862 can be made of rubber, metal, and/or another suitable material, and/or can be configured to project out from the bracket(s) 1806c and/or

1806d. Thus, as the liftgate 1820 is raised vertically, a component 1892 on the liftgate 1820 can come into contact with the bump stop(s) 1862 (as opposed to various other components of the system 1800), and the bump stop(s) 1862 can prevent further vertical motion of the liftgate 1820.

Figure 18C:
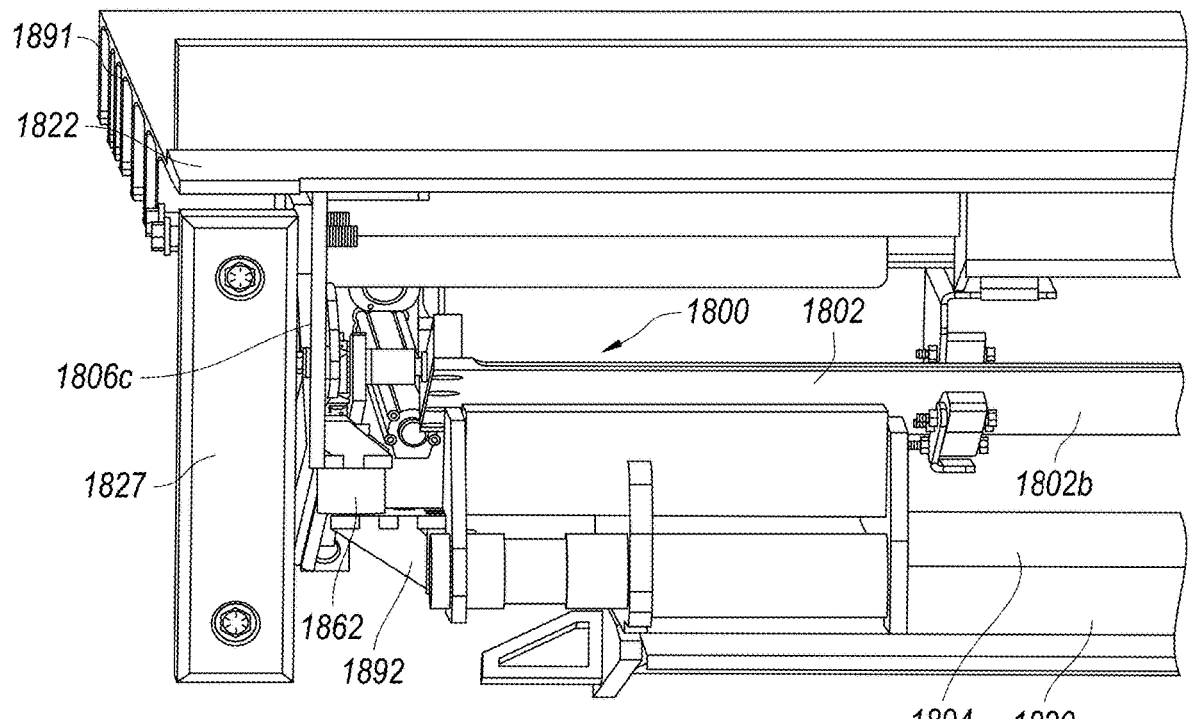
FIGS. 18C and 18D are partially schematic, front views of a portion of the transfer ramp system of FIGS. 18A and 18B.
Figure 18D:
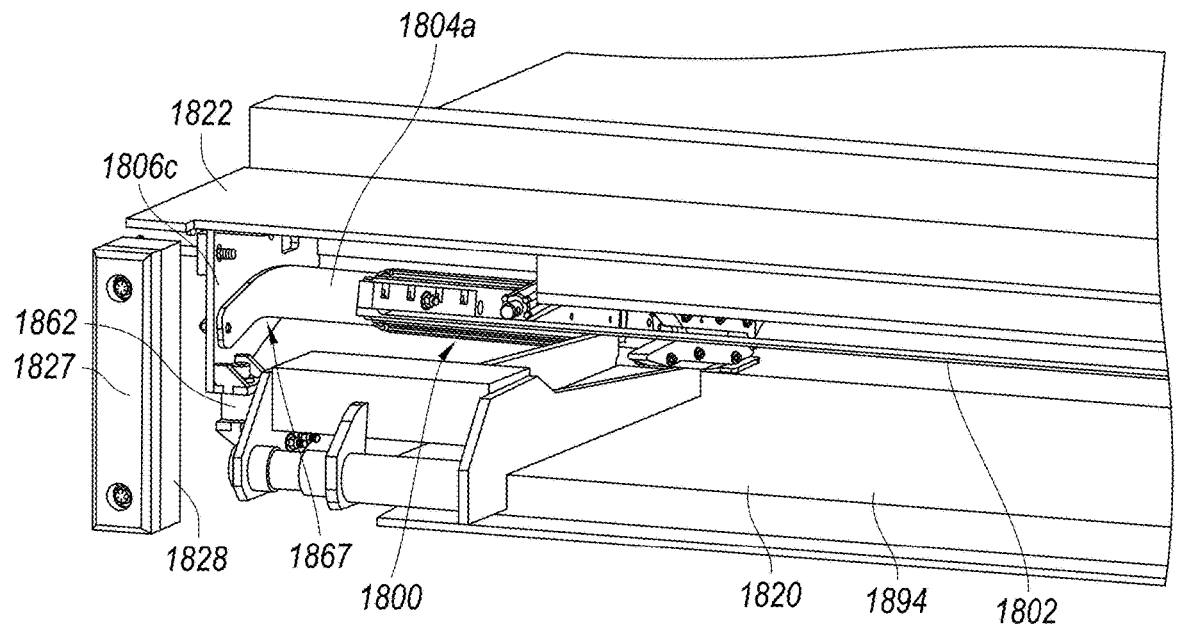

As best shown in FIGS. 18A and 18D, the first extendable arm 1804a and/or the second extendable arm 1804b can include a curve 1867 (e.g., a bend) or a cutout, such as in an outermost rail bracket of the first extendable arm 1804a that is attached to the third mounting bracket 1806c and/or in an outermost rail bracket of the second extendable arm 1804b that is attached to the fourth mounting bracket 1806d. The curve(s) 1867 can facilitate keeping the liftgate 1820 from contacting the first extendable arm 1804a and the second extendable arm 1804b. Additionally, or alternatively, the liftgate 1820, when deployed, can be configured to pivot forward slightly (e.g., in a direction generally along the longitudinal axis of the vehicle/trailer). As such, spacers 1828 made of aluminum or another suitable material can be used to offset rubber bumpers 1827 a desired distance from the backmost edge of the top platform 1822 to, for example, provide a clearance for deployment of the liftgate 1820 and/or the transfer ramp 1802 of the system 1800. For example, the spacers 1828 can be used to offset the rubber bumpers 1827 by approximately 25.4 cm (10 inches) or less, such as by approximately 12.7 cm (5 inches), approximately 7.62 cm (3 inches), approximately 5.08 cm (2 inches), approximately 2.54 cm (1 inch), approximately 1.27 cm (0.5 inch), or another suitable distance. Therefore, when the rubber bumpers 1827 are backed against another structure (e.g., another vehicle; a trailer; a loading dock; or rubber bumpers of another vehicle, trailer, or loading dock), a gap can exist between the back edge of the top platform 1822 and a top surface of the other structure onto which cargo can be placed. Continuing with this example, the gap can be approximately 50 cm (e.g., 52 cm, 50.8 cm (20 inches), 48 cm) or less in width, such as approximately 38.1 cm (15 inches), approximately 33.02 cm (13 inches), approximately 30.48 cm (12 inches), approximately 27.94 cm (11 inches), approximately 26.67 cm (10.5 inches), approximately 25.4 cm (10 inches), or less in width.

The mounting brackets 1806 of the system 1800 are fixedly attached (i) to the top platform 1822 and/or (ii) to the vehicle/trailer such that the system 1800 is mounted to or under the frame rails 1891 of the vehicle/trailer. Referring to FIGS. 18C and 18D, the third mounting bracket 1806c can be (a) positioned within a space proximate to a first side of the liftgate 1820 and/or (b) fixedly attached directly or indirectly to the top platform 1822, such as via sides (not shown) similar to the sides 126 of the system 100 of FIGS. 1-8L. The fourth mounting bracket 1806d (FIG. 18A) can be similarly (a) positioned within a space proximate to a second side of the liftgate 1820 opposite the first side and/or (b) fixedly attached directly or indirectly to the top platform 1822.

Figure 19A:
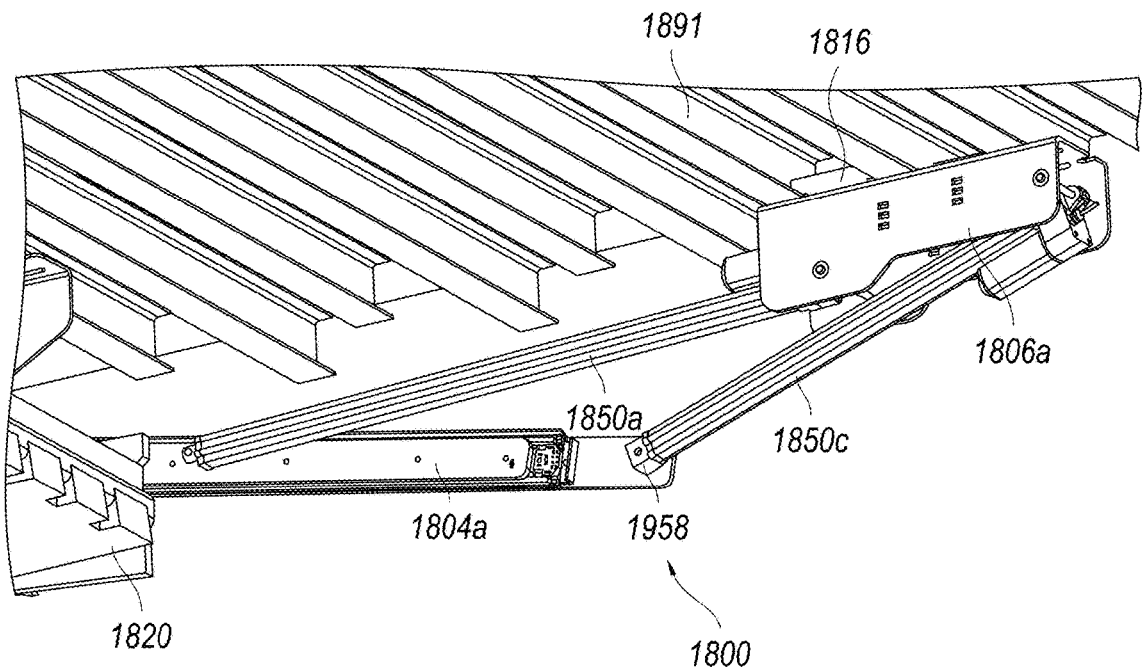
FIGS. 19A and 19B are partially schematic perspective views of another portion of the transfer ramp system of FIGS. 18A-18D.
Figure 19B:
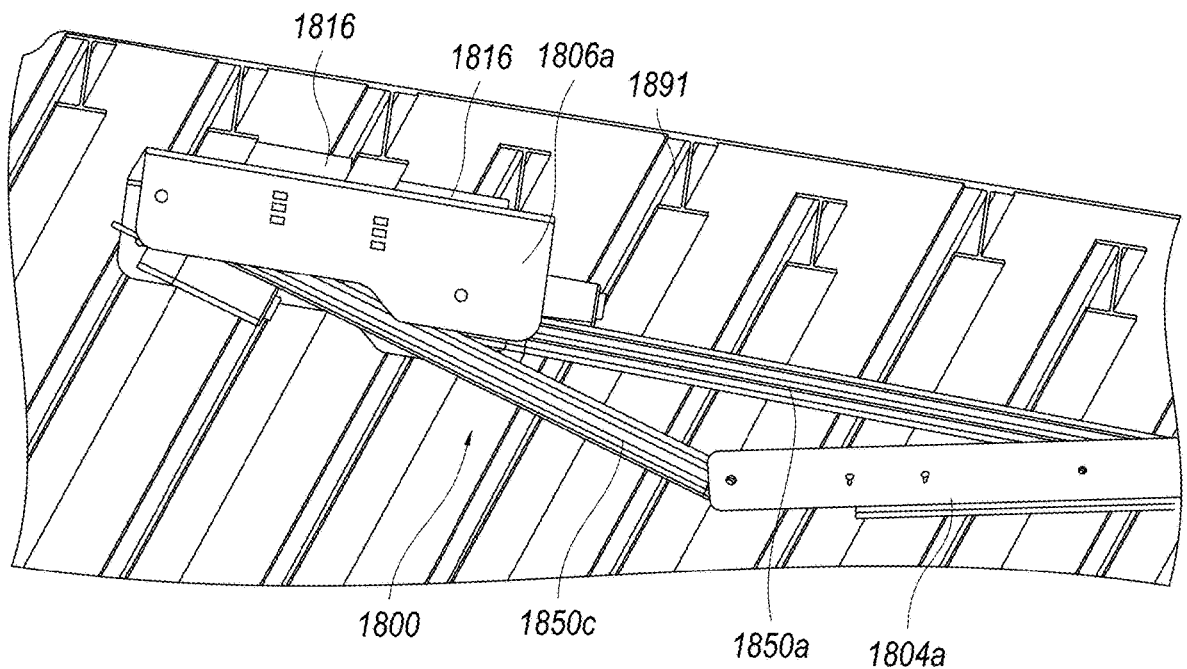

FIGS. 19A and 19B are additional partially schematic perspective views of the system 1800. Referring to FIGS. 18A, 18B, 19A, and 19B together, the first mounting bracket 1806a can be positioned beneath the frame rails 1891 of the vehicle/trailer and at a location proximate to a first side of the vehicle/trailer. In some embodiments, the first mounting bracket 1806a can be fixedly attached to the vehicle/trailer to or under the frame rails 1891 of the vehicle/trailer, such as using one or more upper clamps 1816. The second mounting bracket 1806b (FIGS. 18A and 18B) can similarly be positioned at a location proximate to a second side of the vehicle/trailer opposite the first side, and/or can be fixedly attached to or under the frame rails 1891 of the vehicle/ trailer, such as using one or more upper clamps 1816. As discussed above, the frame rails 1891 can include frame rails of the frame of the vehicle/trailer itself and/or frame rails of a frame of a box positioned on or carried by (e.g., the frame or chassis of) the vehicle/trailer. As a specific example, the first and second mounting brackets 1806a and 1806b of the system 1800 can be fixedly attached to the vehicle/trailer such that the system 1800 is mounted to, on, within, and/or beneath a chassis of the vehicle/trailer. Mounting of the system 1800 to the outer portions of the vehicle/trailer can facilitate using a wider transfer ramp 1802 (e.g., a transfer ramp 1802 that spans an entirety, a substantial majority, and/or nearly all of the width of the box or bed of the vehicle/trailer) than the transfer ramp 102 used in the system 100 of FIGS. 1-8L. Although shown as separate mounting brackets 1806a-1806d in the illustrated embodiment, the first mounting bracket 1806a can be integrated with the third mounting bracket 1806c in other embodiments of the present technology, and/or the second mounting bracket 1806b can be integrated with the fourth mounting bracket 1806d in other embodiments of the present technology. Additionally, or alternatively, the first mounting bracket 1806a can be integrated with the second mounting bracket 1806b, and/or the third mounting bracket 1806c can be integrated with the fourth mounting bracket 1086d.

With continuing reference to FIGS. 18A, 18B, 19A, and 19B together, the first actuator 1850a of the system 1800 can be attached at one end to the first mounting bracket 1806a and can be attached at an opposite end to a distal portion of the first extendable arm 1804a. In some embodiments, the first actuator 1850a can be a pneumatic, hydraulic, electric (e.g., electro-hydraulic, electromechanical), and/or piezoelectric linear actuator. As discussed in greater detail below, the first actuator 1850a can be configured to extend and retract generally along its longitudinal axis (e.g., generally along or parallel to the arrow A illustrated in FIG. 18B) and thereby extend and retract, respectively, the first extendable arm 1804a (e.g., generally along a longitudinal axis of the first extendable arm 1804a). Similarly, the second actuator 1850b (not shown in FIGS. 19A and 19B) of the system 1800 can be attached at one end to the second mounting bracket 1806b and can be attached at an opposite end to a distal portion of the second extendable arm 1804b. In some embodiments, the second actuator 1850b can be a pneumatic, hydraulic, electric (e.g., electro-hydraulic, electromechanical), and/or piezoelectric linear actuator. As discussed in greater detail below, the second actuator 1850b can be configured to extend and retract generally along its longitudinal axis (e.g., generally along or parallel to the arrow A illustrated in FIG. 18B) and thereby extend and retract, respectively, the second extendable arm 1804b (e.g., generally along a longitudinal axis of the second extendable arm 1804b). In some embodiments, the first actuator 1850a and the second actuator 1850b can be extended or retracted in unison and/or independently of one another. In other embodiments of the present technology, the system 1800 can omit the first actuator 1850a or the second actuator 1850b such that the system 1800 uses a single actuator 1850 to extend and retract the first and second extendable arms 1804a and 1804b along their respective longitudinal axis.

The third actuator 1850c of the system 1800 can be attached at one end to the first mounting bracket 1806a and can be attached at an opposite end to a proximal portion of the first extendable arm 1804a. In some embodiments, the third actuator 1850c can be a pneumatic, hydraulic, electric (e.g., electro-hydraulic, electromechanical), and/or piezoelectric linear actuator. As discussed in greater detail below, the third actuator 1850c can be configured to extend and retract generally along its longitudinal axis (e.g., generally along or parallel to the arrow B illustrated in FIG. 18B) and thereby move (e.g., translate, pivotably move, rotate, rotatably move, adjust a pitch of) the first extendable arm 1804a, such as by vertically lowering and/or raising the proximal portion of first extendable arm 1804a. Similarly, the fourth actuator 1850d (not shown in FIGS. 19A and 19B) of the system 1800 can be attached at one end to the second mounting bracket 1806b and can be attached at an opposite end to a proximal portion of the second extendable arm 1804b. In some embodiments, the fourth actuator 1850d can be a pneumatic, hydraulic, electric (e.g., electro-hydraulic, electromechanical), and/or piezoelectric linear actuator. As discussed in greater detail below, the fourth actuator 1850d can be configured to extend and retract generally along its longitudinal axis (e.g., generally along or parallel to the arrow B illustrated in FIG. 18B) and thereby move (e.g., translate, pivotably move, rotate, rotatably move, adjust a pitch of) the second extendable arm 1804b, such as by vertically lowering and/or raising the proximal portion of second extendable arm 1804b. In some embodiments, the third actuator 1850c and the fourth actuator 1850d can be extended or retracted in unison and/or independently of one another. In these and other embodiments, the third actuator 1850c and/or the fourth actuator 1850d can be extended or retracted (a) in unison with the first actuator 1850a and/or the second actuator 1850b, and/or (b) independently of the first actuator 1850a and/or the second actuator 1850b. In some embodiments of the present technology, the system 1800 can omit the third actuator 1850c or the fourth actuator 1850d such that the system 1800 uses a single actuator 1850 to vertically raise and lower the proximal portions of the first and second extendable arms 1804a and 1804b.

Figure 20:
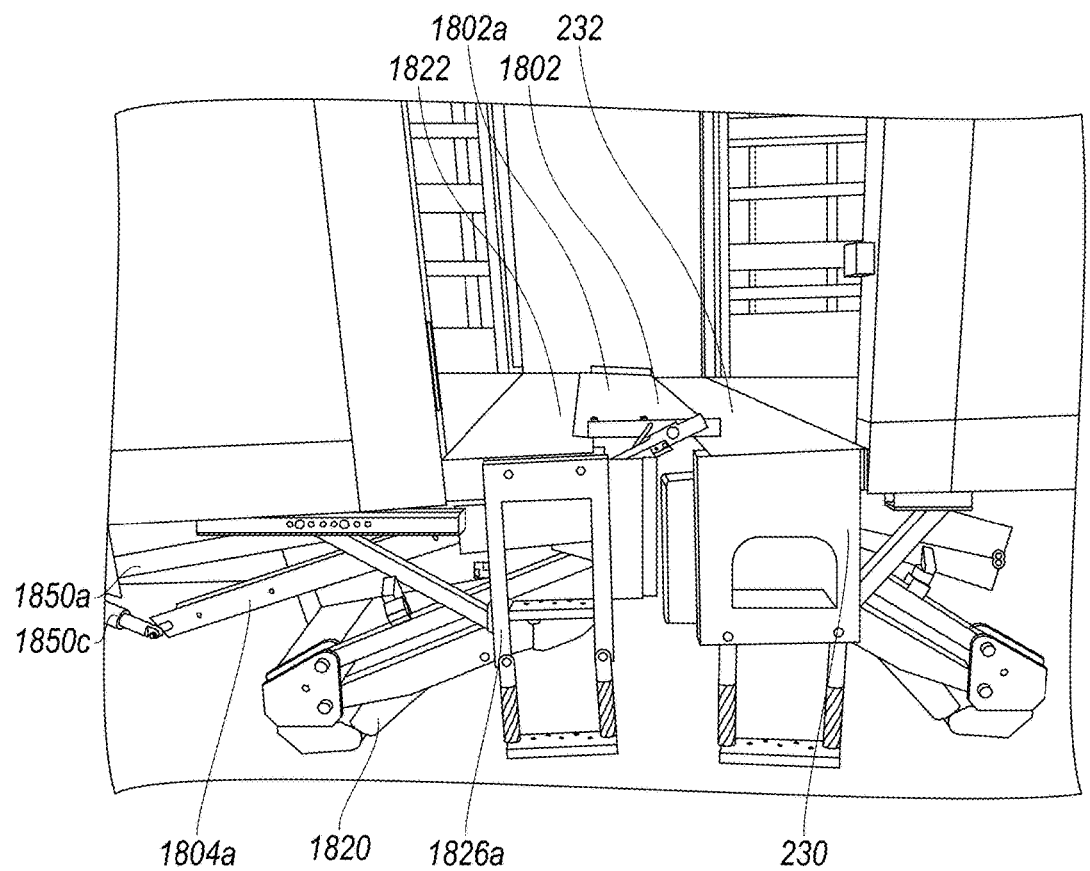
FIG. 20 is a perspective view of the transfer ramp system of FIGS. 18A-18D in a deployed state.

FIG. 20 is a perspective view of the transfer ramp system 1800 of FIGS. 18A-19B in a deployed state (e.g., a fully deployed state). As shown, the transfer ramp 1802 has been (a) maneuvered through the space beneath the top platform 1822 and above the liftgate 1820, and through a gap between the top platform 1822 and a top surface 232 (e.g., a top platform, top plate, dock plate) of another structure 230 (e.g., another vehicle/trailer), and (b) lowered until the transfer ramp 1802 rests on the top platform 1822 and the top surface 232. In this state, the transfer ramp 1802 of the system 1800 can be used to transfer cargo between the vehicle/trailer including the system 1800 and the vehicle/trailer including the top surface 232.

Figure 21:
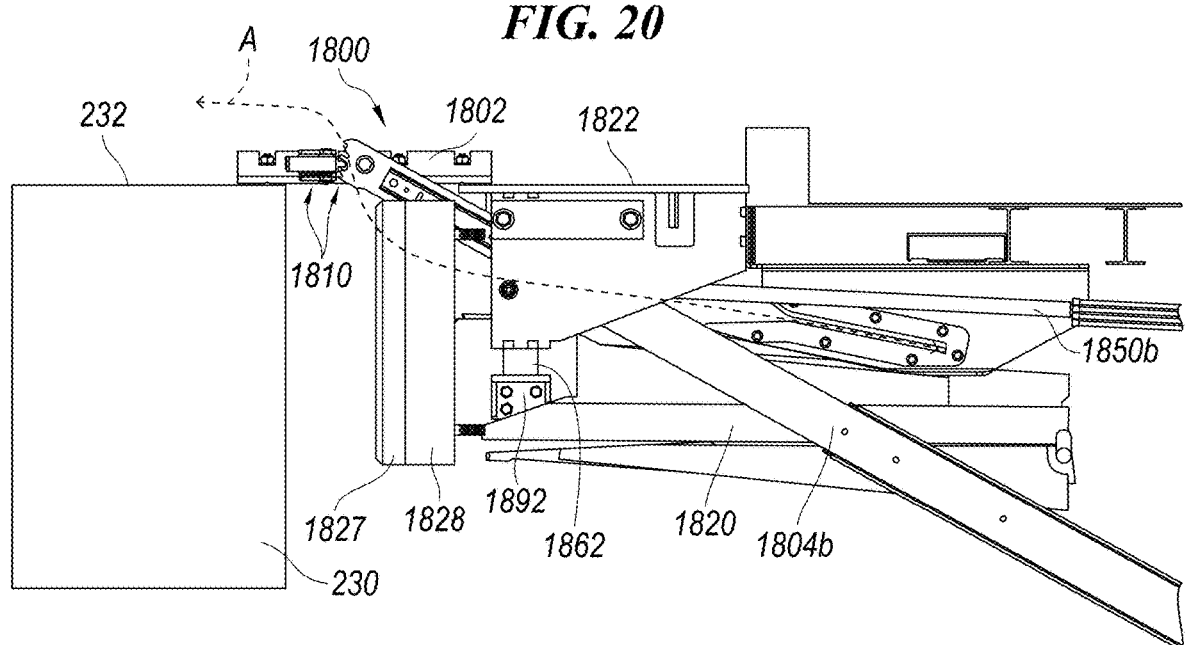
FIG. 21 is a partially schematic side view illustrating motion of the transfer ramp system of FIGS. 18A-18D.

FIG. 21 is a partially schematic side view illustrating motion of the transfer ramp system 1800 of FIGS. 18A-20. As shown in FIG. 21 and as described in greater detail below, the transfer ramp 1802 can be moved generally along the arrow A shown in FIG. 21 (e.g., along a generally 'S'-shaped trajectory) to deploy and retract the transfer ramp 1802 through the gap that exists between the top platform 1822 and the top surface 232. More specifically, user controls (e.g., mounted to and/or stowed on the liftgate 1820 and/or the vehicle/trailer) and/or a microcontroller can be used to control or coordinate operation of the actuators 1850 to move the transfer ramp 1802 generally along the arrow A. In some embodiments, the arrow A can represent a predetermined path. For example, the arrow A can represent a path that reduces or minimizes a gap that must exist between a backmost edge of the top plate 1822 and a backmost edge of the top surface 232 to deploy and/or retract the transfer ramp 1802 of the system 1800 (e.g., without contacting the top platform 1822 and/or the top surface 232). For example, the arrow A can represent an optimized or tightest deployment/retraction path for the transfer ramp 1802. As discussed in greater detail below, while deploying or retracting the transfer ramp 1802, the system 1800 can be configured to (a) monitor potentiometer readings associated with the actuators 1850a-1850d and (b) control one or more of the actuators 1850a-1850d such that the transfer ramp 1802 is deployed or retracted generally along the predetermined path represented by the arrow A.

Figure 22A:
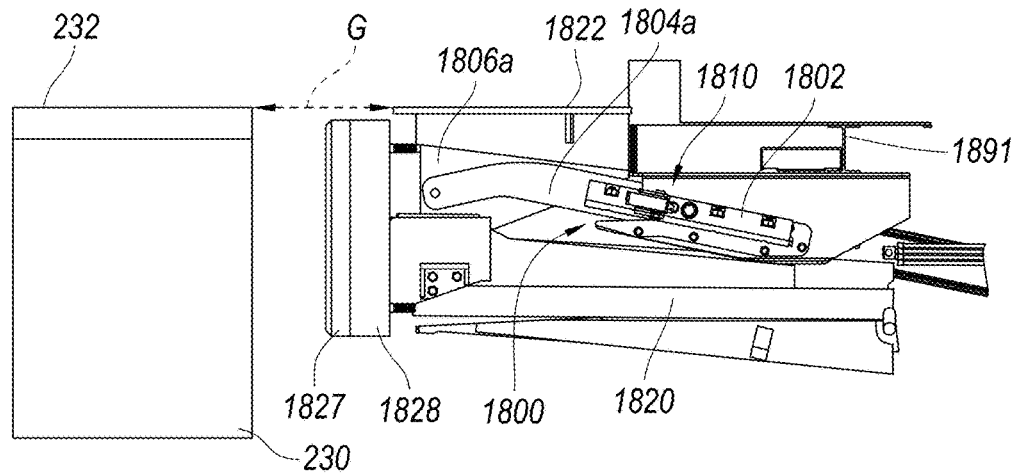
FIGS. 22A-22N are partially schematic side views of the transfer ramp system of FIGS. 18A-18D illustrating a method of operating the transfer ramp system in accordance with various embodiments of the present technology.
Figure 23A:
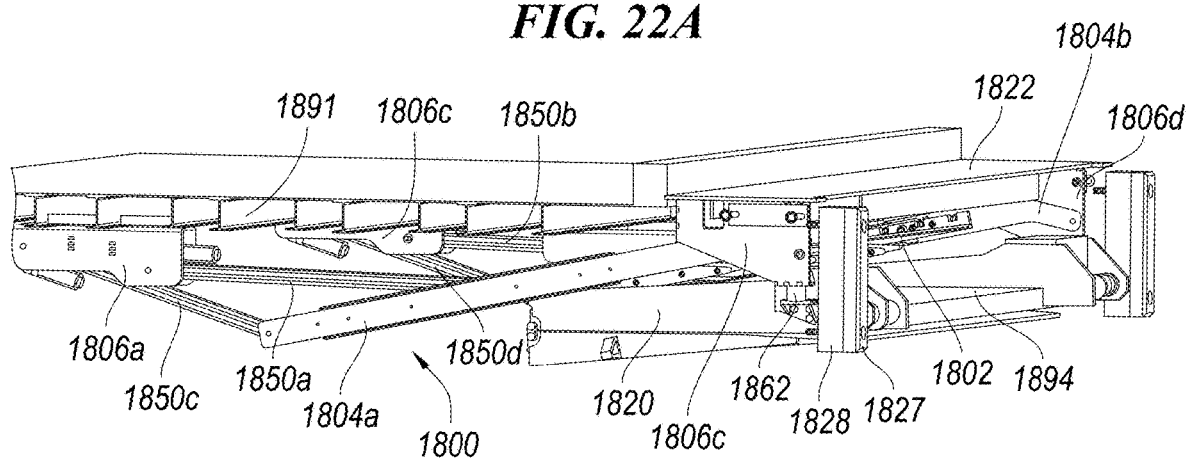
FIGS. 23A-23N are other partially schematic side views of the transfer ramp system of FIGS. 18A-18D illustrating the method of operating the transfer ramp system shown in FIGS. 22A-22N.
Figure 22B:
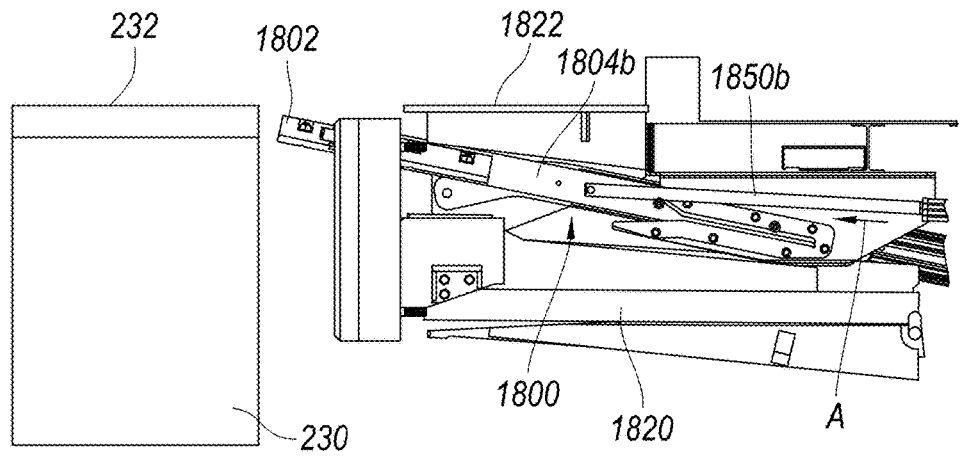
Figure 22C:
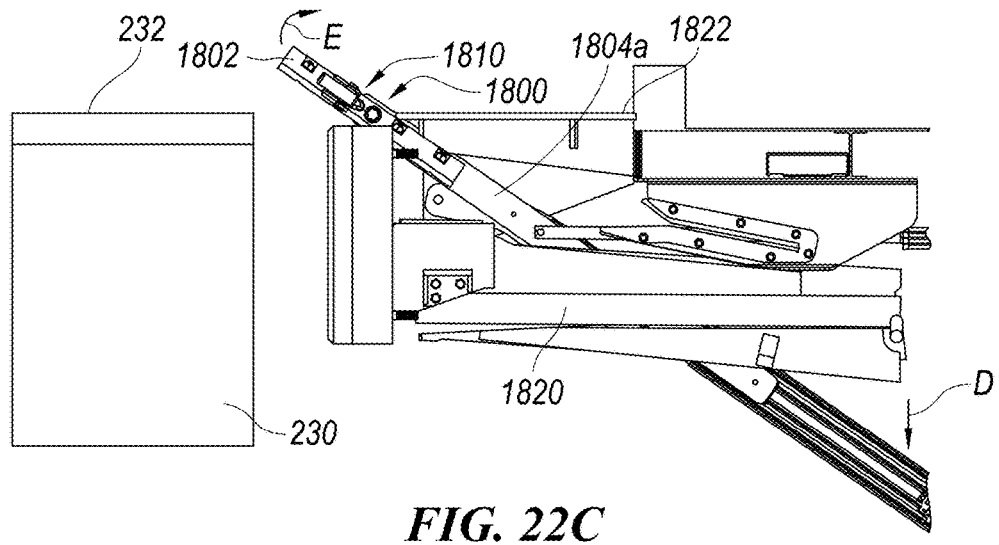
Figure 22D:
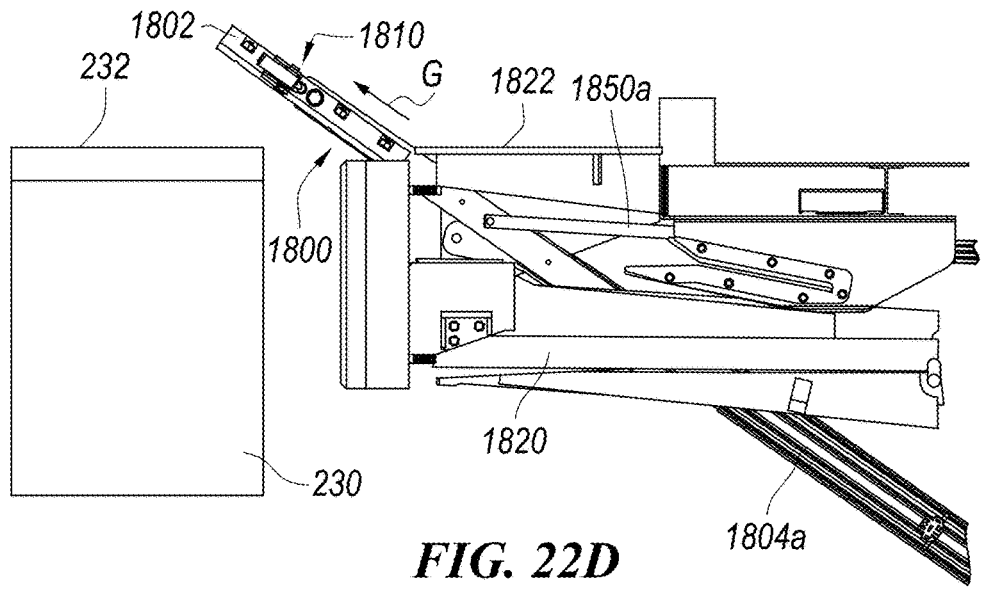
Figure 22E:
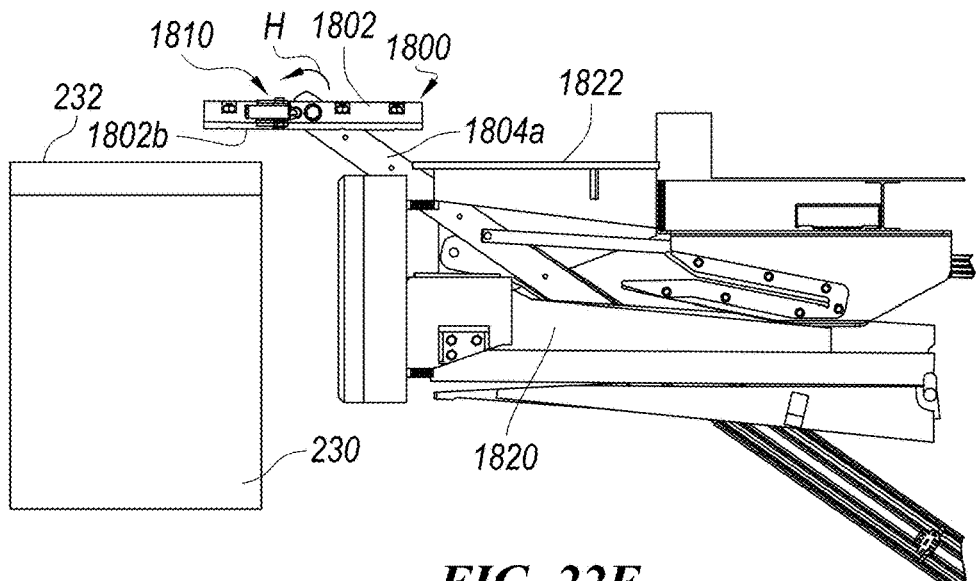
Figure 22F:
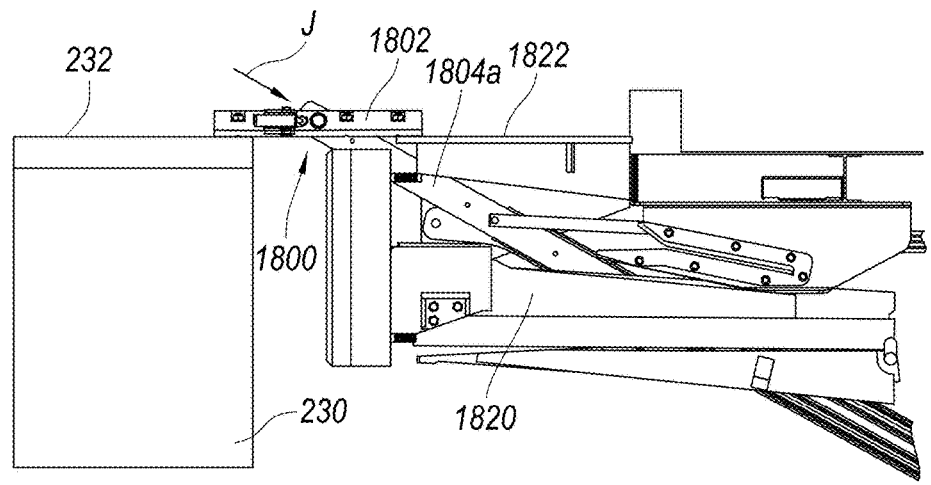
Figure 22G:
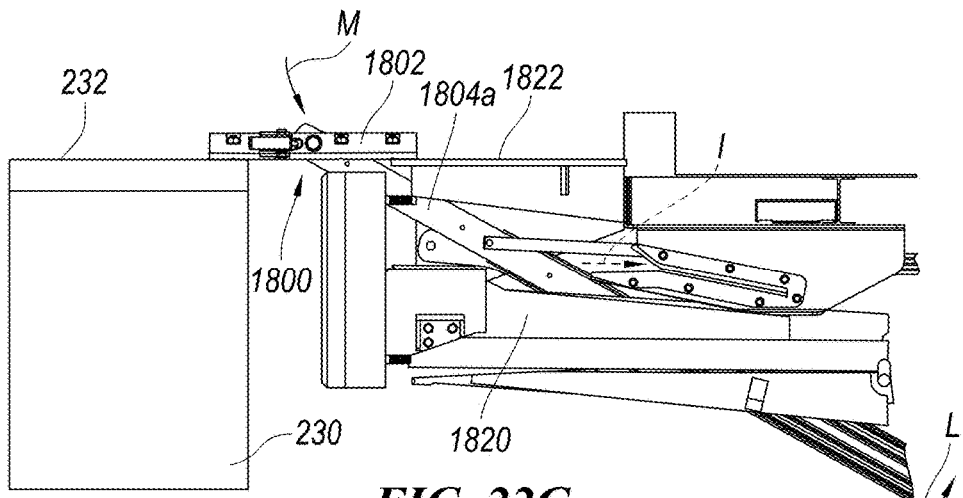
Figure 22H:
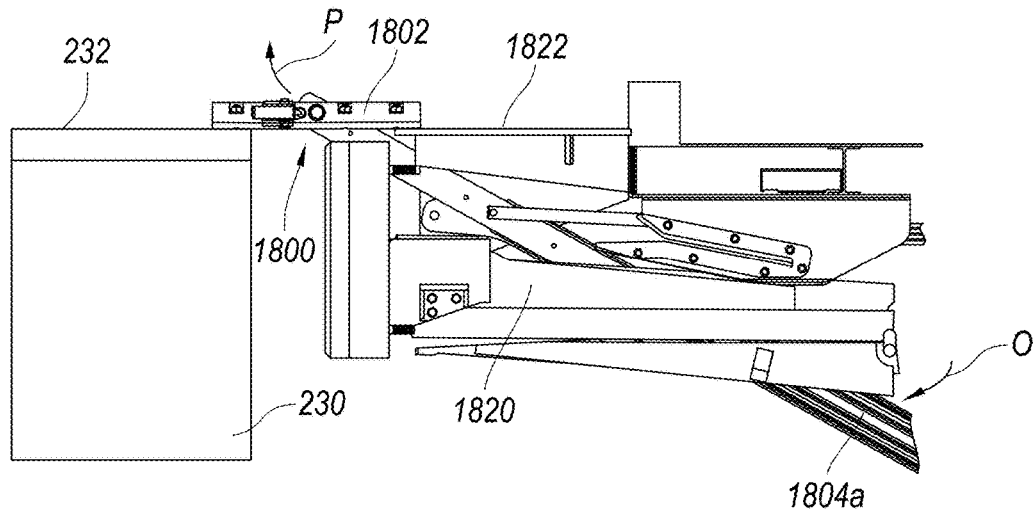
Figure 22I:
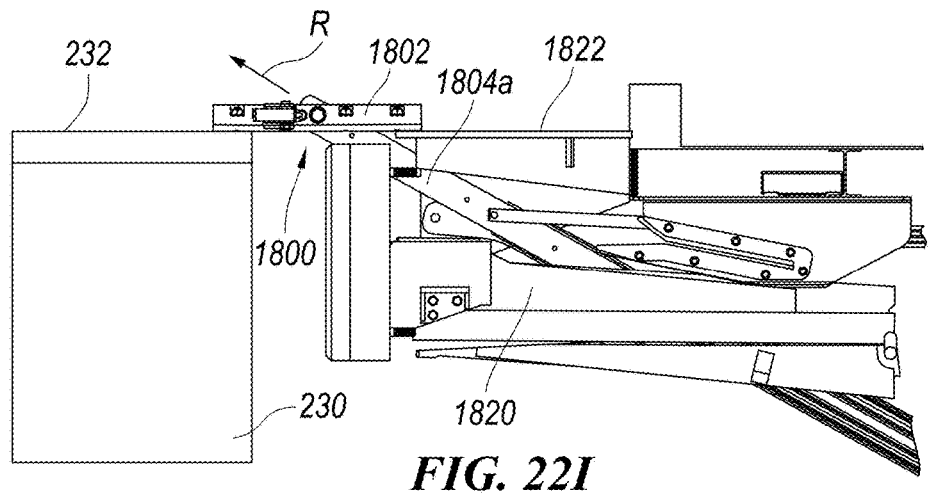
Figure 22J:
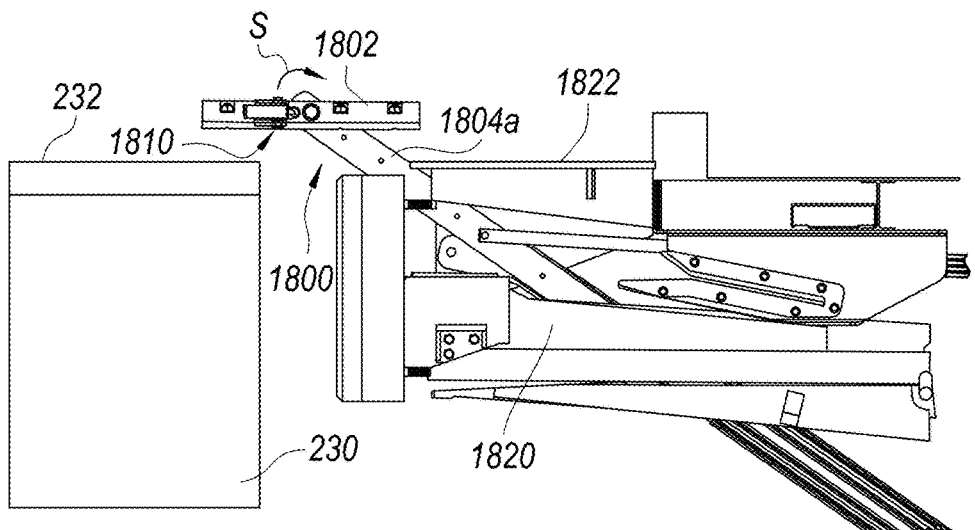
Figure 22K:
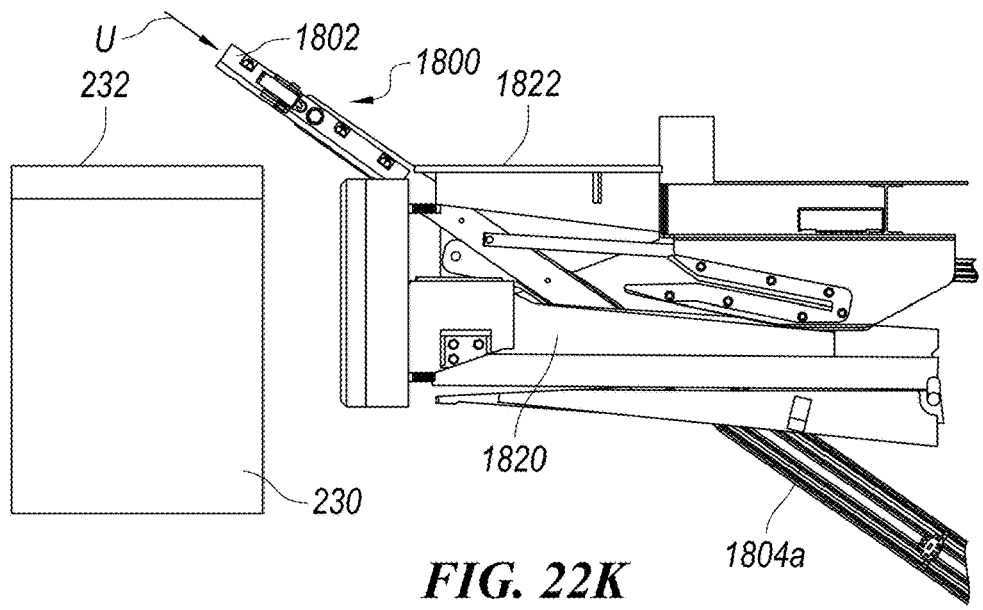
Figure 22L:
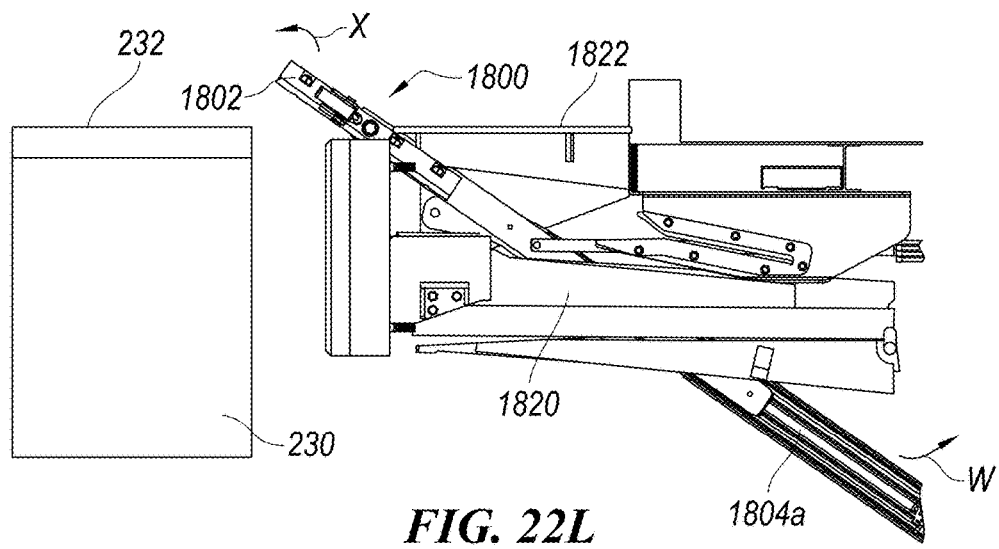
Figure 22M:
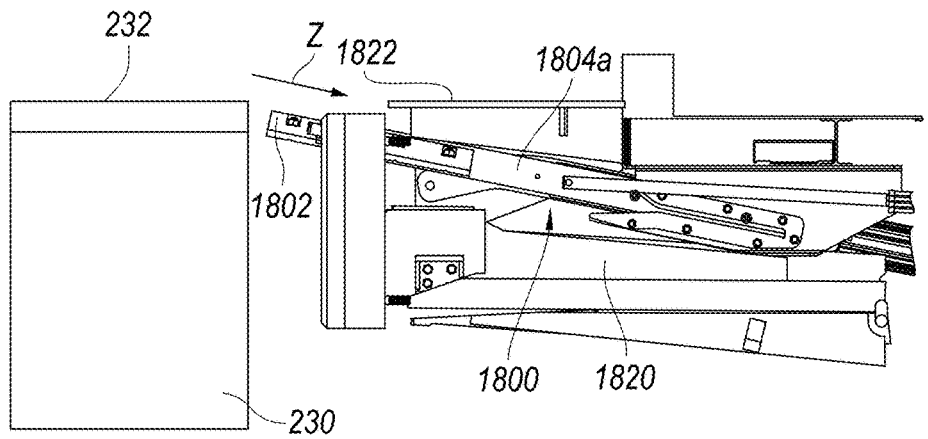
Figure 22N:
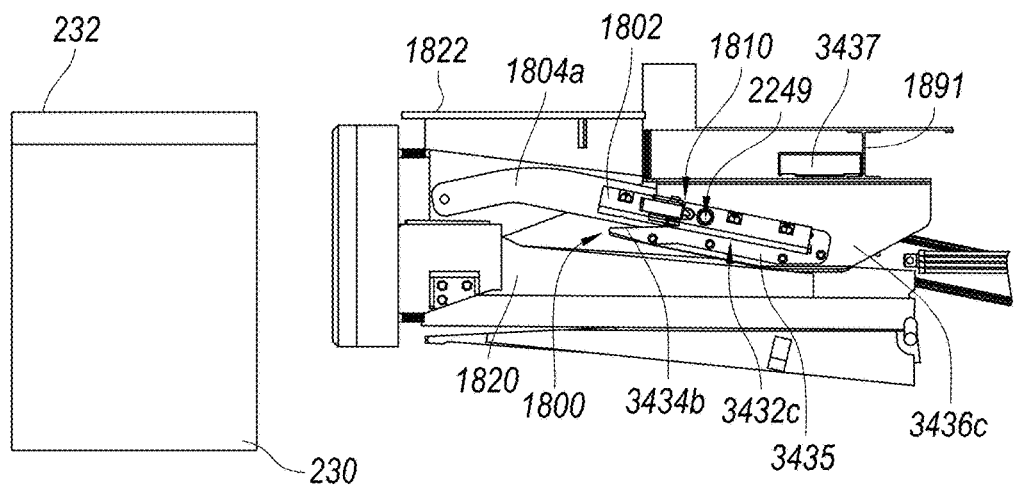

FIGS. 22A-22N are partially schematic side views of the transfer ramp system 1800 of FIGS. 18A-21 illustrating a method of operating the transfer ramp system 1800 in accordance with various embodiments of the present technology. In addition, FIGS. 23A-23N are other partially schematic side views of the transfer ramp system of FIGS. 18A-18D illustrating the method of operating the transfer ramp system 1800 shown in FIGS. 22A-22N, and FIGS. 24A-24N are partially schematic, cross-sectional side views of the transfer ramp system 1800 of FIGS. 18A-18D (without the transfer ramp 1802 illustrated) illustrating the method of operating the transfer ramp system shown in FIGS. 22A-22N and in FIGS. 23A-23N. All or a subset of the steps of the method illustrated in FIGS. 22A-24N can be performed in accordance with the discussion of the system 100 and/or the system 1800 above.

Figure 24A:
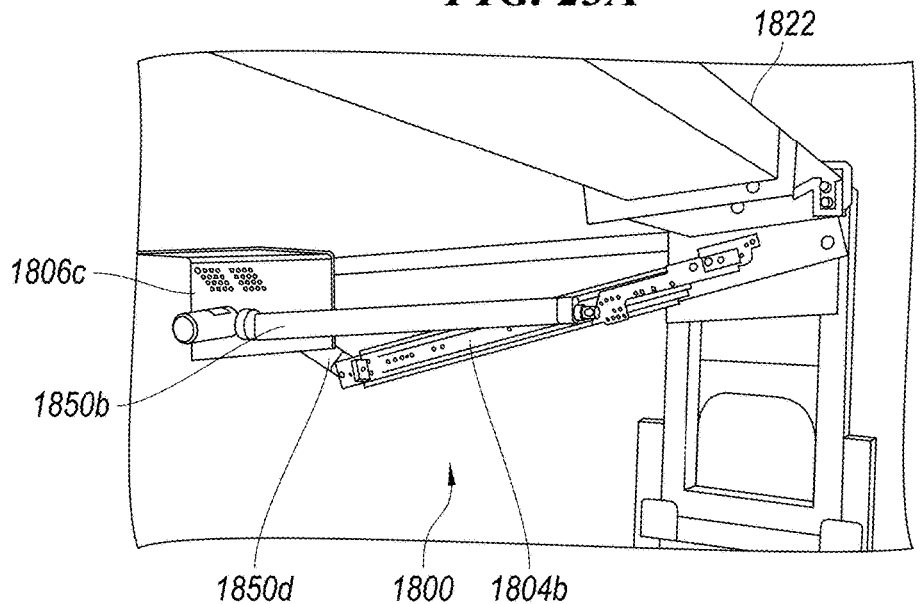
FIGS. 24A-24N are partially schematic, cross-sectional side views of the transfer ramp system of FIGS. 18A-18D illustrating the method of operating the transfer ramp system shown in FIGS. 22A-22N.

Referring to FIGS. 22A, 23A, and 24A together, the method begins with the system 1800 in the stowed position beneath the top platform 1822 and above the liftgate 1820. More specifically, the vehicle/trailer can initially be backed toward the another structure 230 until (a) the vehicle/trailer is positioned such that rubber bumpers 1827 face and/or contact the other structure 230, and/or (b) the top platform 1822 is spaced a distance from the top surface 232 of the other structure 230 that is less than a length of the transfer ramp 1802 measured in a direction generally along a longitudinal axis of the vehicle/trailer. As discussed above, the other structure 230 can be a commercial vehicle, a loading dock, a trailer, a bed of a truck, or another structure. When the vehicle/trailer that includes the system 1800 is positioned as shown in FIGS. 22A, 23A, and 24A, a gap G (FIG. 22A) exists between an edge (e.g., a backmost edge) of the top platform 1822 and an edge of the top surface 232 of the other structure 230.

Figure 23B:
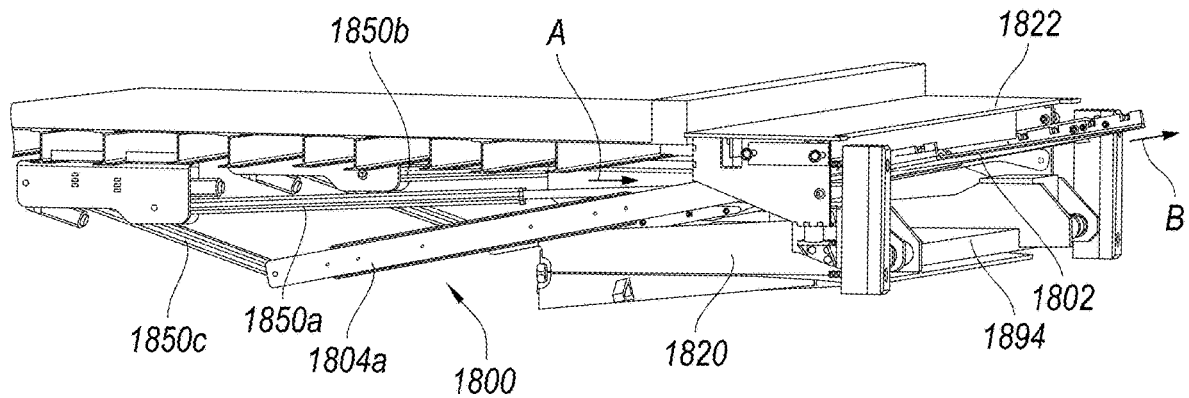
Figure 24B:
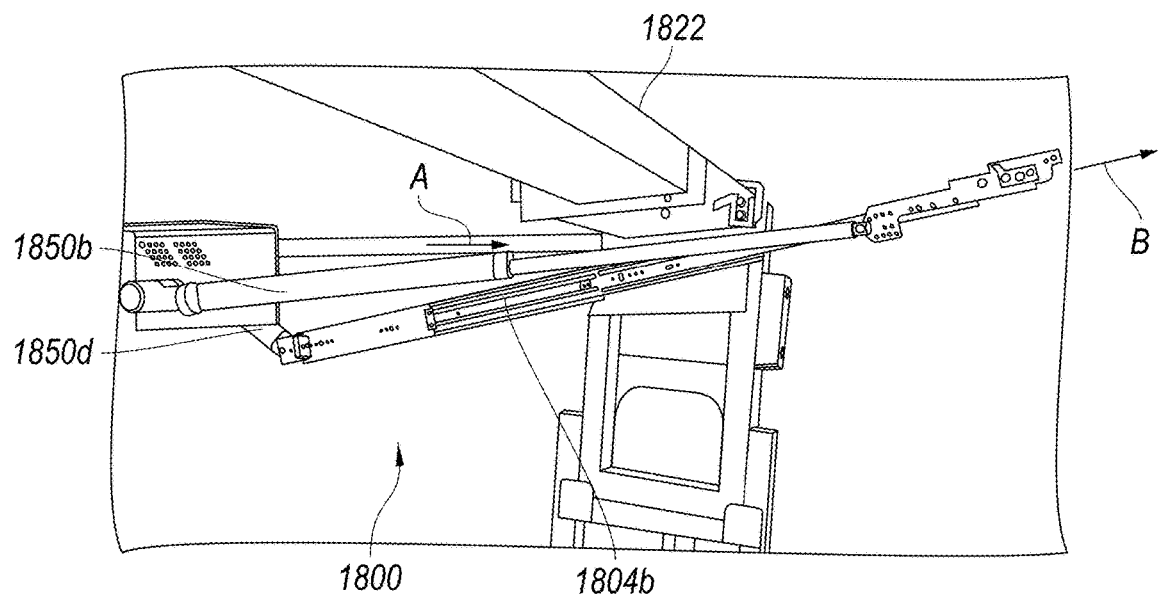

Referring now to FIGS. 22B, 23B, and 24B together, the method continues by extending the first and second extendable arms 1804a and 1804b and thereby extending or moving the transfer ramp 1802 out from a space under the top platform 1822 and above the liftgate 1820. More specifically, as best shown in FIGS. 23B and 24B, the first actuator 1850a and/or the second actuator 1850b can be extended in a direction generally along or parallel to arrow A. Extension of the first actuator 1850a and/or the second actuator 1850b in the direction generally along or parallel to the arrow A can extend the first and second extendable arms 1804a and 1804b in a direction generally along or parallel to arrow B (e.g., by exerting a pushing force on the distal portions of the first and second extendable arms 1804a and 1804b). During this process, the third actuators 1850c and/or the fourth actuator 1850d may be stationary or may be actuated (e.g., extended and/or retracted, such as at a same or different rate from the first and second actuators 1850a and 1850b) in addition to and/or while the first and second actuators 1850a and/or 1850d, respectively, are extended.

Figure 23C:
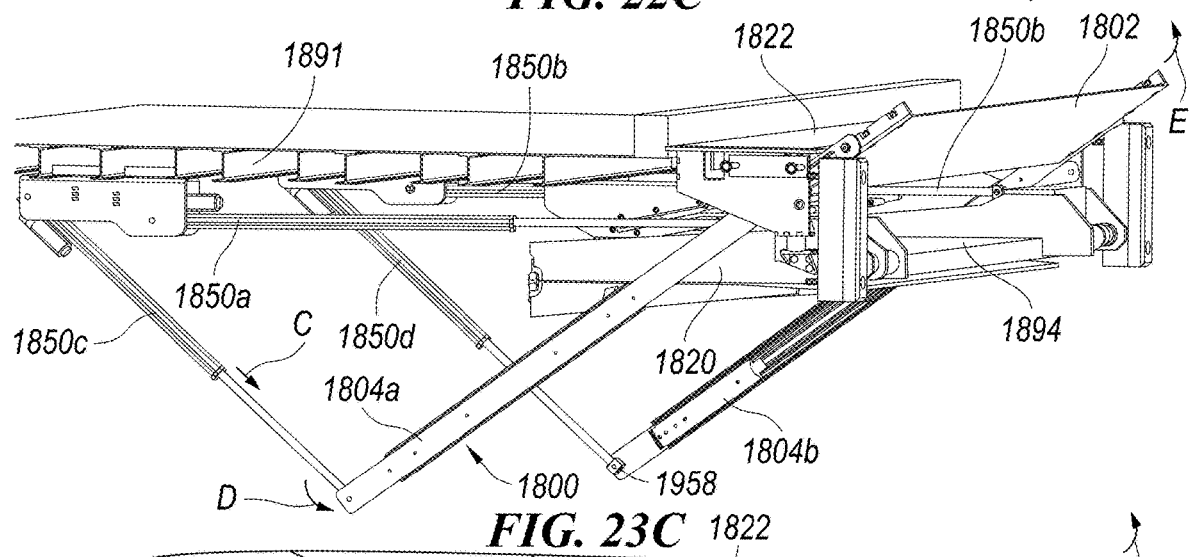
Figure 24C:
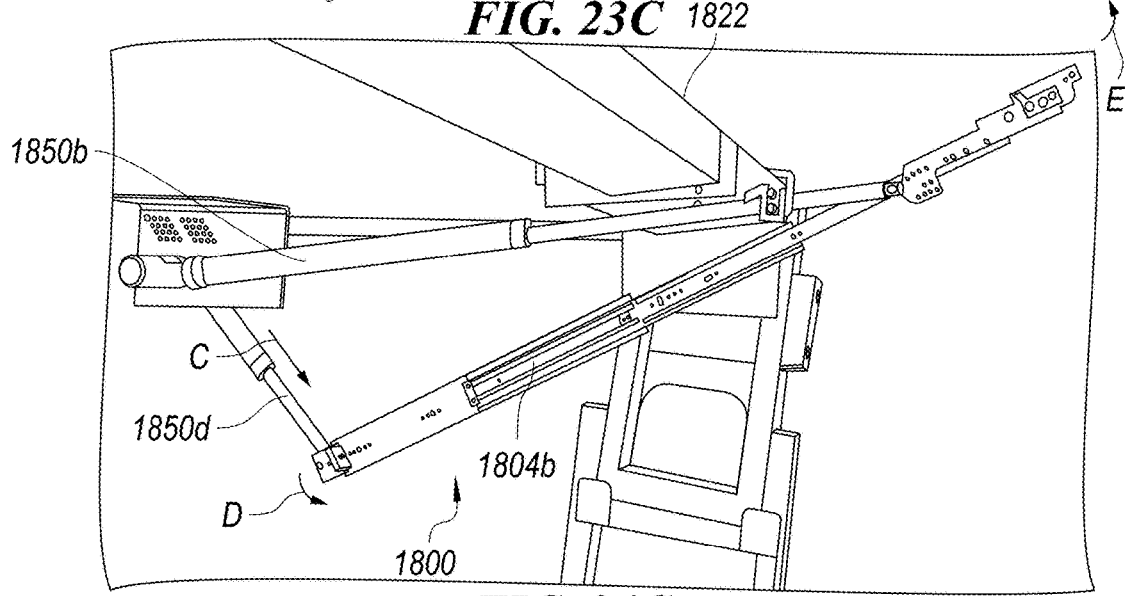

Referring now to FIGS. 22C, 23C, and 24C together, the method continues by rotating the first and second extendable arms 1804a and 1804b. More specifically, as best shown in FIGS. 23C and 24C, the third actuator 1850c and/or the fourth actuator 1850d can be extended in a direction generally along or parallel to arrow C. Extension of the third actuator 1850c and/or the fourth actuator 1850d in the direction generally along or parallel to the arrow C can, at least while the first actuator 1850a and/or the second actuator 1850b, respectively, are stationary and/or extended at a slower rate, (i) rotate and/or vertically lower proximal portions of the first and second extendable arms 1804a and 1804b in a direction generally along or parallel to arrow D, (ii) adjust (e.g., increase) a pitch of the first and second extendable arms 1804a and 1804b and/or of the transfer ramp 1802, and/or (iii) pivot the first and second extendable arms 1804a and 1804b (e.g., generally about a point at which the first and second extendable arms 1804a and 1804b are operably coupled to the first and second actuators 1850a and 1850b). In some embodiments, the first actuator 1850a and/or the second actuator 1850b may optionally be retracted (e.g., at a same or different rate than the third and fourth actuators 1850c and 1850d) in addition to and/or while the third and fourth actuators 1850c and 1850d, respectively, are extended. As (i) the third and fourth actuators 1850c and 1850d are extended while (ii) the first and second actuators 1850a and 1850b are stationary, extended at a slower rate, or are retracted, (a) the distal portions of the first and second extendable arms 1804a and 1804b and/or (b) a back lip/edge of the transfer ramp 1802 can be moved (e.g., rotated, tilted, pivoted, vertically raised) in a direction generally along or parallel to arrow E.

Rotating (e.g., pivoting, tilting) the first and second extendable arms 1804a and 1804b and/or adjusting the pitch of the first and second extendable arms 1804a and 1804b in this manner can facilitate reducing, narrowing, or minimizing a distance required between the transfer ramp 1802 and the backmost edge of the top platform 1822 while deploying the transfer ramp 1802. In other words, rotating and/or adjusting the pitch of the first and second extendable arms 1804a and 1804b in this manner can facilitate (a) deploying the transfer ramp 1802 along an optimized or tightest possible path relative to the top platform 1822 and/or (b) minimizing, narrowing, or reducing a minimum possible gap G (FIG. 22A) that is required between the top platform 1822 and the top surface 232 in order to deploy the transfer ramp 1802 (e.g., without contacting the top platform 1822 and/or the top surface 232). As a specific example, rotating and/or adjusting the pitch of the first and second extendable arms 1804a and 1804b can obviate a need for the structure 230 to include bumpers and/or spacers (e.g., similar to the bumpers 1827 and/or spacers 1828 installed on the vehicle/trailer that includes the system 1800).

Figure 23D:
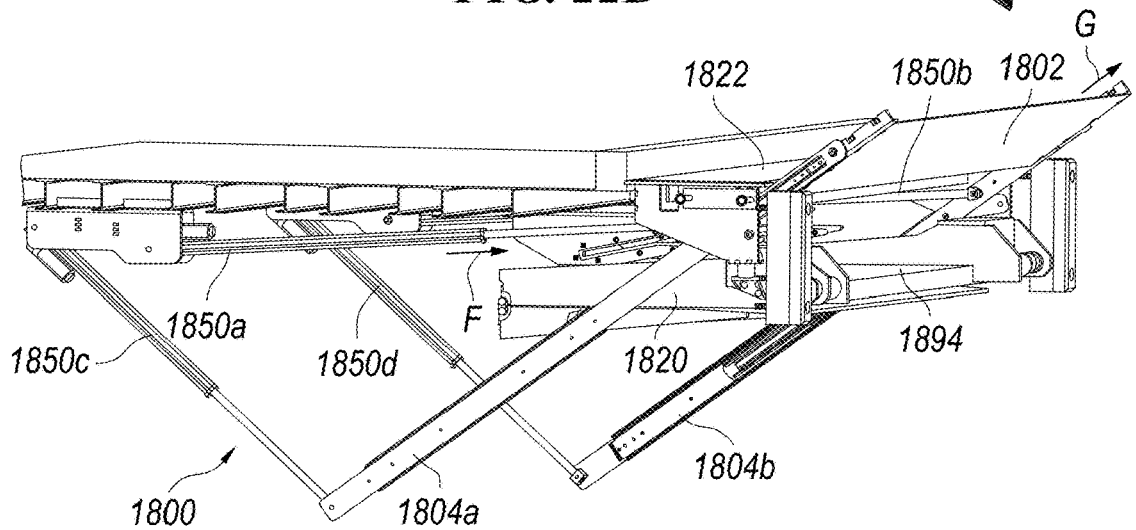
Figure 24D:
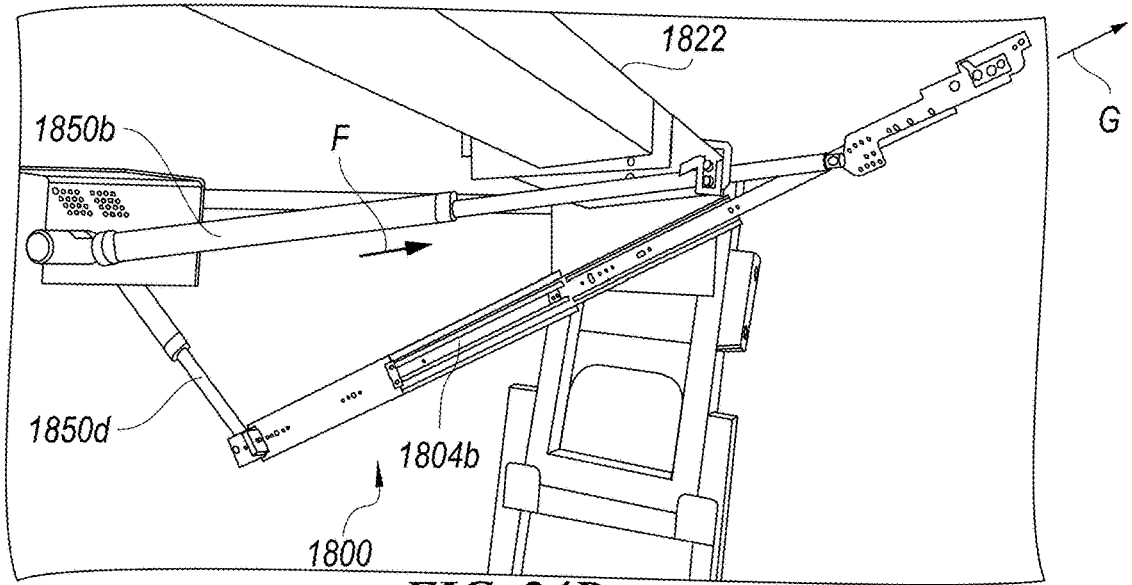

Referring now to FIGS. 22D, 23D, and 24D together, the method continues by further extending the first and second extendable arms 1804a and 1804b and thereby further extending or moving the transfer ramp 1802 outward. More specifically, as best shown in FIGS. 23D and 24D, the first actuator 1850a and/or the second actuator 1850b can be extended in a direction generally along or parallel to arrow F. Extension of the first actuator 1850a and/or the second actuator 1850b in the direction generally along or parallel to the arrow F can extend the first and second extendable arms 1804a and 1804b in a direction generally along or parallel to arrow G (e.g., by exerting a pushing force on the distal portions of the first and second extendable arms 1804a and 1804b). In this manner, the transfer ramp 1802 can be moved up through the gap G (FIG. 22A) between the top platform 1822 and the top surface 232. During this process, the third actuators 1850c and/or the fourth actuator 1850d may be stationary or may be actuated (e.g., extended and/or retracted, such as at a same or different rate from the first and second actuators 1850a and 1850b) in addition to and/or while the first and second actuators 1850a and/or 1850d, respectively, are extended.

Figure 23E:
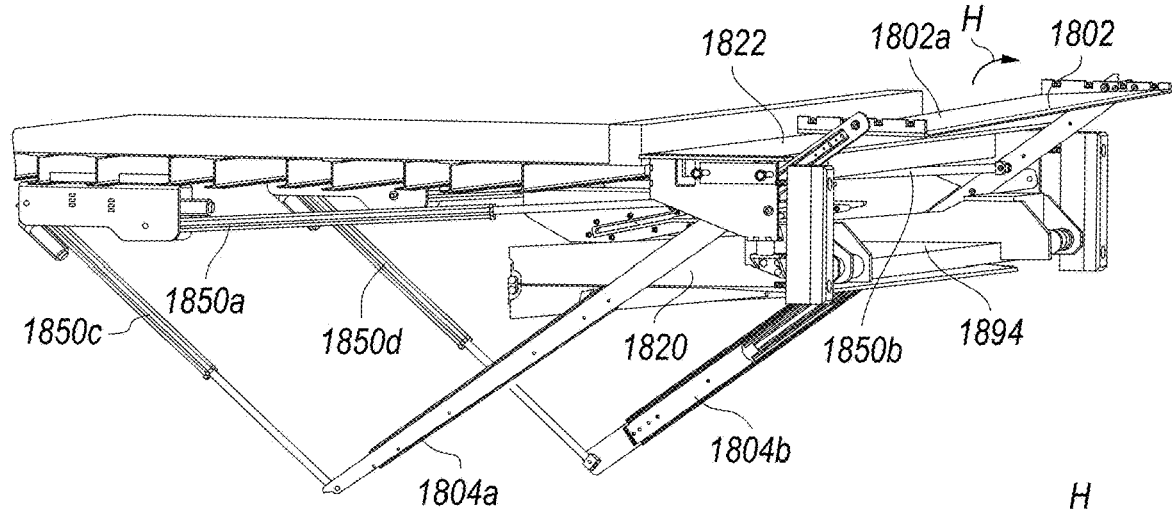
Figure 24E:
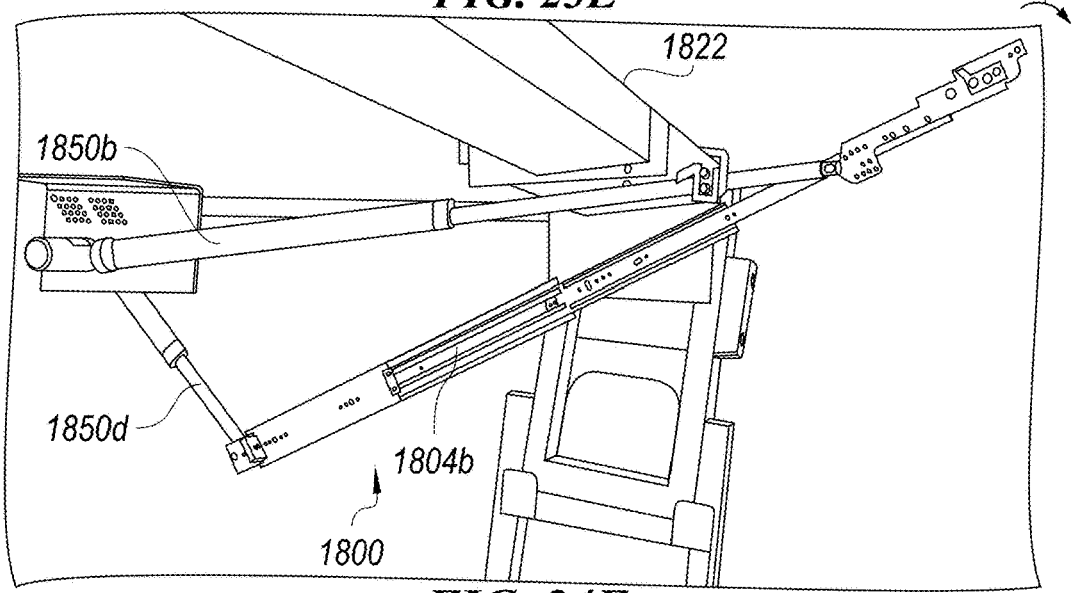

Referring now to FIGS. 22E, 23E, and 24E together, the method continues by rotating or pivoting the transfer ramp 1802 from the stowed orientation/stored arrangement (FIGS. 22D and 23D) to a deployed orientation/deployed arrangement (e.g., in which the transfer ramp 1802 is relatively flat or horizontal, and/or in which top surface 1802a (FIG. 23G) and/or a bottom surface 1802b (FIGS. 22E and 23E) of the transfer ramp 1802 is/are brought more into alignment with the top platform 1822 and/or the top surface 232 of the other structure 230). In some embodiments, rotating or pivoting the transfer ramp 1802 can include rotating or pivoting the transfer ramp 1802 in a direction generally along or parallel to arrow H. In some embodiments, rotating or pivoting the transfer ramp 102 can include releasing a latchable portion (e.g., a latchable portion 2509 illustrated in FIGS. 25A-25D, a latchable portion 2609 illustrated in 26A-26E, and/or a latchable portion 2909 of FIGS. 29A and 29B) of the transfer ramp 1802 from a release latch (e.g., a cable release latch 2511 illustrated in FIGS. 25A-25D, a cable release latch 2611 illustrated in FIGS. 26A-26E, and/or a first notch 2914a illustrated in FIGS. 29A and 29B) of the ramp latching system 1810, such as by actuating the release latch via an actuation mechanism (e.g., a thumb latch shown in FIG. 22E) and/or a cable (not shown). In these and other embodiments, rotating or pivoting the transfer ramp 1802 can include rotating or pivoting the transfer ramp 1802 using one or more springs (e.g., one or more torsion springs) and/or by extending struts 1807 (FIGS. 26A-26E) (e.g., such that the transfer ramp 1802 pivots about hinge pins and/or points at which the first and second extendable arms 1804a and 1804b are attached to the transfer ramp 1802). In these and other embodiments, rotating or pivoting the transfer ramp 1802 can include pushing on the transfer ramp 1802 or otherwise manually rotating or pivoting the transfer ramp 1802.

Figure 23F:
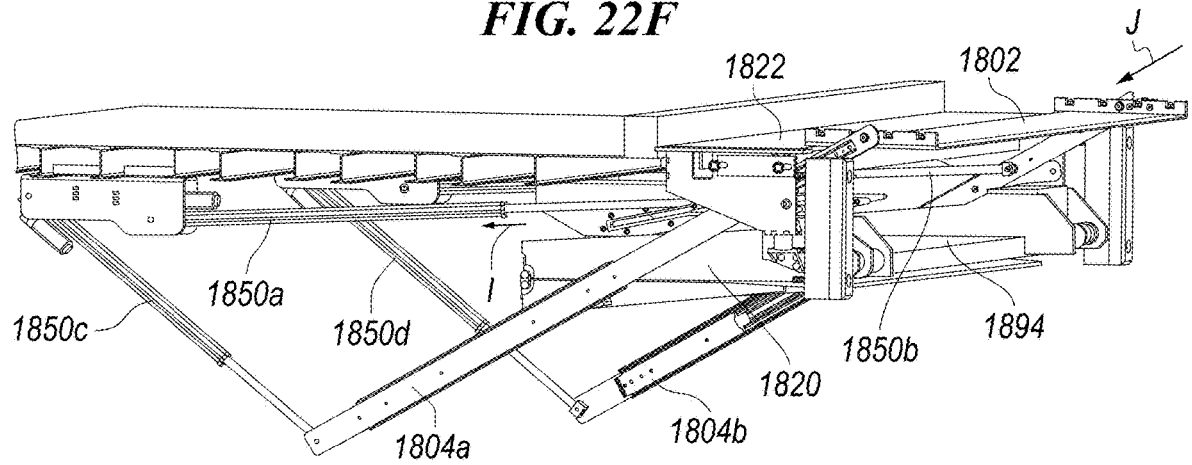
Figure 24F:
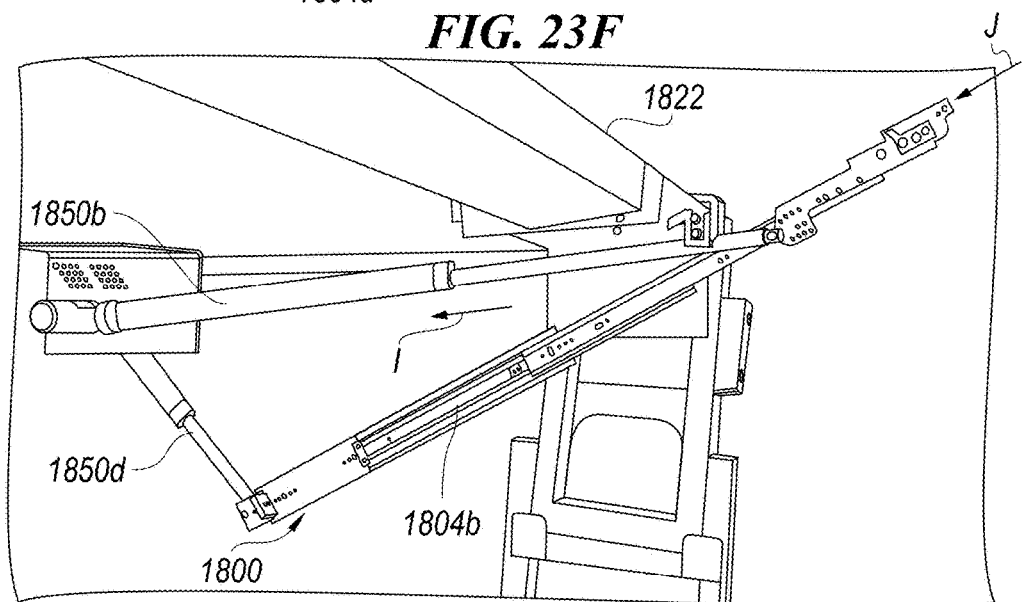

Referring next to FIGS. 22F, 23F, and 24F together, the method continues by retracting the first and second extendable arms 1804a and 1804b and thereby retracting or lowering the transfer ramp 1802 toward the top platform 1822 and the top surface 232 while the transfer ramp 1802 is in the generally flat or horizonal orientation (or in another orientation that is more in alignment with the top platform 1822 of the liftgate 120 than the stowed orientation of the transfer ramp 1802). More specifically, as best shown in FIGS. 23F and 24F, the first actuator 1850a and/or the second actuator 1850b can be retracted in a direction generally along or parallel to arrow I. Retraction of the first actuator 1850a and/or the second actuator 1850b in the direction generally along or parallel to the arrow I can retract the first and second extendable arms 1804a and 1804b in a direction generally along or parallel to arrow J (e.g., by exerting a pulling force on the distal portions of the first and second extendable arms 1804a and 1804b). During this process, the third actuators 1850c and/or the fourth actuator 1850d may be stationary or may be actuated (e.g., extended and/or retracted, such as at a same or different rate from the first and second actuators 1850a and 1850b) in addition to and/or while the first and second actuators 1850a and/or 1850d, respectively, are retracted. As (i) the first and second actuators 1850a and 1850b are retracted while (ii) the third and fourth actuators 1850c and 1850d are stationary and/or actuated, the transfer ramp 1802 can be lowered such that at least a portion of the bottom surface 1802b of the transfer ramp 1802 is positioned above the top surface 232 of the other structure 230 and at least another portion of the bottom surface 1802b is positioned above the top platform 1822. In these and other embodiments, lowering the transfer ramp 1802 can include lowering the transfer ramp 1802 until a portion of the bottom surface 1802b of the transfer ramp 1802 rests on the top surface 232 of the other structure 230, another portion of the bottom surface 1802b rests on the top platform 1822, and/or the transfer ramp 1802 spans (e.g., bridges) the gap G (FIG. 22A).

Figure 23G:
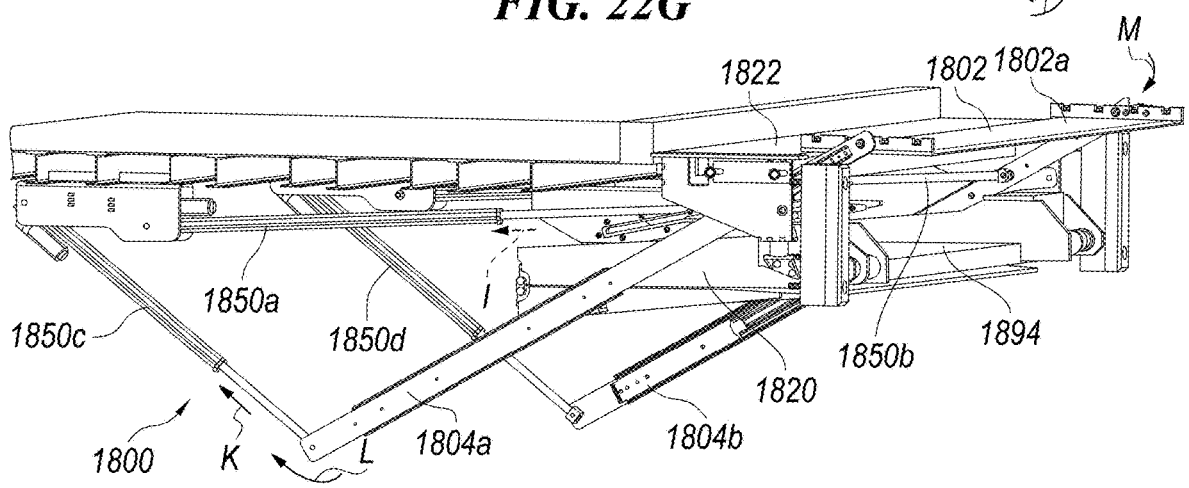
Figure 24G:
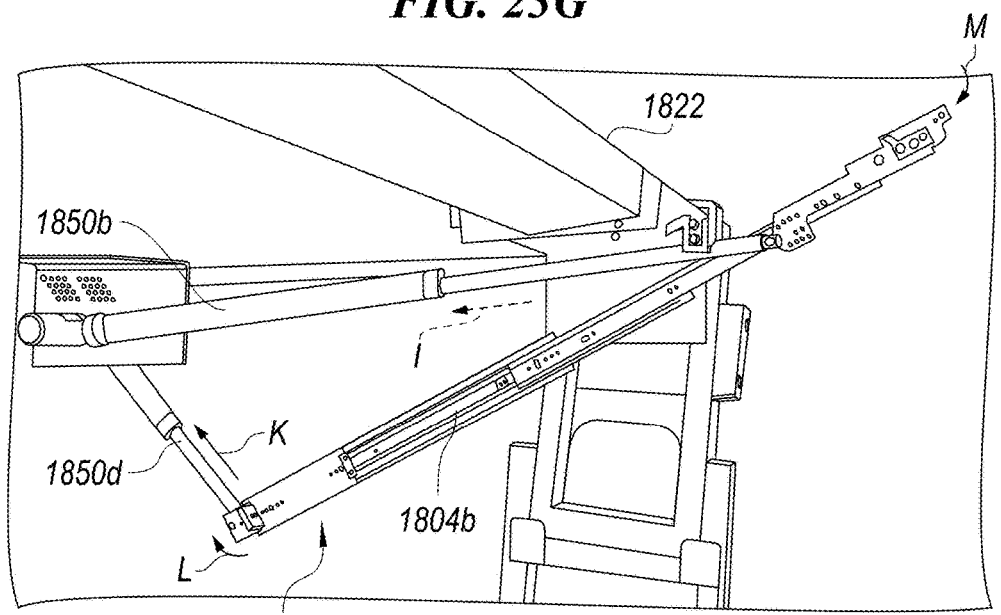

Referring now to FIGS. 22G, 23G, and 24G together, the method optionally continues by rotating or pivoting the first and second extendable arms 1804a and 1804b. More specifically, as best shown in FIGS. 23G and 24G, the third actuator 1850c and/or the fourth actuator 1850d can be retracted in a direction generally along or parallel to arrow K. Retraction of the third actuator 1850c and/or the fourth actuator 1850d in the direction generally along or parallel to the arrow K can, at least while the first actuator 1850a and/or the second actuator 1850b are stationary or retracting at a slower rate, (i) rotate and/or vertically raise proximal portions of the first and second extendable arms 1804a and 1804b in a direction generally along or parallel to arrow L, (ii) adjust (e.g., decrease) a pitch of the first and second extendable arms 1804a and 1804b, and/or (iii) pivot the first and second extendable arms 1804a and 1804b (e.g., generally about the point at which the first and second extendable arms 1804a and 1804b are operably coupled to the first and second actuators 1850a and 1850b). In some embodiments, the first actuator 1850a and/or the second actuator 1850b may optionally be extended in addition to and/or while the third and fourth actuators 1850c and 1850d, respectively, are retracted. As the third and fourth actuators 1850c and 1850d are retracted while the first and second actuators 1850a and 1850b are stationary, retracted at a slower rate, or are extended, a force can be exerted on distal portions of the first and second extendable arms 1804a and 1804b in a direction generally along or parallel to arrow M, and/or the distal portion of the first and/or second extendable arms 1804a and 1804b can be rotated, pivoted, and/or vertically lowered in the direction generally along or parallel to the arrow M.

Rotating and/or retracting the first and second extendable arms 1804a and 1804b in this manner can exert forces on the transfer ramp 1802 and/or on the corresponding hinges/pivot points connecting the transfer ramp 1802 to the first and second extendable arms 1804a and 1804b. In turn, these forces can bend (e.g., deform, warp) the transfer ramp 1802 such that the transfer ramp 1802 is conformed to the top platform 1822 and/or the top surface 232 (e.g., to deal with any misalignment and/or to provide a suitably flat surface across which cargo can be transferred, as discussed above with reference to the system 100 of FIGS. 1-8L). For example, as portions of the transfer ramp 1802 contact the top platform 1822 and/or the top surface 232, corresponding actuators 1850 can overcurrent and cease extending or retracting while other ones of the actuators 1850 continue to extend or retract, thereby conforming the transfer ramp 1802 to the arrangement of the top platform 1822 and/or the top surface 232.

Additionally, or alternatively, the forces exerted on the transfer ramp 1802 and/or on the corresponding hinges/pivot points from tilting and/or retracting the first and second extendable arms 1804a and 1804b can be used to overcome misalignment (e.g., between opposite sides of the top platform 1822, between opposite sides of the top surface 232, and/or between the top platform 1822 and the top surface 232) and/or to change the height of (i) top platform 1822 on the vehicle/trailer that includes the system 1800 and/or (ii) the top surface 232 of the other structure 230. For example, tilting and/or retracting the first and second extendable arms 1804a and 1804b after the transfer ramp 1802 initially contacts the top platform 1822 and the top surface 232 can press or smash the transfer ramp 1802 into the top platform 1822 and the top surface 232 to bring the top platform 1822 and the top surface 232 into closer alignment with one another and/or to bring the transfer ramp 102 closer to a relatively flat, horizonal, or level orientation. As a specific example, consider a scenario in which the top platform 1822 is initially positioned at a lower height than the top surface 232. In this scenario, titling and/or retracting the first and second extendable arms 1804a and 1804b beyond the point at which the transfer ramp 1802 initially contacts the top platform 1822 and the top surface 232 can lower the height of the top surface 232 (e.g., via the suspension of a vehicle corresponding to the other structure 230 that includes the top surface 232) and/or can raise the height of the top platform 1822 (e.g., via an upwards force that results as the transfer ramp 1802 is pushed down into the top surface 232). As a result, the height of the top platform 1822 can be brought into alignment with the height of the top surface 232, meaning that the transfer ramp 1802 can be brought to (or at least closer to) a generally flat, horizontal, or level orientation thereby making transfers of cargo across the transfer ramp 1802 easier.

As another specific example, consider a scenario in which a first side of the top platform 1822 (e.g., proximate the first extendable arm 1804a) is positioned higher than a second side of the top platform 1822 (e.g., proximate the second extendable arm 1804b). When a first side of the transfer ramp 1802 makes initial contact with the first side of the top platform 1822 and the second side of the transfer ramp 1802 is not in contact with the second side of the top platform 1822, both the first and second extendable arms 1804a and 1804b can continue to be retracted. In some embodiments, this can force the first side of the transfer ramp 1802 down into the first side of the top platform 1822 to lower the height of the first side of the top platform 1822 relative to the second side of the top platform 1822 (e.g., using the suspension of the vehicle/trailer that includes the system 1800). Lowering the height of the first side of the top platform 1822 relative to the second side of the top platform 1822 can bring the second side of the transfer ramp 1802 into contact with the second side of the top platform 1822, thereby (a) leveling the transfer ramp 1802 and/or the top platform 1822 and/or (b) eliminating, reducing, or minimizing a roadblock or obstacle posed by the second side of the transfer ramp 1802 to transferring cargo across at least the second side of the transfer ramp 1802.

With the transfer ramp 1802 positioned as shown in FIG. 22G, the method continues by transferring cargo across the top surface 1802a (FIG. 23G) of the transfer ramp 102. For example, cargo (e.g., a pallet or other object) can be loaded into the vehicle/trailer by transferring the cargo from the top surface 232 of the other structure 230, across the top surface 1802a of the transfer ramp 1802, and onto the top platform 1822. Additionally, or alternatively, cargo can be unloaded from the vehicle/trailer by transferring the cargo from the top platform 1822, across the top surface 1802a of the transfer ramp 1802, and onto the top surface 232 of the other structure 230.

Figure 23H:
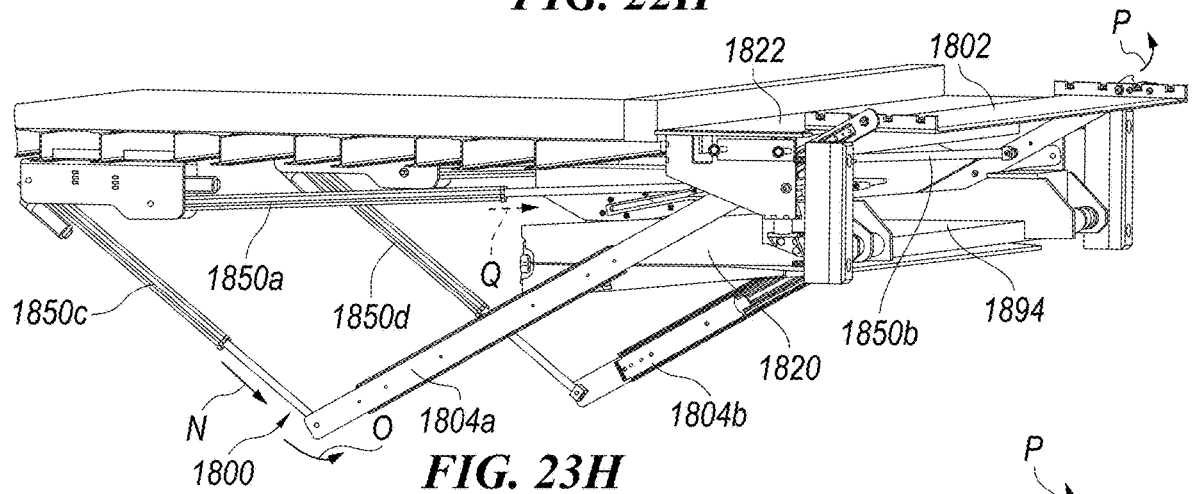
Figure 24H:
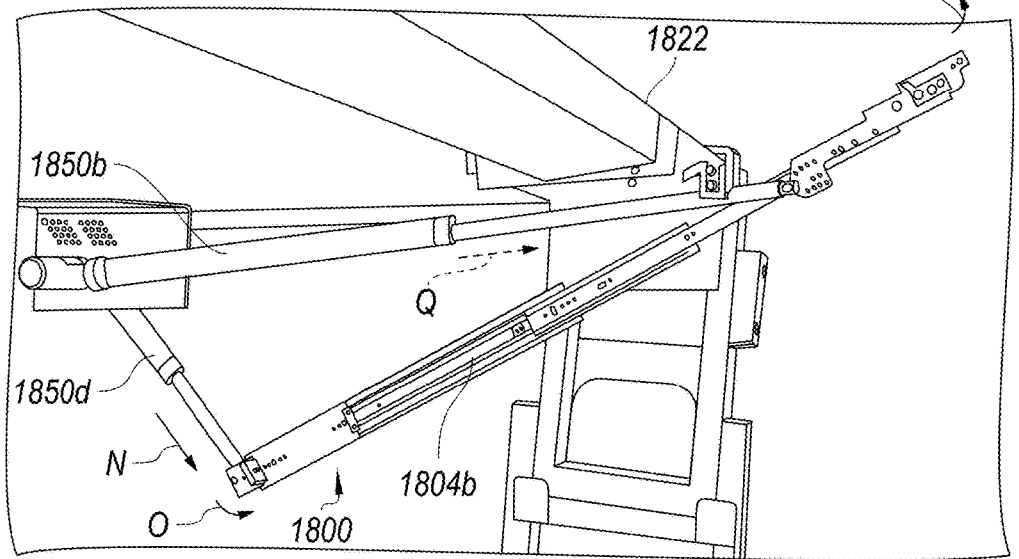

Referring next to FIGS. 22H, 23H, and 24H together, the method optionally continues by tilting the first and second extendable arms 1804a and 1804b. More specifically, as best shown in FIGS. 23H and 24H, the third actuator 1850c and/or the fourth actuator 1850*d* can be extended in a direction generally along or parallel to arrow N. Extension of the third actuator 1850*c* and/or the fourth actuator 1850*d* in the direction generally along or parallel to the arrow N can, at least while the first actuator 1850*a* and/or the second actuator 1850*b*, respectively, are stationary and/or extended at a slower rate, (i) rotate and/or vertically lower proximal portions of the first and second extendable arms 1804*a* and 1804*b* in a direction generally along or parallel to arrow O, (ii) adjust (e.g., increase) a pitch of the first and second extendable arms 1804*a*, and/or (iii) pivot the first and second extendable arms 1804*a* and 1804*b* (e.g., generally about a point at which the first and second extendable arms 1804*a* and 1804*b* are operably coupled to the first and second actuators 1850*a* and 1850*b*). In some embodiments, the first actuator 1850*a* and/or the second actuator 1850*b* may optionally be retracted (e.g., at a same or different rate than the third and fourth actuators 1850*c* and 1850*d*) in addition to and/or while the third and fourth actuators 1850*c* and 1850*d*, respectively, are extended. As (i) the third and fourth actuators 1850*c* and 1850*d* are extended while (ii) the first and second actuators 1850*a* and 1850*b* are stationary, extended (e.g., at a same or slower rate than the third and fourth actuators 1850*c* and 1850*d*), or are retracted, the forces exerted (e.g., on the transfer ramp 1802 and/or on the corresponding hinges/pivot points connecting the transfer ramp 1802 to the first and second extendable arms 1804*a* and 1804*b*) at the step of the method illustrated in FIGS. 22G, 23G, and 24G above can be lessened or removed, and/or the distal portion of the first and/or second extendable arms 1804*a* and 1804*b* can be moved (e.g., rotated, tilted, pivoted, vertically raised) generally along the arrow P. In embodiments in which the transfer ramp 1802 is resiliently deformable, removal of the forces can permit the transfer ramp 1802 to return to or toward its initial or default state prior to application of the forces at the step illustrated by FIGS. 22G, 23G, and 24G.

Figure 23I:
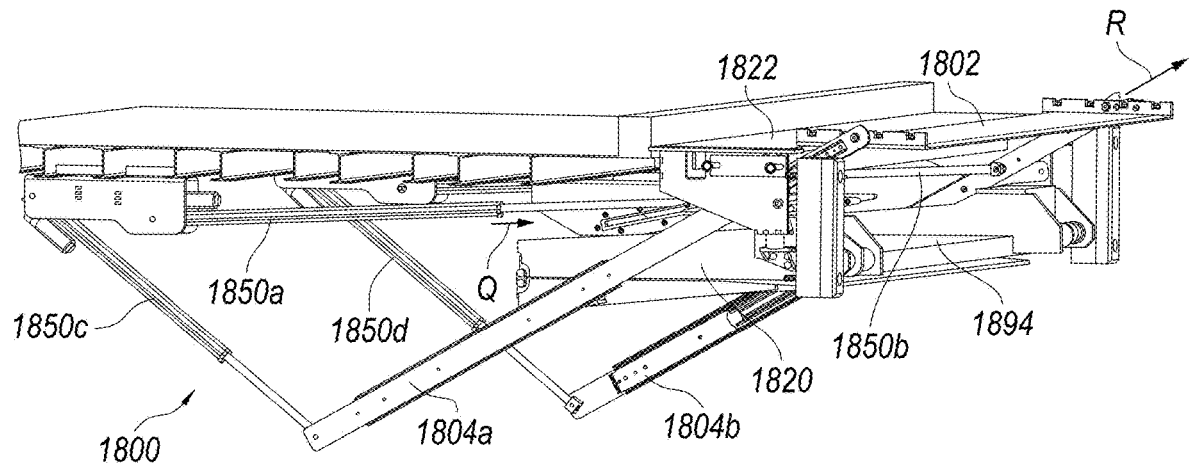
Figure 24I:
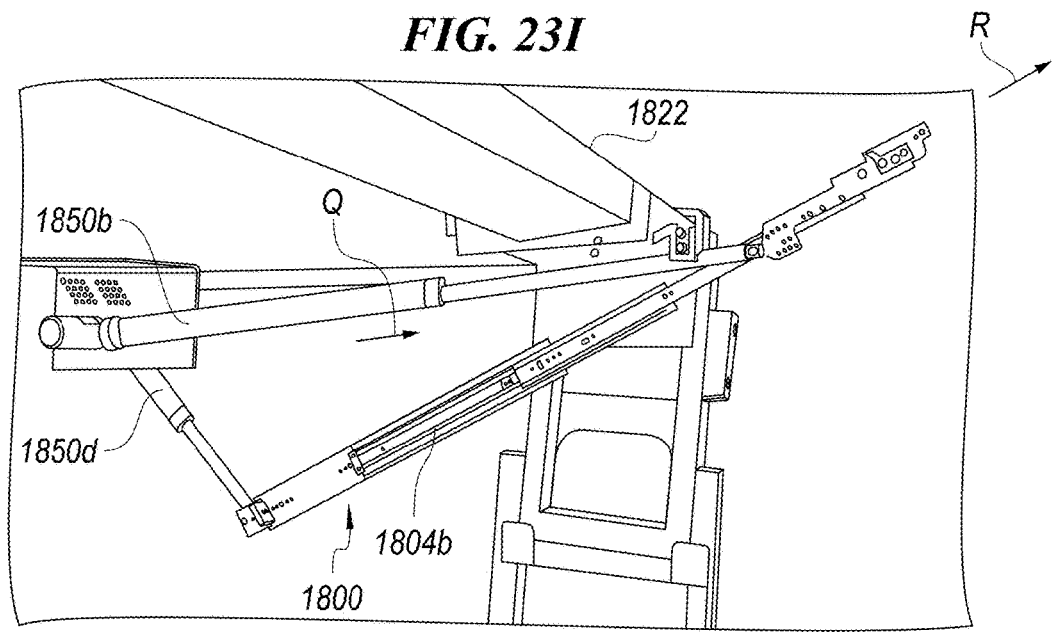

Referring now to FIGS. 22I, 23I, and 24I together, the method continues by extending the first and second extendable arms 1804*a* and 1804*b* and thereby extending or moving the transfer ramp 1802 outward. More specifically, as best shown in FIGS. 23I and 24I, the first actuator 1850*a* and/or the second actuator 1850*b* can be extended in a direction generally along or parallel to arrow Q. Extension of the first actuator 1850*a* and/or the second actuator 1850*b* in the direction generally along or parallel to the arrow Q can extend the first and second extendable arms 1804*a* and 1804*b* in a direction generally along or parallel to arrow R (e.g., by exerting a pushing force on the distal portions of the first and second extendable arms 1804*a* and 1804*b*). In this manner, the transfer ramp 1802 can be raised above the top platform 1822 and the top surface 232. During this process, the third actuators 1850*c* and/or the fourth actuator 1850*d* may be stationary or may be actuated (e.g., extended and/or retracted, such as at a same or different rate from the first and second actuators 1850*a* and 1850*b*) in addition to and/or while the first and second actuators 1850*a* and/or 1850*d*, respectively, are extended.

Figure 23J:
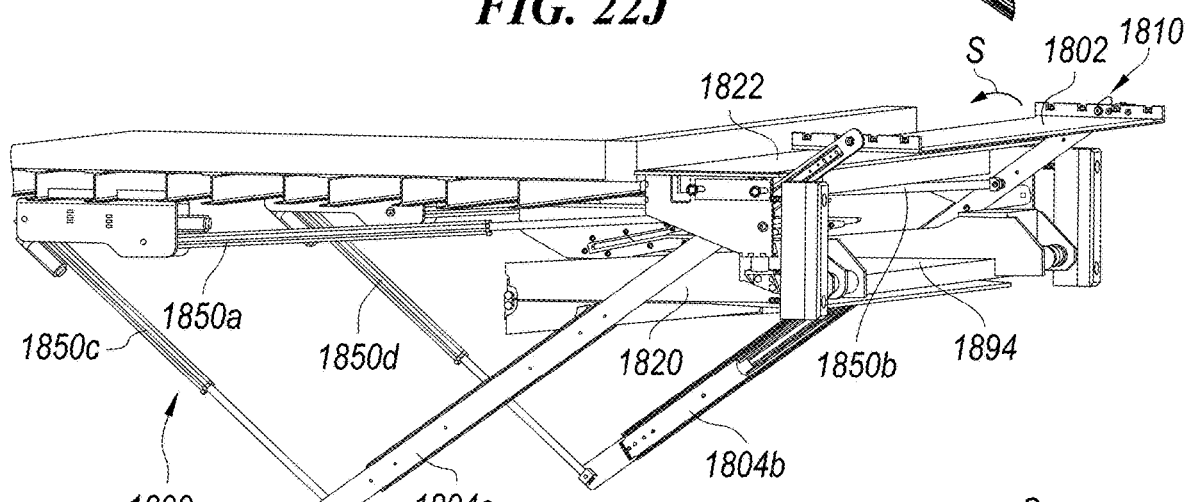
Figure 24J:
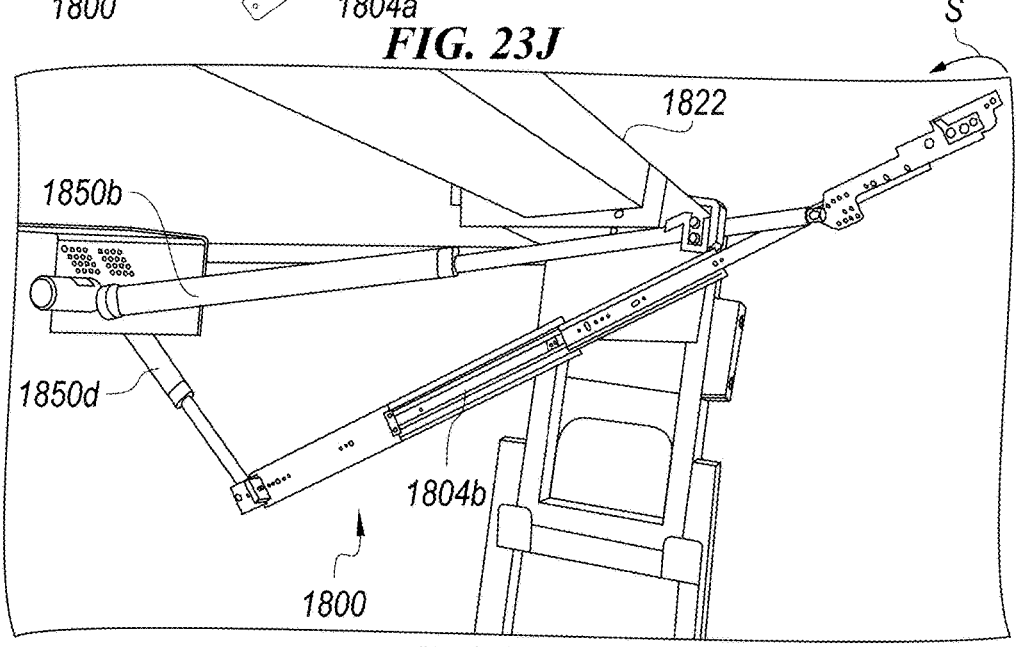

Referring now to FIGS. 22J, 23J, and 24J together, the method continues by rotating or pivoting the transfer ramp 1802 to the stowed orientation. In some embodiments, rotating or pivoting the transfer ramp 1802 to the stowed orientation can include rotating or pivoting the transfer ramp 1802 in a direction generally along or parallel to the arrow S. In these and other embodiments, rotating or pivoting the transfer ramp 1802 can include rotating or pivoting the transfer ramp 1802 using a transfer ramp storage system, such as a transfer ramp storage system discussed in greater detail below with reference to FIGS. 25A-25D and/or a transfer ramp storage system discussed in greater detail below with reference to FIGS. 26A-26E. In these and still other embodiments, rotating or pivoting the transfer ramp 1802 can include rotating or pivoting the transfer ramp 1802 using one or more springs (e.g., one or more torsion springs), and electric motor, and/or by retracting struts 1807 (FIGS. 26A-26E) (e.g., such that the transfer ramp 1802 pivots about hinge pins and/or points at which the first and second extendable arms 1804*a* and 1804*b* are attached to the transfer ramp 1802). In these and other embodiments, rotating or pivoting the transfer ramp 1802 can include pushing on the transfer ramp 1802 or otherwise manually rotating or pivoting the transfer ramp 1802 toward the stowed orientation and/or until a latchable portion of the transfer ramp 1802 is engaged with and/or held by a latch.

Figure 23K:
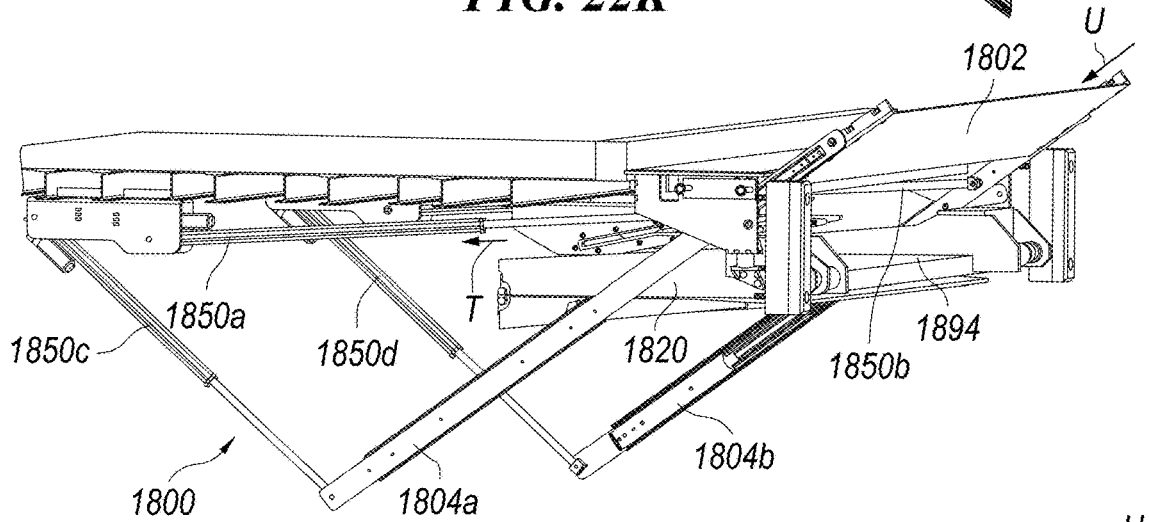
Figure 24K:
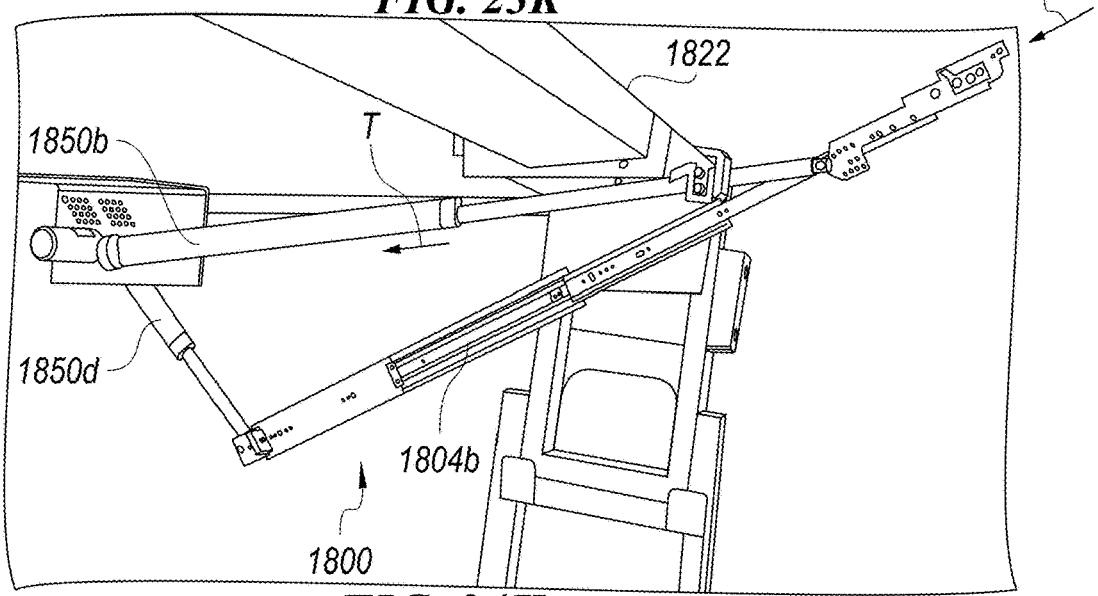

Referring now to FIGS. 22K, 23K, and 24K together, the method continues by retracting the first and second extendable arms 1804*a* and 1804*b* and thereby retracting or lowering the transfer ramp 1802 in the stowed orientation and/or down through the gap G between the top platform 1822 and the top surface 232 of the other structure 230. More specifically, as best shown in FIGS. 23K and 24K, the first actuator 1850*a* and/or the second actuator 1850*b* can be retracted in a direction generally along or parallel to arrow T. Retraction of the first actuator 1850*a* and/or the second actuator 1850*b* generally along or parallel to the arrow T can retract the first and second extendable arms 1804*a* and 1804*b* in a direction generally along or parallel to arrow U (e.g., by exerting a pulling force on the distal portions of the first and second extendable arms 1804*a* and 1804*b*). During this process, the third actuators 1850*c* and/or the fourth actuator 1850*d* may be stationary or may be actuated (e.g., extended and/or retracted, such as at a same or different rate from the first and second actuators 1850*a* and 1850*b*) in addition to and/or while the first and second actuators 1850*a* and/or 1850*d*, respectively, are retracted.

Figure 23L:
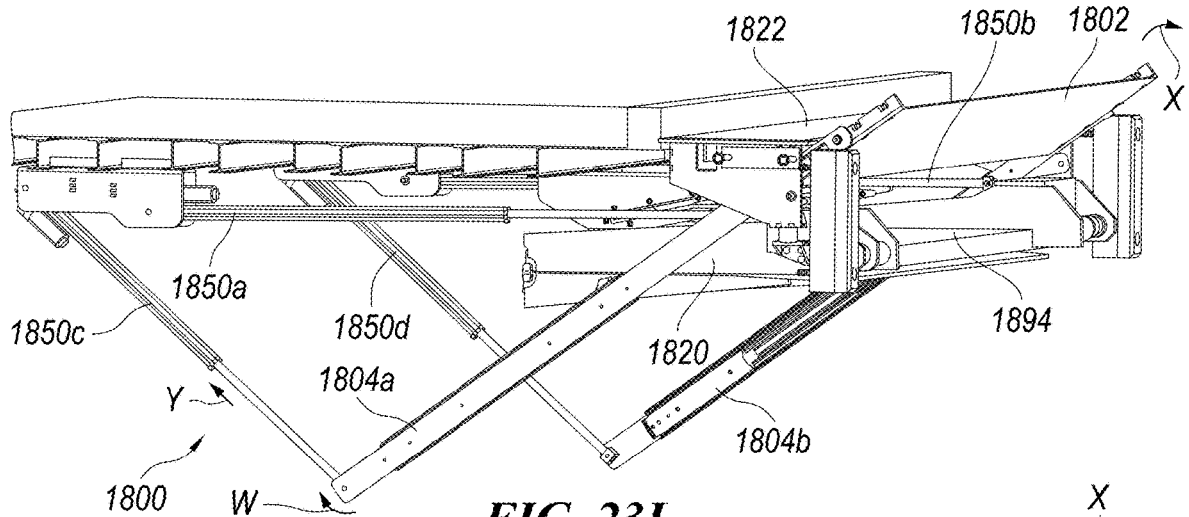
Figure 24L:
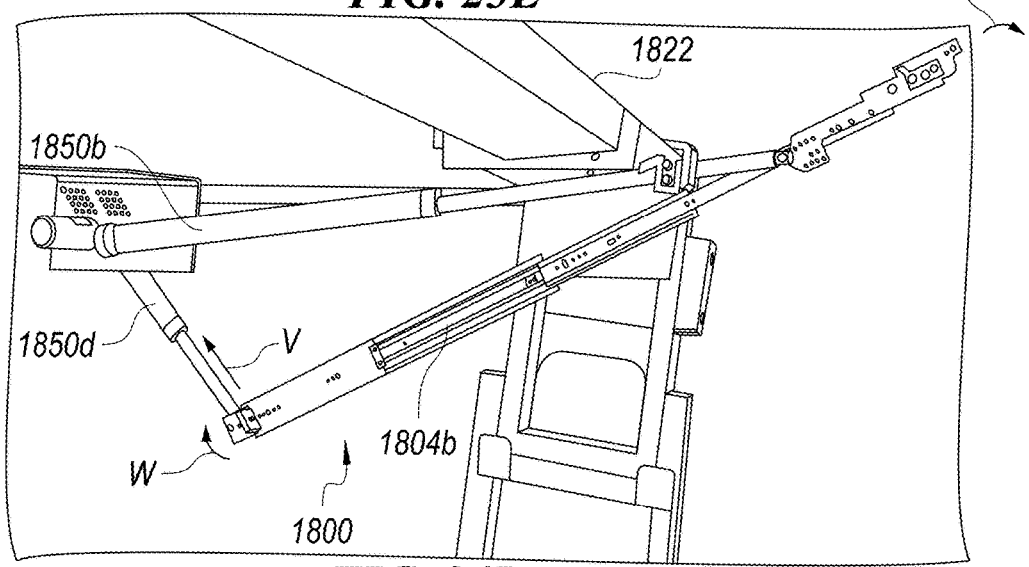

Referring now to FIGS. 22L, 23L, and 24L together, the method continues by rotating the first and second extendable arms 1804*a* and 1804*b*. More specifically, as best shown in FIGS. 23L and 24L, the third actuator 1850*c* and/or the fourth actuator 1850*d* can be retracted in a direction generally along or parallel to arrow V. Retraction of the third actuator 1850*c* and/or the fourth actuator 1850*d* in the direction generally along or parallel to the arrow V can, at least while the first actuator 1850*a* and/or the second actuator 1850*b*, respectively, are stationary and/or retracted at a slower rate, (i) rotate and/or vertically raise proximal portions of the first and second extendable arms 1804*a* and 1804*b* in a direction generally along or parallel to arrow W, (ii) adjust (e.g., decrease) a pitch of the first and second extendable arms 1804*a* and 1804*b* and/or of the transfer ramp 1802, and/or (iii) pivot the first and second extendable arms 1804*a* and 1804*b* (e.g., generally about a point at which the first and second extendable arms 1804*a* and 1804*b* are operably coupled to the first and second actuators 1850*a* and 1850*b*). In some embodiments, the first actuator 1850*a* and/or the second actuator 1850*b* may optionally be extended (e.g., at a same or different rate than the third and fourth actuators 1850*c* and 1850*d*) in addition to and/or while the third and fourth actuators 1850*c* and 1850*d*, respectively, are extended. As (i) the third and fourth actuators 1850*c* and 1850*d* are retracted while (ii) the first and second actuators 1850*a* and 1850*b* are stationary, retracted at a slower rate, or are extended, (a) the distal portions of the first and second extendable arms 1804*a* and 1804*b* and/or (b) the back lip/edge of the transfer ramp 1802 can be moved (e.g., rotated, tilted, pivoted, vertically lowered) in a direction generally along or parallel to arrow X.

Figure 23M:
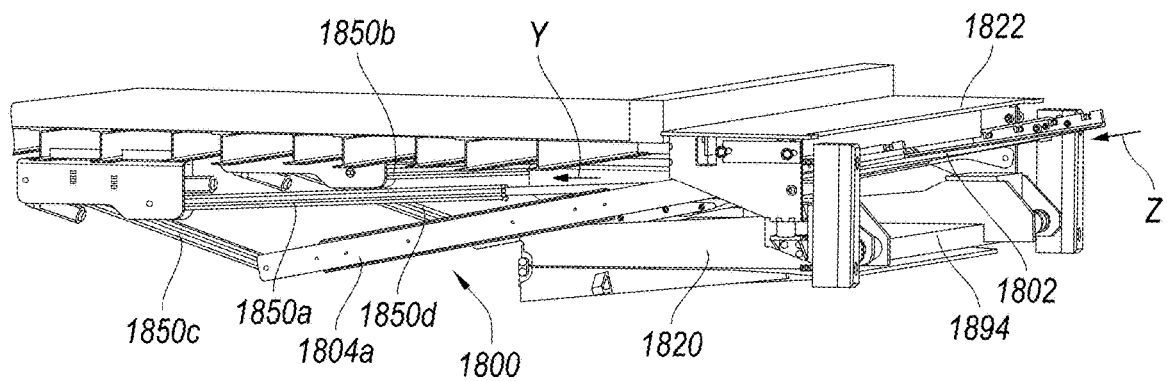
Figure 24M:
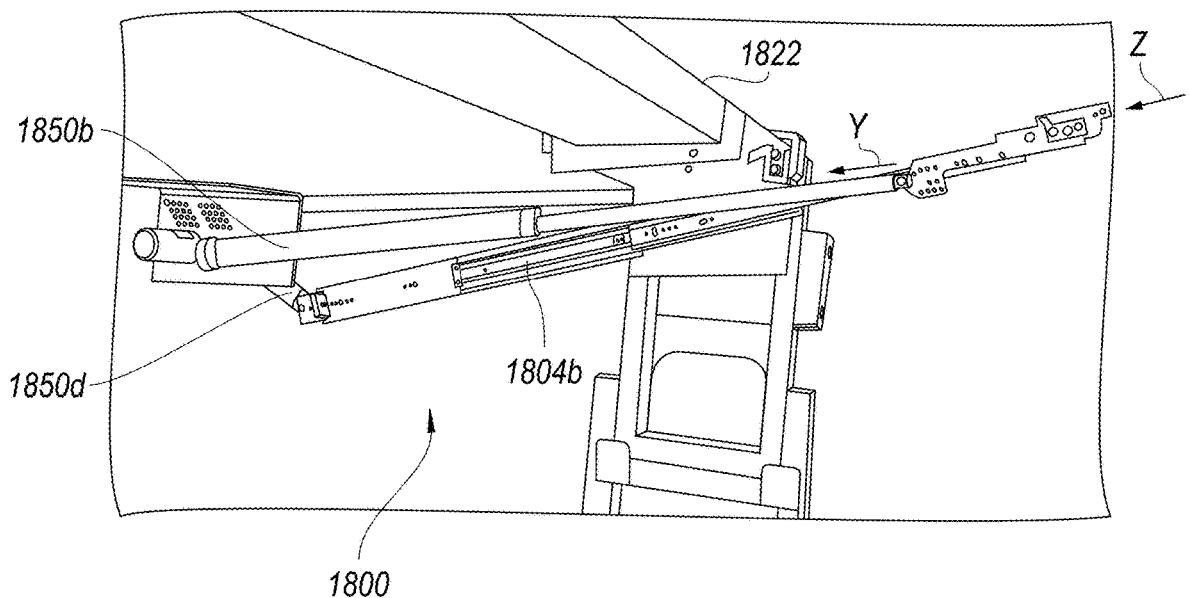
Figure 23N:
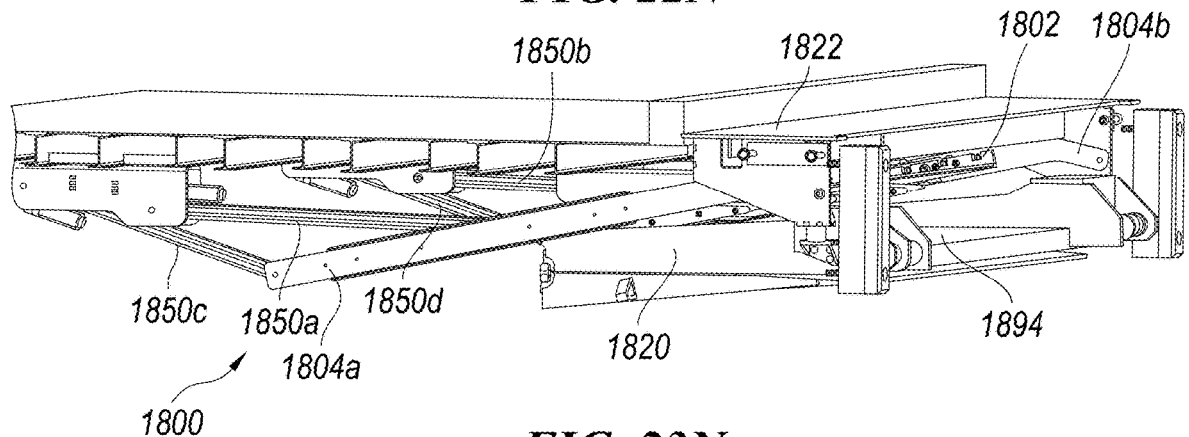

Referring next to FIGS. 22M, 23M, and 24M together, the method continues by further retracting the first and second extendable arms 1804*a* and 1804*b* and thereby further retracting or lowering the transfer ramp 1802. More specifically, as best shown in FIGS. 23M and 24M, the first actuator 1850*a* and/or the second actuator 1850*b* can be retracted in a direction generally along or parallel to arrow Y. Retraction of the first actuator 1850*a* and/or the second actuator 1850*b* in the direction generally along or parallel to the arrow Y can retract the first and second extendable arms 1804*a* and 1804*b* in a direction generally along or parallel to arrow Z (e.g., by exerting a pulling force on the distal portions of the first and second extendable arms 1804*a* and 1804*b*). During this process, the third actuators 1850*c* and/or the fourth actuator 1850*d* may be stationary or may be actuated (e.g., extended and/or retracted, such as at a same or different rate from the first and second actuators 1850*a* and 1850*b*) in addition to and/or while the first and second actuators 1850*a* and/or 1850*d*, respectively, are retracted.

Figure 24N:
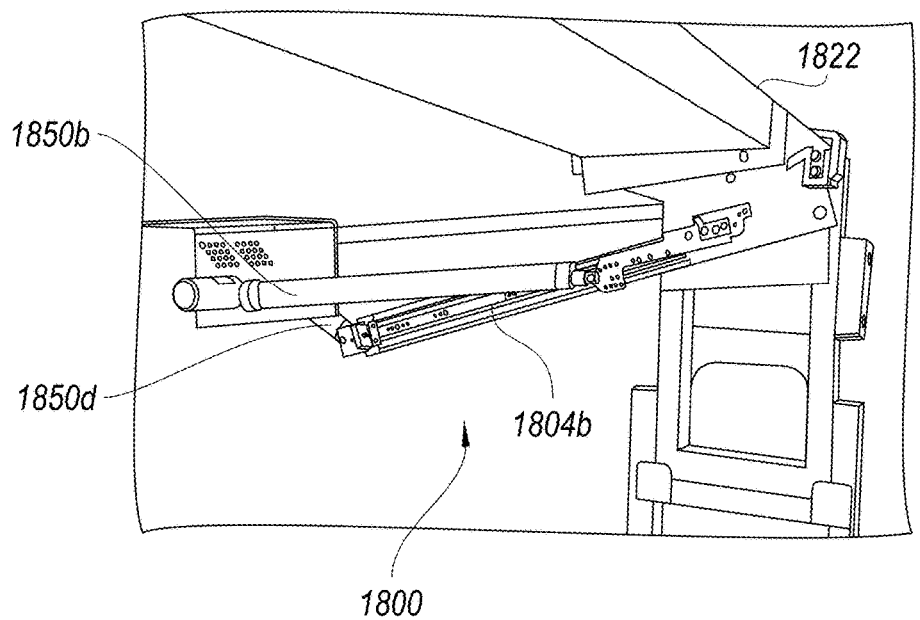

Referring now to FIGS. 22N, 23N, and 24N together, the method continues by returning the system 1800 to the stowed position or state beneath the top platform 1822 and above the liftgate 1820. In some embodiments, the system 1800 can include bump stops and/or storage/stowage stops for the transfer ramp 1802. For example, returning the system 1800 to the stowed position can include retracting the first and second extendable arms 1804*a* and 1804*b* (and/or controlling the third actuator 1850*c* and/or the fourth actuator 1850*d*) until the transfer ramp 1802 contacts bump stops that are composed of rubber and/or another suitable material, and/or that are positioned beneath the top platform 1822 of the liftgate 1820. In this manner, the bump stops can limit further inward motion of the transfer ramp 1802 (e.g., in a direction generally toward the front of the vehicle/trailer) beneath the top platform 1822. As another example, the system 1800 can include a storage/stowage stop that is composed of rubber or another suitable material and/or that may function at least partially as a bump stop.

Figure 34A:
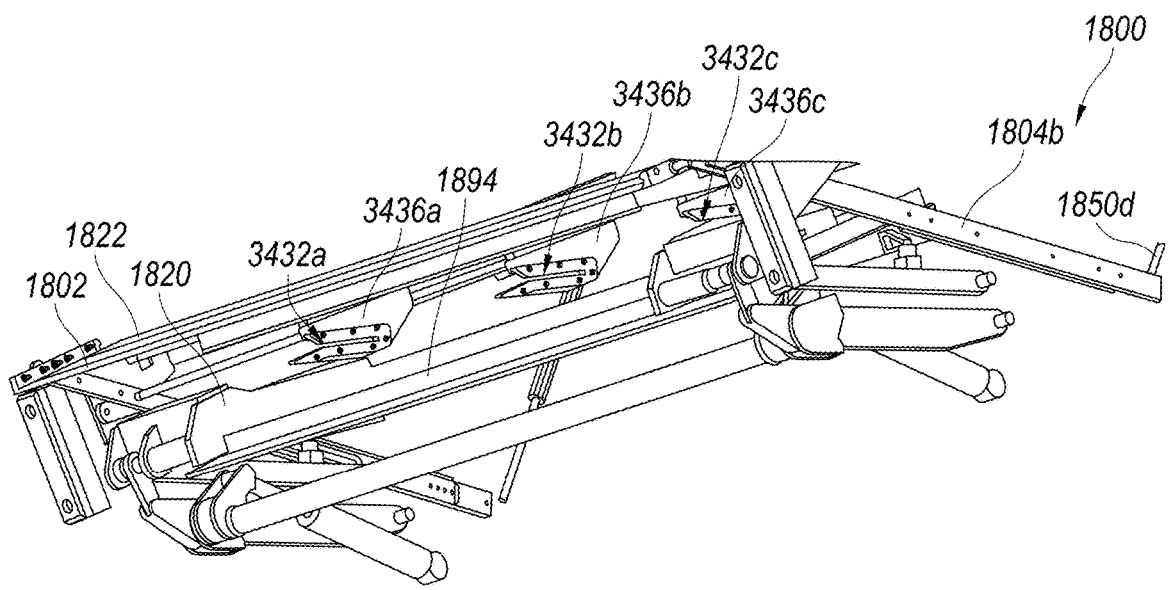
FIGS. 34A-34C are partially schematic perspective views of a stowage stop of a transfer ramp system configured in accordance with various embodiments of the present technology.
Figure 34B:
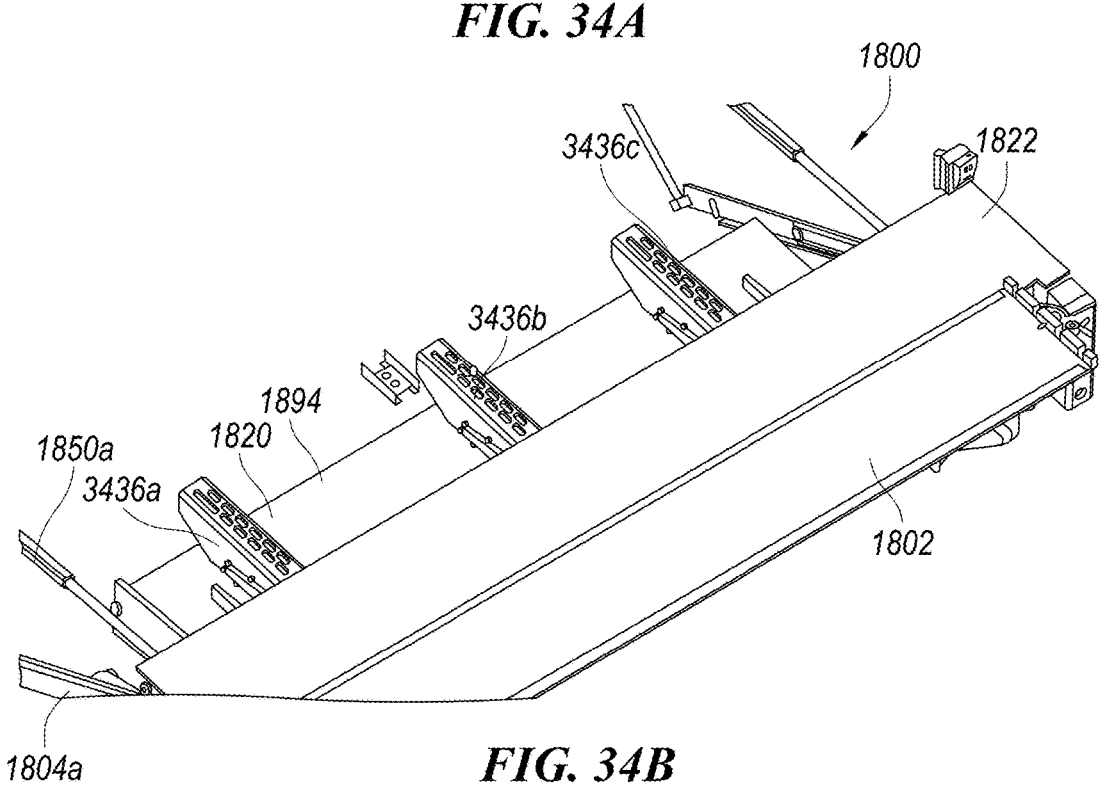
Figure 34C:
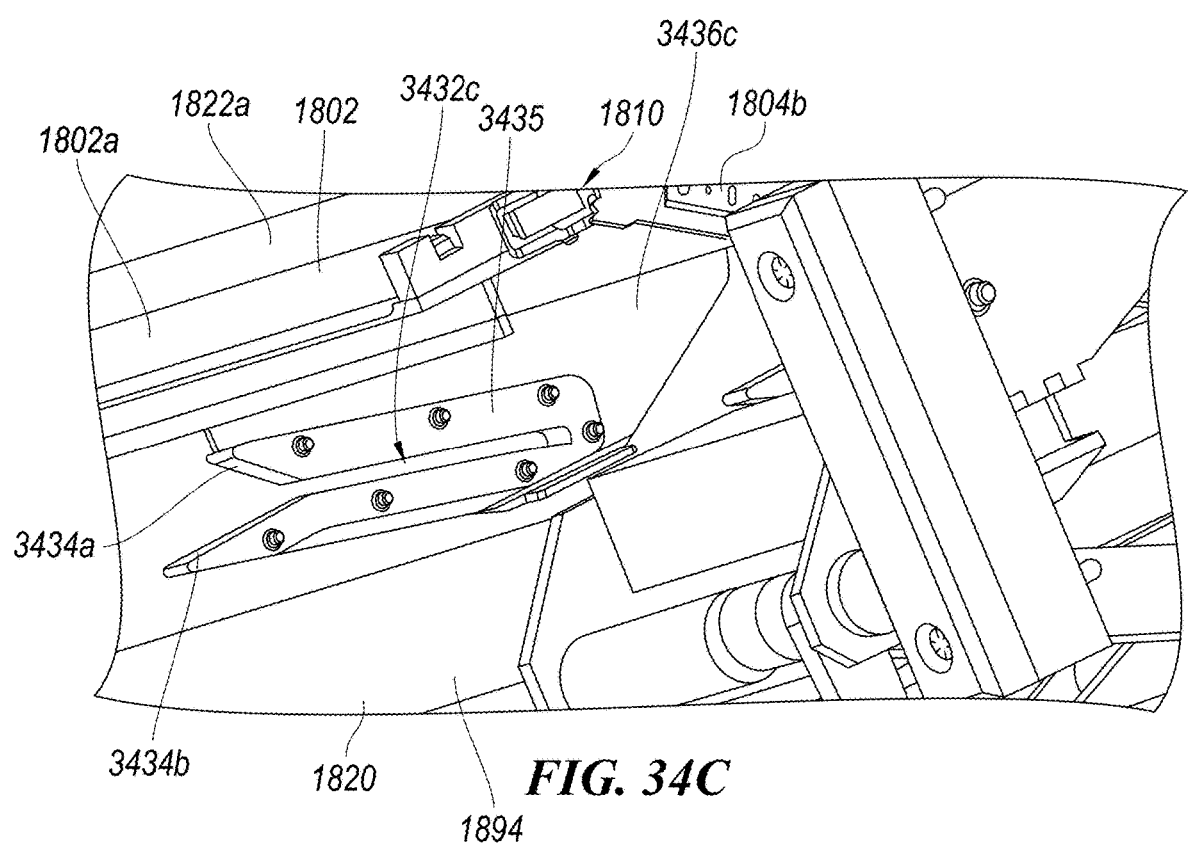

FIGS. 34A-34C are partially schematic perspective views of the system 1800 illustrating an example of such a storage/stowage stop. Components of this stowage stop are also shown in FIG. 22N. Referring to FIGS. 34A and 34B, the stowage stop includes three stowage brackets 3436 (identified individually in FIGS. 34A and 34B as first stowage bracket 3436*a*, second stowage bracket 3436*b*, and third stowage bracket 3436*c*). As shown, the stowage brackets 3436*a*-3436*c* are positioned (i) at least partially above the liftgate 1820 and (ii) beneath the top platform 1822 and/or the frame rails 1891 (FIG. 22N) of the vehicle/trailer. In some embodiments, the stowage brackets 3436 can be mounted directly or indirectly to/beneath the top platform 1822 and/or the frame rails 1891 of the vehicle/trailer, such as using upper clamps 3437 (FIG. 22N) or brackets that are generally similar to the upper clamps 1816 discussed above with reference to FIGS. 18A and 18B.

As best shown in FIG. 34C, each of the stowage brackets 3436*a*-3436*c* can include a corresponding slot or notch 3432*a*-3432*c*, respectively, that is configured to receive a portion of the transfer ramp 1802 as the transfer ramp 1802 is retracted to the stowed position. The notches 3432*a*-3432*c* can each include a bumper 3435 made of rubber, plastic, or another suitable material. Additionally, or alternatively, the notches 3432*a*-3432*c* can each include a pie- or wedge-shaped opening or slot that is configured to receive the transfer ramp 1802. For example, each of the notches 3432*a*-3432*c* can include a first ramp portion 3434*a* (or first tapered surface) and/or a second ramp portion 3434*b* (or second tapered surface) that are configured to guide the transfer ramp 1802 into the corresponding one of the notches 3432*a*-3432*c* as the transfer ramp 1802 is retracted toward the stowed position. Continuing with this example, as the transfer ramp 1802 is retracted to return the system 1800 to the stowed position, the transfer ramp 1802 can be (e.g., tightly) seated within the notches 3432*a*-3432*c* in the stowage brackets 3436*a*-3436*c*, respectively, of the stowage stop. Thus, the stowage stop is expected to (a) stow the transfer ramp 1802 in a generally flat or horizontal orientation, (b) reduce, prevent, or hinder excessive vibration/movement of the transfer ramp 1802 and/or the system 1800 while the vehicle/trailer is being driven/towed, and/or (c) limit, reduce, or minimize wear and tear on the transfer ramp 1802 and/or one or more of the actuators 1850*a*-1850*c* that may otherwise result from the excessive vibration/movement.

In the embodiment illustrated in FIGS. 34A-34C, the stowage stop includes three stowage brackets 3436*a*-3436*c* with corresponding notches 3432*a*-3432*c*, respectively. As discussed above, the transfer ramp 1802 can be generally flexible (e.g., to address misalignment between the top platform 1822 and a top surface 232 of another structure 230 (FIG. 22N)). Therefore, the stowage brackets 3436*a*-3436*c* can be laterally spaced apart from one another to support the sides and middle of the transfer ramp 1802 at least while the transfer ramp 1802 is seated within the notches 3432*a*-3432*c* (e.g., to limit, prevent, or reduce sagging of the sides and/or middle of the transfer ramp 1802). In other embodiments, a different number of stowage brackets 3436 (e.g., one, two, or more than three stowage brackets 3436) can be used. As a specific example, the second stowage bracket 3436*b* can be omitted in some embodiments. Continuing with this example, the distance between the first stowage bracket 3436*a* and the second stowage bracket 3436*c* can be reduced.

In some embodiments, the transfer ramp 1802 can be generally flexible in a direction generally along or parallel to the longitudinal axis of the vehicle/trailer. In these embodiments, the depths of the notches 3432*a*-3432*c* can be configured to receive enough of the transfer ramp 1802 to support the transfer ramp 1802 in the direction generally along or parallel to the longitudinal axis of the vehicle/trailer (e.g., to prevent, limit, or reduce sagging of the transfer ramp 1802 in this direction at least while the transfer ramp 1802 is seated within the notches 1832*a*-1832*c*). For example, as best shown in FIG. 22N, the notches 1832*a*-1832*c* can be configured to receive the transfer ramp 1802 such that the transfer ramp 1802, when fully seated in the notches 1832*a*-1832*c*, is supported by the stowage brackets 3436*a*-3436*c* to a point 2249 or axis around which the transfer ramp 1802 is configured to rotate when released from the ramp latching system 1810. As specific examples, the notches 1832*a*-1832*c* can be configured to receive the transfer ramp 1802 such that the transfer ramp 1802, when fully seated in the notches 1832*a*-1832*c*, is supported by the stowage brackets 3436*a*-3436*c* beyond a midpoint of the transfer ramp 1802 and/or to points located beyond the ends of the extendable arms 1804*a* and 1804*b*, such as to points beyond or along the ramp latching system 1810.

Although the steps of the methods described herein (e.g., with reference to FIGS. 22A-24N and/or 34A-34C) are discussed and/or illustrated in a particular order, the methods described herein are not so limited. In other embodiments, the methods described herein can be performed in different orders. In these and other embodiments, any of the steps of the methods described herein can be performed before, during, and/or after any of the other steps of the methods described herein. Furthermore, a person skilled in the art will readily recognize that the methods described herein can be altered and still remain within these and other embodiments of the present technology. For example, one or more steps of the methods described herein can be omitted and/or repeated in some embodiments.

FIGS. 25A-25D are perspective views of a transfer ramp stowage system 2515 configured in accordance with various embodiments of the present technology. As shown, the transfer ramp stowage system 2515 includes a ramp latching system 2510 and a ramp tilting system 2575. The ramp latching system 2510 can be generally similar to the ramp latching system 110 described above with reference to the system 100 of FIGS. 1-8L. For example, the ramp latching system 2510 can include a cable release latch 2511 (e.g., similar to an automotive hood latch or another suitable type of latch) that is configured to releasably hold a latchable portion 2509 of the transfer ramp 1802. The latchable portion 2509 can be released from the cable release latch 2511 via a cable 2512 and a corresponding actuation mechanism (not shown). As shown, the ramp tilting system 2575 includes a cable 2582 and a pulley system 2580. The cable 2582 is attached at one end to the transfer ramp 1802, is routed through a loop of the pulley system 2580 and/or across a pulley of the pulley system 2580, and is attached at another end to a portion (e.g., a mounting bracket 1806, an extendable arm 1804) of the system 1800, to the top platform 1822, to the liftgate 1820, and/or to the vehicle/trailer.

In operation, the ramp latching system 2510 is configured to hold the transfer ramp 1802 in the stowed orientation. More specifically, the ramp latching system 2510 releasably holds the latchable portion 2509 of the transfer ramp 1802 in the cable release latch 2511 until the cable 2512 and the corresponding actuation mechanism (not shown) is used to release the cable release latch 2511. Thereafter, the transfer ramp 1802 is permitted to pivot or rotate from the stowed orientation to a generally flat or horizontal orientation shown in FIGS. 25A and 25B. To return the transfer ramp 1802 to the stowed orientation, the first and second extendable arms 1804a and 1804b can be extended in a direction generally along or parallel to arrow A (FIG. 25B) such that the cable 2582 is brought taught against the pulley system 2580 (as shown in FIG. 25C). Continued extension of the first and second extendable arms 1804a and 1804b in the direction generally along or parallel to the arrow A exerts a force on the transfer ramp 1802 via the cable 2582 that pivots or rotates the transfer ramp 1802 in a direction generally along or parallel to arrow B shown in FIG. 25C (e.g., until the transfer ramp 1802 is returned to the stowed orientation in which the latchable portion 2509 transfer ramp 1802 is engaged with and is held by the cable release latch 2511 of the ramp latching system 2510, as shown in FIG. 25D).

In some embodiments, the transfer ramp stowage system 2515 can include a structure (not shown) that houses or is otherwise configured to protect the cable 2582 and/or the pulley system 2580 of the ramp tilting system 2575. For example, the structure can include a side bracket that includes a channel or groove through which the cable 2582 can be routed between the transfer ramp 1802 and the portion of the system 1800, the top platform 1822, the liftgate 1820, and/or the vehicle/trailer attached to an opposite end of the cable 2582). Housing the cable 2582, the pulley system 2580, and/or other components of the ramp tilting system 2575 in the structure can protect these components from damage, such as from a pallet, a pallet jack, a user, the liftgate 1820, and/or another object.

FIGS. 26A-26E are partially schematic perspective views of another transfer ramp stowage system 2615 configured in accordance with various embodiments of the present technology. As shown, the transfer ramp stowage system 2615 includes a ramp latching system 2610 and a ramp tilting system 2675. The ramp latching system 2610 is generally similar to the ramp latching system 110 described above with reference to the system 100 of FIGS. 1-8L. For example, the ramp latching system 2610 includes a cable release latch 2611 (e.g., similar to an automotive hood latch or another suitable type of latch) that is configured to releasably hold a latchable portion 2609 of the transfer ramp 1802. The latchable portion 2609 can be released from the cable release latch 2611 via a cable (not shown) and a corresponding actuation mechanism (not shown). As shown, the ramp tilting system 2675 includes a cable 2682 and a routing mechanism 2680 (e.g., a loop, slot, pulley, and/or another feature). The cable 2682 is attached at one end to the transfer ramp 1802 at a location 2685, is routed across or through the routing mechanism 2680, and is attached at another end to a portion (e.g., a mounting bracket 1806, an extendable arm 1804) of the system 1800, to the liftgate 1820, and/or to the vehicle/trailer.

In operation, the ramp latching system 2610 is configured to hold the transfer ramp 1802 in the stowed orientation. More specifically, the ramp latching system 2610 releasably holds the latchable portion 2609 of the transfer ramp 1802 in the cable release latch 2611 until the cable (not shown) and the corresponding actuation mechanism (not shown) is used to release the cable release latch 2511. Thereafter, the transfer ramp 1802 is permitted to pivot or rotate from the stowed orientation to a generally flat or horizontal orientation shown in FIGS. 26A-26C. To return the transfer ramp 1802 to the stowed orientation, the first and second extendable arms 1804a and 1804b can be extended in a direction generally along or parallel to arrow B (FIG. 26C) such that the cable 2682 is brought taught against the routing mechanism 2680 (as shown in FIG. 26C). Continued extension of the first and second extendable arms 1804a and 1804b in the direction generally along or parallel to the arrow B exerts a force on the transfer ramp 1802 via the cable 2682 and in a direction generally along or parallel to arrow C (FIG. 26C) that pivots or rotates the transfer ramp 1802 in a direction generally along or parallel to arrow D shown in FIG. 26C (e.g., until the transfer ramp 1802 is returned to the stowed orientation in which the latchable portion 2609 transfer ramp 1802 is engaged with and is held by the cable release latch 2611 of the ramp latching system 2610, as shown in FIGS. 26D and 26E).

In some embodiments, the transfer ramp stowage system 2615 can include a structure (not shown) that houses or is otherwise configured to protect the cable 2682 and/or the routing mechanism 2680 of the ramp tilting system 2675. For example, the structure can include a side bracket that includes a channel or groove through which the cable 2682 can be routed between the transfer ramp 1802 and the portion of the system 1800, the top platform 1822, the liftgate 1820, and/or the vehicle/trailer attached to an opposite end of the cable 2682). Housing the cable 2682, the routing mechanism 2680, and/or other components of the ramp tilting system 2675 in the structure can protect these components from damage, such as from a pallet, a pallet jack, a user, the liftgate 1820, and/or another object.

Figure 26A:
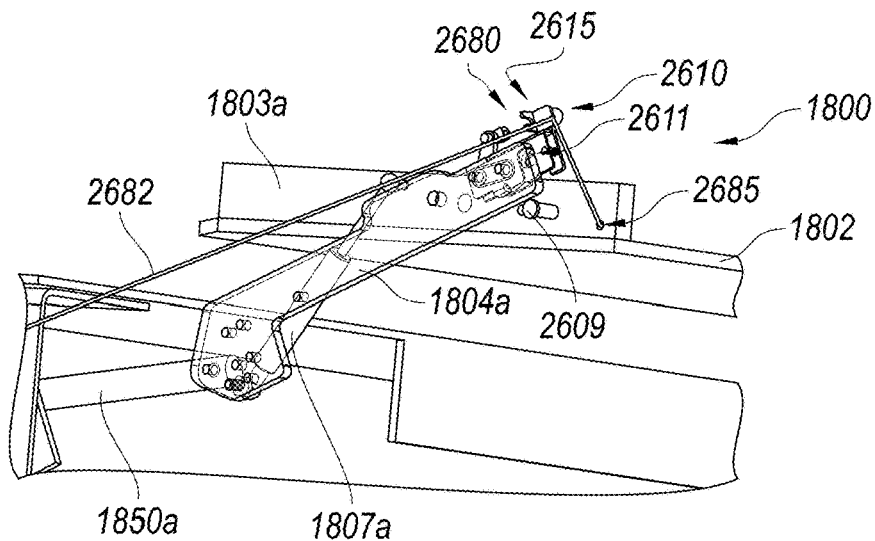
FIGS. 26A-26E are partially schematic views of another transfer ramp stowage system configured in accordance with various embodiments of the present technology.
Figure 26B:
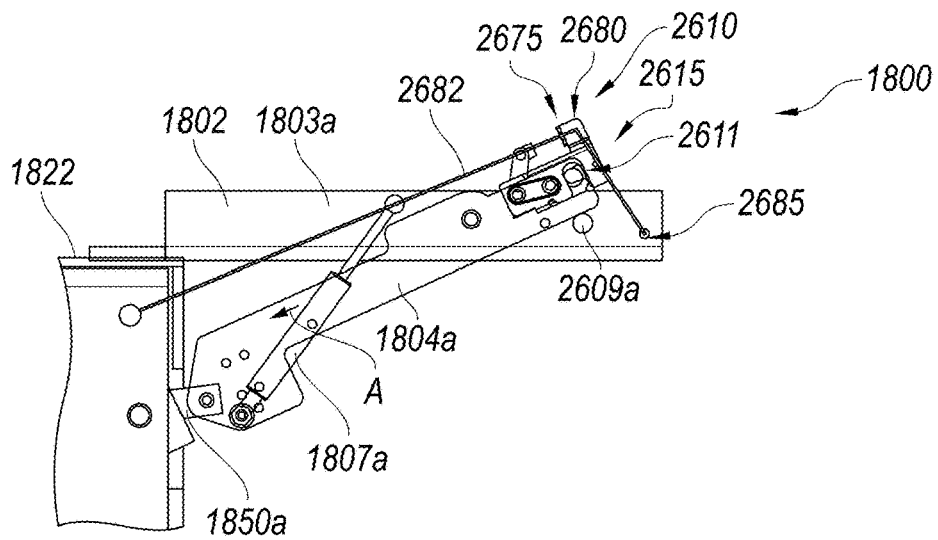
Figure 26C:
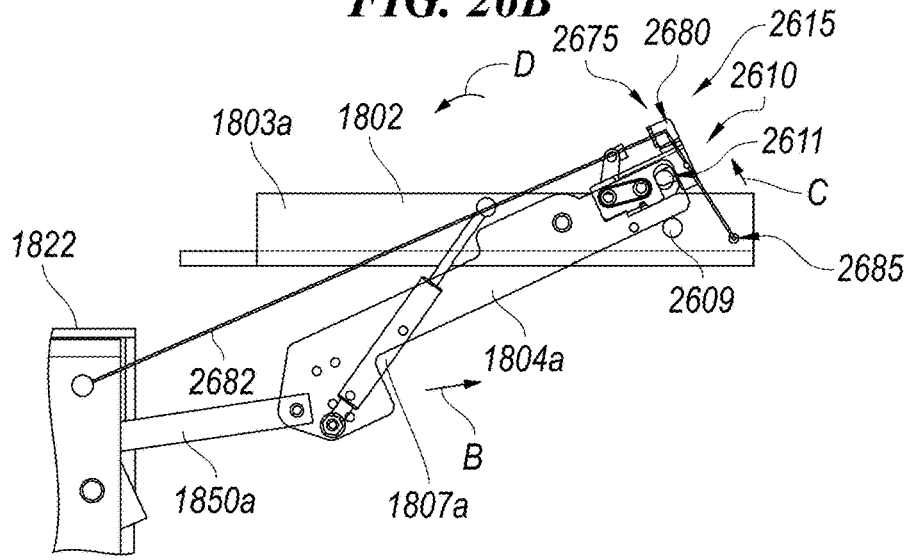
Figure 26D:
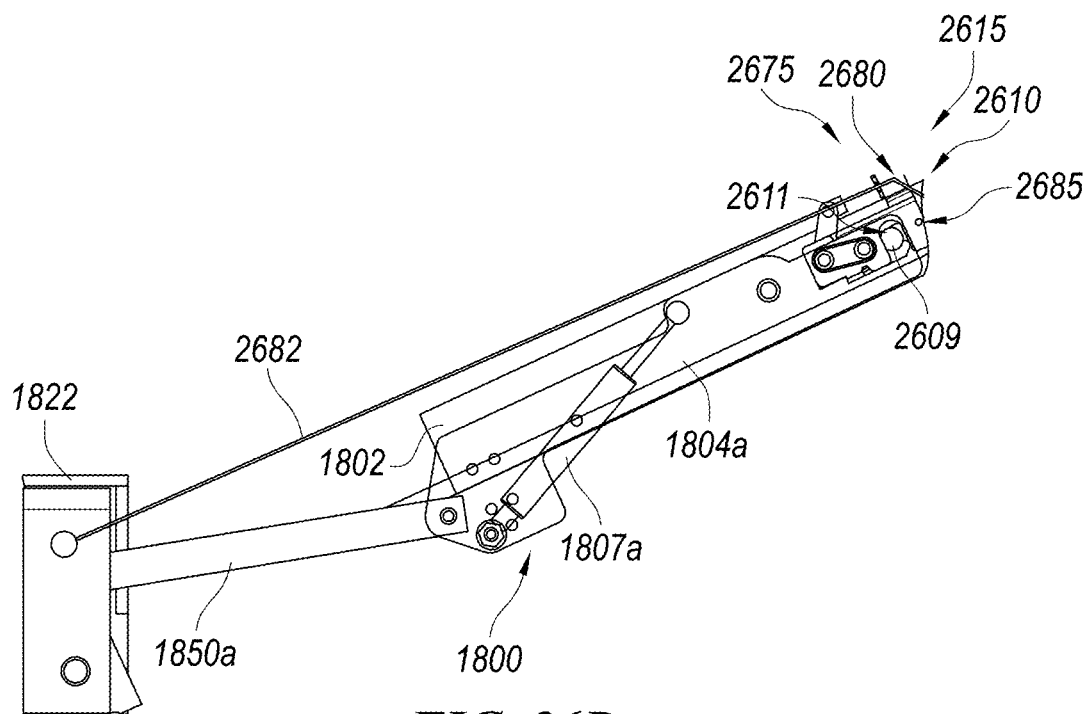
Figure 26E:
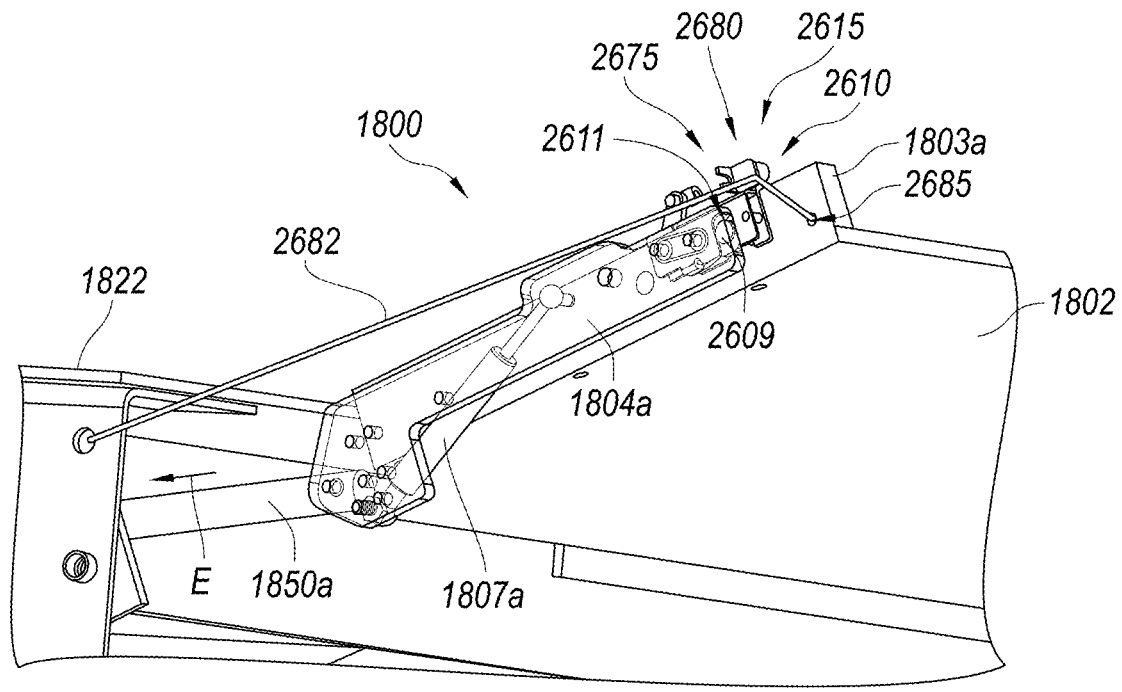

Referring to FIG. 26B, in some embodiments, the cable 2682 can be pulled in a direction generally along or parallel to arrow A. For example, while the transfer ramp 1802 is resting on the top platform 1822 of the liftgate 1820 and/or on the top surface 232 of the other structure 230 (FIGS. 22A-22N), the cable 2682 can be pulled in the direction generally along or parallel to the arrow A. In turn, a front of the transfer ramp 1802 can be pulled upwards in a direction generally along or parallel to the arrow C (FIG. 26C) and thereby exert a downwards force against the back of the transfer ramp 1802 (e.g., to better flatten the transfer ramp 1802 against the top platform 1822).

Figure 27:
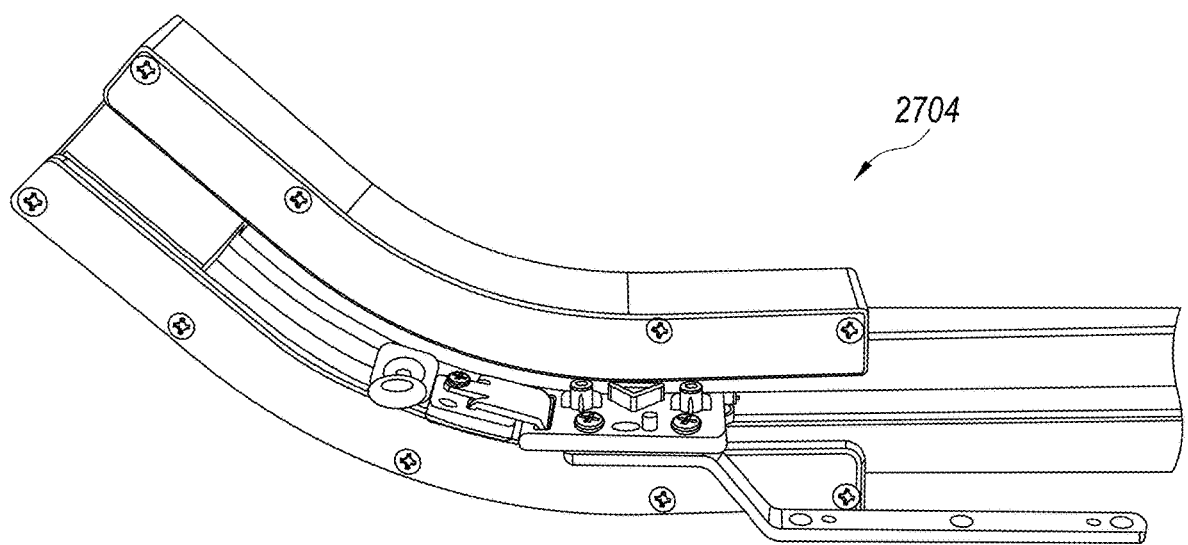
FIG. 27 is a partially schematic perspective view of a curved track configured in accordance with various embodiments of the present technology.

FIG. 27 is a partially schematic perspective view of a curved track 2704 configured in accordance with various embodiments of the present technology. The curved track 2704 can be incorporated into and/or interfaced with the first and second extendable arms 1804a and 1804b in some embodiments, such as to navigate the transfer ramp 1802 through a gap that exists between the top platform 1822 of the liftgate 1820 and a top surface 232 of another structure 230. In some embodiments, the curved track 2704 can be used in addition to or in lieu of the third actuator 1850c and/or fourth actuators 1850d (FIGS. 18A, 18B, and 24A).

Figure 28:
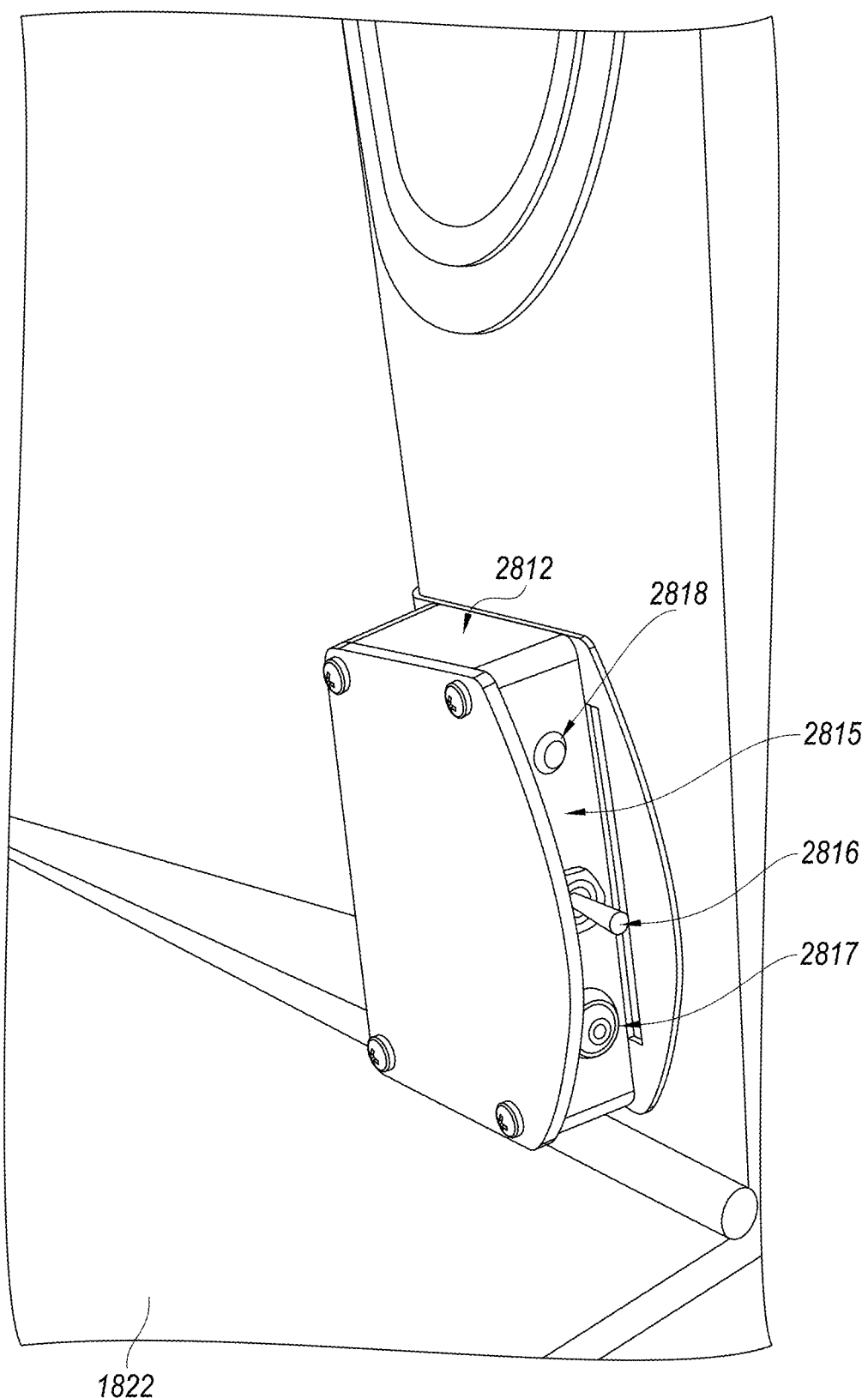
FIG. 28 is a partially schematic perspective view of a user controls arrangement configured in accordance with various embodiments of the present technology.

FIG. 28 is a partially schematic perspective view of a user controls arrangement 2815 configured in accordance with various embodiments of the present technology. As shown, the user controls arrangement 2815 includes a first switch 2816, a second switch 2817, and a visual indicator 2818. In the illustrated embodiment, the first switch 2816 is a momentary switch or a toggle switch, and the second switch 2817 is a button switch. The first switch 2816 and/or the second switch 2817 can be another suitable type of switch in other embodiments of the present technology. The user controls arrangement 2815 further includes a housing 2812 configured to house electronics (not shown) of the system, such as an electronic control unit (ECU) or other controller, microcontroller, processor, integrated circuit, memory, etc. The visual indicator 2818 can be used to notify a user/operator of an error (e.g., with the system; with the configuration of the vehicle/trailer relative to another vehicle, trailer, loading dock, or other structure; etc.) and/or to convey other information to the user/operator.

In some embodiments, the first switch 2816 can be used to extend and/or retract a corresponding transfer ramp system. For example, when an operator actuates the first switch 2816 (e.g., by pressing the first switch 2816 in a first direction, such as up), the user controls arrangement 2815 can cause the transfer ramp system to deploy or extend the transfer ramp, such as from beneath the rear platform of the truck or trailer. Extension of the transfer ramp can continue for as long as the operator keeps the first switch 2816 actuated and/or until the transfer ramp is positioned in a desired position (e.g., a fully extended position). As another example, when an operator actuates the first switch 2816 (e.g., by pressing the first switch 2816 in a second direction, which can be the same direction as or a different direction from the first direction, such as down), the user controls arrangement 2815 can cause the transfer ramp system to retract the transfer ramp toward its stowed position beneath the rear platform of the truck or trailer. Retraction of the transfer ramp can continue for as long as the operator keeps the first switch 2816 actuated and/or until the transfer ramp is positioned in a desired position (e.g., a fully stowed position).

The second switch 2817 can be used to lower the transfer ramp and/or press the transfer ramp down into (a) the rear platform of the truck or trailer that includes the transfer ramp system and/or (b) a loading dock platform, a rear platform of another truck or trailer, and/or another platform. In some embodiments, the second switch 2817 can be used to lower the transfer ramp after (e.g., only after) the transfer ramp has been moved to a desired position (e.g., a fully deployed position) and/or the transfer ramp has been pivoted such that it is oriented generally parallel to the rear platform (e.g., by rotating the transfer ramp to the generally parallel orientation after releasing a mechanical latch and/or using an electric motor or other actuation mechanism). The press down process can continue for as long as the operator keeps the button switch actuated and/or until the transfer ramp system determines (e.g., by monitoring current, voltage, or another measured indicator of the transfer ramp system) that the transfer ramp has been sufficiently pressed down against the platforms to facilitate transferring cargo across the transfer ramp.

An example operation flow of the user controls arrangement 2815 is as follows: (1) an operator actuates the first switch 2816 to deploy the transfer ramp from beneath the rear platform of a truck or trailer; (2) after the transfer ramp reaches a fully deployed position or a position located above the rear platform and another platform, the operator de-actuates the first switch 2816 (or the first switch de-actuates automatically); (3) the transfer ramp is released (e.g., by operating a mechanical latch, such as the mechanical latch discussed in greater detail below with reference to FIGS. 29A and 29B) and is pivoted (e.g., freely, by the operator, using an electric motor or other actuator that controls an angle of the transfer ramp relative to the extendable arms, using another mechanism) to an orientation in which the transfer ramp is generally parallel to the platforms; (4) an operator actuates the second switch 2817 to lower the transfer ramp towards and/or against the platforms; (5) the system continues to lower the transfer ramp against the platforms beyond the point in time at which the transfer ramp initially makes contact with the platforms to level the platforms to a same height (or more similar heights) and/or warp the transfer ramp to conform the transfer ramp to the arrangement of the platforms/make the transfer ramp as flat as possible; (6) this lowering process can continue until the operator de-actuators the second switch 2817 and/or the system determines that the transfer ramp has been sufficiently lowered against the platforms; (7) cargo is transferred across the transfer ramp; (8) the operator actuates the first switch 2816 to extend/raise the platform off of the platforms; (9) the transfer ramp is pivoted (e.g., by an operator, an electric motor, a transfer ramp stowage system, or another mechanism) back into alignment with the extendable arms of the system; and (10) the operator actuates the first switch 2816 to retract/lower the transfer ramp back to its stowed position beneath the rear platform of the truck or trailer.

Figure 29A:
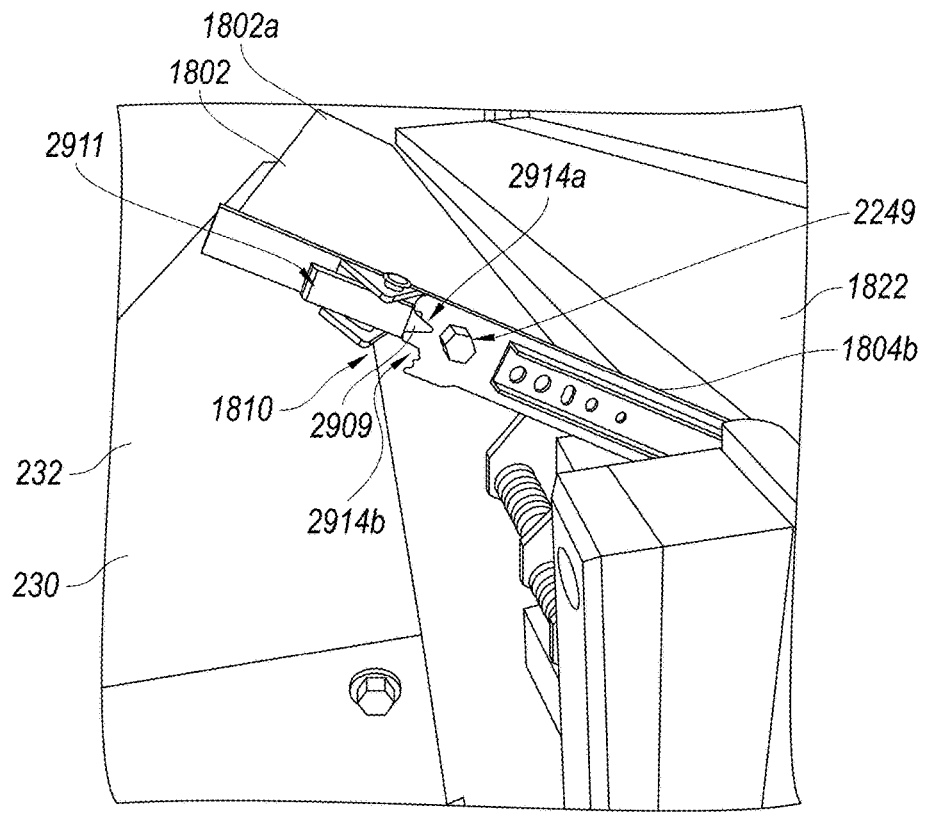
FIGS. 29A and 29B are partially schematic side perspective views of a transfer ramp system configured in accordance with various embodiments of the present technology.
Figure 29B:
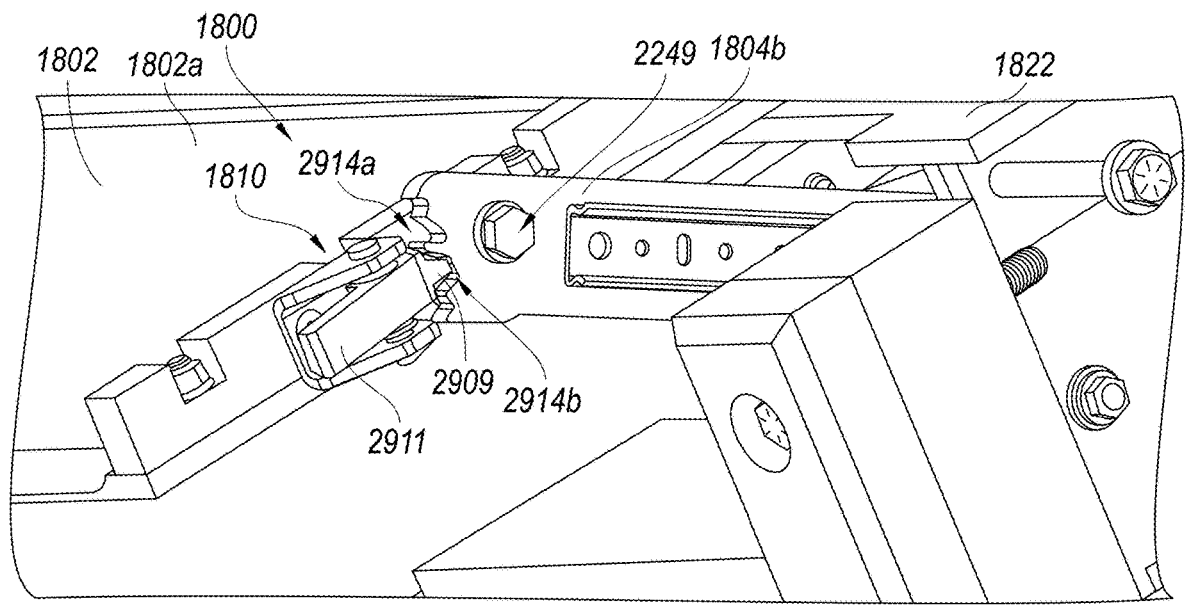

FIGS. 29A and 29B are a partially schematic side perspective views of the transfer ramp system 1800. As shown, the transfer ramp system 1800 includes a ramp latching system 1810. The ramp latching system 1810 can include a lever/pin and corresponding catches. More specifically, the ramp latching system 1810 in the illustrated embodiments includes a mechanical latch 2911, a first notch 2914a or catch, and a second notch 2914b or catch. As best shown in FIG. 29B, the first notch 2914a and the second notch 2914b can be formed at an end portion of the second extendable arm 1804b. In other embodiments, the first notch 2914a and/or the second notch 2914b can be formed in other components of the system 1800 and/or can be located at other positions than shown in FIG. 29B.

In the illustrated embodiment, the mechanical latch 2911 is a thumb latch that, when manually pressed or actuated by a user/operator, pivots a latchable portion 2909 (or lever) of the mechanical latch 2911 away from and/or out of the first notch 2914a and/or the second notch 2914b such that the transfer ramp 1802 can be pivoted (e.g., freely, manually by the user/operator, using an electric motor, using struts, using another mechanism) about a pivot point 2249/pivot axis between (a) the stowed position/orientation shown in FIG. 29A (in which the transfer ramp 1802 is generally in line with the extendable arm 1804b) and (b) the generally flat, horizontal, or level position/orientation shown in FIG. 29B in which the transfer ramp 1802 is generally parallel to the top platform 1822 of the truck/trailer that includes the transfer ramp system 1800.

In the illustrated embodiment, the first notch 2914a corresponds to the stowed position/orientation. In particular, after the mechanical latch 2911 is actuated, the transfer ramp 1802 is rotated, and/or the mechanical latch 2911 is subsequently released, the latchable portion 2909 can be swung toward and/or into the first notch 2914a. While the latchable portion 2909 is positioned within the first notch 2914a, the first notch 2914a can (i) hold the transfer ramp 1802 in the stowed position/orientation and/or (ii) prevent or hinder the transfer ramp 1802 from rotating about the pivot point 2249.

The second notch 2914b can correspond to the generally flat, horizontal, or level position/orientation. In particular, after the mechanical latch 2911 is actuated, the transfer ramp 1802 is rotated, and/or the mechanical latch 2911 is subsequently released, the latchable portion 2909 can be swung toward and/or into the second notch 2914b. While the latchable portion 2909 is positioned within the second notch 2914b, the second notch 2914b can (i) hold the transfer ramp in to the generally flat, horizonal, or level position/orientation and/or (ii) prevent or hinder the transfer ramp 1802 form rotating about the pivot point 2249.

Although the ramp latching system 1810 illustrated in FIGS. 29A and 29B includes a mechanical thumb latch with corresponding notch catches, the ramp latching system can employ other suitable latches/pins/fasteners and/or corresponding catches/locks in other embodiments of the present technology. For example, a cotter pin or a ball lock pin can be used in addition to or in lieu of the thumb latch shown in FIGS. 29A and 29B. Continuing with these examples, the cotter pin or the ball lock pin can be used to lock the transfer ramp 1802 in the stowed position/orientation and/or the generally flat, horizontal, or level position/orientation, such as using corresponding locking/catching mechanisms (e.g., slots, notches, and/or apertures) that are configured to reversibly receive/retain the cotter pin or the ball lock pin. As another example, a push button lock and corresponding locking/catching mechanism (e.g., apertures) can be used to transition the transfer ramp 1802 and/or hold the transfer ramp 1802 in the stowed position/orientation and/or the generally flat, horizontal, or level position/orientation.

Figure 30:
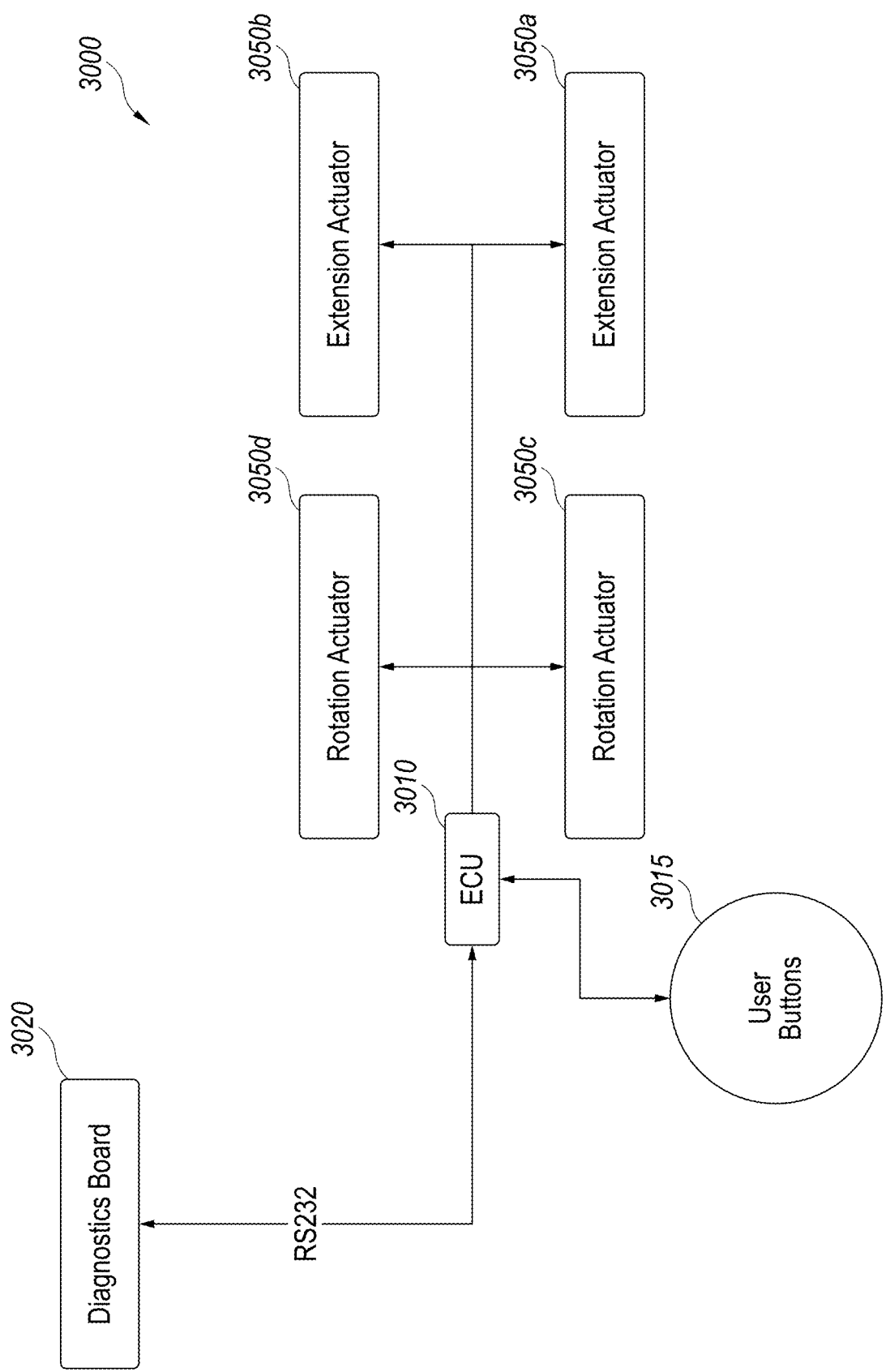
FIG. 30 is a partially schematic diagram of a controls system configured in accordance with various embodiments of the present technology.

FIG. 30 is a partially schematic diagram of a controls system 3000 configured in accordance with various embodiments of the present technology. As shown, the controls system 3000 includes an electronic control unit 3010 ("ECU 3010") or microcontroller, a user controls arrangement 3015 (also referred to herein as "user buttons" or a "user interface"), and a plurality of actuators 3050a-3050d. Actuators 3050a and 3050b can be extension actuators (e.g., the extension actuators 1850a and 1850b discussed in detail above with reference to FIGS. 18A-24N), and actuators 3050c and 3050d can be rotation actuators (e.g., the rotation actuators 1850c and 1850d discussed in detail above with reference to FIGS. 18A-24N). In some embodiments, the controls system 3000 can be used to actuate, control, move, calibrate, etc. a transfer ramp system, such as one of more of the transfer ramp systems described herein. Indeed, all or a portion of the controls system 3000 can be included in (or be components of) one or more of the transfer ramp systems described herein.

As shown in FIG. 30, the user controls arrangement 3015 can be used to control the ECU 3010, which in turn can control the actuators 3050a-3050d. For example, an operator can actuate (e.g., a switch of) the user controls arrangement 3015 to awaken the ECU 3010 and/or instruct the controls system 300 to perform an action. In turn, the ECU 3010 can interpret user input received via the user controls arrangement 3015, and can control the actuators 3050a-3050d accordingly. For example, when an operator uses the user controls arrangement 3015 to instruct the system to extend/raise or retract/lower a transfer ramp, the ECU 3040 can interpret this input and actuate the actuators 3050a and 3050b to extend/raise/retract/lower the transfer ramp (e.g., via extension/retraction of extendible arms of the system) accordingly. In the event that movement of the transfer ramp requires rotation of the transfer ramp (e.g., to navigate through a gap between platforms), the ECU 3010 can additionally, or alternatively, actuate the actuators 3050c and 3050d to tilt the extendible arms and/or rotate the transfer ramp accordingly. As another example, when an operator uses the user controls arrangement 3015 to instruct the system to lower the transfer ramp towards or press the transfer ramp down against platforms, the ECU 3010 can interpret this input and actuate one or more of the actuators 3050a-3050d accordingly.

In some embodiments, the ECU 3010 can monitor the absolute positions of the actuators and/or perform a speed control function to ensure that the transfer ramp is deployed/retracted smoothly and/or without damaging the transfer ramp system, the truck/trailer, and/or another object. For example, as the ECU 3010 actuates the extension actuators 3050a and 3050b to extend a transfer ramp, the ECU 3010 can monitor the position of the actuators 3050a and 3050b (e.g., via potentiometers corresponding to the actuators 3050a and 3050b) to ensure that they are extending (e.g., deploying) the transfer ramp at the same rate and/or along a desired or predetermined path (e.g., the S-shaped path shown in FIG. 21). In the event that the ECU 3010 determines that one of the actuators 3050a and 3050b is extending the transfer ramp at a faster rate than the other of the actuators 3050a and 3050b (e.g., because the other of the actuators 3050a and 3050b is fouled up with dirt or other debris) and/or in the event that the ECU 3010 determines that the transfer ramp has veered/deviated from the desired/predetermined path, the ECU 3010 can implement one or more functions (e.g., a speed control function, a position control function, a current control function, pulse width modulation, gradient descent algorithms, etc.) to (a) reduce the speed with which the one of the actuators 3050a and 3050b is extending the transfer ramp to match or better align with the speed with which the other of the actuators 3050a and 3050b is extending the transfer ramp and/or (b) activate one or more of the actuators 3050a-3050d to return the transfer ramp to the desired/predetermined path.

As also shown in FIG. 30, the controls system 3000 can additionally include a diagnostics board/module 3020 in some embodiments. An example of the diagnostics board/module 3020 is shown in FIG. 32 and described in greater detail below.

Figure 31A:
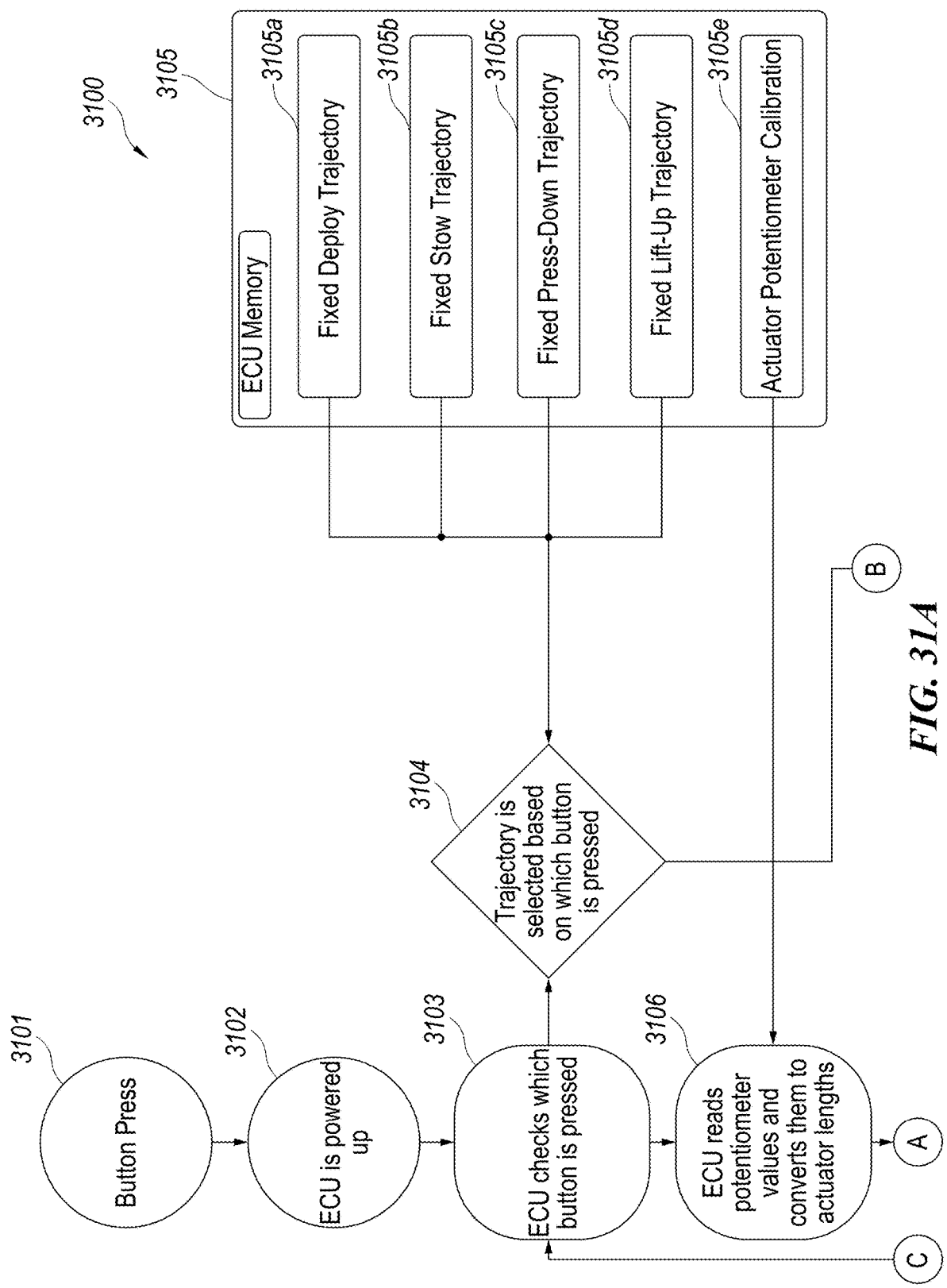
FIGS. 31A and 31B illustrate a flow diagram showing a process for controlling a transfer ramp system in accordance with various embodiments of the present technology.
Figure 31B:
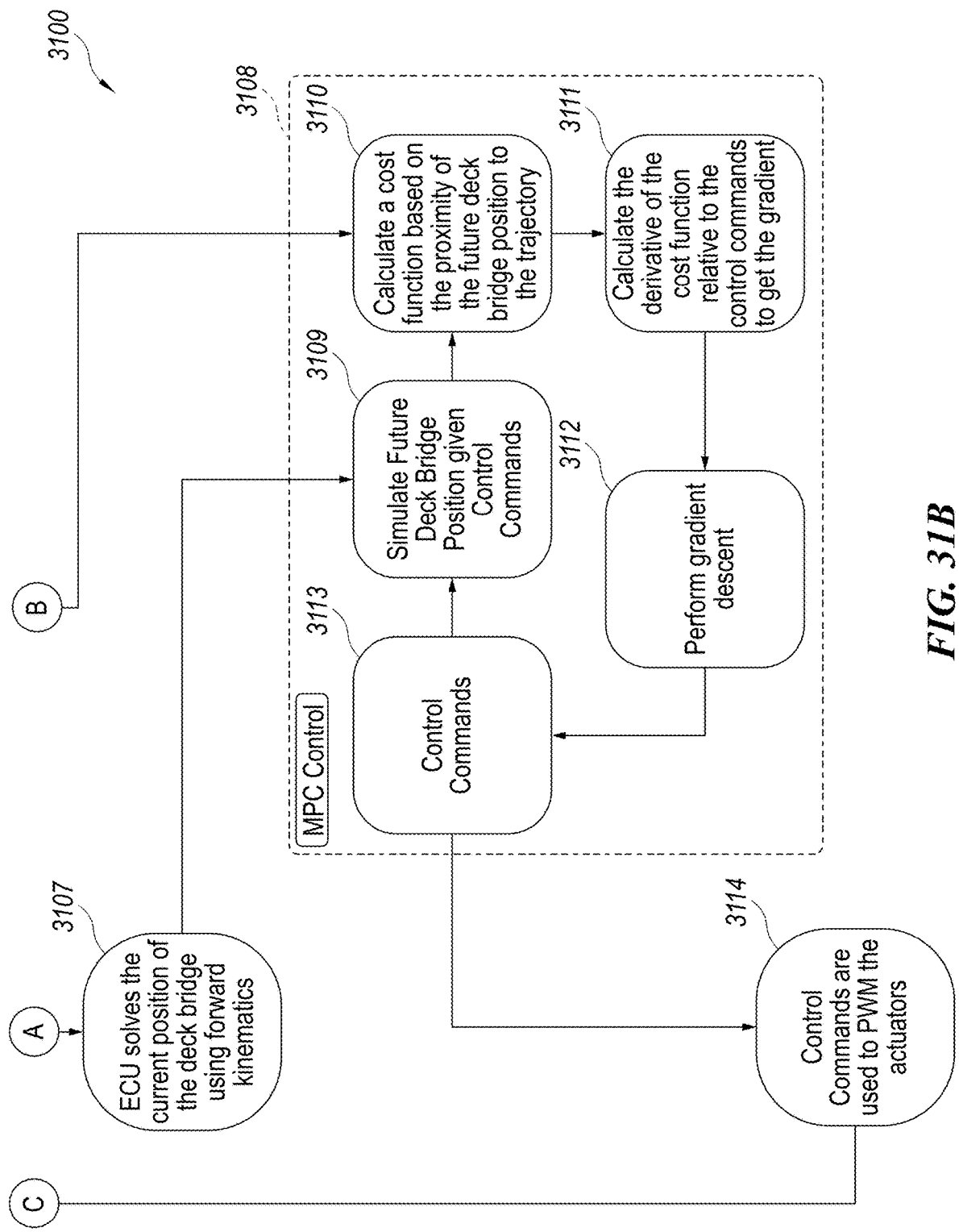

FIGS. 31A and 31B illustrate a flow diagram showing a process 3100 for controlling a transfer ramp system in accordance with various embodiments of the present technology. Referring first to FIG. 31A, the process 3100 can begin by receiving operator input (block 3101), such as via a button/switch of a user controls arrangement. This input can awaken and/or power up an ECU of the transfer ramp system (block 3102), and the ECU can identify (block 3103) what user input was received (e.g., by determining what button of the user controls arrangement was pressed). At block 3104, the ECU can select a trajectory (e.g., a predetermined or desired path) for the transfer ramp based on the user input, and can retrieve (block 3105) the corresponding trajectory information from memory of the ECU. As shown, the memory of the ECU can include a transfer ramp deploy trajectory 3105a, a transfer ramp stow trajectory 3105b, a transfer ramp press-down trajectory 3105c, and/or a transfer ramp lift-up trajectory 3105d. All or a subset of these trajectories 3105a-3105d can be preset, predetermined, or precalculated. The memory of the ECU is also shown as including information 3105e for calibrating the actuator potentiometers of the system, which the ECU can use at block 3106 when reading potentiometer values and converting them to actuator lengths to determine (e.g., absolute) positions of the actuators. Calibration of the actuator potentiometers is discussed in greater detail below with reference to FIGS. 32 and 33.

Referring now to FIG. 31B, the process 3100 can continue at block 3107 by the ECU determining a position of the transfer ramp using forward kinematics. Thereafter, the process 3100 can enter a model prediction control (MPC) portion 3108 of the process 3100. More specifically, at block 3109, a future position of the transfer ramp can be simulated given a set of control commands. At block 3110, a cost function can be calculated based on the proximity of the future position of the transfer deck to the trajectory. This step can be based at least in part on the trajectory information selected/retrieved from the ECU memory at block 3104 (FIG. 31A). At block 3111, a derivative of the cost function can be calculated relative to the control commands to obtain a gradient. At block 3112, a gradient descent algorithm (e.g., using machine learning) can be performed. At block 3113, control commands can be generated/updated. At block 3114, the generated/updated control commands can be used to pulse-width modulate actuators of the system. Thereafter, the process 3100 can return to block 3103 (FIG. 31A) and/or terminate (e.g., the ECU can go to sleep).

Figure 32:
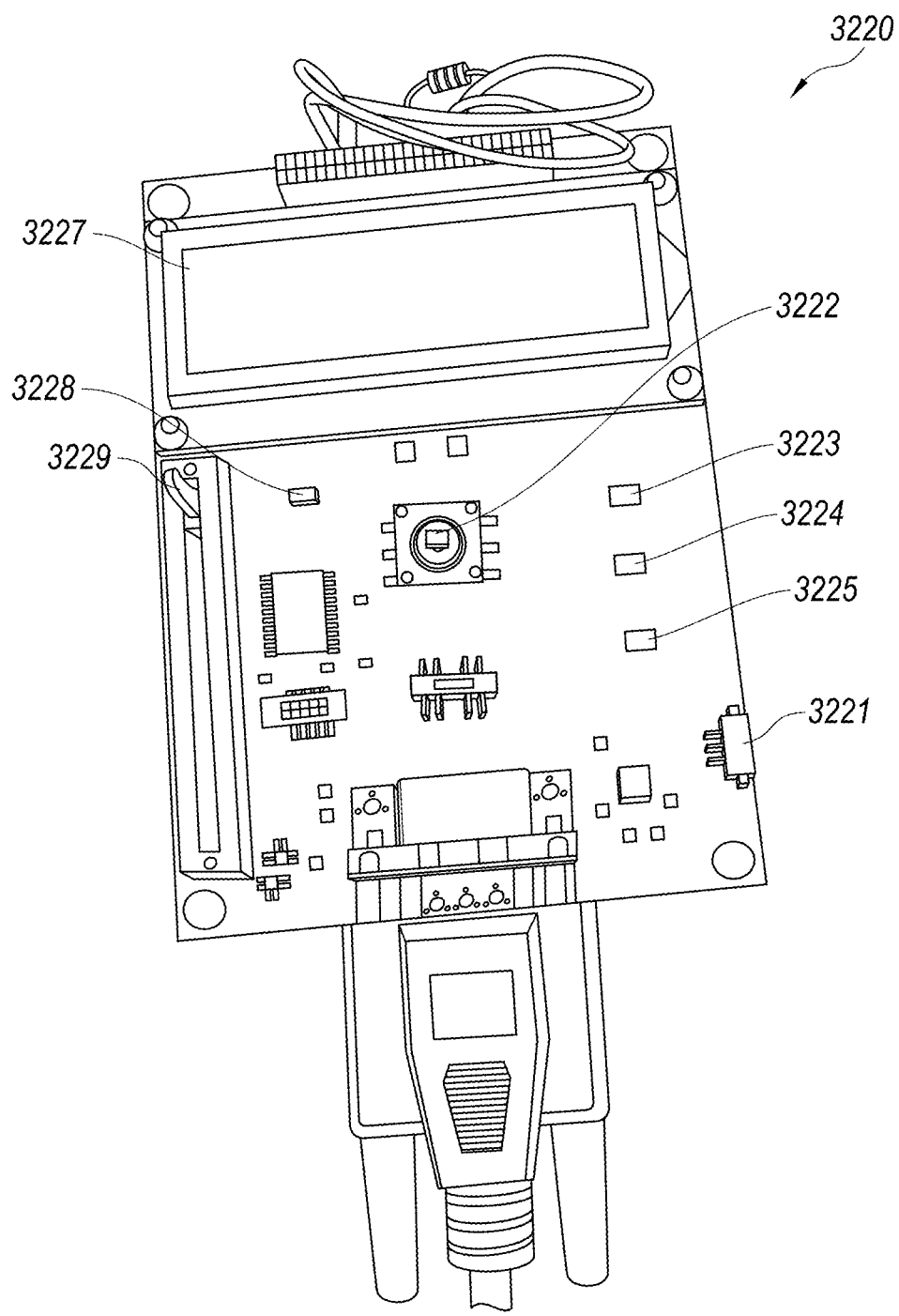
FIG. 32 is a partially schematic diagram of a diagnostics board or module configured in accordance with various embodiments of the present technology.

FIG. 32 is a partially schematic diagram of a diagnostics board 3220 or module configured in accordance with various embodiments of the present technology. The diagnostics board 3220 can be used by technicians to calibrate and/or service a transfer ramp system of the present technology. As shown, the diagnostics board 3220 includes (a) a button or switch 3221 for connecting to and/or activating (e.g., remotely activating) a transfer ramp system of the present technology; (b) a JOG controller 3222 for extending/retracting/raising/lower the extendable arms and/or transfer ramp of the transfer ramp system via actuation of one or more actuators of the system; (c) a button or switch 3223 for actuating one or more actuators of the system to extend extendible arms and/or a transfer ramp of the transfer ramp system; (d) a button or switch 3224 for actuating one or more actuators of the system to retract extendible arms and/or a transfer ramp of the transfer ramp system; and (e) a button or switch 3225 for actuating one or more actuators of the system to lower extendible arms and/or a transfer ramp (e.g., as part of the press down process described in greater detail above).

In the illustrated embodiment, the diagnostics board 3220 additionally includes a screen or display 3227 (e.g., for conveying information to a user or technician). For example, the display 3227 can be used to indicate current (e.g., absolute) positions of potentiometers that are used to determine a current position of corresponding actuators of the system. The diagnostics board 3220 can additionally include a calibration button 3228, such as for calibrating the potentiometers of the transfer ramp system. Additionally, or alternatively, the diagnostics board 3220 can includes a speed control mechanism 3229. Adjusting the position of the speed control mechanism 3229 (e.g., by sliding the speed control mechanism 3229 up or down along the edge of the diagnostics board 3220) can adjust the speed with which the actuators of the transfer control system extend/retract the extendible arms and/or a transfer ramp of the transfer ramp system. For example, sliding the speed control mechanism 3229 upwards toward the top of the diagnostics board 3220 can increase the extension/retraction speed, and sliding the speed control mechanism 3229 downwards toward the bottom of the diagnostics board can decrease the extension/retraction speed.

Figure 33:
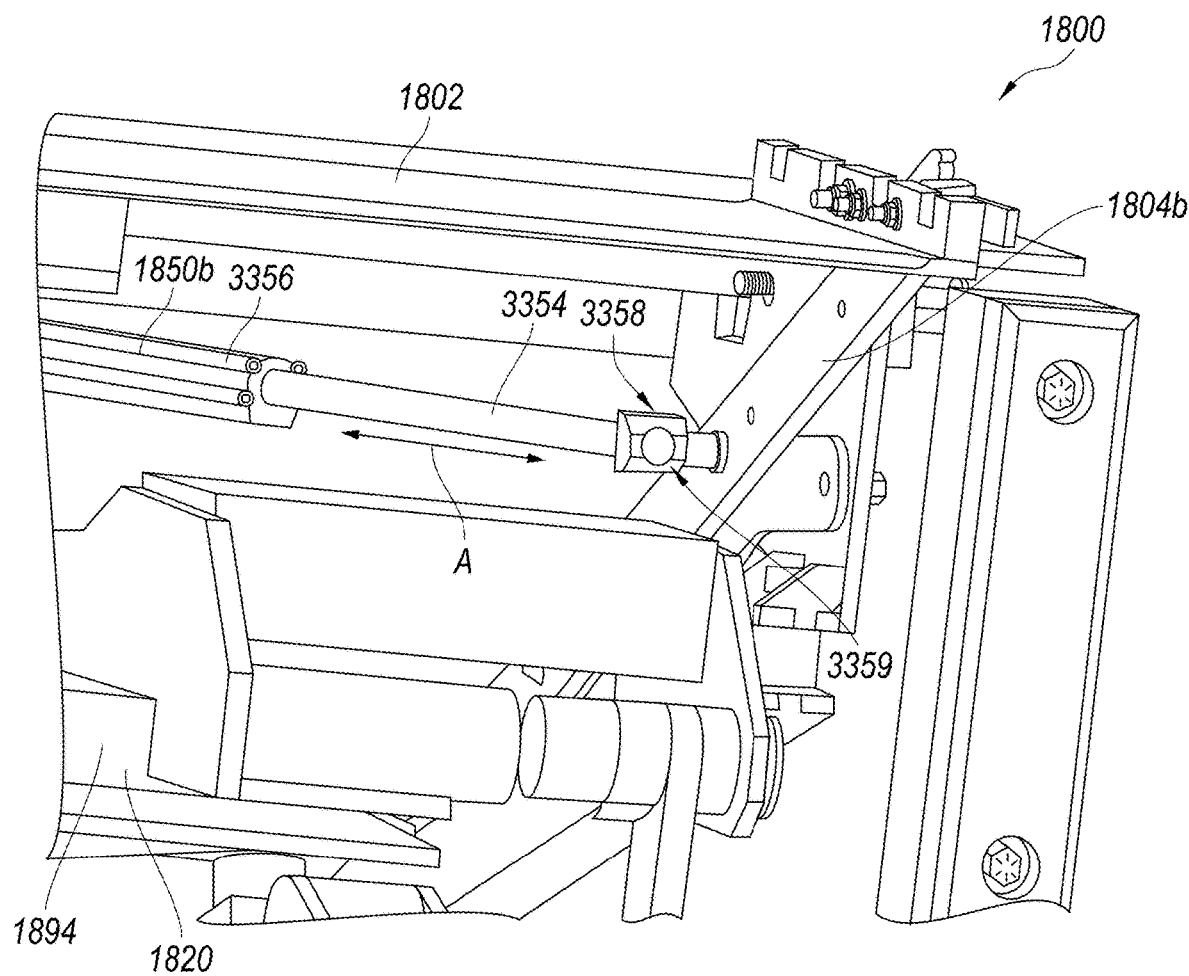
FIG. 33 is a partially schematic perspective view of a travel limiter on an actuator of a transfer ramp system configured in accordance with various embodiments of the present technology.

FIG. 33 is a partially schematic perspective view of a travel limiter 3358 installed on the second actuator 1850b of the transfer ramp system 1800. In some embodiments, the travel limiter 3358 can be used to calibrate a potentiometer corresponding to the second actuator 1850b. More specifically, the travel limiter 3358 can be positioned at an end portion of a rod 3354 of the second actuator 1850b. To calibrate the potentiometer corresponding to the second actuator 1850b, the rod 3354 can be retracted into a body 3356 of the second actuator 1850b until the travel limiter 3358 abuts against a front face of the body 3356. An ECU of the system 1800 can utilize this fully retracted position as a "zero" point for calibration-purposes. For example, the ECU can (e.g., when a calibration button, such as the calibration button 3228 on the diagnostics board 3220 of FIG. 32, is pressed) use the zero point and a corresponding reading on the potentiometer to determine a fixed length of the second actuator 1850b. This information can be used to determine an absolute position of (e.g., the travel limiter 3358 of) the second actuator 1850b at any given time, which the ECU can use to extend and/or retract the transfer ramp 1802 of the system 1800 (e.g., along a predetermined path). As shown in FIG. 33, the travel limiter 3358 of the second actuator 1850b can include a chamfer 3359, such as to avoid contacting the liftgate 1820. In some embodiments, the first actuator 1850a of the system 1800 can include a travel limiter that is generally similar to the travel limiter 3358 and/or that can be used to calibrate a potentiometer corresponding to the first actuator 1850a. Additionally, or alternatively, as best shown in FIGS. 19A and 23C, the third and/or fourth actuators 1850c and 1850d can include travel limiters 1958 that are generally similar to the travel limiter 3358 and/or that can be used to calibrate potentiometers corresponding to the third and/or fourth actuators 1850c and 1850d.

Although not shown so as to avoid unnecessarily obscuring the description of the embodiments of the technology, any of the forgoing systems and methods described above can include and/or be performed by a computing device configured to direct and/or arrange components of the systems and/or to receive, arrange, store, analyze, and/or otherwise process data received, for example, from the machine and/or other components of the systems. As such, such a computing device includes the necessary hardware and corresponding computer-executable instructions to perform these tasks. More specifically, a computing device configured in accordance with an embodiment of the present technology can include a processor, a storage device, input/output device, one or more sensors, and/or any other suitable subsystems and/or components (e.g., displays, speakers, communication modules, etc.). The storage device can include a set of circuits or a network of storage components configured to retain information and provide access to the retained information. For example, the storage device can include volatile and/or non-volatile memory. As a more specific example, the storage device can include random access memory (RAM), magnetic disks or tapes, and/or flash memory.

The computing device can also include (e.g., non-transitory) computer readable media (e.g., the storage device, disk drives, and/or other storage media) including computer-executable instructions stored thereon that, when executed by the processor and/or computing device, cause the systems to perform one or more of the methods described herein. Moreover, the processor can be configured for performing or otherwise controlling steps, calculations, analysis, and any other functions associated with the methods described herein.

In some embodiments, the storage device can store one or more databases used to store data collected by the systems as well as data used to direct and/or adjust components of the systems. In one embodiment, for example, a database is an HTML file designed by the assignee of the present disclosure. In other embodiments, however, data is stored in other types of databases or data files.

One of ordinary skill in the art will understand that various components of the systems (e.g., the computing device) can be further divided into subcomponents, or that various components and functions of the systems may be combined and integrated. In addition, these components can communicate via wired and/or wireless communication, as well as by information contained in the storage media.

C. Examples

Several aspects of the present technology are set forth in the following examples. Although several aspects of the present technology are set forth in examples directed to systems and methods, these aspects of the present technology can similarly be set forth in examples directed to methods and systems, respectively, in other embodiments. Additionally, these aspects of the present technology may be set forth in examples directed to devices and/or (e.g., non-transitory) computer-readable media in other embodiments.

1. A transfer ramp system mountable beneath a top platform at a rear of a vehicle or trailer, the transfer ramp system comprising:
   a transfer ramp; and
   at least one extendable arm attached to the transfer ramp and usable to extend or retract the transfer ramp,
   wherein, when the transfer ramp system is mounted beneath the top platform, the transfer ramp is moveable between (a) a stowed position in which the transfer ramp is positioned beneath the top platform and (b) a deployed position in which the transfer ramp is usable to bridge a gap between the top platform and another structure for moving cargo between (i) the vehicle or trailer and (ii) the other structure.
2. The transfer ramp system of example 1 wherein the transfer ramp system is mountable beneath the top platform at the rear of the vehicle or trailer such that, when the transfer ramp is moved between the stowed position and the deployed position, the transfer ramp is navigated through a space below the top platform and above a liftgate of the vehicle or trailer.
3. The transfer ramp system of example 1 or example 2 wherein the at least one extendable arm includes a first extendable arm coupled to a first side of the transfer ramp and a second extendable arm coupled to a second side of the transfer ramp opposite the first side.
4. The transfer ramp system of any of examples 1-3, further comprising at least one actuator configured to extend or retract the at least one extendable arm to extend or retract, respectively, the transfer ramp.
5. The transfer ramp system of example 4 wherein the at least one actuator includes a linear actuator.
6. The transfer ramp system of example 4 or example 5 wherein the at least one actuator includes an electric linear actuator.
7. The transfer ramp system of any of examples 4-6 wherein the at least one actuator includes a pneumatic linear actuator.
8. The transfer ramp system of any of examples 4-7 wherein the at least one actuator includes a first actuator usable to extend or retract the at least one extendable arm, and wherein the transfer ramp system further comprises a second actuator usable to rotate the at least one extendable arm.
9. The transfer ramp system of any of examples 4-8 wherein:
   the at least one extendable arm includes a first extendable arm extending generally along a first longitudinal axis and a second extendable arm different from the first extendable arm, wherein the second extendable arm extends generally along a second longitudinal axis;
   the at least one actuator includes a first actuator and a second actuator;
   the transfer ramp system further comprises a third actuator and a fourth actuator;
   the first actuator is usable to extend or retract the first extendable arm generally along the first longitudinal axis;
   the third actuator is usable to rotate the first extendable arm and adjust a pitch of the first extendable arm;
   the second actuator is usable to extend or retract the second extendable arm generally along the second longitudinal axis; and
   the fourth actuator is usable to rotate the second extendable arm and adjust a pitch of the second extendable arm.
10. The transfer ramp system of any of examples 1-9, further comprising:
    at least one actuator configured to manipulate the at least one extendable arm; and
    a microcontroller configured to control the at least one actuator to move the transfer ramp between the stowed position and the deployed position.
11. The transfer ramp system of example 10 wherein the microcontroller is configured to control the at least one actuator to move the transfer ramp between the stowed position and the deployed position generally along a predetermined path.
12. The transfer ramp system of example 10 or example 11 wherein the microcontroller is configured to, based at least in part on feedback received from the at least one actuator, control the at least one actuator to move the transfer ramp (i) between the stowed position and the deployed position and/or (ii) along a predetermined path.
13. The transfer ramp system of example 11 or example 12 wherein the predetermined path is generally S-shaped such that, as the transfer ramp is moved between the stowed position and the deployed position, the transfer ramp is navigated under the top platform, through the gap between the top platform and the other structure, and above the top platform and the other structure.
14. The transfer ramp system of any of examples 1-13 wherein the transfer ramp is configured to rotate between (i) a stowed orientation for stowage beneath the top platform and (ii) a deployed orientation in which a top surface of the transfer ramp is generally parallel to a top surface of the top platform.
15. The transfer ramp system of example 14 wherein, at least while the transfer ramp is in the stowed orientation, the top surface of the transfer ramp is generally parallel to a longitudinal axis of an extendable arm of the at least one extendable arm.
16. The transfer ramp system of example 14 or example 15, further comprising at least one strut having a first end attached to an extendable arm of the at least one extendable arm and a second end attached to the transfer ramp, wherein the at least one strut is usable to pivot the transfer ramp at least partway between (i) the stowed orientation and (ii) the deployed orientation.
17. The transfer ramp system of example 16 wherein the at least one strut includes a gas strut or an air cylinder.
18. The transfer ramp system of any of examples 14-17, further comprising at least one spring configured to pivot the transfer ramp at least partway between (i) the stowed orientation and (ii) the deployed orientation.
19. The transfer ramp system of example 18 wherein the at least one spring includes a torsion spring.
20. The transfer ramp system of any of examples 14-19, further comprising a ramp latching system configured to releasably hold the transfer ramp in the stowed orientation.
21. The transfer ramp system of example 20 wherein the ramp latching system includes a cable release latch.
22. The transfer ramp system of example 20 or example 21 wherein the ramp latching system is further configured to releasably hold the transfer ramp in the deployed orientation.
23. The transfer ramp system of any of examples 14-22, further comprising a ramp latching system, wherein the ramp latching system includes:
a first latch configured to releasably hold the transfer ramp in the stowed orientation; or
a second latch configured to releasably hold the transfer ramp in the deployed orientation.
24. The transfer ramp system of example 23 wherein the ramp latching system includes the first latch and the second latch.
25. The transfer ramp system of example 23 or example 24 wherein the first latch, the second latch, or a combination thereof includes (a) a cotter pin, a ball lock pin, or a mechanical thumb latch having a corresponding lever; and (b) a corresponding catch.
26. The transfer ramp system of any of examples 23-25 wherein the first latch, the second latch, or a combination thereof are configured to be manually actuated by an operator of the transfer ramp system.
27. The transfer ramp system of any of examples 23-26 wherein actuation of the first latch, the second latch, or a combination thereof is automated and controlled by the transfer ramp system.
28. The transfer ramp system of any of examples 1-27, further comprising a ramp tilting system configured to rotate the transfer ramp at least partway between (i) a deployed position in which a top surface of the transfer ramp is generally parallel to the top platform and (ii) a stowed orientation for storage beneath the top platform.
29. The transfer ramp system of example 28 wherein the ramp tilting system includes a cable operably coupled to the transfer ramp such that, as the at least one extendable arm is extended while the transfer ramp is in the deployed position, a force is exerted on the transfer ramp via the cable to rotate the transfer ramp toward the stowed orientation.
30. The transfer ramp system of any of examples 1-29 wherein:
when the transfer ramp system is mounted beneath the top platform at the rear of the vehicle or trailer, at least part of the transfer ramp system is positioned above a liftgate of the vehicle or trailer; and
the transfer ramp system further comprises a bump stop to limit vertical motion of the liftgate toward the transfer ramp system.
31. The transfer ramp system of any of examples 1-30, further comprising a stowage stop configured to (a) limit retraction of the transfer ramp, (b) hold the transfer ramp at least while the transfer ramp is in the stowed position, or (c) a combination thereof.
32. The transfer ramp system of example 31 wherein the stowage stop includes one or more slots configured to receive the transfer ramp as the transfer ramp is moved toward the stowed position.
33. The transfer ramp system of any of examples 1-32 wherein the transfer ramp is generally flexible such that the transfer ramp is conformable to vertical misalignment between (a) opposite sides of the top platform, (b) opposite sides of a top surface of the other structure, (c) the top platform and the top surface, or (d) a combination thereof.
34. A cargo transferring system mountable to or under frame rails of a vehicle or trailer, the cargo transferring system comprising:
a bridge deck;
one or more extendable arms operably coupled to the bridge deck; and
one or more actuators configured to extend and retract the one or more extendable arms;
wherein, during operation of the cargo transferring system when mounted to or under the frame rails of the vehicle or trailer, the one or more actuators are controllable to transition the bridge deck between—
a stowed position under the frame rails, and
a deployed position in which the bridge deck is usable to transfer cargo between (i)
a platform of the vehicle or trailer and (ii) a surface of another structure different from the vehicle or trailer.
35. The cargo transferring system of example 34 wherein the cargo transferring system is mountable to or under the frame rails of the vehicle or trailer such that, when the bridge deck is transitioned between the stowed position and the deployed position, the bridge deck is navigated through a space between the platform and a liftgate of the vehicle or trailer.

36. The cargo transferring system of example 34 or example 35 wherein:
the one or more actuators are one or more first actuators configured to extend and retract the one or more extendable arms generally along one or more longitudinal axes of the one or more extendable arms; and
the cargo transferring system further comprises one or more second actuators usable to adjust a pitch of the one or more extendable arms.

37. The cargo transferring system of any of examples 34-36 wherein the bridge deck is configured to rotate relative to the one or more extendable arms such that a top surface of the bridge deck is alignable with a top surface of the platform.

38. The cargo transferring system of any of examples 34-37, further comprising a ramp latching system configured to:
releasably retain the bridge deck in a first orientation for stowage beneath the frame rails; and/or
releasably retain the bridge deck in a second orientation in which a top surface of the bridge deck is generally parallel with a top surface of the platform.

39. The cargo transferring system of any of examples 34-38, further comprising a microcontroller configured to control movement of the bridge deck between the stowed position and the deployed position.

40. The cargo transferring system of example 39 wherein the microcontroller is configured to control the movement of the bridge deck such that the bridge deck is moved between the stowed position and the deployed position according to a predetermined path.

41. The cargo transferring system of example 39 or example 40 wherein the microcontroller is configured to, based at least in part on feedback received from the one or more actuators, control the movement of the bridge deck (i) between the stowed position and the deployed position and/or (ii) according to a predetermined path.

42. The cargo transferring system of example 40 or example 41 wherein the predetermined path is generally S-shaped and extends between a point beneath the frame rails and a point above the platform.

43. A transfer ramp system mountable to or under frame rails of a vehicle or trailer, the transfer ramp system comprising:
a transfer ramp;
one or more extendable arms operably coupled to the transfer ramp;
one or more extension actuators operably coupled to the one or more extendable arms and configured to extend or retract the one or more extendable arms; and
one or more rotation actuators operably coupled to the one or more extendable arms and configured to pivotably move the one or more extendable arms,
wherein, when the transfer ramp system is mounted to or under the frame rails, the one or more extension actuators and the one or more rotation actuators are controllable to manipulate the one or more extendable arms to move the transfer ramp (i) from a position beneath a platform of the vehicle or trailer, (ii) through a gap between the platform and another structure physically separate from the vehicle or trailer, and (iii) to a position above or at least partially aligned with the platform and a top surface of the other structure such that the transfer ramp is usable to transfer cargo between the platform and the top surface.

44. The transfer ramp system of example 43 wherein:
the one or more extendable arms include a first extendable arm extending generally along a first longitudinal axis and a second extendable arm different from the first extendable arm, wherein the second extendable arm extends generally along a second longitudinal axis;
the one or more extension actuators include a first actuator and a second actuator;
the one or more rotation actuators include a third actuator and a fourth actuator;
the first actuator is configured to extend or retract the first extendable arm generally along the first longitudinal axis;
the third actuator is configured, at least while the first actuator is stationary, pivot the first extendable arm and adjust a pitch of the first extendable arm;
the second actuator is configured to extend or retract the second extendable arm generally along the second longitudinal axis; and
the fourth actuator is configured, at least while the second actuator is stationary, to pivot the second extendable arm and adjust a pitch of the second extendable arm.

45. The transfer ramp system of example 43 or example 44, further comprising a microcontroller configured to control the one or more extension actuators and the one or more rotation actuators to manipulate the one or more extendable arms to move the transfer ramp (i) from the position beneath the platform, (ii) through the gap, and (iii) to the position above or at least partially aligned with the platform, according to a predetermined path.

46. The transfer ramp system of any of examples 43-45 wherein the transfer ramp is configured to pivotably move between (i) a stowed orientation for stowage beneath the platform and (ii) a deployed orientation in which a top surface of the transfer ramp is generally parallel to a top surface of the platform.

47. The transfer ramp system of any of examples 43-46, further comprising a ramp latching system configured to:
releasably retain the transfer ramp in a first orientation for stowage beneath the platform; or
releasably retain the transfer ramp in a second orientation in which a top surface of the transfer ramp is generally parallel with a top surface of the platform.

48. A method of operating a transfer ramp system mounted to or under frame rails of a vehicle or trailer, the method comprising:
deploying a transfer ramp of the transfer ramp system from beneath the frame rails of the vehicle or trailer;
transitioning the transfer ramp between (i) a stowed orientation corresponding an orientation of the transfer ramp when stowed under the frame rails and (ii) a deployed orientation in which a top surface of the transfer ramp is more aligned with a platform of the vehicle or trailer than the top surface of the transfer ramp in the stowed orientation; and
positioning the transfer ramp such that the transfer ramp is usable to bridge a gap between the platform and a surface of another structure proximate the vehicle or trailer.

49. The method of example 48 wherein deploying the transfer ramp includes extending at least one extendable arm of the transfer ramp system that is operably coupled to the transfer ramp.
50. The method of example 49 wherein extending the at least one extendable arm includes actuating an actuator operably coupled to the at least one extendable arm.
51. The method of any of example 49 or example 50 wherein deploying the transfer ramp includes rotating the at least one extendable arm such that an angle between (i) a longitudinal axis of the at least one extendable arm and (ii) a top surface of the platform is increased, wherein rotating the at least one extendable arm includes actuating a second actuator operably coupled to the at least one extendable arm.
52. The method of any of examples 48-51 wherein deploying the transfer ramp includes navigating the transfer ramp through a space beneath the platform and above a liftgate of the vehicle or trailer.
53. The method of any of examples 48-52 wherein deploying the transfer ramp includes deploying the transfer ramp through the gap between the platform and the surface of the other structure.
54. The method of any of examples 48-53 wherein:
the other structure is another vehicle, trailer, or loading dock;
positioning the transfer ramp includes positioning the transfer ramp while the platform is positioned a distance from the surface of the other vehicle, trailer, or loading dock; and
the distance corresponds to the gap and is less than or equal to a length of the transfer ramp.
55. The method of any of examples 48-54 wherein transitioning the transfer ramp includes extending a strut of the transfer ramp system that is operably coupled to the transfer ramp.
56. The method of example 55 wherein extending the strut includes filling the strut with gas or air.
57. The method of any of examples 48-56 wherein transitioning the transfer ramp includes releasing the transfer ramp from a latch.
58. The method of any of examples 48-57 wherein transitioning the transfer ramp includes pivoting the transfer ramp using a spring.
59. The method of any of examples 48-58 wherein positioning the transfer ramp includes positioning the transfer ramp such that at least a first portion of the transfer ramp rests on top of the surface of the other structure and such that at least a second portion of the transfer ramp rests on the platform.
60. The method of any of examples 48-59 wherein positioning the transfer ramp includes retracting an extendable arm of the transfer ramp system, wherein the extendable arm is operably coupled to the transfer ramp.
61. The method of any of examples 48-60 wherein positioning the transfer ramp includes rotating an extendable arm of the transfer ramp system after the transfer ramp makes contact with the platform or the surface of the other structure, wherein the extendable arm is operably coupled to the transfer ramp.
62. The method of any of examples 48-61 wherein positioning the transfer ramp includes conforming the transfer ramp to an arrangement of the platform and the surface of the other structure.
63. The method of any of examples 48-62 wherein positioning the transfer ramp includes, after the transfer ramp makes contact with the platform or the surface of the other structure, adjusting a height of the platform toward a height of the surface of the other structure.
64. The method of any of examples 48-63, further comprising transferring cargo across a top surface of the transfer ramp while the transfer ramp bridges the gap.
65. The method of any of examples 48-64, further comprising, after positioning the transfer ramp, raising the transfer ramp, and wherein transitioning the transfer ramp includes transitioning the transfer ramp from the deployed orientation to the stowed orientation.
66. The method of example 65 wherein transitioning the transfer ramp from the deployed orientation to the stowed orientation includes actuating a strut of the transfer ramp system operably coupled to the transfer ramp.
67. The method of example 66 wherein actuating the strut includes venting air from the strut such that the strut retracts.
68. The method of any of examples 65-67 wherein transitioning the transfer ramp from the deployed orientation to the stowed orientation includes extending an extendable arm operably coupled to the transfer ramp such that a force is exerted on the transfer ramp via a cable operably coupled to the transfer ramp.
69. The method of any of examples 65-68 wherein transitioning the transfer ramp from the deployed orientation to the stowed orientation includes manually rotating the transfer ramp.
70. A method of operating a transfer ramp system (a) mounted to a vehicle or trailer and (b) including a transfer ramp usable to transfer cargo between (i) the vehicle or trailer and (ii) another structure separate from the vehicle or trailer, the method comprising:
deploying the transfer ramp, wherein deploying the transfer ramp includes moving the transfer ramp between—
a stowed position beneath frame rails of the vehicle or trailer, and
an extended position above a platform of the vehicle or trailer, and
wherein moving the transfer ramp includes controlling, via a microcontroller of the transfer ramp system, one or more actuators of the transfer ramp system such that the transfer ramp is moved through a gap between the platform and the other structure.
71. The method of example 70 wherein deploying the transfer ramp includes monitoring feedback received from the one or more actuators and controlling the one or more actuators based at least in part on the feedback.
72. The method of example 71 wherein monitoring the feedback includes monitoring one or more potentiometer readings corresponding to the one or more actuators.
73. The method of any of examples 70-72 wherein moving the transfer ramp includes controlling, via the microcontroller, the one or more actuators such that the transfer ramp is moved between the stowed position and the extended position according to a predetermined path.
74. The method of example 73 wherein controlling the one or more actuators such that the transfer ramp is moved between the stowed position and the extended position according to the predetermined path includes controlling the one or more actuators based, at least in part, on feedback received from the one or more actuators.

75. The method of example 74 wherein the feedback includes potentiometer readings corresponding to the one or more actuators.

76. The method of any of examples 73-75 wherein the predetermined path extends through the gap.

77. The method of any of examples 73-76 wherein the predetermined path extends from the stowed position to the extended position.

78. The method of any of examples 70-77 wherein deploying the transfer ramp includes navigating the transfer ramp through a space beneath the platform and above a liftgate of the vehicle or trailer.

79. The method of any of examples 70-78 wherein deploying the transfer ramp includes extending the transfer ramp at least partially through a space beneath the platform, rotating the transfer ramp such that a pitch of the transfer ramp is increased, and extending the transfer ramp with the increased pitch through the gap.

80. The method of any of examples 70-79 wherein deploying the transfer ramp includes deploying the transfer ramp in response to user input.

81. The method of any of examples 70-80, further comprising rotating the transfer ramp between a stored arrangement and a deployed arrangement.

82. The method of example 81 wherein rotating the transfer ramp between the stored arrangement and the deployed arrangement includes rotating the transfer ramp such that a top surface of the transfer ramp is more aligned with a top surface of the platform than the top surface of the transfer ramp while the transfer ramp is in the stored arrangement.

83. The method of example 81 or example 82 wherein rotating the transfer ramp includes releasing the transfer ramp from a latch.

84. The method of any of examples 81-83 wherein rotating the transfer ramp includes:
manually releasing the transfer ramp from a latch;
pivoting the transfer ramp from the stored arrangement toward the deployed arrangement; and/or
latching the transfer ramp in a second latch such that the transfer ramp is releasably retained in the deployed arrangement.

85. The method of any of examples 81-83 wherein rotating the transfer ramp includes:
manually releasing the transfer ramp from a latch;
pivoting the transfer ramp from the deployed arrangement toward the stored arrangement; and/or
latching the transfer ramp in a second latch such that the transfer ramp is releasably retained in the stored arrangement.

86. The method of any of examples 70-85, further comprising moving the transfer ramp between (i) the extended position and (ii) a deployed position in which the transfer ramp spans the gap between the platform and the other structure.

87. The method of example 86 wherein moving the transfer ramp between the extended position and the deployed position includes moving the transfer ramp toward the deployed position in which (a) a first portion of the transfer ramp is positioned above and contacts a top surface of the platform and/or (b) a second portion of the transfer ramp is positioned above and contacts a top surface of the other structure.

88. The method of example 86 or example 87 wherein moving the transfer ramp between the extended position and the deployed position includes controlling, via the microcontroller, the one or more actuators such that the transfer ramp is moved according to a second predetermined path.

89. The method of example 88 wherein moving the transfer ramp according to the second predetermined path includes retracting the transfer ramp toward the platform such that the transfer ramp is moved from the extended position to the deployed position.

90. The method of example 88 wherein moving the transfer ramp according to the second predetermined path includes extending the transfer ramp away from the platform such that the transfer ramp is moved from the deployed position to the extended position.

91. The method of any of examples 86-90 wherein moving the transfer ramp between the extended position and the deployed position includes moving the transfer ramp in response to user input.

92. The method of any of examples 86-91 wherein moving the transfer ramp between the extended position and the deployed position includes moving the transfer ramp toward the deployed position, and wherein moving the transfer ramp toward the deployed position includes retracting the transfer ramp toward the platform and the other structure beyond initial contact of the transfer ramp with the platform or the other structure.

93. The method of example 92 wherein retracting the transfer ramp toward the platform and the other structure beyond the initial contact includes bending the transfer ramp to conform to an alignment between the platform and the other structure.

94. The method of example 92 or example 93 wherein retracting the transfer ramp toward the platform and the other structure beyond the initial contact includes adjusting a height of the platform and/or a height of a top surface of the other structure.

95. The method of any of examples 70-94, further comprising retracting the transfer ramp between the extended position and the stowed position, wherein retracting the transfer ramp including controlling, via the microcontroller, the one or more actuators such that the transfer ramp is moved (a) between the extended position and the stowed position according to a second predetermined path and (b) through the gap between the platform and the other structure.

96. The method of example 95 wherein retracting the transfer ramp according to the second predetermined path includes retracting the transfer ramp through the gap, rotating the transfer ramp such that a pitch of the transfer ramp is decreased, and retracting the transfer ramp with the decreased pitch through a space beneath the platform.

97. The method of example 95 or example 96 wherein retracting the transfer ramp includes retracting the transfer ramp in response to user input.

98. The method of any of examples 95-97 wherein retracting the transfer ramp includes seating the transfer ramp in one or more notches of a stowage stop positioned under the frame rails.

99. The method of any of examples 70-98 wherein the gap has a width of 52 cm or less.

100. The method of any of examples 70-99 wherein the gap has a width of 38 cm or less.

101. The method of any of examples 70-100 wherein the gap has a width of 26 cm or less.

D. Conclusion

From the foregoing, it will be appreciated that specific embodiments of the technology have been described herein for purposes of illustration, but well-known structures and functions have not been shown or described in detail to avoid unnecessarily obscuring the description of the embodiments of the technology. The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on."

Spatially relative terms, such as "beneath," "below," "over," "under," "above," "upper," "top," "bottom," "left," "right," "center," "middle," "forward," "away," and the like, are used herein for ease of description to describe one element or feature's relationship relative to another element(s) or feature(s) as illustrated in the figures. It will be understood that the spatially relative terms are intended to encompass different orientations of the device or system in use or operation in addition to the orientation depicted in the figures. For example, if a device or system in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein are interpreted accordingly. In addition, it will also be understood that when an element is referred to as being "between" two other elements, it can be the only element between the two other elements, or one or more intervening elements may also be present.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A transfer ramp system mountable to or under frame rails of a vehicle or trailer, the transfer ramp system comprising:
   a transfer ramp;
   one or more extendable arms operably coupled to the transfer ramp;
   one or more extension actuators operably coupled to the one or more extendable arms and configured to extend or retract the one or more extendable arms; and
   one or more rotation actuators operably coupled to the one or more extendable arms and configured to pivotably move the one or more extendable arms,
   wherein, when the transfer ramp system is mounted to or under the frame rails, the one or more extension actuators and the one or more rotation actuators are controllable to manipulate the one or more extendable arms to move the transfer ramp (a) from a position beneath a platform of the vehicle or trailer, (b) upwards and fully through a gap between the platform and another structure physically separate from the vehicle or trailer, and (c) to a position above the platform and a top surface of the other structure such that the transfer ramp is usable to transfer cargo between the platform and the top surface.

2. The transfer ramp system of claim 1 wherein:
   the one or more extendable arms include a first extendable arm extending generally along a first longitudinal axis and a second extendable arm different from the first extendable arm, wherein the second extendable arm extends generally along a second longitudinal axis;
   the one or more extension actuators include a first actuator and a second actuator;
   the one or more rotation actuators include a third actuator and a fourth actuator;
   the first actuator is configured to extend or retract the first extendable arm generally along the first longitudinal axis;
   the third actuator is configured, at least while the first actuator is stationary, to pivot the first extendable arm and adjust a pitch of the first extendable arm;
   the second actuator is configured to extend or retract the second extendable arm generally along the second longitudinal axis; and
   the fourth actuator is configured, at least while the second actuator is stationary, to pivot the second extendable arm and adjust a pitch of the second extendable arm.

3. The transfer ramp system of claim 1, further comprising a microcontroller configured to control the one or more extension actuators and the one or more rotation actuators to manipulate the one or more extendable arms to move the transfer ramp (a) from the position beneath the platform, (b) through the gap, and (c) to the position above the platform, according to a predetermined path.

4. The transfer ramp system of claim 1 wherein the transfer ramp is configured to pivotably move between (a) a stowed orientation for stowage beneath the platform and (b) a deployed orientation in which a top surface of the transfer ramp is generally parallel to a top surface of the platform.

5. The transfer ramp system of claim 1, further comprising a ramp latching system configured to:
releasably retain the transfer ramp in a first orientation for stowage beneath the platform; or
releasably retain the transfer ramp in a second orientation in which a top surface of the transfer ramp is generally parallel with a top surface of the platform.

6. The transfer ramp system of claim 1 wherein:
the transfer ramp has a length measured in a direction generally along a longitudinal axis of the vehicle or trailer;
the length is shorter than a distance between (i) a platform of the vehicle or trailer and (ii) the ground upon which the vehicle or trailer rests; and
the gap between the platform and the other structure, as measured in the direction generally along the longitudinal axis of the vehicle or trailer, is smaller than the length of the transfer ramp.

7. The transfer ramp system of claim 6 wherein the one or more extension actuators and the one or more rotation actuators are controllable to manipulate the one or more extendable arms to move an entirety of the length of the transfer ramp (i) upwards and through the gap between the platform and the other structure physically separate from the vehicle or trailer, and (ii) to the position above the platform and the top surface of the other structure.

8. The transfer ramp system of claim 1 wherein the one or more extension actuators and the one or more rotation actuators are controllable to manipulate the one or more extendable arms to move the transfer ramp to the position above the platform and the top surface of the other structure such that the transfer ramp, while in a deployed orientation that is generally parallel to the platform and the top surface of the other structure, rests on top of the platform, on top of the top surface, or a combination thereof.

9. The transfer ramp system of claim 1 wherein the one or more rotation actuators are further configured to pivotably move the one or more extension actuators.

10. A transfer ramp system mountable beneath a top platform at a rear of a vehicle or trailer, the transfer ramp system comprising:
a transfer ramp; and
at least one extendable arm attached to the transfer ramp and usable to extend or retract the transfer ramp,
wherein, when the transfer ramp system is mounted beneath the top platform, the transfer ramp is moveable, using the at least one extendable arm, between (a) a stowed position in which the transfer ramp is positioned beneath the top platform and (b) a deployed position in which the transfer ramp is positioned above the top platform and another structure such that the transfer ramp is usable to bridge a gap between the top platform and another structure for moving cargo between (i) the vehicle or trailer and (ii) the other structure, and
wherein, in the deployed position, the transfer ramp is in a deployed orientation in which a top surface of the transfer ramp is generally parallel to a top surface of the top platform.

11. The transfer ramp system of claim 10 wherein the transfer ramp system is mountable beneath the top platform at the rear of the vehicle or trailer such that, when the transfer ramp is moved between the stowed position and the deployed position, the transfer ramp is navigated through a space below the top platform and above a liftgate of the vehicle or trailer.

12. The transfer ramp system of claim 10, further comprising at least one actuator configured to extend or retract the at least one extendable arm to extend or retract, respectively, the transfer ramp.

13. The transfer ramp system of claim 12 wherein the at least one actuator includes a first actuator usable to extend or retract the at least one extendable arm, and wherein the transfer ramp system further comprises a second actuator usable to rotate the at least one extendable arm.

14. The transfer ramp system of claim 12 wherein:
the at least one extendable arm includes a first extendable arm extending generally along a first longitudinal axis and a second extendable arm different from the first extendable arm, wherein the second extendable arm extends generally along a second longitudinal axis;
the at least one actuator includes a first actuator and a second actuator;
the transfer ramp system further comprises a third actuator and a fourth actuator;
the first actuator is usable to extend or retract the first extendable arm generally along the first longitudinal axis;
the third actuator is usable to rotate the first extendable arm and adjust a pitch of the first extendable arm;
the second actuator is usable to extend or retract the second extendable arm generally along the second longitudinal axis; and
the fourth actuator is usable to rotate the second extendable arm and adjust a pitch of the second extendable arm.

15. The transfer ramp system of claim 10, further comprising:
at least one actuator configured to manipulate the at least one extendable arm; and
a microcontroller configured to control the at least one actuator to move the transfer ramp between the stowed position and the deployed position.

16. The transfer ramp system of claim 15 wherein the microcontroller is configured to control the at least one actuator to move the transfer ramp between the stowed position and the deployed position generally along a predetermined path.

17. The transfer ramp system of claim 16 wherein the microcontroller is configured to control the at least one actuator to move the transfer ramp along the predetermined path based, at least in part, on feedback received from the at least one actuator.

18. The transfer ramp system of claim 16 wherein the predetermined path is generally S-shaped such that, as the transfer ramp is moved between the stowed position and the deployed position, the transfer ramp is navigated under the top platform, through the gap between the top platform and the other structure, and above the top platform and the other structure.

19. The transfer ramp system of claim 10 wherein the transfer ramp is configured to rotate between (i) a stowed orientation for stowage beneath the top platform and (ii) the deployed orientation.

20. The transfer ramp system of claim 19, further comprising a ramp latching system configured to releasably hold the transfer ramp in the stowed orientation.

21. The transfer ramp system of claim 19, further comprising a ramp latching system, wherein the ramp latching system includes:
a first latch configured to releasably hold the transfer ramp in the stowed orientation; and
a second latch configured to releasably hold the transfer ramp in the deployed orientation.

22. A cargo transferring system mountable to or under frame rails of a vehicle or trailer, the cargo transferring system comprising:
a bridge deck;
one or more extendable arms operably coupled to the bridge deck; and
one or more actuators configured to extend and retract the one or more extendable arms,
wherein, during operation of the cargo transferring system when mounted to or under the frame rails of the vehicle or trailer, the one or more actuators are controllable to transition the bridge deck between a stowed position under the frame rails,
a transition position in which the one or more actuators are controllable to maneuver the bridge deck from beneath the platform of the vehicle or trailer, upwards and through a space between the vehicle or trailer and the other structure, and to a position above the platform of the vehicle or trailer, and
a deployed position in which a top sruface of the bridge deck is generally parallel to a top surface of a platform of the vehicle or trailer and is usable to transfer cargo between (i) the platform of the vehicle or trailer and (ii) a surface of another structure different from the vehicle or trailer.

23. The cargo transferring system of claim 22 wherein the bridge deck includes a length measured in a direction generally along a longitudinal axis of the vehicle or trailer, and wherein the space between the vehicle or trailer and the other structure, measured in the direction generally along the longitudinal axis of the vehicle or trailer, is less than the length of the bridge deck.

24. The cargo transferring system of claim 22 wherein:
the one or more actuators are one or more first actuators configured to extend and retract the one or more extendable arms generally along one or more longitudinal axes of the one or more extendable arms; and
the cargo transferring system further comprises one or more second actuators usable to adjust a pitch of the one or more extendable arms.

25. The cargo transferring system of claim 22 wherein the bridge deck is configured to rotate relative to the one or more extendable arms such that a top surface of the bridge deck is alignable with a top surface of the platform.

26. The cargo transferring system of claim 22, further comprising a ramp latching system configured to:
releasably retain the bridge deck in a first orientation for stowage beneath the frame rails; and/or
releasably retain the bridge deck in a second orientation in which a top surface of the bridge deck is generally parallel with a top surface of the platform.

27. The cargo transferring system of claim 22, further comprising a microcontroller configured to control movement of the bridge deck between the stowed position and the deployed position.

28. The cargo transferring system of claim 27 wherein the microcontroller is configured to control the movement of the bridge deck such that the bridge deck is moved between the stowed position and the deployed position according to a predetermined path.

29. The cargo transferring system of claim 28 wherein the microcontroller is configured to, based at least in part on feedback received from the one or more actuators, control the movement of the bridge deck according to the predetermined path.

30. The cargo transferring system of claim 28 wherein the predetermined path is generally S-shaped and extends between a point beneath the frame rails and a point above the platform.

31. A method of operating a transfer ramp system (a) mounted to a vehicle or trailer and (b) including a transfer ramp usable to transfer cargo between (i) the vehicle or trailer and (ii) another structure separate from the vehicle or trailer, the method comprising:
deploying the transfer ramp, wherein deploying the transfer ramp includes moving the transfer ramp between a stowed position beneath frame rails of the vehicle or trailer, and
an extended position above a platform of the vehicle or trailer, and
wherein moving the transfer ramp includes controlling, via a microcontroller of the transfer ramp system, one or more actuators of the transfer ramp system such that the transfer ramp is moved upwards and through a gap between the platform and the other structure, thereby positioning the transfer ramp at a location above the platform and the other structure.

32. The method of claim 31, further comprising moving the transfer ramp between (i) the extended position and (ii) a deployed position in which the transfer ramp spans the gap between the platform and the other structure.

33. The method of claim 31 wherein:
deploying the transfer ramp includes monitoring feedback received from the one or more actuators;
moving the transfer ramp includes controlling, via the microcontroller, the one or more actuators such that the transfer ramp is moved between the stowed position and the extended position according to a predetermined path; and
controlling the one or more actuators includes controlling the one or more actuators based, at least in part, on the feedback.

34. The method of claim 31, further comprising rotating the transfer ramp between a stored arrangement and a deployed arrangement in which a top surface of the transfer ramp is more aligned with a top surface of the platform than in the stored arrangement.

35. The method of claim 31 wherein:
the transfer ramp has a length measured in a direction generally along a longitudinal axis of the vehicle or trailer;
the length is shorter than a distance between (i) a platform of the vehicle or trailer and (ii) the ground upon which the vehicle or trailer rests; and
the gap between the platform and the other structure, as measured in the direction generally along the longitudinal axis of the vehicle or trailer, is smaller than the length of the transfer ramp.

36. The transfer ramp system of claim 10 wherein:
the transfer ramp has a length measured in a direction generally along a longitudinal axis of the vehicle or trailer; and
the length is shorter than a distance between (i) a platform of the vehicle or trailer and (ii) the ground upon which the vehicle or trailer rests.

* * * * *